US012551530B2

(12) United States Patent
Emtage et al.

(10) Patent No.: US 12,551,530 B2
(45) Date of Patent: Feb. 17, 2026

(54) IMMUNE CELL FUNCTION

(71) Applicant: Kite Pharma, Inc., Santa Monica, CA (US)

(72) Inventors: Peter Emtage, Lafayette, CA (US); Jun Feng, San Diego, CA (US); Heba Nowyhed, Los Angeles, CA (US); Tammy Phung, San Diego, CA (US)

(73) Assignee: Kite Pharma, Inc., Santa Monica, CA (US)

( * ) Notice: Subject to any disclaimer, the term of this patent is extended or adjusted under 35 U.S.C. 154(b) by 1056 days.

(21) Appl. No.: 17/400,467

(22) Filed: Aug. 12, 2021

(65) Prior Publication Data

US 2022/0047677 A1 Feb. 17, 2022

Related U.S. Application Data

(60) Provisional application No. 63/066,039, filed on Aug. 14, 2020.

(51) Int. Cl.

| | |
|---|---|
| ***A61K 38/20*** | (2006.01) |
| ***A61K 35/17*** | (2025.01) |
| ***A61K 38/17*** | (2006.01) |
| ***A61K 39/395*** | (2006.01) |
| ***A61K 40/11*** | (2025.01) |
| ***A61K 40/15*** | (2025.01) |
| ***A61K 40/31*** | (2025.01) |
| ***A61K 40/32*** | (2025.01) |
| ***A61K 40/42*** | (2025.01) |
| ***A61P 35/00*** | (2006.01) |
| ***C07K 14/54*** | (2006.01) |
| ***C07K 14/715*** | (2006.01) |
| ***C12N 5/0783*** | (2010.01) |
| ***C12N 15/62*** | (2006.01) |
| ***C12N 15/86*** | (2006.01) |

(52) U.S. Cl.

CPC .......... *A61K 38/20* (2013.01); *A61K 38/1774* (2013.01); *A61K 38/1793* (2013.01); *A61K 38/208* (2013.01); *A61K 38/2086* (2013.01); *A61K 39/3955* (2013.01); *A61K 40/11* (2025.01); *A61K 40/15* (2025.01); *A61K 40/31* (2025.01); *A61K 40/32* (2025.01); *A61K 40/4211* (2025.01); *A61K 40/4268* (2025.01); *A61P 35/00* (2018.01); *C07K 14/54* (2013.01); *C07K 14/7155* (2013.01); *C12N 5/0636* (2013.01); *C12N 5/0646* (2013.01); *C12N 15/625* (2013.01); *C12N 15/86* (2013.01); *A61K 2239/48* (2023.05); *C07K 2319/00* (2013.01); *C12N 2501/2302* (2013.01); *C12N 2501/2307* (2013.01); *C12N 2501/2312* (2013.01); *C12N 2501/2315* (2013.01); *C12N 2501/2318* (2013.01); *C12N 2501/405* (2013.01); *C12N 2510/00* (2013.01); *C12N 2740/10043* (2013.01); *C12N 2740/15043* (2013.01)

(58) Field of Classification Search
None
See application file for complete search history.

(56) References Cited

FOREIGN PATENT DOCUMENTS

| | | | |
|---|---|---|---|
| CN | 110494557 | A | 11/2019 |
| CN | 114450015 | A | 5/2022 |
| EP | 1094081 | A1 | 4/2001 |
| WO | WO-2002/032374 | A2 | 4/2002 |
| WO | WO-03/059376 | A1 | 7/2003 |
| WO | WO 2018/027155 | A1 * | 2/2018 |
| WO | WO-2019/077037 | A1 | 4/2019 |
| WO | WO-2019/165121 | A1 | 8/2019 |
| WO | WO-2020/045610 | A1 | 3/2020 |
| WO | WO-2020/146835 | A1 | 7/2020 |
| WO | WO-2021/021907 | A1 | 2/2021 |
| WO | WO-2021/101467 | A1 | 5/2021 |

OTHER PUBLICATIONS

Agrahari et al., 2017 (Expert Opinion on Drug Delivery, vol. 14, No. 10, p. 1145-1162).*
Li et al., 2020 (Annals of Translational Medicine, 8(17):1093, p. 1-8).*
Dagar et al., 2023 (Journal of Translational Medicine, 21:449, p. 1-36).*
Cooper et al., 2015 (International Journal of Surgery, vol. 23, p. 211-216).*
Liu et al., 2017 (Frontiers in Immunology, vol. 8, article 645, p. 1-6).*
Blokon-Kogan, et al. (2022) "Membrane anchored IL-18 linked to constitutively active TLR4 and CD40 improves human T cell antitumor capacities for adoptive cell therapy", Journal for ImmunoTherapy of Cancer, 10:e001544 (12 pages). (Year: 2022).*
Kessel, et al. (2025) "Weal and woe of interleukin-18 in the T cell therapy of cancer", Journal for Immunotherapy of Cancer, 31(1):e010545 (6 pages). (Year: 2025).*
Avanzi, M.P. et al. (2018) "Engineered Tumor-Targeted T Cells Mediate Enhanced Anti-Tumor Efficacy Both Directly and through Activation of the Endogenous Immune System" Cell Reports 23(7):2130-2141.
Chmielewski, M. et al. (2017) "CAR T Cells Releasing IL-18 Covert to T-Bet(high) FoxO1(low) Effectors that Exhibit Augmented Activity Against Advanced Solid Tumors" Cell Reports 21(11):3205-3219.

(Continued)

*Primary Examiner* — Robert M Kelly

(57) ABSTRACT

The methods and compositions disclosed herein relate to the field of cell therapy, and more specifically, to improving CAR and/or TCR function through improvement of the tumor microenvironment via improvement in cytokine signaling. Methods of treating a cancer in a patient are disclosed comprising administering to the patient immune cells expressing a chimeric antigen receptor or T-cell receptor and a membrane bound IL-18. Further disclosed are nucleic acids which encode a membrane bound IL-18 and methods for culturing cells expressing such nucleic acids.

5 Claims, No Drawings

Specification includes a Sequence Listing.

(56) References Cited

OTHER PUBLICATIONS

Chmielewski, M. et al. (2018) "TRUCKs with IL-18 payload: Toward shaping the immune landscape for a more efficacious CAR T-cell therapy of solid cancer" Advances in Cell and Gene Therapy 1(1):E7, 4 pages.
Granzin, M. et al. (2017) "Shaping of Natural Killer Cell Antitumor Activity by Ex Vivo Cultivation" Frontiers in Immunology 8(458): 18 pages.
Hu, B. et al. (2017) "Augmentation of Antitumor Immunity by Human and Mouse CAR T Cells Secreting IL-18" Cell Reports 20(13):3025-3033.
Lange, S.M. et al. (2020) "Engineering CAR T cells with a GM-CSF:IL-18 cytokine switch receptor results in potent antitumor activity in solid tumors" J Immunol 204(1 Suppl) 170.9, abstract.
Intl. Search Report-Written Opinion dated Jan. 4, 2022 for Intl. Appl. No. PCT/US2021/045668.
Office Action dated Jan. 23, 2024 for Japanese Appl. No. 2023/510321.
Huang, Y. et al. (2019) "IL-18R-dependent and independent pathways account for IL-18-enhanced antitumor ability of CAR-T cells" FASEB J. 34(1):1768-1782.
Rowley, J. et al. (2009) "Expression of IL-15RA or an IL-15/IL-15RA fusion on CD8+ T cells modifies adoptively transferred T-cell function in cis" Eur J Immunol. 39(2):491-506.
Office Action dated Nov. 21, 2024 for Australian Appl. No. 2021326504.
Office Action dated Jan. 22, 2025 for Chinese Appl. No. 202180055502.2.
Office Action dated Jul. 30, 2025 for European Appl. No. 21773914.3.
Office Action dated Aug. 11, 2025 for Chinese Appl. No. 202180055502.2.
Office Action dated Aug. 28, 2025 for Korean Appl. No. 10-2023-7008320.

* cited by examiner

```
SEQUENCE LISTING

<160> NUMBER OF SEQ ID NOS: 47

<210> SEQ ID NO 1
<211> LENGTH: 579
<212> TYPE: DNA
<213> ORGANISM: Homo sapiens

<400> SEQUENCE: 1

atggccgctg agcccgtgga agataactgc atcaacttcg tcgccatgaa gttcatcgac     60

aacaccctgt actttatcgc cgaggacgac gagaacctgg aaagcgacta cttcggcaag    120

ctggaaagca agctgagcgt gatccggaac ctgaacgacc aggtgctgtt catcgatcag    180

ggcaacagac ccctgttcga ggacatgacc gacagcgact gcagagacaa cgcccctcgg    240

accatcttca tcatcagcat gtacaaggac agccagccta gaggcatggc cgtgaccatc    300

tctgtgaagt gcgagaagat cagcaccctg agctgcgaga acaagatcat cagcttcaaa    360

gagatgaacc cgccggacaa catcaaggac accaagagcg acatcatatt cttccagcgg    420

agcgtgcccg gccacgacaa caagatgcag tttgagagca gcagctacga gggctacttc    480

ctggcctgcg agaaagagcg ggacctgttc aagctgatcc tgaagaaaga ggacgaactg    540

ggcgaccgca gcatcatgtt caccgtgcag aacgaggac                           579


<210> SEQ ID NO 2
<211> LENGTH: 193
<212> TYPE: PRT
<213> ORGANISM: Homo sapiens

<400> SEQUENCE: 2

Met Ala Ala Glu Pro Val Glu Asp Asn Cys Ile Asn Phe Val Ala Met
1               5                   10                  15

Lys Phe Ile Asp Asn Thr Leu Tyr Phe Ile Ala Glu Asp Asp Glu Asn
            20                  25                  30

Leu Glu Ser Asp Tyr Phe Gly Lys Leu Glu Ser Lys Leu Ser Val Ile
        35                  40                  45

Arg Asn Leu Asn Asp Gln Val Leu Phe Ile Asp Gln Gly Asn Arg Pro
    50                  55                  60

Leu Phe Glu Asp Met Thr Asp Ser Asp Cys Arg Asp Asn Ala Pro Arg
65                  70                  75                  80

Thr Ile Phe Ile Ile Ser Met Tyr Lys Asp Ser Gln Pro Arg Gly Met
                85                  90                  95

Ala Val Thr Ile Ser Val Lys Cys Glu Lys Ile Ser Thr Leu Ser Cys
            100                 105                 110

Glu Asn Lys Ile Ile Ser Phe Lys Glu Met Asn Pro Pro Asp Asn Ile
        115                 120                 125

Lys Asp Thr Lys Ser Asp Ile Ile Phe Phe Gln Arg Ser Val Pro Gly
    130                 135                 140

His Asp Asn Lys Met Gln Phe Glu Ser Ser Ser Tyr Glu Gly Tyr Phe
145                 150                 155                 160

Leu Ala Cys Glu Lys Glu Arg Asp Leu Phe Lys Leu Ile Leu Lys Lys
```

165 170 175

Glu Asp Glu Leu Gly Asp Arg Ser Ile Met Phe Thr Val Gln Asn Glu
180 185 190

Asp

<210> SEQ ID NO 3
<211> LENGTH: 21
<212> TYPE: PRT
<213> ORGANISM: Artificial Sequence
<220> FEATURE:
<223> OTHER INFORMATION: Description of Artificial Sequence: Synthetic peptide

<400> SEQUENCE: 3

Met Ala Leu Pro Val Thr Ala Leu Leu Leu Pro Leu Ala Leu Leu Leu
1 5 10 15

His Ala Ala Arg Pro
20

<210> SEQ ID NO 4
<211> LENGTH: 48
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 4

Met Arg Ile Ser Lys Pro His Leu Arg Ser Ile Ser Ile Gln Cys Tyr
1 5 10 15

Leu Cys Leu Leu Leu Asn Ser His Phe Leu Thr Glu Ala Gly Ile His
20 25 30

Val Phe Ile Leu Gly Cys Phe Ser Ala Gly Leu Pro Lys Thr Glu Ala
35 40 45

<210> SEQ ID NO 5
<211> LENGTH: 1626
<212> TYPE: DNA
<213> ORGANISM: Homo sapiens

<400> SEQUENCE: 5
atgaactgca gagagctgcc cctgacactg tgggtgctga tctctgtgtc taccgccgag 60
agctgcacca gcagacctca catcacagtg gtggaaggcg agcccttcta cctgaagcac 120
tgcagctgtt ctctggccca cgagatcgag acaaccacca agagctggta caagagcagc 180
ggcagccaag agcacgtgga actgaaccct agaagcagca gcagaatcgc cctgcacgac 240
tgcgtgctgg aattctggcc tgtcgagctg aacgataccg gcagctactt cttccagatg 300
aagaactaca cccagaaatg gaagctgaac gtgatccggc ggaacaagca cagctgcttc 360
accgagagac aagtgaccag caagatcgtg gaagtgaaga agttctttca gatcacgtgc 420
gagaactcct actaccagac actggtcaac agcaccagcc tgtacaagaa ctgcaagaag 480
ctcctgctcg agaacaacaa gaaccccacc atcaagaaga acgccgagtt cgaggaccag 540
ggctactaca gctgcgtgca cttcctgcac cacaacggca agctgttcaa catcaccaag 600
accttcaata tcaccatcgt cgaggaccgc agcaacatcg tgcctgttct gctgggcccc 660
aagctgaatc atgtggctgt ggaactgggc aagaacgtgc ggctgaattg cagcgccctg 720
ctgaacgaag aggacgtgat ctactggatg ttcggcgagg aaaacggcag cgaccccaac 780
atccacgaag agaaagaaat gcggatcatg acccctgaag gcaagtggca cgccagcaag 840

```
gtgctgcgga tcgagaatat cggcgagagc aacctgaacg tgctgtacaa ctgtaccgtg     900

gccagcaccg gcggcacaga taccaagtcc tttatcctcg tgcggaaggc cgacatggct     960

gacattccag gccacgtgtt cacccggggc atgatcattg ccgtgctgat cctggtggcc    1020

gtcgtgtgtc tggtcaccgt gtgtgtgatc tacagagtgg acctggtcct gttctaccgg    1080

cacctgacca gaagggacga gacactgacc gacggcaaga cctacgatgc cttcgtgtcc    1140

tacctgaaag agtgcagacc cgagaacggc gaagaacaca ccttcgccgt ggaaatcctg    1200

cctagagtgc tggaaaagca cttcggctac aagctgtgca tcttcgagcg cgacgttgtg    1260

cctggcggag ctgtggtgga tgagatccac agcctgatcg agaagtccag acggctgatc    1320

atcgtgctga gcaagagcta catgagcaac gaagtccgct acgagctgga aagcggactg    1380

cacgaagccc tggtggaacg gaagatcaag atcatcctga ttgagttcac ccctgtgacc    1440

gacttcacat tcctgcctca gagcctgaag ctgctgaagt cccacagagt gctgaagtgg    1500

aaagccgaca agagcctgag ctacaacagc cggttttgga agaacctgct gtacctgatg    1560

cctgccaaga ccgtgaagcc cggcagagat gaacctgagg ttctgcctgt gctgagcgag    1620

tcctaa                                                                1626
```

<210> SEQ ID NO 6
<211> LENGTH: 540
<212> TYPE: PRT
<213> ORGANISM: Homo sapiens

<400> SEQUENCE: 6

```
Met Asn Cys Arg Glu Leu Pro Leu Thr Leu Trp Val Leu Ile Ser Val
1               5                   10                  15

Ser Thr Ala Glu Ser Cys Thr Ser Arg Pro His Ile Thr Val Val Glu
            20                  25                  30

Gly Glu Pro Phe Tyr Leu Lys His Cys Ser Cys Ser Leu Ala His Glu
        35                  40                  45

Ile Glu Thr Thr Thr Lys Ser Trp Tyr Lys Ser Ser Gly Ser Gln Glu
    50                  55                  60

His Val Glu Leu Asn Pro Arg Ser Ser Ser Arg Ile Ala Leu His Asp
65                  70                  75                  80

Cys Val Leu Glu Phe Trp Pro Val Glu Leu Asn Asp Thr Gly Ser Tyr
                85                  90                  95

Phe Phe Gln Met Lys Asn Tyr Thr Gln Lys Trp Lys Leu Asn Val Ile
            100                 105                 110

Arg Arg Asn Lys His Ser Cys Phe Thr Glu Arg Gln Val Thr Ser Lys
        115                 120                 125

Ile Val Glu Val Lys Lys Phe Phe Gln Ile Thr Cys Glu Asn Ser Tyr
    130                 135                 140

Tyr Gln Thr Leu Val Asn Ser Thr Ser Leu Tyr Lys Asn Cys Lys Lys
145                 150                 155                 160

Leu Leu Leu Glu Asn Asn Lys Asn Pro Thr Ile Lys Lys Asn Ala Glu
                165                 170                 175

Phe Glu Asp Gln Gly Tyr Tyr Ser Cys Val His Phe Leu His His Asn
            180                 185                 190

Gly Lys Leu Phe Asn Ile Thr Lys Thr Phe Asn Ile Thr Ile Val Glu
        195                 200                 205

Asp Arg Ser Asn Ile Val Pro Val Leu Leu Gly Pro Lys Leu Asn His
    210                 215                 220
```

```
Val Ala Val Glu Leu Gly Lys Asn Val Arg Leu Asn Cys Ser Ala Leu
225                 230                 235                 240

Leu Asn Glu Glu Asp Val Ile Tyr Trp Met Phe Gly Glu Glu Asn Gly
                245                 250                 255

Ser Asp Pro Asn Ile His Glu Glu Lys Glu Met Arg Ile Met Thr Pro
            260                 265                 270

Glu Gly Lys Trp His Ala Ser Lys Val Leu Arg Ile Glu Asn Ile Gly
        275                 280                 285

Glu Ser Asn Leu Asn Val Leu Tyr Asn Cys Thr Val Ala Ser Thr Gly
    290                 295                 300

Gly Thr Asp Thr Lys Ser Phe Ile Leu Val Arg Lys Ala Asp Met Ala
305                 310                 315                 320

Asp Ile Pro Gly His Val Phe Thr Arg Gly Met Ile Ile Ala Val Leu
                325                 330                 335

Ile Leu Val Ala Val Val Cys Leu Val Thr Val Cys Val Ile Tyr Arg
            340                 345                 350

Val Asp Leu Val Leu Phe Tyr Arg His Leu Thr Arg Arg Asp Glu Thr
        355                 360                 365

Leu Thr Asp Gly Lys Thr Tyr Asp Ala Phe Val Ser Tyr Leu Lys Glu
    370                 375                 380

Cys Arg Pro Glu Asn Gly Glu Glu His Thr Phe Ala Val Glu Ile Leu
385                 390                 395                 400

Pro Arg Val Leu Glu Lys His Phe Gly Tyr Lys Leu Cys Ile Phe Glu
                405                 410                 415

Arg Asp Val Val Pro Gly Gly Ala Val Val Asp Glu Ile His Ser Leu
            420                 425                 430

Ile Glu Lys Ser Arg Arg Leu Ile Ile Val Leu Ser Lys Ser Tyr Met
        435                 440                 445

Ser Asn Glu Val Arg Tyr Glu Leu Glu Ser Gly Leu His Glu Ala Leu
    450                 455                 460

Val Glu Arg Lys Ile Lys Ile Ile Leu Ile Glu Phe Thr Pro Val Thr
465                 470                 475                 480

Asp Phe Thr Phe Leu Pro Gln Ser Leu Lys Leu Leu Lys Ser His Arg
                485                 490                 495

Val Leu Lys Trp Lys Ala Asp Lys Ser Leu Ser Tyr Asn Ser Arg Phe
            500                 505                 510

Trp Lys Asn Leu Leu Tyr Leu Met Pro Ala Lys Thr Val Lys Pro Gly
        515                 520                 525

Arg Asp Glu Pro Glu Val Leu Pro Val Leu Ser Glu
    530                 535                 540


<210> SEQ ID NO 7
<211> LENGTH: 1800
<212> TYPE: DNA
<213> ORGANISM: Homo sapiens

<400> SEQUENCE: 7

atgctgtgtc tcggctggat cttcctgtgg ctggtggccg gcgagagaat caagggcttc      60

aatatcagcg gctgcagcac caagaaactg ctgtggacct acagcacccg cagcgaagag     120

gaattcgtgc tgttctgcga cctgcctgag cctcagaagt cccacttctg ccaccggaac     180

agactgagcc ctaaacaggt gcccgagcat ctgcctttca tgggcagcaa cgatctgagc     240

gacgtgcagt ggtatcagca gcccagcaat ggcgaccctc tggaagatat cagaaagagc     300

taccctcaca tcatccagga caagtgcacc ctgcactttc tgacccctgg cgtgaacaac     360
```

```
agcggcagct acatctgcag acccaagatg atcaagagcc cctacgacgt ggcctgctgc    420
gtgaagatga tcctggaagt gaagccccag accaacgcca gctgcgagta tagcgccagc    480
cacaagcagg atctgctgct gggctctaca ggcagcatca gctgtcctag cctgagctgt    540
cagagcgacg ctcagtctcc tgccgtgacc tggtacaaga acggcaagct gctgagcgtg    600
gaacggtcca acagaatcgt ggtggacgag gtgtacgact accaccaggg cacctacgtg    660
tgcgactaca cccagagcga taccgtgtct agctggaccg tcagagccgt ggtgcaagtg    720
cggacaatcg tgggcgatac caagctgaag cccgacattc tggaccccgt ggaagataca    780
ctggaagtgg aactgggcaa gcccctgacc atcagctgca aggccagatt cggcttcgag    840
cgggtgttca accccgtgat caagtggtac atcaaggaca gcgacctgga atgggaagtg    900
tccgtgcctg aggccaagtc catcaagagc acactgaagg acgagatcat cgagcggaac    960
atcatcctgg aaaaagtgac ccagcgggac ctgcggagaa agttcgtgtg cttcgtgcag   1020
aactccatcg gcaacaccac acagagcgtg cagctgaaag aaaagcgcgg cgtggtgctg   1080
ctgtacatcc tgctgggaac aatcggcacc ctggtggctg ttctggctgc ttctgccctg   1140
ctgtatcggc actggatcga gatcgtgctg ctctacagaa cctaccagag caaggatcag   1200
accctgggcg acaagaagga cttcgacgcc tttgtgtcct acgccaagtg gtccagcttt   1260
cccagcgagg ccacaagctc cctgagcgaa gaacatctgg ccctgtctct gttccccgac   1320
gtgctggaaa acaaatacgg ctacagcctg tgcctgctgg aaagagatgt tgcccctggc   1380
ggagtgtacg ccgaggatat cgtgtccatc atcaagcgga gcagacgggg catcttcatt   1440
ctgagcccca actacgtgaa cggccccagc atctttgaac tgcaagccgc cgtgaacctg   1500
gctctggacg atcagacact gaagctgatt ctgatcaagt tctgctactt ccaagagcct   1560
gagagcctgc ctcacctggt caaaaaggcc ctgagagtgc tgcccaccgt gacttggaga   1620
ggcctgaaaa gcgtgccacc taacagccgg ttctgggcca agatgagata ccacatgcct   1680
gtgaagaact cccagggctt cacctggaac cagctgcgga tcaccagcag aatcttccag   1740
tggaagggcc tgagccggac cgagacaaca ggcagaagct cccagcctaa agagtggtga   1800
```

```
<210> SEQ ID NO 8
<211> LENGTH: 599
<212> TYPE: PRT
<213> ORGANISM: Homo sapiens

<400> SEQUENCE: 8

Met Leu Cys Leu Gly Trp Ile Phe Leu Trp Leu Val Ala Gly Glu Arg
1               5                   10                  15

Ile Lys Gly Phe Asn Ile Ser Gly Cys Ser Thr Lys Lys Leu Leu Trp
            20                  25                  30

Thr Tyr Ser Thr Arg Ser Glu Glu Glu Phe Val Leu Phe Cys Asp Leu
        35                  40                  45

Pro Glu Pro Gln Lys Ser His Phe Cys His Arg Asn Arg Leu Ser Pro
    50                  55                  60

Lys Gln Val Pro Glu His Leu Pro Phe Met Gly Ser Asn Asp Leu Ser
65                  70                  75                  80

Asp Val Gln Trp Tyr Gln Gln Pro Ser Asn Gly Asp Pro Leu Glu Asp
                85                  90                  95

Ile Arg Lys Ser Tyr Pro His Ile Ile Gln Asp Lys Cys Thr Leu His
            100                 105                 110

Phe Leu Thr Pro Gly Val Asn Asn Ser Gly Ser Tyr Ile Cys Arg Pro
```

```
        115                 120                 125

Lys Met Ile Lys Ser Pro Tyr Asp Val Ala Cys Cys Val Lys Met Ile
    130                 135                 140

Leu Glu Val Lys Pro Gln Thr Asn Ala Ser Cys Glu Tyr Ser Ala Ser
145                 150                 155                 160

His Lys Gln Asp Leu Leu Leu Gly Ser Thr Gly Ser Ile Ser Cys Pro
                165                 170                 175

Ser Leu Ser Cys Gln Ser Asp Ala Gln Ser Pro Ala Val Thr Trp Tyr
            180                 185                 190

Lys Asn Gly Lys Leu Leu Ser Val Glu Arg Ser Asn Arg Ile Val Val
        195                 200                 205

Asp Glu Val Tyr Asp Tyr His Gln Gly Thr Tyr Val Cys Asp Tyr Thr
    210                 215                 220

Gln Ser Asp Thr Val Ser Ser Trp Thr Val Arg Ala Val Val Gln Val
225                 230                 235                 240

Arg Thr Ile Val Gly Asp Thr Lys Leu Lys Pro Asp Ile Leu Asp Pro
                245                 250                 255

Val Glu Asp Thr Leu Glu Val Glu Leu Gly Lys Pro Leu Thr Ile Ser
            260                 265                 270

Cys Lys Ala Arg Phe Gly Phe Glu Arg Val Phe Asn Pro Val Ile Lys
        275                 280                 285

Trp Tyr Ile Lys Asp Ser Asp Leu Glu Trp Glu Val Ser Val Pro Glu
    290                 295                 300

Ala Lys Ser Ile Lys Ser Thr Leu Lys Asp Glu Ile Ile Glu Arg Asn
305                 310                 315                 320

Ile Ile Leu Glu Lys Val Thr Gln Arg Asp Leu Arg Arg Lys Phe Val
                325                 330                 335

Cys Phe Val Gln Asn Ser Ile Gly Asn Thr Thr Gln Ser Val Gln Leu
            340                 345                 350

Lys Glu Lys Arg Gly Val Val Leu Leu Tyr Ile Leu Leu Gly Thr Ile
        355                 360                 365

Gly Thr Leu Val Ala Val Leu Ala Ala Ser Ala Leu Leu Tyr Arg His
    370                 375                 380

Trp Ile Glu Ile Val Leu Leu Tyr Arg Thr Tyr Gln Ser Lys Asp Gln
385                 390                 395                 400

Thr Leu Gly Asp Lys Lys Asp Phe Asp Ala Phe Val Ser Tyr Ala Lys
                405                 410                 415

Trp Ser Ser Phe Pro Ser Glu Ala Thr Ser Ser Leu Ser Glu Glu His
            420                 425                 430

Leu Ala Leu Ser Leu Phe Pro Asp Val Leu Glu Asn Lys Tyr Gly Tyr
        435                 440                 445

Ser Leu Cys Leu Leu Glu Arg Asp Val Ala Pro Gly Gly Val Tyr Ala
    450                 455                 460

Glu Asp Ile Val Ser Ile Ile Lys Arg Ser Arg Arg Gly Ile Phe Ile
465                 470                 475                 480

Leu Ser Pro Asn Tyr Val Asn Gly Pro Ser Ile Phe Glu Leu Gln Ala
                485                 490                 495

Ala Val Asn Leu Ala Leu Asp Asp Gln Thr Leu Lys Leu Ile Leu Ile
            500                 505                 510

Lys Phe Cys Tyr Phe Gln Glu Pro Glu Ser Leu Pro His Leu Val Lys
        515                 520                 525

Lys Ala Leu Arg Val Leu Pro Thr Val Thr Trp Arg Gly Leu Lys Ser
    530                 535                 540
```

```
Val Pro Pro Asn Ser Arg Phe Trp Ala Lys Met Arg Tyr His Met Pro
545                 550                 555                 560

Val Lys Asn Ser Gln Gly Phe Thr Trp Asn Gln Leu Arg Ile Thr Ser
                565                 570                 575

Arg Ile Phe Gln Trp Lys Gly Leu Ser Arg Thr Glu Thr Thr Gly Arg
            580                 585                 590

Ser Ser Gln Pro Lys Glu Trp
        595


<210> SEQ ID NO 9
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: SITE
<222> LOCATION: (1)..(30)
<223> OTHER INFORMATION: This sequence may encompass 1-6 “Gly Gly Gly
      Gly Ser” repeating units

<400> SEQUENCE: 9

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser
            20                  25                  30


<210> SEQ ID NO 10
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Gly Gly Gly Gly Ser Gly Gly Gly Gly Ser Gly Gly Gly Gly Ser Gly
1               5                   10                  15

Gly Gly Gly Ser
            20


<210> SEQ ID NO 11
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Gly Gly Gly Gly Ser Gly Gly Gly Gly Ser Gly Gly Gly Gly Ser
1               5                   10                  15


<210> SEQ ID NO 12
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Gly Ser Thr Ser Gly Ser Gly Lys Pro Gly Ser Gly Glu Gly Ser Thr
1               5                   10                  15
```

Lys Gly

<210> SEQ ID NO 13
<211> LENGTH: 54
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 13
ggcagcacca gcggcagcgg caaaccgggc agcggcgaag gcagcaccaa aggc 54

<210> SEQ ID NO 14
<211> LENGTH: 30
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 14
gaacagaagc tgataagtga ggaggacttg 30

<210> SEQ ID NO 15
<211> LENGTH: 10
<212> TYPE: PRT
<213> ORGANISM: Artificial Sequence
<220> FEATURE:
<223> OTHER INFORMATION: Description of Artificial Sequence: Synthetic peptide

<400> SEQUENCE: 15

Glu Gln Lys Leu Ile Ser Glu Glu Asp Leu
1 5 10

<210> SEQ ID NO 16
<211> LENGTH: 534
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 16
atggctctgc ctgtgacagc tctgctgctg cctctggctc tgcttctgca tgccgccaga 60
ccttacttcg gcaagctgga aagcaagctg agcgtgatcc ggaacctgaa cgaccaggtg 120
ctgttcatcg accagggcaa cagacccctg ttcgaggaca tgaccgacag cgactgcaga 180
gacaacgccc ctcggaccat cttcatcatc agcatgtaca aggacagcca gcctagaggc 240
atggccgtga ccatctctgt gaagtgcgag aagatcagca ccctgagctg cgagaacaag 300
atcatcagct tcaaagagat gaacccgccg gacaacatca aggacaccaa gagcgacatc 360
atattcttcc agcggagcgt gcccggccac gacaacaaga tgcagtttga gagcagcagc 420
tacgagggct acttcctggc ctgcgagaaa gagcgggacc tgttcaagct gatcctgaag 480
aaagaggacg aactgggcga ccgcagcatc atgttcaccg tgcagaacga ggac 534

<210> SEQ ID NO 17
<211> LENGTH: 178
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 17

```
Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30

Ile Arg Asn Leu Asn Asp Gln Val Leu Phe Ile Asp Gln Gly Asn Arg
        35                  40                  45

Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110

Ile Lys Asp Thr Lys Ser Asp Ile Ile Phe Phe Gln Arg Ser Val Pro
        115                 120                 125

Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160

Lys Glu Asp Glu Leu Gly Asp Arg Ser Ile Met Phe Thr Val Gln Asn
                165                 170                 175

Glu Asp
```

<210> SEQ ID NO 18
<211> LENGTH: 615
<212> TYPE: DNA
<213> ORGANISM: Artificial Sequence
<220> FEATURE:
<223> OTHER INFORMATION: Description of Artificial Sequence: Synthetic
polynucleotide

<400> SEQUENCE: 18

```
atgagaatca gcaagcccca cctgagatcc atcagcatcc agtgctacct gtgcctgctg     60

ctgaacagcc actttctgac agaggccggc atccacgtgt tcatcctggg ctgtttttct    120

gccggcctgc ctaagaccga ggcctacttt ggcaagctgg aaagcaagct gagcgtgatc    180

cggaacctga acgaccaggt gctgttcatc gaccagggca acagacccct gttcgaggac    240

atgaccgaca gcgactgcag agacaacgcc cctcggacca tcttcatcat cagcatgtac    300

aaggacagcc agcctagagg catggccgtg accatctctg tgaagtgcga gaagatcagc    360

accctgagct gcgagaacaa gatcatcagc ttcaaagaga tgaacccgcc ggacaacatc    420

aaggacacca agagcgacat catattcttc cagcggagcg tgcccggcca cgacaacaag    480

atgcagtttg agagcagcag ctacgagggc tacttcctgg cctgcgagaa agagcgggac    540

ctgttcaagc tgatcctgaa gaaagaggac gaactgggcg accgcagcat catgttcacc    600

gtgcagaacg aggac                                                     615
```

<210> SEQ ID NO 19
<211> LENGTH: 205
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 19

```
Met Arg Ile Ser Lys Pro His Leu Arg Ser Ile Ser Ile Gln Cys Tyr
1               5                   10                  15

Leu Cys Leu Leu Leu Asn Ser His Phe Leu Thr Glu Ala Gly Ile His
            20                  25                  30

Val Phe Ile Leu Gly Cys Phe Ser Ala Gly Leu Pro Lys Thr Glu Ala
        35                  40                  45

Tyr Phe Gly Lys Leu Glu Ser Lys Leu Ser Val Ile Arg Asn Leu Asn
    50                  55                  60

Asp Gln Val Leu Phe Ile Asp Gln Gly Asn Arg Pro Leu Phe Glu Asp
65                  70                  75                  80

Met Thr Asp Ser Asp Cys Arg Asp Asn Ala Pro Arg Thr Ile Phe Ile
                85                  90                  95

Ile Ser Met Tyr Lys Asp Ser Gln Pro Arg Gly Met Ala Val Thr Ile
            100                 105                 110

Ser Val Lys Cys Glu Lys Ile Ser Thr Leu Ser Cys Glu Asn Lys Ile
        115                 120                 125

Ile Ser Phe Lys Glu Met Asn Pro Pro Asp Asn Ile Lys Asp Thr Lys
    130                 135                 140

Ser Asp Ile Ile Phe Phe Gln Arg Ser Val Pro Gly His Asp Asn Lys
145                 150                 155                 160

Met Gln Phe Glu Ser Ser Ser Tyr Glu Gly Tyr Phe Leu Ala Cys Glu
                165                 170                 175

Lys Glu Arg Asp Leu Phe Lys Leu Ile Leu Lys Lys Glu Asp Glu Leu
            180                 185                 190

Gly Asp Arg Ser Ile Met Phe Thr Val Gln Asn Glu Asp
        195                 200                 205
```

<210> SEQ ID NO 20
<211> LENGTH: 2142
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 20

```
atggctctgc ctgtgacagc tctgctgctg cctctggctc tgcttctgca tgccgccaga     60

ccttacttcg gcaagctgga aagcaagctg agcgtgatcc ggaacctgaa cgaccaggtg    120

ctgttcatcg accagggcaa cagacccctg ttcgaggaca tgaccgacag cgactgcaga    180

gacaacgccc ctcggaccat cttcatcatc agcatgtaca aggacagcca gcctagaggc    240

atggccgtga ccatctctgt gaagtgcgag aagatcagca ccctgagctg cgagaacaag    300

atcatcagct tcaaagagat gaacccgccg gacaacatca aggacaccaa gagcgacatc    360

atattcttcc agcggagcgt gcccggccac gacaacaaga tgcagtttga gagcagcagc    420

tacgagggct acttcctggc ctgcgagaaa gagcgggacc tgttcaagct gatcctgaag    480

aaagaggacg aactgggcga ccgcagcatc atgttcaccg tgcagaatga ggatggcggc    540

ggaggatctg gcggaggtgg aagcggaggc ggtggaagct gtacaagcag acctcacatc    600

accgtggtgg aaggcgagcc cttctacctg aagcactgca gctgttctct ggcccacgag    660

atcgagacaa ccaccaagtc ctggtacaag agcagcggca gccaagagca cgtggaactg    720

aaccctagaa gcagctccag aatcgccctg cacgactgcg tgctggaatt ctggcctgtc    780
```

```
gagctgaacg ataccggcag ctacttcttc cagatgaaga actacaccca gaaatggaag    840

ctcaacgtga tcaggcggaa caagcacagc tgcttcaccg agagacaagt gaccagcaag    900

atcgtggaag tgaagaagtt ctttcagatc acgtgcgaga actcctacta ccagacactg    960

gtcaacagca ccagcctgta caagaactgc aagaagctgc tcctcgagaa caacaagaac   1020

cccaccatca agaagaacgc cgagttcgag gatcagggct actacagctg cgtgcacttc   1080

ctgcaccaca atggcaagct gttcaacatc accaagacct tcaatatcac catcgtcgag   1140

gaccgctcca acatcgtgcc tgttctgctg ggccccaagc tgaatcatgt ggctgtggaa   1200

ctgggcaaga acgtgcggct gaattgcagc gccctgctga acgaagagga cgtgatctac   1260

tggatgttcg gcgaggaaaa cggcagcgac cccaacatcc acgaagagaa agaaatgcgg   1320

atcatgaccc ctgaaggcaa gtggcacgcc agcaaggtgc tgcggatcga gaatatcggc   1380

gagagcaacc tgaatgtgct gtacaactgc accgtggcca gcaccggcgg caccgatacc   1440

aagtctttta tcctcgtgcg gaaggccgac atggctgaca ttccaggcca cgtgttcacc   1500

cggggcatga tcattgccgt gctgattctg gtggccgtcg tgtgtctggt caccgtgtgt   1560

gtgatctaca gagtggacct ggtcctgttc taccggcacc tgaccagaag ggacgagaca   1620

ctgaccgacg gcaagaccta cgatgccttc gtgtcctacc tgaaagagtg cagacccgag   1680

aacggcgaag aacacacctt cgccgtggaa atcctgccta gagtgctgga aaagcacttc   1740

ggctacaagc tgtgcatctt cgagcgcgac gttgtgcctg gcggagctgt ggtggatgag   1800

atccacagcc tgatcgagaa gtccagacgg ctgatcatcg tgctgagcaa gagctacatg   1860

agcaacgaag tccgctacga gctggaatcc ggactgcacg aagccctggt ggaacggaag   1920

atcaagatca ttctgatcga gttcacccct gtgaccgact tcacattcct gcctcagagc   1980

ctgaagctgc tgaagtccca cagagtgctg aagtggaaag ccgacaagag cctgagctac   2040

aacagccggt tttggaagaa cctgctgtac ctgatgcctg ccaagaccgt gaagcccggc   2100

agagatgagc ccgaagttct gccagtgctg agcgagtctt ga                      2142
```

```
<210> SEQ ID NO 21
<211> LENGTH: 712
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 21

Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30

Ile Arg Asn Leu Asn Asp Gln Val Leu Phe Ile Asp Gln Gly Asn Arg
        35                  40                  45

Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110
```

```
Ile Lys Asp Thr Lys Ser Asp Ile Ile Phe Phe Gln Arg Ser Val Pro
        115                 120                 125

Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160

Lys Glu Asp Glu Leu Gly Asp Arg Ser Ile Met Phe Thr Val Gln Asn
                165                 170                 175

Glu Asp Gly Gly Gly Gly Ser Gly Gly Gly Gly Ser Gly Gly Gly Gly
            180                 185                 190

Ser Cys Thr Ser Arg Pro His Ile Thr Val Val Glu Gly Glu Pro Phe
        195                 200                 205

Tyr Leu Lys His Cys Ser Cys Ser Leu Ala His Glu Ile Glu Thr Thr
    210                 215                 220

Thr Lys Ser Trp Tyr Lys Ser Ser Gly Ser Gln Glu His Val Glu Leu
225                 230                 235                 240

Asn Pro Arg Ser Ser Ser Arg Ile Ala Leu His Asp Cys Val Leu Glu
                245                 250                 255

Phe Trp Pro Val Glu Leu Asn Asp Thr Gly Ser Tyr Phe Phe Gln Met
            260                 265                 270

Lys Asn Tyr Thr Gln Lys Trp Lys Leu Asn Val Ile Arg Arg Asn Lys
        275                 280                 285

His Ser Cys Phe Thr Glu Arg Gln Val Thr Ser Lys Ile Val Glu Val
    290                 295                 300

Lys Lys Phe Phe Gln Ile Thr Cys Glu Asn Ser Tyr Tyr Gln Thr Leu
305                 310                 315                 320

Val Asn Ser Thr Ser Leu Tyr Lys Asn Cys Lys Lys Leu Leu Leu Glu
                325                 330                 335

Asn Asn Lys Asn Pro Thr Ile Lys Lys Asn Ala Glu Phe Glu Asp Gln
            340                 345                 350

Gly Tyr Tyr Ser Cys Val His Phe Leu His His Asn Gly Lys Leu Phe
        355                 360                 365

Asn Ile Thr Lys Thr Phe Asn Ile Thr Ile Val Glu Asp Arg Ser Asn
    370                 375                 380

Ile Val Pro Val Leu Leu Gly Pro Lys Leu Asn His Val Ala Val Glu
385                 390                 395                 400

Leu Gly Lys Asn Val Arg Leu Asn Cys Ser Ala Leu Leu Asn Glu Glu
                405                 410                 415

Asp Val Ile Tyr Trp Met Phe Gly Glu Glu Asn Gly Ser Asp Pro Asn
            420                 425                 430

Ile His Glu Glu Lys Glu Met Arg Ile Met Thr Pro Glu Gly Lys Trp
        435                 440                 445

His Ala Ser Lys Val Leu Arg Ile Glu Asn Ile Gly Glu Ser Asn Leu
    450                 455                 460

Asn Val Leu Tyr Asn Cys Thr Val Ala Ser Thr Gly Gly Thr Asp Thr
465                 470                 475                 480

Lys Ser Phe Ile Leu Val Arg Lys Ala Asp Met Ala Asp Ile Pro Gly
                485                 490                 495

His Val Phe Thr Arg Gly Met Ile Ile Ala Val Leu Ile Leu Val Ala
            500                 505                 510

Val Val Cys Leu Val Thr Val Cys Val Ile Tyr Arg Val Asp Leu Val
        515                 520                 525

Leu Phe Tyr Arg His Leu Thr Arg Arg Asp Glu Thr Leu Thr Asp Gly
```

```
    530                 535                 540

Lys Thr Tyr Asp Ala Phe Val Ser Tyr Leu Lys Glu Cys Arg Pro Glu
545                 550                 555                 560

Asn Gly Glu Glu His Thr Phe Ala Val Glu Ile Leu Pro Arg Val Leu
                565                 570                 575

Glu Lys His Phe Gly Tyr Lys Leu Cys Ile Phe Glu Arg Asp Val Val
            580                 585                 590

Pro Gly Gly Ala Val Val Asp Glu Ile His Ser Leu Ile Glu Lys Ser
        595                 600                 605

Arg Arg Leu Ile Ile Val Leu Ser Lys Ser Tyr Met Ser Asn Glu Val
    610                 615                 620

Arg Tyr Glu Leu Glu Ser Gly Leu His Glu Ala Leu Val Glu Arg Lys
625                 630                 635                 640

Ile Lys Ile Ile Leu Ile Glu Phe Thr Pro Val Thr Asp Phe Thr Phe
                645                 650                 655

Leu Pro Gln Ser Leu Lys Leu Leu Lys Ser His Arg Val Leu Lys Trp
            660                 665                 670

Lys Ala Asp Lys Ser Leu Ser Tyr Asn Ser Arg Phe Trp Lys Asn Leu
        675                 680                 685

Leu Tyr Leu Met Pro Ala Lys Thr Val Lys Pro Gly Arg Asp Glu Pro
    690                 695                 700

Glu Val Leu Pro Val Leu Ser Glu
705                 710
```

<210> SEQ ID NO 22
<211> LENGTH: 2157
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 22

```
atggctctgc ctgtgacagc tctgctgctg cctctggctc tgcttctgca tgccgccaga      60
ccttacttcg gcaagctgga aagcaagctg agcgtgatcc ggaacctgaa cgaccaggtg     120
ctgttcatcg accagggcaa cagacccctg ttcgaggaca tgaccgacag cgactgcaga     180
gacaacgccc ctcggaccat cttcatcatc agcatgtaca aggacagcca gcctagaggc     240
atggccgtga ccatctctgt gaagtgcgag aagatcagca ccctgagctg cgagaacaag     300
atcatcagct tcaaagagat gaacccgccg gacaacatca aggacaccaa gagcgacatc     360
atattcttcc agcggagcgt gcccggccac gacaacaaga tgcagtttga gagcagcagc     420
tacgagggct acttcctggc ctgcgagaaa gagcgggacc tgttcaagct gatcctgaag     480
aaagaggacg aactgggcga ccgcagcatc atgttcaccg tgcagaatga ggatggcggc     540
ggaggatctg gcggaggtgg aagcggaggc ggaggaagcg gtggcggcgg atcttgtaca     600
tctagacccc acatcaccgt ggtggaaggc gagccctttt acctgaagca ctgcagctgt     660
tctctggccc acgagatcga gacaaccacc aagtcctggt acaagagcag cggcagccaa     720
gagcacgtgg aactgaaccc tagaagcagc tccagaatcg ccctgcacga ctgcgtgctg     780
gaattctggc ctgtcgagct gaacgatacc ggcagctact tcttccagat gaagaactac     840
acccagaaat ggaagctcaa cgtgatcagg cggaacaagc acagctgctt caccgagaga     900
caagtgacca gcaagatcgt ggaagtgaag aagttctttc agatcacgtg cgagaactcc     960
tactaccaga cactggtcaa cagcaccagc ctgtacaaga actgcaagaa gctgctcctc    1020
```

```
gagaacaaca agaaccccac catcaagaag aacgccgagt tcgaggatca gggctactac   1080

agctgcgtgc acttcctgca ccacaatggc aagctgttca acatcaccaa gaccttcaat   1140

atcaccatcg tcgaggaccg ctccaacatc gtgcctgttc tgctgggccc caagctgaat   1200

catgtggctg tggaactggg caagaacgtg cggctgaatt gcagcgccct gctgaacgaa   1260

gaggacgtga tctactggat gttcggcgag gaaaacggca gcgaccccaa catccacgaa   1320

gagaaagaaa tgcggatcat gacccctgaa ggcaagtggc acgccagcaa ggtgctgcgg   1380

atcgagaata tcggcgagag caacctgaat gtgctgtaca actgcaccgt ggccagcacc   1440

ggcggcaccg ataccaagtc ttttatcctc gtgcggaagg ccgacatggc tgacattcca   1500

ggccacgtgt tcacccgggg catgatcatt gccgtgctga ttctggtggc cgtcgtgtgt   1560

ctggtcaccg tgtgtgtgat ctacagagtg gacctggtcc tgttctaccg gcacctgacc   1620

agaagggacg agacactgac cgacggcaag acctacgatg ccttcgtgtc ctacctgaaa   1680

gagtgcagac ccgagaacgg cgaagaacac accttcgccg tggaaatcct gcctagagtg   1740

ctggaaaagc acttcggcta caagctgtgc atcttcgagc gcgacgttgt gcctggcgga   1800

gctgtggtgg atgagatcca cagcctgatc gagaagtcca gacggctgat catcgtgctg   1860

agcaagagct acatgagcaa cgaagtccgc tacgagctgg aatccggact gcacgaagcc   1920

ctggtggaac ggaagatcaa gatcattctg atcgagttca cccctgtgac cgacttcaca   1980

ttcctgcctc agagcctgaa gctgctgaag tcccacagag tgctgaagtg gaaagccgac   2040

aagagcctga gctacaacag ccggttttgg aagaacctgc tgtacctgat gcctgccaag   2100

accgtgaagc ccggcagaga tgagcccgaa gttctgccag tgctgagcga gtcttga      2157
```

<210> SEQ ID NO 23
<211> LENGTH: 717
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 23

```
Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30

Ile Arg Asn Leu Asn Asp Gln Val Leu Phe Ile Asp Gln Gly Asn Arg
        35                  40                  45

Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110

Ile Lys Asp Thr Lys Ser Asp Ile Ile Phe Phe Gln Arg Ser Val Pro
        115                 120                 125

Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160
```

```
Lys Glu Asp Glu Leu Gly Asp Arg Ser Ile Met Phe Thr Val Gln Asn
                165                 170                 175

Glu Asp Gly Gly Gly Gly Ser Gly Gly Gly Gly Ser Gly Gly Gly Gly
            180                 185                 190

Ser Gly Gly Gly Gly Ser Cys Thr Ser Arg Pro His Ile Thr Val Val
        195                 200                 205

Glu Gly Glu Pro Phe Tyr Leu Lys His Cys Ser Cys Ser Leu Ala His
    210                 215                 220

Glu Ile Glu Thr Thr Thr Lys Ser Trp Tyr Lys Ser Ser Gly Ser Gln
225                 230                 235                 240

Glu His Val Glu Leu Asn Pro Arg Ser Ser Ser Arg Ile Ala Leu His
                245                 250                 255

Asp Cys Val Leu Glu Phe Trp Pro Val Glu Leu Asn Asp Thr Gly Ser
            260                 265                 270

Tyr Phe Phe Gln Met Lys Asn Tyr Thr Gln Lys Trp Lys Leu Asn Val
        275                 280                 285

Ile Arg Arg Asn Lys His Ser Cys Phe Thr Glu Arg Gln Val Thr Ser
    290                 295                 300

Lys Ile Val Glu Val Lys Lys Phe Phe Gln Ile Thr Cys Glu Asn Ser
305                 310                 315                 320

Tyr Tyr Gln Thr Leu Val Asn Ser Thr Ser Leu Tyr Lys Asn Cys Lys
                325                 330                 335

Lys Leu Leu Leu Glu Asn Asn Lys Asn Pro Thr Ile Lys Lys Asn Ala
            340                 345                 350

Glu Phe Glu Asp Gln Gly Tyr Tyr Ser Cys Val His Phe Leu His His
        355                 360                 365

Asn Gly Lys Leu Phe Asn Ile Thr Lys Thr Phe Asn Ile Thr Ile Val
    370                 375                 380

Glu Asp Arg Ser Asn Ile Val Pro Val Leu Leu Gly Pro Lys Leu Asn
385                 390                 395                 400

His Val Ala Val Glu Leu Gly Lys Asn Val Arg Leu Asn Cys Ser Ala
                405                 410                 415

Leu Leu Asn Glu Glu Asp Val Ile Tyr Trp Met Phe Gly Glu Glu Asn
            420                 425                 430

Gly Ser Asp Pro Asn Ile His Glu Glu Lys Glu Met Arg Ile Met Thr
        435                 440                 445

Pro Glu Gly Lys Trp His Ala Ser Lys Val Leu Arg Ile Glu Asn Ile
    450                 455                 460

Gly Glu Ser Asn Leu Asn Val Leu Tyr Asn Cys Thr Val Ala Ser Thr
465                 470                 475                 480

Gly Gly Thr Asp Thr Lys Ser Phe Ile Leu Val Arg Lys Ala Asp Met
                485                 490                 495

Ala Asp Ile Pro Gly His Val Phe Thr Arg Gly Met Ile Ile Ala Val
            500                 505                 510

Leu Ile Leu Val Ala Val Val Cys Leu Val Thr Val Cys Val Ile Tyr
        515                 520                 525

Arg Val Asp Leu Val Leu Phe Tyr Arg His Leu Thr Arg Arg Asp Glu
    530                 535                 540

Thr Leu Thr Asp Gly Lys Thr Tyr Asp Ala Phe Val Ser Tyr Leu Lys
545                 550                 555                 560

Glu Cys Arg Pro Glu Asn Gly Glu Glu His Thr Phe Ala Val Glu Ile
                565                 570                 575
```

```
Leu Pro Arg Val Leu Glu Lys His Phe Gly Tyr Lys Leu Cys Ile Phe
            580                 585                 590

Glu Arg Asp Val Val Pro Gly Gly Ala Val Val Asp Glu Ile His Ser
        595                 600                 605

Leu Ile Glu Lys Ser Arg Arg Leu Ile Ile Val Leu Ser Lys Ser Tyr
    610                 615                 620

Met Ser Asn Glu Val Arg Tyr Glu Leu Glu Ser Gly Leu His Glu Ala
625                 630                 635                 640

Leu Val Glu Arg Lys Ile Lys Ile Ile Leu Ile Glu Phe Thr Pro Val
                645                 650                 655

Thr Asp Phe Thr Phe Leu Pro Gln Ser Leu Lys Leu Leu Lys Ser His
            660                 665                 670

Arg Val Leu Lys Trp Lys Ala Asp Lys Ser Leu Ser Tyr Asn Ser Arg
        675                 680                 685

Phe Trp Lys Asn Leu Leu Tyr Leu Met Pro Ala Lys Thr Val Lys Pro
    690                 695                 700

Gly Arg Asp Glu Pro Glu Val Leu Pro Val Leu Ser Glu
705                 710                 715


<210> SEQ ID NO 24
<211> LENGTH: 2322
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 24

atggctctgc ctgtgacagc tctgctgctg cctctggctc tgcttctgca tgccgccaga     60

ccttacttcg gcaagctgga aagcaagctg agcgtgatcc ggaacctgaa cgaccaggtg    120

ctgttcatcg accagggcaa cagacccctg ttcgaggaca tgaccgacag cgactgcaga    180

gacaacgccc ctcggaccat cttcatcatc agcatgtaca aggacagcca gcctagaggc    240

atggccgtga ccatctctgt gaagtgcgag aagatcagca ccctgagctg cgagaacaag    300

atcatcagct tcaaagagat gaacccgccg gacaacatca aggacaccaa gagcgacatc    360

atattcttcc agcggagcgt gcccggccac gacaacaaga tgcagtttga gagcagcagc    420

tacgagggct acttcctggc ctgcgagaaa gagcgggacc tgttcaagct gatcctgaag    480

aaagaggacg aactgggcga ccgcagcatc atgttcaccg tgcagaatga ggatggcggc    540

ggaggatctg gcggaggtgg aagcggaggc ggaggcagct ttaatatcag cggctgcagc    600

accaagaaac tgctgtggac ctacagcacc cgcagcgaag aggaattcgt gctgttctgc    660

gacctgcctg agcctcagaa gtcccacttc tgccaccgga acagactgag ccctaaacag    720

gtgcccgagc atctgccttt catgggcagc aacgatctga gcgacgtgca gtggtatcag    780

cagcccagca atggcgaccc tctggaagat atcagaaaga gctaccctca catcatccag    840

gacaagtgca ccctgcactt tctgacccct ggcgtgaaca acagcggcag ctacatctgc    900

agacccaaga tgatcaagag cccctacgac gtggcctgct gcgtgaagat gatcctggaa    960

gtgaagcccc agaccaacgc cagctgcgag tatagcgcca gccacaagca ggatctgctg   1020

ctcggctcta caggcagcat cagctgtcct agcctgtcct gtcagagcga cgctcagtct   1080

cctgccgtga cctggtacaa gaatggcaag ctgctgtccg tggaacggtc caacagaatc   1140

gtggtggacg aggtgtacga ctaccaccag ggcacctacg tgtgcgacta cacccagagc   1200

gataccgtgt ctagctggac cgtcagagcc gtggtgcaag tgcggacaat cgtgggcgat   1260
```

```
accaagctga agcccgacat tctggacccc gtggaagata cactggaagt ggaactgggc   1320

aagcccctga ccatcagctg caaggccaga ttcggcttcg agcgggtgtt caaccccgtg   1380

atcaagtggt acattaagga cagcgacctg gaatgggaag tgtccgtgcc tgaggccaag   1440

tccatcaaga gcacactgaa ggacgagatc atcgagcgga acatcatcct ggaaaaagtg   1500

acccagaggg acctgcggcg gaagttcgtg tgctttgtgc agaactccat cggcaacacc   1560

acacagagcg tgcagctgaa agaaaagcgc ggcgtggtgc tgctgtacat cctgctggga   1620

acaatcggca cactggtggc tgtgctggct gcatctgccc tgctgtatag acactggatc   1680

gagatcgtcc tgctgtaccg gacctaccag agcaaggatc agaccctggg cgacaagaag   1740

gacttcgacg cctttgtgtc ctacgccaag tggtccagct ttcccagcga ggccacatct   1800

agcctgagcg aggaacatct ggccctgtct ctgttccccg acgtgctgga aaacaaatac   1860

ggctacagcc tgtgcctgct ggaaagagat gttgcccctg gcggagtgta cgccgaggat   1920

atcgtgtcca tcatcaagcg gagcagacgg ggcatcttca ttctgagccc caactacgtg   1980

aacggcccca gcatctttga actgcaagcc gccgtgaacc tggctctgga cgatcagaca   2040

ctgaagctca tcctgatcaa gttctgctac ttccaagagc ctgagagcct gcctcacctg   2100

gtcaaaaagg ccctgagagt gctgcccacc gtgacttgga gaggcctgaa aagcgtgcca   2160

cctaacagcc ggttctgggc caagatgaga taccacatgc ctgtgaagaa cagccagggc   2220

ttcacctgga accagctgcg gatcaccagc cggatctttc agtggaaggg cctgagcaga   2280

accgagacaa ccggcagaag ctcccagcct aaagagtggt ga                      2322
```

```
<210> SEQ ID NO 25
<211> LENGTH: 773
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 25

Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30

Ile Arg Asn Leu Asn Asp Gln Val Leu Phe Ile Asp Gln Gly Asn Arg
        35                  40                  45

Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110

Ile Lys Asp Thr Lys Ser Asp Ile Ile Phe Phe Gln Arg Ser Val Pro
        115                 120                 125

Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160

Lys Glu Asp Glu Leu Gly Asp Arg Ser Ile Met Phe Thr Val Gln Asn
```

```
                165                 170                 175

Glu Asp Gly Gly Gly Gly Ser Gly Gly Gly Gly Ser Gly Gly Gly Gly
            180                 185                 190

Ser Phe Asn Ile Ser Gly Cys Ser Thr Lys Lys Leu Leu Trp Thr Tyr
        195                 200                 205

Ser Thr Arg Ser Glu Glu Glu Phe Val Leu Phe Cys Asp Leu Pro Glu
    210                 215                 220

Pro Gln Lys Ser His Phe Cys His Arg Asn Arg Leu Ser Pro Lys Gln
225                 230                 235                 240

Val Pro Glu His Leu Pro Phe Met Gly Ser Asn Asp Leu Ser Asp Val
                245                 250                 255

Gln Trp Tyr Gln Gln Pro Ser Asn Gly Asp Pro Leu Glu Asp Ile Arg
            260                 265                 270

Lys Ser Tyr Pro His Ile Ile Gln Asp Lys Cys Thr Leu His Phe Leu
        275                 280                 285

Thr Pro Gly Val Asn Asn Ser Gly Ser Tyr Ile Cys Arg Pro Lys Met
    290                 295                 300

Ile Lys Ser Pro Tyr Asp Val Ala Cys Cys Val Lys Met Ile Leu Glu
305                 310                 315                 320

Val Lys Pro Gln Thr Asn Ala Ser Cys Glu Tyr Ser Ala Ser His Lys
                325                 330                 335

Gln Asp Leu Leu Leu Gly Ser Thr Gly Ser Ile Ser Cys Pro Ser Leu
            340                 345                 350

Ser Cys Gln Ser Asp Ala Gln Ser Pro Ala Val Thr Trp Tyr Lys Asn
        355                 360                 365

Gly Lys Leu Leu Ser Val Glu Arg Ser Asn Arg Ile Val Val Asp Glu
    370                 375                 380

Val Tyr Asp Tyr His Gln Gly Thr Tyr Val Cys Asp Tyr Thr Gln Ser
385                 390                 395                 400

Asp Thr Val Ser Ser Trp Thr Val Arg Ala Val Val Gln Val Arg Thr
                405                 410                 415

Ile Val Gly Asp Thr Lys Leu Lys Pro Asp Ile Leu Asp Pro Val Glu
            420                 425                 430

Asp Thr Leu Glu Val Glu Leu Gly Lys Pro Leu Thr Ile Ser Cys Lys
        435                 440                 445

Ala Arg Phe Gly Phe Glu Arg Val Phe Asn Pro Val Ile Lys Trp Tyr
    450                 455                 460

Ile Lys Asp Ser Asp Leu Glu Trp Glu Val Ser Val Pro Glu Ala Lys
465                 470                 475                 480

Ser Ile Lys Ser Thr Leu Lys Asp Glu Ile Ile Glu Arg Asn Ile Ile
                485                 490                 495

Leu Glu Lys Val Thr Gln Arg Asp Leu Arg Arg Lys Phe Val Cys Phe
            500                 505                 510

Val Gln Asn Ser Ile Gly Asn Thr Thr Gln Ser Val Gln Leu Lys Glu
        515                 520                 525

Lys Arg Gly Val Val Leu Leu Tyr Ile Leu Leu Gly Thr Ile Gly Thr
    530                 535                 540

Leu Val Ala Val Leu Ala Ala Ser Ala Leu Leu Tyr Arg His Trp Ile
545                 550                 555                 560

Glu Ile Val Leu Leu Tyr Arg Thr Tyr Gln Ser Lys Asp Gln Thr Leu
                565                 570                 575

Gly Asp Lys Lys Asp Phe Asp Ala Phe Val Ser Tyr Ala Lys Trp Ser
            580                 585                 590
```

```
Ser Phe Pro Ser Glu Ala Thr Ser Ser Leu Ser Glu Glu His Leu Ala
        595                 600                 605

Leu Ser Leu Phe Pro Asp Val Leu Glu Asn Lys Tyr Gly Tyr Ser Leu
    610                 615                 620

Cys Leu Leu Glu Arg Asp Val Ala Pro Gly Gly Val Tyr Ala Glu Asp
625                 630                 635                 640

Ile Val Ser Ile Ile Lys Arg Ser Arg Arg Gly Ile Phe Ile Leu Ser
                645                 650                 655

Pro Asn Tyr Val Asn Gly Pro Ser Ile Phe Glu Leu Gln Ala Ala Val
            660                 665                 670

Asn Leu Ala Leu Asp Asp Gln Thr Leu Lys Leu Ile Leu Ile Lys Phe
        675                 680                 685

Cys Tyr Phe Gln Glu Pro Glu Ser Leu Pro His Leu Val Lys Lys Ala
    690                 695                 700

Leu Arg Val Leu Pro Thr Val Thr Trp Arg Gly Leu Lys Ser Val Pro
705                 710                 715                 720

Pro Asn Ser Arg Phe Trp Ala Lys Met Arg Tyr His Met Pro Val Lys
                725                 730                 735

Asn Ser Gln Gly Phe Thr Trp Asn Gln Leu Arg Ile Thr Ser Arg Ile
            740                 745                 750

Phe Gln Trp Lys Gly Leu Ser Arg Thr Glu Thr Thr Gly Arg Ser Ser
        755                 760                 765

Gln Pro Lys Glu Trp
    770


<210> SEQ ID NO 26
<211> LENGTH: 2337
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 26

atggctctgc ctgtgacagc tctgctgctg cctctggctc tgcttctgca tgccgccaga     60

ccttacttcg gcaagctgga aagcaagctg agcgtgatcc ggaacctgaa cgaccaggtg    120

ctgttcatcg accagggcaa cagaccccctg ttcgaggaca tgaccgacag cgactgcaga    180

gacaacgccc ctcggaccat cttcatcatc agcatgtaca aggacagcca gcctagaggc    240

atggccgtga ccatctctgt gaagtgcgag aagatcagca ccctgagctg cgagaacaag    300

atcatcagct tcaaagagat gaacccgccg gacaacatca aggacaccaa gagcgacatc    360

atattcttcc agcggagcgt gcccggccac gacaacaaga tgcagtttga gagcagcagc    420

tacgagggct acttcctggc ctgcgagaaa gagcgggacc tgttcaagct gatcctgaag    480

aaagaggacg aactgggcga ccgcagcatc atgttcaccg tgcagaatga ggatggcggc    540

ggaggatctg gcggaggtgg aagcggaggc ggaggaagcg gtggcggcgg atcctttaat    600

atcagcggct gcagcaccaa gaaactgctg tggacctaca gcacccgcag cgaagaggaa    660

ttcgtgctgt tctgcgacct gcctgagcct cagaagtccc acttctgcca ccggaacaga    720

ctgagcccta aacaggtgcc cgagcatctg cctttcatgg gcagcaacga tctgagcgac    780

gtgcagtggt atcagcagcc cagcaatggc gaccctctgg aagatatcag aaagagctac    840

cctcacatca tccaggacaa gtgcaccctg cactttctga cccctggcgt gaacaacagc    900

ggcagctaca tctgcagacc caagatgatc aagagcccct acgacgtggc ctgctgcgtg    960
```

```
aagatgatcc tggaagtgaa gccccagacc aacgccagct gcgagtatag cgccagccac   1020

aagcaggatc tgctgctcgg ctctacaggc agcatcagct gtcctagcct gtcctgtcag   1080

agcgacgctc agtctcctgc cgtgacctgg tacaagaatg gcaagctgct gtccgtggaa   1140

cggtccaaca gaatcgtggt ggacgaggtg tacgactacc accagggcac ctacgtgtgc   1200

gactacaccc agagcgatac cgtgtctagc tggaccgtca gagccgtggt gcaagtgcgg   1260

acaatcgtgg gcgataccaa gctgaagccc gacattctgg accccgtgga agatacactg   1320

gaagtggaac tgggcaagcc cctgaccatc agctgcaagg ccagattcgg cttcgagcgg   1380

gtgttcaacc ccgtgatcaa gtggtacatt aaggacagcg acctggaatg ggaagtgtcc   1440

gtgcctgagg ccaagtccat caagagcaca ctgaaggacg agatcatcga gcggaacatc   1500

atcctggaaa aagtgaccca gagggacctg cggcggaagt tcgtgtgctt tgtgcagaac   1560

tccatcggca acaccacaca gagcgtgcag ctgaaagaaa agcgcggcgt ggtgctgctg   1620

tacatcctgc tgggaacaat cggcacactg gtggctgtgc tggctgcatc tgccctgctg   1680

tatagacact ggatcgagat cgtcctgctg taccggacct accagagcaa ggatcagacc   1740

ctgggcgaca agaaggactt cgacgccttt gtgtcctacg ccaagtggtc cagctttccc   1800

agcgaggcca catctagcct gagcgaggaa catctggccc tgtctctgtt ccccgacgtg   1860

ctggaaaaca aatacggcta cagcctgtgc ctgctggaaa gagatgttgc ccctggcgga   1920

gtgtacgccg aggatatcgt gtccatcatc aagcggagca gacggggcat cttcattctg   1980

agccccaact acgtgaacgg ccccagcatc tttgaactgc aagccgccgt gaacctggct   2040

ctggacgatc agacactgaa gctcatcctg atcaagttct gctacttcca agagcctgag   2100

agcctgcctc acctggtcaa aaaggccctg agagtgctgc ccaccgtgac ttggagaggc   2160

ctgaaaagcg tgccacctaa cagccggttc tggccaaga tgagatacca catgcctgtg   2220

aagaacagcc agggcttcac ctggaaccag ctgcggatca ccagccggat ctttcagtgg   2280

aagggcctga gcagaaccga gacaaccggc agaagctccc agcctaaaga gtggtga      2337
```

```
<210> SEQ ID NO 27
<211> LENGTH: 778
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27

Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30

Ile Arg Asn Leu Asn Asp Gln Val Leu Phe Ile Asp Gln Gly Asn Arg
        35                  40                  45

Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110
```

```
Ile Lys Asp Thr Lys Ser Asp Ile Ile Phe Phe Gln Arg Ser Val Pro
        115                 120                 125

Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160

Lys Glu Asp Glu Leu Gly Asp Arg Ser Ile Met Phe Thr Val Gln Asn
                165                 170                 175

Glu Asp Gly Gly Gly Gly Ser Gly Gly Gly Gly Ser Gly Gly Gly Gly
            180                 185                 190

Ser Gly Gly Gly Gly Ser Phe Asn Ile Ser Gly Cys Ser Thr Lys Lys
        195                 200                 205

Leu Leu Trp Thr Tyr Ser Thr Arg Ser Glu Glu Glu Phe Val Leu Phe
    210                 215                 220

Cys Asp Leu Pro Glu Pro Gln Lys Ser His Phe Cys His Arg Asn Arg
225                 230                 235                 240

Leu Ser Pro Lys Gln Val Pro Glu His Leu Pro Phe Met Gly Ser Asn
                245                 250                 255

Asp Leu Ser Asp Val Gln Trp Tyr Gln Gln Pro Ser Asn Gly Asp Pro
            260                 265                 270

Leu Glu Asp Ile Arg Lys Ser Tyr Pro His Ile Ile Gln Asp Lys Cys
        275                 280                 285

Thr Leu His Phe Leu Thr Pro Gly Val Asn Asn Ser Gly Ser Tyr Ile
    290                 295                 300

Cys Arg Pro Lys Met Ile Lys Ser Pro Tyr Asp Val Ala Cys Cys Val
305                 310                 315                 320

Lys Met Ile Leu Glu Val Lys Pro Gln Thr Asn Ala Ser Cys Glu Tyr
                325                 330                 335

Ser Ala Ser His Lys Gln Asp Leu Leu Leu Gly Ser Thr Gly Ser Ile
            340                 345                 350

Ser Cys Pro Ser Leu Ser Cys Gln Ser Asp Ala Gln Ser Pro Ala Val
        355                 360                 365

Thr Trp Tyr Lys Asn Gly Lys Leu Leu Ser Val Glu Arg Ser Asn Arg
    370                 375                 380

Ile Val Val Asp Glu Val Tyr Asp Tyr His Gln Gly Thr Tyr Val Cys
385                 390                 395                 400

Asp Tyr Thr Gln Ser Asp Thr Val Ser Ser Trp Thr Val Arg Ala Val
                405                 410                 415

Val Gln Val Arg Thr Ile Val Gly Asp Thr Lys Leu Lys Pro Asp Ile
            420                 425                 430

Leu Asp Pro Val Glu Asp Thr Leu Glu Val Glu Leu Gly Lys Pro Leu
        435                 440                 445

Thr Ile Ser Cys Lys Ala Arg Phe Gly Phe Glu Arg Val Phe Asn Pro
    450                 455                 460

Val Ile Lys Trp Tyr Ile Lys Asp Ser Asp Leu Glu Trp Glu Val Ser
465                 470                 475                 480

Val Pro Glu Ala Lys Ser Ile Lys Ser Thr Leu Lys Asp Glu Ile Ile
                485                 490                 495

Glu Arg Asn Ile Ile Leu Glu Lys Val Thr Gln Arg Asp Leu Arg Arg
            500                 505                 510

Lys Phe Val Cys Phe Val Gln Asn Ser Ile Gly Asn Thr Thr Gln Ser
        515                 520                 525

Val Gln Leu Lys Glu Lys Arg Gly Val Val Leu Leu Tyr Ile Leu Leu
```

```
    530                 535                 540

Gly Thr Ile Gly Thr Leu Val Ala Val Leu Ala Ala Ser Ala Leu Leu
545                 550                 555                 560

Tyr Arg His Trp Ile Glu Ile Val Leu Leu Tyr Arg Thr Tyr Gln Ser
                565                 570                 575

Lys Asp Gln Thr Leu Gly Asp Lys Lys Asp Phe Asp Ala Phe Val Ser
            580                 585                 590

Tyr Ala Lys Trp Ser Ser Phe Pro Ser Glu Ala Thr Ser Ser Leu Ser
        595                 600                 605

Glu Glu His Leu Ala Leu Ser Leu Phe Pro Asp Val Leu Glu Asn Lys
    610                 615                 620

Tyr Gly Tyr Ser Leu Cys Leu Leu Glu Arg Asp Val Ala Pro Gly Gly
625                 630                 635                 640

Val Tyr Ala Glu Asp Ile Val Ser Ile Ile Lys Arg Ser Arg Arg Gly
                645                 650                 655

Ile Phe Ile Leu Ser Pro Asn Tyr Val Asn Gly Pro Ser Ile Phe Glu
            660                 665                 670

Leu Gln Ala Ala Val Asn Leu Ala Leu Asp Asp Gln Thr Leu Lys Leu
        675                 680                 685

Ile Leu Ile Lys Phe Cys Tyr Phe Gln Glu Pro Glu Ser Leu Pro His
    690                 695                 700

Leu Val Lys Lys Ala Leu Arg Val Leu Pro Thr Val Thr Trp Arg Gly
705                 710                 715                 720

Leu Lys Ser Val Pro Pro Asn Ser Arg Phe Trp Ala Lys Met Arg Tyr
                725                 730                 735

His Met Pro Val Lys Asn Ser Gln Gly Phe Thr Trp Asn Gln Leu Arg
            740                 745                 750

Ile Thr Ser Arg Ile Phe Gln Trp Lys Gly Leu Ser Arg Thr Glu Thr
        755                 760                 765

Thr Gly Arg Ser Ser Gln Pro Lys Glu Trp
    770                 775
```

<210> SEQ ID NO 28
<211> LENGTH: 2367
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 28

```
atggctctgc ctgtgacagc tctgctgctg cctctggctc tgcttctgca tgccgccaga     60

ccttacttcg gcaagctgga aagcaagctg agcgtgatcc ggaacctgaa cgaccaggtg    120

ctgttcatcg accagggcaa cagacccctg ttcgaggaca tgaccgacag cgactgcaga    180

gacaacgccc ctcggaccat cttcatcatc agcatgtaca aggacagcca gcctagaggc    240

atggccgtga ccatctctgt gaagtgcgag aagatcagca ccctgagctg cgagaacaag    300

atcatcagct tcaaagagat gaacccgccg gacaacatca aggacaccaa gagcgacatc    360

atattcttcc agcggagcgt gcccggccac gacaacaaga tgcagtttga gagcagcagc    420

tacgagggct acttcctggc ctgcgagaaa gagcgggacc tgttcaagct gatcctgaag    480

aaagaggacg aactgggcga ccgcagcatc atgttcaccg tgcagaatga ggatggcggc    540

ggaggatctg gcggaggtgg aagcggaggc ggaggaagcg gtggcggcgg atccgaacag    600

aagctgataa gtgaggagga cttgtttaat atcagcggct gcagcaccaa gaaactgctg    660
```

```
tggacctaca gcacccgcag cgaagaggaa ttcgtgctgt tctgcgacct gcctgagcct    720

cagaagtccc acttctgcca ccggaacaga ctgagcccta aacaggtgcc cgagcatctg    780

cctttcatgg gcagcaacga tctgagcgac gtgcagtggt atcagcagcc cagcaatggc    840

gaccctctgg aagatatcag aaagagctac cctcacatca tccaggacaa gtgcaccctg    900

cactttctga cccctggcgt gaacaacagc ggcagctaca tctgcagacc caagatgatc    960

aagagcccct acgacgtggc ctgctgcgtg aagatgatcc tggaagtgaa gccccagacc   1020

aacgccagct gcgagtatag cgccagccac aagcaggatc tgctgctcgg ctctacaggc   1080

agcatcagct gtcctagcct gtcctgtcag agcgacgctc agtctcctgc cgtgacctgg   1140

tacaagaatg gcaagctgct gtccgtggaa cggtccaaca gaatcgtggt ggacgaggtg   1200

tacgactacc accagggcac ctacgtgtgc gactacaccc agagcgatac cgtgtctagc   1260

tggaccgtca gagccgtggt gcaagtgcgg acaatcgtgg gcgataccaa gctgaagccc   1320

gacattctgg accccgtgga agatacactg gaagtggaac tgggcaagcc cctgaccatc   1380

agctgcaagg ccagattcgg cttcgagcgg gtgttcaacc ccgtgatcaa gtggtacatt   1440

aaggacagcg acctggaatg ggaagtgtcc gtgcctgagg ccaagtccat caagagcaca   1500

ctgaaggacg agatcatcga gcggaacatc atcctggaaa aagtgaccca gagggacctg   1560

cggcggaagt tcgtgtgctt tgtgcagaac tccatcggca acaccacaca gagcgtgcag   1620

ctgaaagaaa agcgcggcgt ggtgctgctg tacatcctgc tgggaacaat cggcacactg   1680

gtggctgtgc tggctgcatc tgccctgctg tatagacact ggatcgagat cgtcctgctg   1740

taccggacct accagagcaa ggatcagacc ctgggcgaca agaaggactt cgacgccttt   1800

gtgtcctacg ccaagtggtc cagctttccc agcgaggcca catctagcct gagcgaggaa   1860

catctggccc tgtctctgtt ccccgacgtg ctggaaaaca aatacggcta cagcctgtgc   1920

ctgctggaaa gagatgttgc ccctggcgga gtgtacgccg aggatatcgt gtccatcatc   1980

aagcggagca gacggggcat cttcattctg agccccaact acgtgaacgg ccccagcatc   2040

tttgaactgc aagccgccgt gaacctggct ctggacgatc agacactgaa gctcatcctg   2100

atcaagttct gctacttcca agagcctgag agcctgcctc acctggtcaa aaaggccctg   2160

agagtgctgc ccaccgtgac ttggagaggc ctgaaaagcg tgccacctaa cagccggttc   2220

tgggccaaga tgagatacca catgcctgtg aagaacagcc agggcttcac ctggaaccag   2280

ctgcggatca ccagccggat ctttcagtgg aagggcctga gcagaaccga gacaaccggc   2340

agaagctccc agcctaaaga gtggtga                                       2367
```

```
<210> SEQ ID NO 29
<211> LENGTH: 788
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 29

Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30

Ile Arg Asn Leu Asn Asp Gln Val Leu Phe Ile Asp Gln Gly Asn Arg
        35                  40                  45
```

```
Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110

Ile Lys Asp Thr Lys Ser Asp Ile Ile Phe Phe Gln Arg Ser Val Pro
        115                 120                 125

Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160

Lys Glu Asp Glu Leu Gly Asp Arg Ser Ile Met Phe Thr Val Gln Asn
                165                 170                 175

Glu Asp Gly Gly Gly Gly Ser Gly Gly Gly Gly Ser Gly Gly Gly Gly
            180                 185                 190

Ser Gly Gly Gly Gly Ser Glu Gln Lys Leu Ile Ser Glu Glu Asp Leu
        195                 200                 205

Phe Asn Ile Ser Gly Cys Ser Thr Lys Lys Leu Leu Trp Thr Tyr Ser
    210                 215                 220

Thr Arg Ser Glu Glu Glu Phe Val Leu Phe Cys Asp Leu Pro Glu Pro
225                 230                 235                 240

Gln Lys Ser His Phe Cys His Arg Asn Arg Leu Ser Pro Lys Gln Val
                245                 250                 255

Pro Glu His Leu Pro Phe Met Gly Ser Asn Asp Leu Ser Asp Val Gln
            260                 265                 270

Trp Tyr Gln Gln Pro Ser Asn Gly Asp Pro Leu Glu Asp Ile Arg Lys
        275                 280                 285

Ser Tyr Pro His Ile Ile Gln Asp Lys Cys Thr Leu His Phe Leu Thr
    290                 295                 300

Pro Gly Val Asn Asn Ser Gly Ser Tyr Ile Cys Arg Pro Lys Met Ile
305                 310                 315                 320

Lys Ser Pro Tyr Asp Val Ala Cys Cys Val Lys Met Ile Leu Glu Val
                325                 330                 335

Lys Pro Gln Thr Asn Ala Ser Cys Glu Tyr Ser Ala Ser His Lys Gln
            340                 345                 350

Asp Leu Leu Leu Gly Ser Thr Gly Ser Ile Ser Cys Pro Ser Leu Ser
        355                 360                 365

Cys Gln Ser Asp Ala Gln Ser Pro Ala Val Thr Trp Tyr Lys Asn Gly
    370                 375                 380

Lys Leu Leu Ser Val Glu Arg Ser Asn Arg Ile Val Val Asp Glu Val
385                 390                 395                 400

Tyr Asp Tyr His Gln Gly Thr Tyr Val Cys Asp Tyr Thr Gln Ser Asp
                405                 410                 415

Thr Val Ser Ser Trp Thr Val Arg Ala Val Val Gln Val Arg Thr Ile
            420                 425                 430

Val Gly Asp Thr Lys Leu Lys Pro Asp Ile Leu Asp Pro Val Glu Asp
        435                 440                 445

Thr Leu Glu Val Glu Leu Gly Lys Pro Leu Thr Ile Ser Cys Lys Ala
    450                 455                 460

Arg Phe Gly Phe Glu Arg Val Phe Asn Pro Val Ile Lys Trp Tyr Ile
```

```
465                 470                 475                 480

Lys Asp Ser Asp Leu Glu Trp Glu Val Ser Val Pro Glu Ala Lys Ser
                485                 490                 495

Ile Lys Ser Thr Leu Lys Asp Glu Ile Ile Glu Arg Asn Ile Ile Leu
            500                 505                 510

Glu Lys Val Thr Gln Arg Asp Leu Arg Arg Lys Phe Val Cys Phe Val
        515                 520                 525

Gln Asn Ser Ile Gly Asn Thr Thr Gln Ser Val Gln Leu Lys Glu Lys
    530                 535                 540

Arg Gly Val Val Leu Leu Tyr Ile Leu Leu Gly Thr Ile Gly Thr Leu
545                 550                 555                 560

Val Ala Val Leu Ala Ala Ser Ala Leu Leu Tyr Arg His Trp Ile Glu
                565                 570                 575

Ile Val Leu Leu Tyr Arg Thr Tyr Gln Ser Lys Asp Gln Thr Leu Gly
            580                 585                 590

Asp Lys Lys Asp Phe Asp Ala Phe Val Ser Tyr Ala Lys Trp Ser Ser
        595                 600                 605

Phe Pro Ser Glu Ala Thr Ser Ser Leu Ser Glu Glu His Leu Ala Leu
    610                 615                 620

Ser Leu Phe Pro Asp Val Leu Glu Asn Lys Tyr Gly Tyr Ser Leu Cys
625                 630                 635                 640

Leu Leu Glu Arg Asp Val Ala Pro Gly Gly Val Tyr Ala Glu Asp Ile
                645                 650                 655

Val Ser Ile Ile Lys Arg Ser Arg Arg Gly Ile Phe Ile Leu Ser Pro
            660                 665                 670

Asn Tyr Val Asn Gly Pro Ser Ile Phe Glu Leu Gln Ala Ala Val Asn
        675                 680                 685

Leu Ala Leu Asp Asp Gln Thr Leu Lys Leu Ile Leu Ile Lys Phe Cys
    690                 695                 700

Tyr Phe Gln Glu Pro Glu Ser Leu Pro His Leu Val Lys Lys Ala Leu
705                 710                 715                 720

Arg Val Leu Pro Thr Val Thr Trp Arg Gly Leu Lys Ser Val Pro Pro
                725                 730                 735

Asn Ser Arg Phe Trp Ala Lys Met Arg Tyr His Met Pro Val Lys Asn
            740                 745                 750

Ser Gln Gly Phe Thr Trp Asn Gln Leu Arg Ile Thr Ser Arg Ile Phe
        755                 760                 765

Gln Trp Lys Gly Leu Ser Arg Thr Glu Thr Thr Gly Arg Ser Ser Gln
    770                 775                 780

Pro Lys Glu Trp
785
```

<210> SEQ ID NO 30
<211> LENGTH: 2391
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 30

```
atggctctgc ctgtgacagc tctgctgctg cctctggctc tgcttctgca tgccgccaga     60

ccttacttcg gcaagctgga aagcaagctg agcgtgatcc ggaacctgaa cgaccaggtg    120

ctgttcatcg accagggcaa cagacccctg ttcgaggaca tgaccgacag cgactgcaga    180
```

```
gacaacgccc ctcggaccat cttcatcatc agcatgtaca aggacagcca gcctagaggc    240
atggccgtga ccatctctgt gaagtgcgag aagatcagca ccctgagctg cgagaacaag    300
atcatcagct tcaaagagat gaacccgccg gacaacatca aggacaccaa gagcgacatc    360
atattcttcc agcggagcgt gcccggccac gacaacaaga tgcagtttga gagcagcagc    420
tacgagggct acttcctggc ctgcgagaaa gagcgggacc tgttcaagct gatcctgaag    480
aaagaggacg aactgggcga ccgcagcatc atgttcaccg tgcagaatga ggatggcggc    540
ggaggatctg gcggaggtgg aagcggaggc ggaggaagcg gtggcggcgg atccggctcc    600
acctctggat ccggcaagcc cggatctggc gagggatcca ccaagggctt taatatcagc    660
ggctgcagca ccaagaaact gctgtggacc tacagcaccc gcagcgaaga ggaattcgtg    720
ctgttctgcg acctgcctga gcctcagaag tcccacttct gccaccggaa cagactgagc    780
cctaaacagg tgcccgagca tctgcctttc atgggcagca acgatctgag cgacgtgcag    840
tggtatcagc agcccagcaa tggcgaccct ctggaagata tcagaaagag ctaccctcac    900
atcatccagg acaagtgcac cctgcacttt ctgacccctg gcgtgaacaa cagcggcagc    960
tacatctgca gacccaagat gatcaagagc ccctacgacg tggcctgctg cgtgaagatg   1020
atcctggaag tgaagcccca gaccaacgcc agctgcgagt atagcgccag ccacaagcag   1080
gatctgctgc tcggctctac aggcagcatc agctgtccta gcctgtcctg tcagagcgac   1140
gctcagtctc ctgccgtgac ctggtacaag aatggcaagc tgctgtccgt ggaacggtcc   1200
aacagaatcg tggtggacga ggtgtacgac taccaccagg gcacctacgt gtgcgactac   1260
acccagagcg ataccgtgtc tagctggacc gtcagagccg tggtgcaagt gcggacaatc   1320
gtgggcgata ccaagctgaa gcccgacatt ctggaccccg tggaagatac actggaagtg   1380
gaactgggca agcccctgac catcagctgc aaggccagat tcggcttcga gcgggtgttc   1440
aaccccgtga tcaagtggta cattaaggac agcgacctgg aatgggaagt gtccgtgcct   1500
gaggccaagt ccatcaagag cacactgaag gacgagatca tcgagcggaa catcatcctg   1560
gaaaaagtga cccagaggga cctgcggcgg aagttcgtgt gctttgtgca gaactccatc   1620
ggcaacacca cacagagcgt gcagctgaaa gaaaagcgcg gcgtggtgct gctgtacatc   1680
ctgctgggaa caatcggcac actggtggct gtgctggctg catctgccct gctgtataga   1740
cactggatcg agatcgtcct gctgtaccgg acctaccaga gcaaggatca gaccctgggc   1800
gacaagaagg acttcgacgc ctttgtgtcc tacgccaagt ggtccagctt tcccagcgag   1860
gccacatcta gcctgagcga ggaacatctg gccctgtctc tgttccccga cgtgctggaa   1920
aacaaatacg gctacagcct gtgcctgctg gaaagagatg ttgcccctgg cggagtgtac   1980
gccgaggata tcgtgtccat catcaagcgg agcagacggg gcatcttcat tctgagcccc   2040
aactacgtga acggccccag catctttgaa ctgcaagccg ccgtgaacct ggctctggac   2100
gatcagacac tgaagctcat cctgatcaag ttctgctact tccaagagcc tgagagcctg   2160
cctcacctgg tcaaaaaggc cctgagagtg ctgcccaccg tgacttggag aggcctgaaa   2220
agcgtgccac ctaacagccg gttctgggcc aagatgagat accacatgcc tgtgaagaac   2280
agccagggct tcacctggaa ccagctgcgg atcaccagcc ggatctttca gtggaagggc   2340
ctgagcagaa ccgagacaac cggcagaagc tcccagccta aagagtggtg a             2391
```

<210> SEQ ID NO 31
<211> LENGTH: 796
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 31

```
Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30

Ile Arg Asn Leu Asn Asp Gln Val Leu Phe Ile Asp Gln Gly Asn Arg
        35                  40                  45

Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110

Ile Lys Asp Thr Lys Ser Asp Ile Ile Phe Phe Gln Arg Ser Val Pro
        115                 120                 125

Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160

Lys Glu Asp Glu Leu Gly Asp Arg Ser Ile Met Phe Thr Val Gln Asn
                165                 170                 175

Glu Asp Gly Gly Gly Gly Ser Gly Gly Gly Ser Gly Gly Gly Gly
            180                 185                 190

Ser Gly Gly Gly Gly Ser Gly Ser Thr Ser Gly Ser Gly Lys Pro Gly
        195                 200                 205

Ser Gly Glu Gly Ser Thr Lys Gly Phe Asn Ile Ser Gly Cys Ser Thr
    210                 215                 220

Lys Lys Leu Leu Trp Thr Tyr Ser Thr Arg Ser Glu Glu Glu Phe Val
225                 230                 235                 240

Leu Phe Cys Asp Leu Pro Glu Pro Gln Lys Ser His Phe Cys His Arg
                245                 250                 255

Asn Arg Leu Ser Pro Lys Gln Val Pro Glu His Leu Pro Phe Met Gly
            260                 265                 270

Ser Asn Asp Leu Ser Asp Val Gln Trp Tyr Gln Gln Pro Ser Asn Gly
        275                 280                 285

Asp Pro Leu Glu Asp Ile Arg Lys Ser Tyr Pro His Ile Ile Gln Asp
    290                 295                 300

Lys Cys Thr Leu His Phe Leu Thr Pro Gly Val Asn Asn Ser Gly Ser
305                 310                 315                 320

Tyr Ile Cys Arg Pro Lys Met Ile Lys Ser Pro Tyr Asp Val Ala Cys
                325                 330                 335

Cys Val Lys Met Ile Leu Glu Val Lys Pro Gln Thr Asn Ala Ser Cys
            340                 345                 350

Glu Tyr Ser Ala Ser His Lys Gln Asp Leu Leu Leu Gly Ser Thr Gly
        355                 360                 365

Ser Ile Ser Cys Pro Ser Leu Ser Cys Gln Ser Asp Ala Gln Ser Pro
    370                 375                 380

Ala Val Thr Trp Tyr Lys Asn Gly Lys Leu Leu Ser Val Glu Arg Ser
```

```
385                 390                 395                 400

Asn Arg Ile Val Val Asp Glu Val Tyr Asp Tyr His Gln Gly Thr Tyr
                405                 410                 415

Val Cys Asp Tyr Thr Gln Ser Asp Thr Val Ser Ser Trp Thr Val Arg
            420                 425                 430

Ala Val Val Gln Val Arg Thr Ile Val Gly Asp Thr Lys Leu Lys Pro
        435                 440                 445

Asp Ile Leu Asp Pro Val Glu Asp Thr Leu Glu Val Glu Leu Gly Lys
    450                 455                 460

Pro Leu Thr Ile Ser Cys Lys Ala Arg Phe Gly Phe Glu Arg Val Phe
465                 470                 475                 480

Asn Pro Val Ile Lys Trp Tyr Ile Lys Asp Ser Asp Leu Glu Trp Glu
                485                 490                 495

Val Ser Val Pro Glu Ala Lys Ser Ile Lys Ser Thr Leu Lys Asp Glu
            500                 505                 510

Ile Ile Glu Arg Asn Ile Ile Leu Glu Lys Val Thr Gln Arg Asp Leu
        515                 520                 525

Arg Arg Lys Phe Val Cys Phe Val Gln Asn Ser Ile Gly Asn Thr Thr
    530                 535                 540

Gln Ser Val Gln Leu Lys Glu Lys Arg Gly Val Val Leu Leu Tyr Ile
545                 550                 555                 560

Leu Leu Gly Thr Ile Gly Thr Leu Val Ala Val Leu Ala Ala Ser Ala
                565                 570                 575

Leu Leu Tyr Arg His Trp Ile Glu Ile Val Leu Leu Tyr Arg Thr Tyr
            580                 585                 590

Gln Ser Lys Asp Gln Thr Leu Gly Asp Lys Lys Asp Phe Asp Ala Phe
        595                 600                 605

Val Ser Tyr Ala Lys Trp Ser Ser Phe Pro Ser Glu Ala Thr Ser Ser
    610                 615                 620

Leu Ser Glu Glu His Leu Ala Leu Ser Leu Phe Pro Asp Val Leu Glu
625                 630                 635                 640

Asn Lys Tyr Gly Tyr Ser Leu Cys Leu Leu Glu Arg Asp Val Ala Pro
                645                 650                 655

Gly Gly Val Tyr Ala Glu Asp Ile Val Ser Ile Ile Lys Arg Ser Arg
            660                 665                 670

Arg Gly Ile Phe Ile Leu Ser Pro Asn Tyr Val Asn Gly Pro Ser Ile
        675                 680                 685

Phe Glu Leu Gln Ala Ala Val Asn Leu Ala Leu Asp Asp Gln Thr Leu
    690                 695                 700

Lys Leu Ile Leu Ile Lys Phe Cys Tyr Phe Gln Glu Pro Glu Ser Leu
705                 710                 715                 720

Pro His Leu Val Lys Lys Ala Leu Arg Val Leu Pro Thr Val Thr Trp
                725                 730                 735

Arg Gly Leu Lys Ser Val Pro Pro Asn Ser Arg Phe Trp Ala Lys Met
            740                 745                 750

Arg Tyr His Met Pro Val Lys Asn Ser Gln Gly Phe Thr Trp Asn Gln
        755                 760                 765

Leu Arg Ile Thr Ser Arg Ile Phe Gln Trp Lys Gly Leu Ser Arg Thr
    770                 775                 780

Glu Thr Thr Gly Arg Ser Ser Gln Pro Lys Glu Trp
785                 790                 795
```

<210> SEQ ID NO 32

<211> LENGTH: 2421
<212> TYPE: DNA
<213> ORGANISM: Artificial Sequence
<220> FEATURE:
<223> OTHER INFORMATION: Description of Artificial Sequence: Synthetic
polynucleotide

<400> SEQUENCE: 32

```
atggctctgc ctgtgacagc tctgctgctg cctctggctc tgcttctgca tgccgccaga     60
ccttacttcg gcaagctgga aagcaagctg agcgtgatcc ggaacctgaa cgaccaggtg    120
ctgttcatcg accagggcaa cagacccctg ttcgaggaca tgaccgacag cgactgcaga    180
gacaacgccc ctcggaccat cttcatcatc agcatgtaca aggacagcca gcctagaggc    240
atggccgtga ccatctctgt gaagtgcgag aagatcagca ccctgagctg cgagaacaag    300
atcatcagct tcaaagagat gaacccgccg gacaacatca aggacaccaa gagcgacatc    360
atattcttcc agcggagcgt gcccggccac gacaacaaga tgcagtttga gagcagcagc    420
tacgagggct acttcctggc ctgcgagaaa gagcgggacc tgttcaagct gatcctgaag    480
aaagaggacg aactgggcga ccgcagcatc atgttcaccg tgcagaatga ggatggcggc    540
ggaggatctg gcggaggtgg aagcggaggc ggaggaagcg gtggcggcgg atccggctcc    600
acctctggat ccggcaagcc cggatctggc gagggatcca ccaagggcga acagaagctg    660
ataagtgagg aggacttgtt taatatcagc ggctgcagca ccaagaaact gctgtggacc    720
tacagcaccc gcagcgaaga ggaattcgtg ctgttctgcg acctgcctga gcctcagaag    780
tcccacttct gccaccggaa cagactgagc cctaaacagg tgcccgagca tctgcctttc    840
atgggcagca acgatctgag cgacgtgcag tggtatcagc agcccagcaa tggcgaccct    900
ctggaagata tcagaaagag ctaccctcac atcatccagg acaagtgcac cctgcacttt    960
ctgacccctg gcgtgaacaa cagcggcagc tacatctgca gacccaagat gatcaagagc   1020
ccctacgacg tggcctgctg cgtgaagatg atcctggaag tgaagcccca gaccaacgcc   1080
agctgcgagt atagcgccag ccacaagcag gatctgctgc tcggctctac aggcagcatc   1140
agctgtccta gcctgtcctg tcagagcgac gctcagtctc ctgccgtgac ctggtacaag   1200
aatggcaagc tgctgtccgt ggaacggtcc aacagaatcg tggtggacga ggtgtacgac   1260
taccaccagg gcacctacgt gtgcgactac acccagagcg ataccgtgtc tagctggacc   1320
gtcagagccg tggtgcaagt gcggacaatc gtgggcgata ccaagctgaa gcccgacatt   1380
ctggaccccg tggaagatac actggaagtg gaactgggca agcccctgac catcagctgc   1440
aaggccagat tcggcttcga gcgggtgttc aaccccgtga tcaagtggta cattaaggac   1500
agcgacctgg aatgggaagt gtccgtgcct gaggccaagt ccatcaagag cacactgaag   1560
gacgagatca tcgagcggaa catcatcctg gaaaaagtga cccagaggga cctgcggcgg   1620
aagttcgtgt gctttgtgca gaactccatc ggcaacacca cacagagcgt gcagctgaaa   1680
gaaaagcgcg gcgtggtgct gctgtacatc ctgctgggaa caatcggcac actggtggct   1740
gtgctggctg catctgccct gctgtataga cactggatcg agatcgtcct gctgtaccgg   1800
acctaccaga gcaaggatca gaccctgggc gacaagaagg acttcgacgc ctttgtgtcc   1860
tacgccaagt ggtccagctt tcccagcgag gccacatcta gcctgagcga ggaacatctg   1920
gccctgtctc tgttccccga cgtgctggaa aacaaatacg gctacagcct gtgcctgctg   1980
gaaagagatg ttgcccctgg cggagtgtac gccgaggata tcgtgtccat catcaagcgg   2040
agcagacggg gcatcttcat tctgagcccc aactacgtga acggccccag catctttgaa   2100
```

```
ctgcaagccg ccgtgaacct ggctctggac gatcagacac tgaagctcat cctgatcaag   2160

ttctgctact tccaagagcc tgagagcctg cctcacctgg tcaaaaaggc cctgagagtg   2220

ctgcccaccg tgacttggag aggcctgaaa agcgtgccac ctaacagccg gttctgggcc   2280

aagatgagat accacatgcc tgtgaagaac agccagggct tcacctggaa ccagctgcgg   2340

atcaccagcc ggatctttca gtggaagggc ctgagcagaa ccgagacaac cggcagaagc   2400

tcccagccta aagagtggtg a                                              2421


<210> SEQ ID NO 33
<211> LENGTH: 806
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30

Ile Arg Asn Leu Asn Asp Gln Val Leu Phe Ile Asp Gln Gly Asn Arg
        35                  40                  45

Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110

Ile Lys Asp Thr Lys Ser Asp Ile Ile Phe Phe Gln Arg Ser Val Pro
        115                 120                 125

Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160

Lys Glu Asp Glu Leu Gly Asp Arg Ser Ile Met Phe Thr Val Gln Asn
                165                 170                 175

Glu Asp Gly Gly Gly Gly Ser Gly Gly Gly Gly Ser Gly Gly Gly Gly
            180                 185                 190

Ser Gly Gly Gly Gly Ser Gly Ser Thr Ser Gly Ser Gly Lys Pro Gly
        195                 200                 205

Ser Gly Glu Gly Ser Thr Lys Gly Glu Gln Lys Leu Ile Ser Glu Glu
    210                 215                 220

Asp Leu Phe Asn Ile Ser Gly Cys Ser Thr Lys Lys Leu Leu Trp Thr
225                 230                 235                 240

Tyr Ser Thr Arg Ser Glu Glu Glu Phe Val Leu Phe Cys Asp Leu Pro
                245                 250                 255

Glu Pro Gln Lys Ser His Phe Cys His Arg Asn Arg Leu Ser Pro Lys
            260                 265                 270

Gln Val Pro Glu His Leu Pro Phe Met Gly Ser Asn Asp Leu Ser Asp
        275                 280                 285

Val Gln Trp Tyr Gln Gln Pro Ser Asn Gly Asp Pro Leu Glu Asp Ile
    290                 295                 300
```

```
Arg Lys Ser Tyr Pro His Ile Ile Gln Asp Lys Cys Thr Leu His Phe
305                 310                 315                 320

Leu Thr Pro Gly Val Asn Asn Ser Gly Ser Tyr Ile Cys Arg Pro Lys
                325                 330                 335

Met Ile Lys Ser Pro Tyr Asp Val Ala Cys Cys Val Lys Met Ile Leu
            340                 345                 350

Glu Val Lys Pro Gln Thr Asn Ala Ser Cys Glu Tyr Ser Ala Ser His
        355                 360                 365

Lys Gln Asp Leu Leu Leu Gly Ser Thr Gly Ser Ile Ser Cys Pro Ser
    370                 375                 380

Leu Ser Cys Gln Ser Asp Ala Gln Ser Pro Ala Val Thr Trp Tyr Lys
385                 390                 395                 400

Asn Gly Lys Leu Leu Ser Val Glu Arg Ser Asn Arg Ile Val Val Asp
                405                 410                 415

Glu Val Tyr Asp Tyr His Gln Gly Thr Tyr Val Cys Asp Tyr Thr Gln
            420                 425                 430

Ser Asp Thr Val Ser Ser Trp Thr Val Arg Ala Val Val Gln Val Arg
        435                 440                 445

Thr Ile Val Gly Asp Thr Lys Leu Lys Pro Asp Ile Leu Asp Pro Val
    450                 455                 460

Glu Asp Thr Leu Glu Val Glu Leu Gly Lys Pro Leu Thr Ile Ser Cys
465                 470                 475                 480

Lys Ala Arg Phe Gly Phe Glu Arg Val Phe Asn Pro Val Ile Lys Trp
                485                 490                 495

Tyr Ile Lys Asp Ser Asp Leu Glu Trp Glu Val Ser Val Pro Glu Ala
            500                 505                 510

Lys Ser Ile Lys Ser Thr Leu Lys Asp Glu Ile Ile Glu Arg Asn Ile
        515                 520                 525

Ile Leu Glu Lys Val Thr Gln Arg Asp Leu Arg Arg Lys Phe Val Cys
    530                 535                 540

Phe Val Gln Asn Ser Ile Gly Asn Thr Thr Gln Ser Val Gln Leu Lys
545                 550                 555                 560

Glu Lys Arg Gly Val Val Leu Leu Tyr Ile Leu Leu Gly Thr Ile Gly
                565                 570                 575

Thr Leu Val Ala Val Leu Ala Ala Ser Ala Leu Leu Tyr Arg His Trp
            580                 585                 590

Ile Glu Ile Val Leu Leu Tyr Arg Thr Tyr Gln Ser Lys Asp Gln Thr
        595                 600                 605

Leu Gly Asp Lys Lys Asp Phe Asp Ala Phe Val Ser Tyr Ala Lys Trp
    610                 615                 620

Ser Ser Phe Pro Ser Glu Ala Thr Ser Ser Leu Ser Glu Glu His Leu
625                 630                 635                 640

Ala Leu Ser Leu Phe Pro Asp Val Leu Glu Asn Lys Tyr Gly Tyr Ser
                645                 650                 655

Leu Cys Leu Leu Glu Arg Asp Val Ala Pro Gly Gly Val Tyr Ala Glu
            660                 665                 670

Asp Ile Val Ser Ile Ile Lys Arg Ser Arg Arg Gly Ile Phe Ile Leu
        675                 680                 685

Ser Pro Asn Tyr Val Asn Gly Pro Ser Ile Phe Glu Leu Gln Ala Ala
    690                 695                 700

Val Asn Leu Ala Leu Asp Asp Gln Thr Leu Lys Leu Ile Leu Ile Lys
705                 710                 715                 720
```

```
Phe Cys Tyr Phe Gln Glu Pro Glu Ser Leu Pro His Leu Val Lys Lys
                725                 730                 735

Ala Leu Arg Val Leu Pro Thr Val Thr Trp Arg Gly Leu Lys Ser Val
            740                 745                 750

Pro Pro Asn Ser Arg Phe Trp Ala Lys Met Arg Tyr His Met Pro Val
        755                 760                 765

Lys Asn Ser Gln Gly Phe Thr Trp Asn Gln Leu Arg Ile Thr Ser Arg
    770                 775                 780

Ile Phe Gln Trp Lys Gly Leu Ser Arg Thr Glu Thr Thr Gly Arg Ser
785                 790                 795                 800

Ser Gln Pro Lys Glu Trp
                805


<210> SEQ ID NO 34
<211> LENGTH: 2367
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 34

atggctctgc ctgtgacagc tctgctgctg cctctggctc tgcttctgca tgccgccaga     60

ccttacttcg gcaagctgga aagcaagctg agcgtgatcc ggaacctgaa cgaccaggtg    120

ctgttcatcg accagggcaa cagacccctg ttcgaggaca tgaccgacag cgactgcaga    180

gacaacgccc ctcggaccat cttcatcatc agcatgtaca aggacagcca gcctagaggc    240

atggccgtga ccatctctgt gaagtgcgag aagatcagca ccctgagctg cgagaacaag    300

atcatcagct tcaaagagat gaacccgccg gacaacatca aggacaccaa gagcgacatc    360

atattcttcc agcggagcgt gcccggccac gacaacaaga tgcagtttga gagcagcagc    420

tacgagggct acttcctggc ctgcgagaaa gagcgggacc tgttcaagct gatcctgaag    480

aaagaggacg aactgggcga ccgcagcatc atgttcaccg tgcagaatga ggatggcggc    540

ggaggatctg gcggaggtgg aagcggaggc ggaggaagcg gtggcggcgg atccggcggt    600

ggcggttcag gcggtggcgg atcttttaat atcagcggct gcagcaccaa gaaactgctg    660

tggacctaca gcacccgcag cgaagaggaa ttcgtgctgt tctgcgacct gcctgagcct    720

cagaagtccc acttctgcca ccggaacaga ctgagcccta aacaggtgcc cgagcatctg    780

cctttcatgg gcagcaacga tctgagcgac gtgcagtggt atcagcagcc cagcaatggc    840

gaccctctgg aagatatcag aaagagctac cctcacatca tccaggacaa gtgcaccctg    900

cactttctga cccctggcgt gaacaacagc ggcagctaca tctgcagacc caagatgatc    960

aagagcccct acgacgtggc ctgctgcgtg aagatgatcc tggaagtgaa gccccagacc   1020

aacgccagct gcgagtatag cgccagccac aagcaggatc tgctgctcgg ctctacaggc   1080

agcatcagct gtcctagcct gtcctgtcag agcgacgctc agtctcctgc cgtgacctgg   1140

tacaagaatg gcaagctgct gtccgtggaa cggtccaaca gaatcgtggt ggacgaggtg   1200

tacgactacc accagggcac ctacgtgtgc gactacaccc agagcgatac cgtgtctagc   1260

tggaccgtca gagccgtggt gcaagtgcgg acaatcgtgg gcgataccaa gctgaagccc   1320

gacattctgg accccgtgga agatacactg gaagtggaac tgggcaagcc cctgaccatc   1380

agctgcaagg ccagattcgg cttcgagcgg gtgttcaacc ccgtgatcaa gtggtacatt   1440

aaggacagcg acctggaatg ggaagtgtcc gtgcctgagg ccaagtccat caagagcaca   1500
```

```
ctgaaggacg agatcatcga gcggaacatc atcctggaaa aagtgaccca gagggacctg   1560

cggcggaagt tcgtgtgctt tgtgcagaac tccatcggca acaccacaca gagcgtgcag   1620

ctgaaagaaa agcgcggcgt ggtgctgctg tacatcctgc tgggaacaat cggcacactg   1680

gtggctgtgc tggctgcatc tgccctgctg tatagacact ggatcgagat cgtcctgctg   1740

taccggacct accagagcaa ggatcagacc ctgggcgaca agaaggactt cgacgccttt   1800

gtgtcctacg ccaagtggtc cagctttccc agcgaggcca catctagcct gagcgaggaa   1860

catctggccc tgtctctgtt ccccgacgtg ctggaaaaca aatacggcta cagcctgtgc   1920

ctgctggaaa gagatgttgc cctggcggga gtgtacgccg aggatatcgt gtccatcatc   1980

aagcggagca gacggggcat cttcattctg agccccaact acgtgaacgg ccccagcatc   2040

tttgaactgc aagccgccgt gaacctggct ctggacgatc agacactgaa gctcatcctg   2100

atcaagttct gctacttcca agagcctgag agcctgcctc acctggtcaa aaaggccctg   2160

agagtgctgc ccaccgtgac ttggagaggc ctgaaaagcg tgccacctaa cagccggttc   2220

tgggccaaga tgagatacca catgcctgtg aagaacagcc agggcttcac ctggaaccag   2280

ctgcggatca ccagccggat ctttcagtgg aagggcctga gcagaaccga gacaaccggc   2340

agaagctccc agcctaaaga gtggtga                                        2367
```

<210> SEQ ID NO 35
<211> LENGTH: 788
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 35

```
Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30

Ile Arg Asn Leu Asn Asp Gln Val Leu Phe Ile Asp Gln Gly Asn Arg
        35                  40                  45

Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110

Ile Lys Asp Thr Lys Ser Asp Ile Ile Phe Phe Gln Arg Ser Val Pro
        115                 120                 125

Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160

Lys Glu Asp Glu Leu Gly Asp Arg Ser Ile Met Phe Thr Val Gln Asn
                165                 170                 175

Glu Asp Gly Gly Gly Gly Ser Gly Gly Gly Gly Ser Gly Gly Gly Gly
            180                 185                 190

Ser Gly Gly Gly Gly Ser Gly Gly Gly Gly Ser Gly Gly Gly Gly Ser
        195                 200                 205
```

```
Phe Asn Ile Ser Gly Cys Ser Thr Lys Lys Leu Leu Trp Thr Tyr Ser
    210                 215                 220

Thr Arg Ser Glu Glu Glu Phe Val Leu Phe Cys Asp Leu Pro Glu Pro
225                 230                 235                 240

Gln Lys Ser His Phe Cys His Arg Asn Arg Leu Ser Pro Lys Gln Val
                245                 250                 255

Pro Glu His Leu Pro Phe Met Gly Ser Asn Asp Leu Ser Asp Val Gln
            260                 265                 270

Trp Tyr Gln Gln Pro Ser Asn Gly Asp Pro Leu Glu Asp Ile Arg Lys
        275                 280                 285

Ser Tyr Pro His Ile Ile Gln Asp Lys Cys Thr Leu His Phe Leu Thr
    290                 295                 300

Pro Gly Val Asn Asn Ser Gly Ser Tyr Ile Cys Arg Pro Lys Met Ile
305                 310                 315                 320

Lys Ser Pro Tyr Asp Val Ala Cys Cys Val Lys Met Ile Leu Glu Val
                325                 330                 335

Lys Pro Gln Thr Asn Ala Ser Cys Glu Tyr Ser Ala Ser His Lys Gln
            340                 345                 350

Asp Leu Leu Leu Gly Ser Thr Gly Ser Ile Ser Cys Pro Ser Leu Ser
        355                 360                 365

Cys Gln Ser Asp Ala Gln Ser Pro Ala Val Thr Trp Tyr Lys Asn Gly
    370                 375                 380

Lys Leu Leu Ser Val Glu Arg Ser Asn Arg Ile Val Val Asp Glu Val
385                 390                 395                 400

Tyr Asp Tyr His Gln Gly Thr Tyr Val Cys Asp Tyr Thr Gln Ser Asp
                405                 410                 415

Thr Val Ser Ser Trp Thr Val Arg Ala Val Val Gln Val Arg Thr Ile
            420                 425                 430

Val Gly Asp Thr Lys Leu Lys Pro Asp Ile Leu Asp Pro Val Glu Asp
        435                 440                 445

Thr Leu Glu Val Glu Leu Gly Lys Pro Leu Thr Ile Ser Cys Lys Ala
    450                 455                 460

Arg Phe Gly Phe Glu Arg Val Phe Asn Pro Val Ile Lys Trp Tyr Ile
465                 470                 475                 480

Lys Asp Ser Asp Leu Glu Trp Glu Val Ser Val Pro Glu Ala Lys Ser
                485                 490                 495

Ile Lys Ser Thr Leu Lys Asp Glu Ile Ile Glu Arg Asn Ile Ile Leu
            500                 505                 510

Glu Lys Val Thr Gln Arg Asp Leu Arg Arg Lys Phe Val Cys Phe Val
        515                 520                 525

Gln Asn Ser Ile Gly Asn Thr Thr Gln Ser Val Gln Leu Lys Glu Lys
    530                 535                 540

Arg Gly Val Val Leu Leu Tyr Ile Leu Leu Gly Thr Ile Gly Thr Leu
545                 550                 555                 560

Val Ala Val Leu Ala Ala Ser Ala Leu Leu Tyr Arg His Trp Ile Glu
                565                 570                 575

Ile Val Leu Leu Tyr Arg Thr Tyr Gln Ser Lys Asp Gln Thr Leu Gly
            580                 585                 590

Asp Lys Lys Asp Phe Asp Ala Phe Val Ser Tyr Ala Lys Trp Ser Ser
        595                 600                 605

Phe Pro Ser Glu Ala Thr Ser Ser Leu Ser Glu Glu His Leu Ala Leu
    610                 615                 620
```

```
Ser Leu Phe Pro Asp Val Leu Glu Asn Lys Tyr Gly Tyr Ser Leu Cys
625                 630                 635                 640

Leu Leu Glu Arg Asp Val Ala Pro Gly Gly Val Tyr Ala Glu Asp Ile
                645                 650                 655

Val Ser Ile Ile Lys Arg Ser Arg Arg Gly Ile Phe Ile Leu Ser Pro
            660                 665                 670

Asn Tyr Val Asn Gly Pro Ser Ile Phe Glu Leu Gln Ala Ala Val Asn
        675                 680                 685

Leu Ala Leu Asp Asp Gln Thr Leu Lys Leu Ile Leu Ile Lys Phe Cys
    690                 695                 700

Tyr Phe Gln Glu Pro Glu Ser Leu Pro His Leu Val Lys Lys Ala Leu
705                 710                 715                 720

Arg Val Leu Pro Thr Val Thr Trp Arg Gly Leu Lys Ser Val Pro Pro
                725                 730                 735

Asn Ser Arg Phe Trp Ala Lys Met Arg Tyr His Met Pro Val Lys Asn
            740                 745                 750

Ser Gln Gly Phe Thr Trp Asn Gln Leu Arg Ile Thr Ser Arg Ile Phe
        755                 760                 765

Gln Trp Lys Gly Leu Ser Arg Thr Glu Thr Thr Gly Arg Ser Ser Gln
    770                 775                 780

Pro Lys Glu Trp
785
```

<210> SEQ ID NO 36
<211> LENGTH: 2397
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 36

```
atggctctgc ctgtgacagc tctgctgctg cctctggctc tgcttctgca tgccgccaga     60

ccttacttcg gcaagctgga aagcaagctg agcgtgatcc ggaacctgaa cgaccaggtg    120

ctgttcatcg accagggcaa cagacccctg ttcgaggaca tgaccgacag cgactgcaga    180

gacaacgccc ctcggaccat cttcatcatc agcatgtaca aggacagcca gcctagaggc    240

atggccgtga ccatctctgt gaagtgcgag aagatcagca ccctgagctg cgagaacaag    300

atcatcagct tcaaagagat gaacccgccg gacaacatca aggacaccaa gagcgacatc    360

atattcttcc agcggagcgt gcccggccac gacaacaaga tgcagtttga gagcagcagc    420

tacgagggct acttcctggc ctgcgagaaa gagcgggacc tgttcaagct gatcctgaag    480

aaagaggacg aactgggcga ccgcagcatc atgttcaccg tgcagaatga ggatggcggc    540

ggaggatctg gcggaggtgg aagcggaggc ggaggaagcg gtggcggcgg atccggtggc    600

ggcggttcag gcggtggcgg atctgaacag aagctgataa gtgaggagga cttgtttaat    660

atcagcggct gcagcaccaa gaaactgctg tggacctaca gcacccgcag cgaagaggaa    720

ttcgtgctgt tctgcgacct gcctgagcct cagaagtccc acttctgcca ccggaacaga    780

ctgagcccta aacaggtgcc cgagcatctg cctttcatgg gcagcaacga tctgagcgac    840

gtgcagtggt atcagcagcc cagcaatggc gaccctctgg aagatatcag aaagagctac    900

cctcacatca tccaggacaa gtgcaccctg cactttctga cccctggcgt gaacaacagc    960

ggcagctaca tctgcagacc caagatgatc aagagcccct acgacgtggc ctgctgcgtg   1020

aagatgatcc tggaagtgaa gccccagacc aacgccagct gcgagtatag cgccagccac   1080
```

```
aagcaggatc tgctgctcgg ctctacaggc agcatcagct gtcctagcct gtcctgtcag   1140

agcgacgctc agtctcctgc cgtgacctgg tacaagaatg gcaagctgct gtccgtggaa   1200

cggtccaaca gaatcgtggt ggacgaggtg tacgactacc accagggcac ctacgtgtgc   1260

gactacaccc agagcgatac cgtgtctagc tggaccgtca gagccgtggt gcaagtgcgg   1320

acaatcgtgg gcgataccaa gctgaagccc gacattctgg accccgtgga agatacactg   1380

gaagtggaac tgggcaagcc cctgaccatc agctgcaagg ccagattcgg cttcgagcgg   1440

gtgttcaacc ccgtgatcaa gtggtacatt aaggacagcg acctggaatg ggaagtgtcc   1500

gtgcctgagg ccaagtccat caagagcaca ctgaaggacg agatcatcga gcggaacatc   1560

atcctggaaa aagtgaccca gagggacctg cggcggaagt tcgtgtgctt tgtgcagaac   1620

tccatcggca acaccacaca gagcgtgcag ctgaaagaaa agcgcggcgt ggtgctgctg   1680

tacatcctgc tgggaacaat cggcacactg gtggctgtgc tggctgcatc tgccctgctg   1740

tatagacact ggatcgagat cgtcctgctg taccggacct accagagcaa ggatcagacc   1800

ctgggcgaca agaaggactt cgacgccttt gtgtcctacg ccaagtggtc cagctttccc   1860

agcgaggcca catctagcct gagcgaggaa catctggccc tgtctctgtt ccccgacgtg   1920

ctggaaaaca aatacggcta cagcctgtgc ctgctggaaa gagatgttgc ccctggcgga   1980

gtgtacgccg aggatatcgt gtccatcatc aagcggagca gacggggcat cttcattctg   2040

agccccaact acgtgaacgg ccccagcatc tttgaactgc aagccgccgt gaacctggct   2100

ctggacgatc agacactgaa gctcatcctg atcaagttct gctacttcca agagcctgag   2160

agcctgcctc acctggtcaa aaaggccctg agagtgctgc ccaccgtgac ttggagaggc   2220

ctgaaaagcg tgccacctaa cagccggttc tgggccaaga tgagatacca catgcctgtg   2280

aagaacagcc agggcttcac ctggaaccag ctgcggatca ccagccggat ctttcagtgg   2340

aagggcctga gcagaaccga gacaaccggc agaagctccc agcctaaaga gtggtga      2397
```

```
<210> SEQ ID NO 37
<211> LENGTH: 798
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 37

Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30

Ile Arg Asn Leu Asn Asp Gln Val Leu Phe Ile Asp Gln Gly Asn Arg
        35                  40                  45

Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110

Ile Lys Asp Thr Lys Ser Asp Ile Ile Phe Phe Gln Arg Ser Val Pro
        115                 120                 125
```

```
Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160

Lys Glu Asp Glu Leu Gly Asp Arg Ser Ile Met Phe Thr Val Gln Asn
                165                 170                 175

Glu Asp Gly Gly Gly Gly Ser Gly Gly Gly Gly Ser Gly Gly Gly Gly
            180                 185                 190

Ser Gly Gly Gly Gly Ser Gly Gly Gly Gly Ser Gly Gly Gly Gly Ser
        195                 200                 205

Glu Gln Lys Leu Ile Ser Glu Glu Asp Leu Phe Asn Ile Ser Gly Cys
    210                 215                 220

Ser Thr Lys Lys Leu Leu Trp Thr Tyr Ser Thr Arg Ser Glu Glu Glu
225                 230                 235                 240

Phe Val Leu Phe Cys Asp Leu Pro Glu Pro Gln Lys Ser His Phe Cys
                245                 250                 255

His Arg Asn Arg Leu Ser Pro Lys Gln Val Pro Glu His Leu Pro Phe
            260                 265                 270

Met Gly Ser Asn Asp Leu Ser Asp Val Gln Trp Tyr Gln Gln Pro Ser
        275                 280                 285

Asn Gly Asp Pro Leu Glu Asp Ile Arg Lys Ser Tyr Pro His Ile Ile
    290                 295                 300

Gln Asp Lys Cys Thr Leu His Phe Leu Thr Pro Gly Val Asn Asn Ser
305                 310                 315                 320

Gly Ser Tyr Ile Cys Arg Pro Lys Met Ile Lys Ser Pro Tyr Asp Val
                325                 330                 335

Ala Cys Cys Val Lys Met Ile Leu Glu Val Lys Pro Gln Thr Asn Ala
            340                 345                 350

Ser Cys Glu Tyr Ser Ala Ser His Lys Gln Asp Leu Leu Leu Gly Ser
        355                 360                 365

Thr Gly Ser Ile Ser Cys Pro Ser Leu Ser Cys Gln Ser Asp Ala Gln
    370                 375                 380

Ser Pro Ala Val Thr Trp Tyr Lys Asn Gly Lys Leu Leu Ser Val Glu
385                 390                 395                 400

Arg Ser Asn Arg Ile Val Val Asp Glu Val Tyr Asp Tyr His Gln Gly
                405                 410                 415

Thr Tyr Val Cys Asp Tyr Thr Gln Ser Asp Thr Val Ser Ser Trp Thr
            420                 425                 430

Val Arg Ala Val Val Gln Val Arg Thr Ile Val Gly Asp Thr Lys Leu
        435                 440                 445

Lys Pro Asp Ile Leu Asp Pro Val Glu Asp Thr Leu Glu Val Glu Leu
    450                 455                 460

Gly Lys Pro Leu Thr Ile Ser Cys Lys Ala Arg Phe Gly Phe Glu Arg
465                 470                 475                 480

Val Phe Asn Pro Val Ile Lys Trp Tyr Ile Lys Asp Ser Asp Leu Glu
                485                 490                 495

Trp Glu Val Ser Val Pro Glu Ala Lys Ser Ile Lys Ser Thr Leu Lys
            500                 505                 510

Asp Glu Ile Ile Glu Arg Asn Ile Ile Leu Glu Lys Val Thr Gln Arg
        515                 520                 525

Asp Leu Arg Arg Lys Phe Val Cys Phe Val Gln Asn Ser Ile Gly Asn
    530                 535                 540
```

```
Thr Thr Gln Ser Val Gln Leu Lys Glu Lys Arg Gly Val Val Leu Leu
545                 550                 555                 560

Tyr Ile Leu Leu Gly Thr Ile Gly Thr Leu Val Ala Val Leu Ala Ala
                565                 570                 575

Ser Ala Leu Leu Tyr Arg His Trp Ile Glu Ile Val Leu Leu Tyr Arg
            580                 585                 590

Thr Tyr Gln Ser Lys Asp Gln Thr Leu Gly Asp Lys Lys Asp Phe Asp
        595                 600                 605

Ala Phe Val Ser Tyr Ala Lys Trp Ser Ser Phe Pro Ser Glu Ala Thr
    610                 615                 620

Ser Ser Leu Ser Glu Glu His Leu Ala Leu Ser Leu Phe Pro Asp Val
625                 630                 635                 640

Leu Glu Asn Lys Tyr Gly Tyr Ser Leu Cys Leu Leu Glu Arg Asp Val
                645                 650                 655

Ala Pro Gly Gly Val Tyr Ala Glu Asp Ile Val Ser Ile Ile Lys Arg
            660                 665                 670

Ser Arg Arg Gly Ile Phe Ile Leu Ser Pro Asn Tyr Val Asn Gly Pro
        675                 680                 685

Ser Ile Phe Glu Leu Gln Ala Ala Val Asn Leu Ala Leu Asp Asp Gln
    690                 695                 700

Thr Leu Lys Leu Ile Leu Ile Lys Phe Cys Tyr Phe Gln Glu Pro Glu
705                 710                 715                 720

Ser Leu Pro His Leu Val Lys Lys Ala Leu Arg Val Leu Pro Thr Val
                725                 730                 735

Thr Trp Arg Gly Leu Lys Ser Val Pro Pro Asn Ser Arg Phe Trp Ala
            740                 745                 750

Lys Met Arg Tyr His Met Pro Val Lys Asn Ser Gln Gly Phe Thr Trp
        755                 760                 765

Asn Gln Leu Arg Ile Thr Ser Arg Ile Phe Gln Trp Lys Gly Leu Ser
    770                 775                 780

Arg Thr Glu Thr Thr Gly Arg Ser Ser Gln Pro Lys Glu Trp
785                 790                 795
```

<210> SEQ ID NO 38
<211> LENGTH: 2451
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 38

```
atggctctgc ctgtgacagc tctgctgctg cctctggctc tgcttctgca tgccgccaga     60

ccttacttcg gcaagctgga aagcaagctg agcgtgatcc ggaacctgaa cgaccaggtg    120

ctgttcatcg accagggcaa cagacccctg ttcgaggaca tgaccgacag cgactgcaga    180

gacaacgccc ctcggaccat cttcatcatc agcatgtaca aggacagcca gcctagaggc    240

atggccgtga ccatctctgt gaagtgcgag aagatcagca ccctgagctg cgagaacaag    300

atcatcagct tcaaagagat gaacccgccg gacaacatca aggacaccaa gagcgacatc    360

atattcttcc agcggagcgt gcccggccac gacaacaaga tgcagtttga gagcagcagc    420

tacgagggct acttcctggc ctgcgagaaa gagcgggacc tgttcaagct gatcctgaag    480

aaagaggacg aactgggcga ccgcagcatc atgttcaccg tgcagaatga ggatggcggc    540

ggaggatctg gcggaggtgg aagcggaggc ggaggaagcg gtggcggcgg atccggtggc    600
```

```
ggcggttcag gcggtggcgg atctggctcc acctctggat ccggcaagcc cggatctggc    660
gagggatcca ccaagggcga acagaagctg ataagtgagg aggacttgtt taatatcagc    720
ggctgcagca ccaagaaact gctgtggacc tacagcaccc gcagcgaaga ggaattcgtg    780
ctgttctgcg acctgcctga gcctcagaag tcccacttct gccaccggaa cagactgagc    840
cctaaacagg tgcccgagca tctgcctttc atgggcagca acgatctgag cgacgtgcag    900
tggtatcagc agcccagcaa tggcgaccct ctggaagata tcagaaagag ctaccctcac    960
atcatccagg acaagtgcac cctgcacttt ctgacccctg gcgtgaacaa cagcggcagc   1020
tacatctgca gacccaagat gatcaagagc cctacgacg tggcctgctg cgtgaagatg    1080
atcctggaag tgaagcccca gaccaacgcc agctgcgagt atagcgccag ccacaagcag   1140
gatctgctgc tcggctctac aggcagcatc agctgtccta gcctgtcctg tcagagcgac   1200
gctcagtctc ctgccgtgac ctggtacaag aatggcaagc tgctgtccgt ggaacggtcc   1260
aacagaatcg tggtggacga ggtgtacgac taccaccagg gcacctacgt gtgcgactac   1320
acccagagcg ataccgtgtc tagctggacc gtcagagccg tggtgcaagt gcggacaatc   1380
gtgggcgata ccaagctgaa gcccgacatt ctggaccccg tggaagatac actggaagtg   1440
gaactgggca agcccctgac catcagctgc aaggccagat tcggcttcga gcgggtgttc   1500
aaccccgtga tcaagtggta cattaaggac agcgacctgg aatgggaagt gtccgtgcct   1560
gaggccaagt ccatcaagag cacactgaag gacgagatca tcgagcggaa catcatcctg   1620
gaaaaagtga cccagaggga cctgcggcgg aagttcgtgt gctttgtgca gaactccatc   1680
ggcaacacca cacagagcgt gcagctgaaa gaaaagcgcg gcgtggtgct gctgtacatc   1740
ctgctgggaa caatcggcac actggtggct gtgctggctg catctgccct gctgtataga   1800
cactggatcg agatcgtcct gctgtaccgg acctaccaga gcaaggatca gaccctgggc   1860
gacaagaagg acttcgacgc ctttgtgtcc tacgccaagt ggtccagctt tcccagcgag   1920
gccacatcta gcctgagcga ggaacatctg gccctgtctc tgttccccga cgtgctggaa   1980
aacaaatacg gctacagcct gtgcctgctg gaaagagatg ttgcccctgg cggagtgtac   2040
gccgaggata tcgtgtccat catcaagcgg agcagacggg gcatcttcat tctgagcccc   2100
aactacgtga acggccccag catctttgaa ctgcaagccg ccgtgaacct ggctctggac   2160
gatcagacac tgaagctcat cctgatcaag ttctgctact tccaagagcc tgagagcctg   2220
cctcacctgg tcaaaaaggc cctgagagtg ctgcccaccg tgacttggag aggcctgaaa   2280
agcgtgccac ctaacagccg gttctgggcc aagatgagat accacatgcc tgtgaagaac   2340
agccagggct tcacctggaa ccagctgcgg atcaccagcc ggatctttca gtggaagggc   2400
ctgagcagaa ccgagacaac cggcagaagc tcccagccta aagagtggtg a            2451
```

<210> SEQ ID NO 39
<211> LENGTH: 816
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 39

```
Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30
```

```
Ile Arg Asn Leu Asn Asp Gln Val Leu Phe Ile Asp Gln Gly Asn Arg
        35                  40                  45

Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110

Ile Lys Asp Thr Lys Ser Asp Ile Ile Phe Phe Gln Arg Ser Val Pro
        115                 120                 125

Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160

Lys Glu Asp Glu Leu Gly Asp Arg Ser Ile Met Phe Thr Val Gln Asn
                165                 170                 175

Glu Asp Gly Gly Gly Gly Ser Gly Gly Gly Gly Ser Gly Gly Gly Gly
            180                 185                 190

Ser Gly Gly Gly Gly Ser Gly Gly Gly Gly Ser Gly Gly Gly Gly Ser
        195                 200                 205

Gly Ser Thr Ser Gly Ser Gly Lys Pro Gly Ser Gly Glu Gly Ser Thr
    210                 215                 220

Lys Gly Glu Gln Lys Leu Ile Ser Glu Glu Asp Leu Phe Asn Ile Ser
225                 230                 235                 240

Gly Cys Ser Thr Lys Lys Leu Leu Trp Thr Tyr Ser Thr Arg Ser Glu
                245                 250                 255

Glu Glu Phe Val Leu Phe Cys Asp Leu Pro Glu Pro Gln Lys Ser His
            260                 265                 270

Phe Cys His Arg Asn Arg Leu Ser Pro Lys Gln Val Pro Glu His Leu
        275                 280                 285

Pro Phe Met Gly Ser Asn Asp Leu Ser Asp Val Gln Trp Tyr Gln Gln
    290                 295                 300

Pro Ser Asn Gly Asp Pro Leu Glu Asp Ile Arg Lys Ser Tyr Pro His
305                 310                 315                 320

Ile Ile Gln Asp Lys Cys Thr Leu His Phe Leu Thr Pro Gly Val Asn
                325                 330                 335

Asn Ser Gly Ser Tyr Ile Cys Arg Pro Lys Met Ile Lys Ser Pro Tyr
            340                 345                 350

Asp Val Ala Cys Cys Val Lys Met Ile Leu Glu Val Lys Pro Gln Thr
        355                 360                 365

Asn Ala Ser Cys Glu Tyr Ser Ala Ser His Lys Gln Asp Leu Leu Leu
    370                 375                 380

Gly Ser Thr Gly Ser Ile Ser Cys Pro Ser Leu Ser Cys Gln Ser Asp
385                 390                 395                 400

Ala Gln Ser Pro Ala Val Thr Trp Tyr Lys Asn Gly Lys Leu Leu Ser
                405                 410                 415

Val Glu Arg Ser Asn Arg Ile Val Val Asp Glu Val Tyr Asp Tyr His
            420                 425                 430

Gln Gly Thr Tyr Val Cys Asp Tyr Thr Gln Ser Asp Thr Val Ser Ser
        435                 440                 445

Trp Thr Val Arg Ala Val Val Gln Val Arg Thr Ile Val Gly Asp Thr
```

```
    450                 455                 460

Lys Leu Lys Pro Asp Ile Leu Asp Pro Val Glu Asp Thr Leu Glu Val
465                 470                 475                 480

Glu Leu Gly Lys Pro Leu Thr Ile Ser Cys Lys Ala Arg Phe Gly Phe
                485                 490                 495

Glu Arg Val Phe Asn Pro Val Ile Lys Trp Tyr Ile Lys Asp Ser Asp
            500                 505                 510

Leu Glu Trp Glu Val Ser Val Pro Glu Ala Lys Ser Ile Lys Ser Thr
        515                 520                 525

Leu Lys Asp Glu Ile Ile Glu Arg Asn Ile Ile Leu Glu Lys Val Thr
    530                 535                 540

Gln Arg Asp Leu Arg Arg Lys Phe Val Cys Phe Val Gln Asn Ser Ile
545                 550                 555                 560

Gly Asn Thr Thr Gln Ser Val Gln Leu Lys Glu Lys Arg Gly Val Val
                565                 570                 575

Leu Leu Tyr Ile Leu Leu Gly Thr Ile Gly Thr Leu Val Ala Val Leu
            580                 585                 590

Ala Ala Ser Ala Leu Leu Tyr Arg His Trp Ile Glu Ile Val Leu Leu
        595                 600                 605

Tyr Arg Thr Tyr Gln Ser Lys Asp Gln Thr Leu Gly Asp Lys Lys Asp
    610                 615                 620

Phe Asp Ala Phe Val Ser Tyr Ala Lys Trp Ser Ser Phe Pro Ser Glu
625                 630                 635                 640

Ala Thr Ser Ser Leu Ser Glu Glu His Leu Ala Leu Ser Leu Phe Pro
                645                 650                 655

Asp Val Leu Glu Asn Lys Tyr Gly Tyr Ser Leu Cys Leu Leu Glu Arg
            660                 665                 670

Asp Val Ala Pro Gly Gly Val Tyr Ala Glu Asp Ile Val Ser Ile Ile
        675                 680                 685

Lys Arg Ser Arg Arg Gly Ile Phe Ile Leu Ser Pro Asn Tyr Val Asn
    690                 695                 700

Gly Pro Ser Ile Phe Glu Leu Gln Ala Ala Val Asn Leu Ala Leu Asp
705                 710                 715                 720

Asp Gln Thr Leu Lys Leu Ile Leu Ile Lys Phe Cys Tyr Phe Gln Glu
                725                 730                 735

Pro Glu Ser Leu Pro His Leu Val Lys Lys Ala Leu Arg Val Leu Pro
            740                 745                 750

Thr Val Thr Trp Arg Gly Leu Lys Ser Val Pro Pro Asn Ser Arg Phe
        755                 760                 765

Trp Ala Lys Met Arg Tyr His Met Pro Val Lys Asn Ser Gln Gly Phe
    770                 775                 780

Thr Trp Asn Gln Leu Arg Ile Thr Ser Arg Ile Phe Gln Trp Lys Gly
785                 790                 795                 800

Leu Ser Arg Thr Glu Thr Thr Gly Arg Ser Ser Gln Pro Lys Glu Trp
                805                 810                 815


<210> SEQ ID NO 40
<211> LENGTH: 2241
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 40
```

```
atggctctgc ctgtgacagc tctgctgctg cctctggctc tgcttctgca tgccgccaga     60
ccttacttcg gcaagctgga aagcaagctg agcgtgatcc ggaacctgaa cgaccaggtg    120
ctgttcatcg accagggcaa cagacccctg ttcgaggaca tgaccgacag cgactgcaga    180
gacaacgccc ctcggaccat cttcatcatc agcatgtaca aggacagcca gcctagaggc    240
atggccgtga ccatctctgt gaagtgcgag aagatcagca ccctgagctg cgagaacaag    300
atcatcagct tcaaagagat gaacccgccg gacaacatca aggacaccaa gagcgacatc    360
atattcttcc agcggagcgt gcccggccac gacaacaaga tgcagtttga gagcagcagc    420
tacgagggct acttcctggc ctgcgagaaa gagcgggacc tgttcaagct gatcctgaag    480
aaagaggacg aactgggcga ccgcagcatc atgttcaccg tgcagaatga ggatggcggc    540
ggaggatctg gcggaggtgg aagcggaggc ggaggaagcg gtggcggcgg atccggctcc    600
acctctggat ccggcaagcc cggatctggc gagggatcca ccaagggcga acagaagctg    660
ataagtgagg aggacttgtg tacatctaga ccccacatca ccgtggtgga aggcgagccc    720
ttttacctga agcactgcag ctgttctctg gcccacgaga tcgagacaac caccaagtcc    780
tggtacaaga gcagcggcag ccaagagcac gtggaactga accctagaag cagctccaga    840
atcgccctgc acgactgcgt gctggaattc tggcctgtcg agctgaacga taccggcagc    900
tacttcttcc agatgaagaa ctacacccag aaatggaagc tcaacgtgat caggcggaac    960
aagcacagct gcttcaccga gagacaagtg accagcaaga tcgtggaagt gaagaagttc   1020
tttcagatca cgtgcgagaa ctcctactac cagacactgg tcaacagcac cagcctgtac   1080
aagaactgca agaagctgct cctcgagaac aacaagaacc ccaccatcaa gaagaacgcc   1140
gagttcgagg atcagggcta ctacagctgc gtgcacttcc tgcaccacaa tggcaagctg   1200
ttcaacatca ccaagacctt caatatcacc atcgtcgagg accgctccaa catcgtgcct   1260
gttctgctgg gccccaagct gaatcatgtg gctgtggaac tgggcaagaa cgtgcggctg   1320
aattgcagcg ccctgctgaa cgaagaggac gtgatctact ggatgttcgg cgaggaaaac   1380
ggcagcgacc ccaacatcca cgaagagaaa gaaatgcgga tcatgacccc tgaaggcaag   1440
tggcacgcca gcaaggtgct gcggatcgag aatatcggcg agagcaacct gaatgtgctg   1500
tacaactgca ccgtggccag caccggcggc accgatacca agtcttttat cctcgtgcgg   1560
aaggccgaca tggctgacat tccaggccac gtgttcaccc ggggcatgat cattgccgtg   1620
ctgattctgg tggccgtcgt gtgtctggtc accgtgtgtg tgatctacag agtggacctg   1680
gtcctgttct accggcacct gaccagaagg gacgagacac tgaccgacgg caagacctac   1740
gatgccttcg tgtcctacct gaaagagtgc agacccgaga acggcgaaga acacaccttc   1800
gccgtggaaa tcctgcctag agtgctggaa aagcacttcg gctacaagct gtgcatcttc   1860
gagcgcgacg ttgtgcctgg cggagctgtg gtggatgaga tccacagcct gatcgagaag   1920
tccagacggc tgatcatcgt gctgagcaag agctacatga gcaacgaagt ccgctacgag   1980
ctggaatccg gactgcacga agccctggtg gaacggaaga tcaagatcat tctgatcgag   2040
ttcacccctg tgaccgactt cacattcctg cctcagagcc tgaagctgct gaagtcccac   2100
agagtgctga agtggaaagc cgacaagagc ctgagctaca acagccggtt ttggaagaac   2160
ctgctgtacc tgatgcctgc caagaccgtg aagcccggca gagatgagcc cgaagttctg   2220
ccagtgctga gcgagtcttg a                                             2241
```

<210> SEQ ID NO 41
<211> LENGTH: 746

<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 41

```
Met Ala Leu Pro Val Thr Ala Leu Leu Leu Pro Leu Ala Leu Leu Leu
1               5                   10                  15

His Ala Ala Arg Pro Tyr Phe Gly Lys Leu Glu Ser Lys Leu Ser Val
            20                  25                  30

Ile Arg Asn Leu Asn Asp Gln Val Leu Phe Ile Asp Gln Gly Asn Arg
        35                  40                  45

Pro Leu Phe Glu Asp Met Thr Asp Ser Asp Cys Arg Asp Asn Ala Pro
    50                  55                  60

Arg Thr Ile Phe Ile Ile Ser Met Tyr Lys Asp Ser Gln Pro Arg Gly
65                  70                  75                  80

Met Ala Val Thr Ile Ser Val Lys Cys Glu Lys Ile Ser Thr Leu Ser
                85                  90                  95

Cys Glu Asn Lys Ile Ile Ser Phe Lys Glu Met Asn Pro Pro Asp Asn
            100                 105                 110

Ile Lys Asp Thr Lys Ser Asp Ile Ile Phe Phe Gln Arg Ser Val Pro
        115                 120                 125

Gly His Asp Asn Lys Met Gln Phe Glu Ser Ser Ser Tyr Glu Gly Tyr
    130                 135                 140

Phe Leu Ala Cys Glu Lys Glu Arg Asp Leu Phe Lys Leu Ile Leu Lys
145                 150                 155                 160

Lys Glu Asp Glu Leu Gly Asp Arg Ser Ile Met Phe Thr Val Gln Asn
                165                 170                 175

Glu Asp Gly Gly Gly Gly Ser Gly Gly Gly Gly Ser Gly Gly Gly Gly
            180                 185                 190

Ser Gly Gly Gly Gly Ser Gly Ser Thr Ser Gly Ser Gly Lys Pro Gly
        195                 200                 205

Ser Gly Glu Gly Ser Thr Lys Gly Glu Gln Lys Leu Ile Ser Glu Glu
    210                 215                 220

Asp Leu Cys Thr Ser Arg Pro His Ile Thr Val Val Glu Gly Glu Pro
225                 230                 235                 240

Phe Tyr Leu Lys His Cys Ser Cys Ser Leu Ala His Glu Ile Glu Thr
                245                 250                 255

Thr Thr Lys Ser Trp Tyr Lys Ser Ser Gly Ser Gln Glu His Val Glu
            260                 265                 270

Leu Asn Pro Arg Ser Ser Ser Arg Ile Ala Leu His Asp Cys Val Leu
        275                 280                 285

Glu Phe Trp Pro Val Glu Leu Asn Asp Thr Gly Ser Tyr Phe Phe Gln
    290                 295                 300

Met Lys Asn Tyr Thr Gln Lys Trp Lys Leu Asn Val Ile Arg Arg Asn
305                 310                 315                 320

Lys His Ser Cys Phe Thr Glu Arg Gln Val Thr Ser Lys Ile Val Glu
                325                 330                 335

Val Lys Lys Phe Phe Gln Ile Thr Cys Glu Asn Ser Tyr Tyr Gln Thr
            340                 345                 350

Leu Val Asn Ser Thr Ser Leu Tyr Lys Asn Cys Lys Lys Leu Leu Leu
        355                 360                 365

Glu Asn Asn Lys Asn Pro Thr Ile Lys Lys Asn Ala Glu Phe Glu Asp
    370                 375                 380
```

```
Gln Gly Tyr Tyr Ser Cys Val His Phe Leu His His Asn Gly Lys Leu
385                 390                 395                 400

Phe Asn Ile Thr Lys Thr Phe Asn Ile Thr Ile Val Glu Asp Arg Ser
                405                 410                 415

Asn Ile Val Pro Val Leu Leu Gly Pro Lys Leu Asn His Val Ala Val
            420                 425                 430

Glu Leu Gly Lys Asn Val Arg Leu Asn Cys Ser Ala Leu Leu Asn Glu
        435                 440                 445

Glu Asp Val Ile Tyr Trp Met Phe Gly Glu Glu Asn Gly Ser Asp Pro
    450                 455                 460

Asn Ile His Glu Glu Lys Glu Met Arg Ile Met Thr Pro Glu Gly Lys
465                 470                 475                 480

Trp His Ala Ser Lys Val Leu Arg Ile Glu Asn Ile Gly Glu Ser Asn
                485                 490                 495

Leu Asn Val Leu Tyr Asn Cys Thr Val Ala Ser Thr Gly Gly Thr Asp
            500                 505                 510

Thr Lys Ser Phe Ile Leu Val Arg Lys Ala Asp Met Ala Asp Ile Pro
        515                 520                 525

Gly His Val Phe Thr Arg Gly Met Ile Ile Ala Val Leu Ile Leu Val
    530                 535                 540

Ala Val Val Cys Leu Val Thr Val Cys Val Ile Tyr Arg Val Asp Leu
545                 550                 555                 560

Val Leu Phe Tyr Arg His Leu Thr Arg Arg Asp Glu Thr Leu Thr Asp
                565                 570                 575

Gly Lys Thr Tyr Asp Ala Phe Val Ser Tyr Leu Lys Glu Cys Arg Pro
            580                 585                 590

Glu Asn Gly Glu Glu His Thr Phe Ala Val Glu Ile Leu Pro Arg Val
        595                 600                 605

Leu Glu Lys His Phe Gly Tyr Lys Leu Cys Ile Phe Glu Arg Asp Val
    610                 615                 620

Val Pro Gly Gly Ala Val Val Asp Glu Ile His Ser Leu Ile Glu Lys
625                 630                 635                 640

Ser Arg Arg Leu Ile Ile Val Leu Ser Lys Ser Tyr Met Ser Asn Glu
                645                 650                 655

Val Arg Tyr Glu Leu Glu Ser Gly Leu His Glu Ala Leu Val Glu Arg
            660                 665                 670

Lys Ile Lys Ile Ile Leu Ile Glu Phe Thr Pro Val Thr Asp Phe Thr
        675                 680                 685

Phe Leu Pro Gln Ser Leu Lys Leu Leu Lys Ser His Arg Val Leu Lys
    690                 695                 700

Trp Lys Ala Asp Lys Ser Leu Ser Tyr Asn Ser Arg Phe Trp Lys Asn
705                 710                 715                 720

Leu Leu Tyr Leu Met Pro Ala Lys Thr Val Lys Pro Gly Arg Asp Glu
                725                 730                 735

Pro Glu Val Leu Pro Val Leu Ser Glu Ser
            740                 745
```

<210> SEQ ID NO 42
<211> LENGTH: 164
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 42

```
Met Lys Trp Lys Ala Leu Phe Thr Ala Ala Ile Leu Gln Ala Gln Leu
1               5                   10                  15

Pro Ile Thr Glu Ala Gln Ser Phe Gly Leu Leu Asp Pro Lys Leu Cys
            20                  25                  30

Tyr Leu Leu Asp Gly Ile Leu Phe Ile Tyr Gly Val Ile Leu Thr Ala
        35                  40                  45

Leu Phe Leu Arg Val Lys Phe Ser Arg Ser Ala Asp Ala Pro Ala Tyr
    50                  55                  60

Gln Gln Gly Gln Asn Gln Leu Tyr Asn Glu Leu Asn Leu Gly Arg Arg
65                  70                  75                  80

Glu Glu Tyr Asp Val Leu Asp Lys Arg Arg Gly Arg Asp Pro Glu Met
                85                  90                  95

Gly Gly Lys Pro Gln Arg Arg Lys Asn Pro Gln Glu Gly Leu Tyr Asn
            100                 105                 110

Glu Leu Gln Lys Asp Lys Met Ala Glu Ala Tyr Ser Glu Ile Gly Met
        115                 120                 125

Lys Gly Glu Arg Arg Arg Gly Lys Gly His Asp Gly Leu Tyr Gln Gly
    130                 135                 140

Leu Ser Thr Ala Thr Lys Asp Thr Tyr Asp Ala Leu His Met Gln Ala
145                 150                 155                 160

Leu Pro Pro Arg
```

<210> SEQ ID NO 43
<211> LENGTH: 113
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 43

```
Leu Arg Val Lys Phe Ser Arg Ser Ala Asp Ala Pro Ala Tyr Gln Gln
1               5                   10                  15

Gly Gln Asn Gln Leu Tyr Asn Glu Leu Asn Leu Gly Arg Arg Glu Glu
            20                  25                  30

Tyr Asp Val Leu Asp Lys Arg Arg Gly Arg Asp Pro Glu Met Gly Gly
        35                  40                  45

Lys Pro Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
            100                 105                 110

Arg
```

<210> SEQ ID NO 44
<211> LENGTH: 339
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 44

```
ctgagagtga agttcagcag gagcgcagac gcccccgcgt accagcaggg ccagaaccag     60

ctctataacg agctcaatct aggacgaaga gaggagtacg atgttttgga caagagacgt    120

ggccgggacc ctgagatggg gggaaagccg agaaggaaga accctcagga aggcctgtac    180

aatgaactgc agaaagataa gatggcggag gcctacagtg agattgggat gaaaggcgag    240

cgccggaggg gcaaggggca cgatggcctt taccagggtc tcagtacagc caccaaggac    300

acctacgacg cccttcacat gcaggccctg ccccctcgc                           339
```

```
<210> SEQ ID NO 45
<211> LENGTH: 1824
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 45

atggcatgcc ctggcttcct gtgggcactt gtgatctcca cctgtcttga atttagcatg     60

gctcagacag tcactcagtc tcaaccagag atgtctgtgc aggaggcaga gaccgtgacc    120

ctgagctgca catatgacac cagtgagagt gattattatt tattctggta caagcagcct    180

cccagcaggc agatgattct cgttattcgc caagaagctt ataagcaaca gaatgcaaca    240

gagaatcgtt tctctgtgaa cttccagaaa gcagccaaat ccttcagtct caagatctca    300

gactcacagc tgggggatgc cgcgatgtat ttctgtgctc tccggagctc aggaacctac    360

aaatacatct ttggaacagg caccaggctg aaggttttag caaatatcca gaaccctgaa    420

cctgctgtgt accagttaaa agatcctcgg tctcaggaca gcaccctctg cctgttcacc    480

gactttgact cccaaatcaa tgtgccgaaa accatggaat ctggaacgtt catcactgac    540

aaaactgtgc tggacatgaa agctatggat tccaagagca atggggccat tgcctggagc    600

aaccagacaa gcttcacctg ccaagatatc ttcaaagaga ccaacgccac ctaccccagt    660

tcagacgttc cctgtgatgc cacgttgact gagaaaagct ttgaaacaga tatgaaccta    720

aactttcaaa acctgtcagt tatgggactc cgaatcctcc tgctgaaagt agccggattt    780

aacctgctca tgacgctgag gctgtggtcc agtcgggcca agcggtccgg atccggagcc    840

accaacttca gcctgctgaa gcaggccggc gacgtggagg agaaccccgg ccccatgggc    900

accaggctcc tcttctgggt ggccttctgt ctcctggggg cagatcacac aggagctgga    960

gtctcccagt cccccagtaa caaggtcaca gagaagggaa aggatgtaga gctcaggtgt   1020

gatccaattt caggtcatac tgccctttac tggtaccgac agagcctggg gcagggcctg   1080

gagtttttaa tttacttcca aggcaacagt gcaccagaca aatcagggct gcccagtgat   1140

cgcttctctg cagagaggac tgggggatcc gtctccactc tgacgatcca gcgcacacag   1200

caggaggact cggccgtgta tctctgtgcc agcatccgga cagggccttt tttctctgga   1260

aacaccatat attttggaga gggaagttgg ctcactgttg tagaggacct gagaaacgtg   1320

accccaccca aggtctcctt gtttgagcca tcaaaagcag agattgcaaa caaacaaaag   1380

gctaccctcg tgtgcttggc caggggcttc ttccctgacc acgtggagct gagctggtgg   1440

gtgaatggca aggaggtcca cagtggggtc agcacggacc ctcaggccta caaggagagc   1500

aattatagct actgcctgag cagccgcctg agggtctctg ctaccttctg gcacaatcct   1560

cgaaaccact tccgctgcca agtgcagttc catgggcttt cagaggagga caagtggcca   1620

gagggctcac ccaaacctgt cacacagaac atcagtgcag aggcctgggg ccgagcagac   1680
```

```
tgtggaatca cttcagcatc ctatcatcag ggggttctgt ctgcaaccat cctctatgag   1740

atcctactgg ggaaggccac cctatatgct gtgctggtca gtggcctggt gctgatggct   1800

atggtcaaaa gaaagaactc atga                                          1824


<210> SEQ ID NO 46
<211> LENGTH: 607
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 46

Met Ala Cys Pro Gly Phe Leu Trp Ala Leu Val Ile Ser Thr Cys Leu
1               5                   10                  15

Glu Phe Ser Met Ala Gln Thr Val Thr Gln Ser Gln Pro Glu Met Ser
            20                  25                  30

Val Gln Glu Ala Glu Thr Val Thr Leu Ser Cys Thr Tyr Asp Thr Ser
        35                  40                  45

Glu Ser Asp Tyr Tyr Leu Phe Trp Tyr Lys Gln Pro Pro Ser Arg Gln
    50                  55                  60

Met Ile Leu Val Ile Arg Gln Glu Ala Tyr Lys Gln Gln Asn Ala Thr
65                  70                  75                  80

Glu Asn Arg Phe Ser Val Asn Phe Gln Lys Ala Ala Lys Ser Phe Ser
                85                  90                  95

Leu Lys Ile Ser Asp Ser Gln Leu Gly Asp Ala Ala Met Tyr Phe Cys
            100                 105                 110

Ala Leu Arg Ser Ser Gly Thr Tyr Lys Tyr Ile Phe Gly Thr Gly Thr
        115                 120                 125

Arg Leu Lys Val Leu Ala Asn Ile Gln Asn Pro Glu Pro Ala Val Tyr
    130                 135                 140

Gln Leu Lys Asp Pro Arg Ser Gln Asp Ser Thr Leu Cys Leu Phe Thr
145                 150                 155                 160

Asp Phe Asp Ser Gln Ile Asn Val Pro Lys Thr Met Glu Ser Gly Thr
                165                 170                 175

Phe Ile Thr Asp Lys Thr Val Leu Asp Met Lys Ala Met Asp Ser Lys
            180                 185                 190

Ser Asn Gly Ala Ile Ala Trp Ser Asn Gln Thr Ser Phe Thr Cys Gln
        195                 200                 205

Asp Ile Phe Lys Glu Thr Asn Ala Thr Tyr Pro Ser Ser Asp Val Pro
    210                 215                 220

Cys Asp Ala Thr Leu Thr Glu Lys Ser Phe Glu Thr Asp Met Asn Leu
225                 230                 235                 240

Asn Phe Gln Asn Leu Ser Val Met Gly Leu Arg Ile Leu Leu Leu Lys
                245                 250                 255

Val Ala Gly Phe Asn Leu Leu Met Thr Leu Arg Leu Trp Ser Ser Arg
            260                 265                 270

Ala Lys Arg Ser Gly Ser Gly Ala Thr Asn Phe Ser Leu Leu Lys Gln
        275                 280                 285

Ala Gly Asp Val Glu Glu Asn Pro Gly Pro Met Gly Thr Arg Leu Leu
    290                 295                 300
```

```
Phe Trp Val Ala Phe Cys Leu Leu Gly Ala Asp His Thr Gly Ala Gly
305                 310                 315                 320

Val Ser Gln Ser Pro Ser Asn Lys Val Thr Glu Lys Gly Lys Asp Val
                325                 330                 335

Glu Leu Arg Cys Asp Pro Ile Ser Gly His Thr Ala Leu Tyr Trp Tyr
            340                 345                 350

Arg Gln Ser Leu Gly Gln Gly Leu Glu Phe Leu Ile Tyr Phe Gln Gly
        355                 360                 365

Asn Ser Ala Pro Asp Lys Ser Gly Leu Pro Ser Asp Arg Phe Ser Ala
    370                 375                 380

Glu Arg Thr Gly Gly Ser Val Ser Thr Leu Thr Ile Gln Arg Thr Gln
385                 390                 395                 400

Gln Glu Asp Ser Ala Val Tyr Leu Cys Ala Ser Ile Arg Thr Gly Pro
                405                 410                 415

Phe Phe Ser Gly Asn Thr Ile Tyr Phe Gly Glu Gly Ser Trp Leu Thr
            420                 425                 430

Val Val Glu Asp Leu Arg Asn Val Thr Pro Pro Lys Val Ser Leu Phe
        435                 440                 445

Glu Pro Ser Lys Ala Glu Ile Ala Asn Lys Gln Lys Ala Thr Leu Val
    450                 455                 460

Cys Leu Ala Arg Gly Phe Phe Pro Asp His Val Glu Leu Ser Trp Trp
465                 470                 475                 480

Val Asn Gly Lys Glu Val His Ser Gly Val Ser Thr Asp Pro Gln Ala
                485                 490                 495

Tyr Lys Glu Ser Asn Tyr Ser Tyr Cys Leu Ser Ser Arg Leu Arg Val
            500                 505                 510

Ser Ala Thr Phe Trp His Asn Pro Arg Asn His Phe Arg Cys Gln Val
        515                 520                 525

Gln Phe His Gly Leu Ser Glu Glu Asp Lys Trp Pro Glu Gly Ser Pro
    530                 535                 540

Lys Pro Val Thr Gln Asn Ile Ser Ala Glu Ala Trp Gly Arg Ala Asp
545                 550                 555                 560

Cys Gly Ile Thr Ser Ala Ser Tyr His Gln Gly Val Leu Ser Ala Thr
                565                 570                 575

Ile Leu Tyr Glu Ile Leu Leu Gly Lys Ala Thr Leu Tyr Ala Val Leu
            580                 585                 590

Val Ser Gly Leu Val Leu Met Ala Met Val Lys Arg Lys Asn Ser
        595                 600                 605


<210> SEQ ID NO 47
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: See specification as filed for detailed
      description of substitutions and preferred embodiments

<400> SEQUENCE: 47

Gly Gly Gly Gly Ser
1               5
```

IMMUNE CELL FUNCTION

CROSS-REFERENCE TO RELATED APPLICATIONS

This application claims priority to U.S. Provisional Application No. 63/066,039, filed Aug. 14, 2020 which is hereby incorporated herein by reference in its entirety for all purposes.

STATEMENT REGARDING SEQUENCE LISTING

The Sequence Listing associated with this application is provided in text format in lieu of paper copy, and is hereby incorporated by reference into the specification. The name of the text file containing the Sequence Listing is K-1079-US-NP_SL.txt. The text file is 146,635 bytes, was created on Oct. 27, 2021, and is being submitted electronically via EFS-Web, concurrent with the filing of this specification.

TECHNICAL FIELD

The present disclosure relates to the fields of immunology and cell therapy, and more specifically, to improving T cell and Natural Killer (NK) cell based immunotherapies comprising CAR and/or TCR by modulating cytokine signaling.

BACKGROUND

The immune system provides an innate defense against cancer through its ability to search, seek and destroy malignant cells throughout the body. However, a caveat to this defense mechanism is that certain cancers may induce an immunosuppressive microenvironment that reduces the robustness of an antitumor immune response. (Beatty et al., *Clin Cancer Res*, (21) (4): 687-632 (2015)). These immune escape mechanisms present challenges for the implementation and effectiveness of cellular immunotherapies, including the use of engineered cell therapy technologies such as chimeric antigen receptor (CAR) T cell therapy and T cell receptor (TCR) T cell therapy and/or Natural Killer cell based immunotherapy.

Since overall T cell function and proliferation are dependent on cytokine signaling, it is theorized that the use of cytokines may improve the overall quality and potency of T cell based therapies. Past studies have demonstrated the successful use of IL-2 as a means of T-cell based therapy expansion, although drawbacks included both T-cell exhaustion and diminished T-cell persistence. (Gattinoni et al., *J Clin Invest*, (115): 1616-1626 (2005)). Other studies show an improved potency of CAR-T cells with the use of IL-7 and IL-15 together (Xu et al., *Blood*, (123): 3750-3759 (2014). CAR-T potency was also reported to improve with the use of IL-21 (Singh et al., *Cancer Res*, (71) 3516-3527 (2011)). Similarly, IL-2 has been found to enhance the cytotoxicity of NK cells (Hu et al., *Front. Immunol.*, (20) 1205 (2019)).

Accordingly, there is a need to exploit the use of cytokine signaling as a means for improving the efficacy of immune cell based immunotherapies.

SUMMARY

The present disclosure provides multiple methods and compositions for modulating the immune response through IL-18 signaling. These methods and compositions ultimately relate to immune cells, such as Natural Killer (NK) cells and T cells, comprising nucleic acids encoding cell therapy molecules comprising antigen binding domains or binding motifs (e.g., CARs or TCRs) that have increased IL-18 signaling or are administered with IL-18.

The present disclosure provides methods and uses of any of the nucleic acids, polypeptides, expression vectors, or immune cells provided herein in the modulation of IL-18 signaling in a subject. For immune cells containing a CAR or TCR, the present disclosure provides methods and uses in the treatment or prevention of cancer in a subject.

The present disclosure provides a method of treating a cancer associated with expression of a tumor antigen in a subject comprising administering to the subject an effective amount of immune cells, wherein the immune cells comprise a CAR or TCR, and a) comprise a membrane-bound IL-18; b) are co-administered with IL-18; or c) are contacted with IL-18 during expansion of the immune cells.

In one aspect of this method, the immune cells comprise a membrane-bound IL-18 which can be obtained by expression of a nucleic acid comprising a nucleotide sequence encoding a polypeptide comprising a signal peptide, interleukin-18 (IL-18) and an interleukin-18 receptor (IL-18R) subunit. In certain embodiments, the nucleic acid comprises a nucleotide sequence set forth in SEQ ID NOs: 16, 18, 20, 22, 24, 26, 28, 30, 32, 34, 36, 38 or 40.

In another aspect of this method, immune cells, such as NK cells or T cells, comprising a CAR or TCR are co-administered to the subject together with IL-18. The IL-18 may be administered simultaneously, in the same composition or in different compositions, or sequentially. In another aspect of this method, immune cells such as NK cells or T cells, comprising a CAR or TCR are further co-administered to the subject together with IL-18 and soluble IL-12 and/or soluble IL-15.

In yet another aspect of this method, immune cells are contacted with IL-18 during expansion, to produce immune cells containing a CAR or TCR. In one embodiment, the cells are expanded in the presence of IL-18 and cultured with one or more of IL-2, an AKT inhibitor, IL-7, IL-12 or IL-15.

In certain embodiments, the IL-18 is at an amount of about 0.001 to about 500 ng/ml IL-18.

In certain embodiments of any of the aspects herein, the antigen is a tumor antigen. In various embodiments of any of the aspects described herein, the tumor antigen is selected from the group consisting of 2B4 (CD244), 4-1BB, 5T4, A33 antigen, adenocarcinoma antigen, adrenoceptor beta 3 (ADRB3), A kinase anchor protein 4 (AKAP-4), alpha-fetoprotein (AFP), anaplastic lymphoma kinase (ALK), Androgen receptor, B7H3 (CD276), B2-integrins, BAFF, B-lymphoma cell, B cell maturation antigen (BCMA), bcr-abl (oncogene fusion protein consisting of breakpoint cluster region (BCR) and Abelson murine leukemia viral oncogene homolog 1 (Abl)), BhCG, bone marrow stromal cell antigen 2 (BST2), CCCTC-Binding Factor (Zinc Finger Protein)-Like (BORIS or Brother of the Regulator of Imprinted Sites), BST2, C242 antigen, 9-0-acetyl-CA19-9 marker, CA-125, CAEX, calreticulin, carbonic anhydrase 9 (CAIX), C-MET, CCR4, CCR5, CCR8, CD2, CD3, CD4, CD5, CD8, CD7, CD10, CD16, CD19, CD20, CD22, CD23 (IgE receptor), CD24, CD25, CD27, CD28, CD30 (TNFRSF8), CD33, CD34, CD38, CD40, CD40L, CD41, CD44, CD44V6, CD49f, CD51, CD52, CD56, CD63, CD70, CD72, CD74, CD79a, CD79b, CD80, CD84, CD96, CD97, CD100, CD123, CD125, CD133, CD137, CD138, CD150, CD152 (CTLA-4), CD160, CD171, CD179a, CD200, CD221, CD229, CD244, CD272 (BTLA), CD274 (PD-L1, B7H1), CD279 (PD-1), CD352, CD358, CD300 molecule-like family member f (CD300LF), Carcinoembryonic antigen (CEA), claudin 6 (CLDN6), C-type lectin-like molecule-1 (CLL-1 or CLECL1), C-type lectin domain family 12 member A (CLEC12A), a cytomegalovirus (CMV) infected cell antigen, CNT0888, CRTAM (CD355), CS-1 (also referred to as CD2 subset 1, CRACC, CD319, and 19A24), CTLA-4, Cyclin B 1, chromosome X open reading frame 61 (CXORF61), Cytochrome P450 1B 1 (CYP1B1), DNAM-1 (CD226), desmoglein 4, DR3, DR5, E-cadherin neoepitope, epidermal growth factor receptor (EGFR), EGFIR, epidermal growth factor receptor variant III (EGFRvIII), epithelial glycoprotein-2 (EGP-2), epithelial glycoprotein-40 (EGP-40), EGF-like module-containing mucin-like hormone receptor-like 2 (EMR2), elongation factor 2 mutated (ELF2M), endosialin, Epithelial cell adhesion molecule (EPCAM), ephrin type-A receptor 2 (EphA2), Ephrin B2, receptor tyrosine-protein kinases erb-B2,3,4 (erb-B2,3,4), ERBB, ERBB2 (Her2/neu), ERG (transmembrane protease, serine 2 (TMPRSS2) ETS fusion gene), ETA, ETS translocation-variant gene 6, located on chromosome 12p (ETV6-AML), Fc fragment of IgA receptor (FCAR or CD89), fibroblast activation protein alpha (FAP), FBP, Fc receptor-like 5 (FcRL5), fetal acetylcholine receptor (AChR), fibronectin extra domain-B, Fms-Like Tyrosine Kinase 3 (FLT3), folate-binding protein (FBP), folate receptor 1, folate receptor «, Folate receptor β, Fos-related antigen 1, Fucosyl, Fucosyl GM1; GM2, ganglioside G2 (GD2), ganglioside GD3 (aNeu5 Ac (2-8) aNeu5Ac (2-3) bDGalp (1-4) bDGlcp (1-1) Cer), o-acetyl-GD2 ganglioside (OAcGD2), GITR (TNFRSF 18), GM1, ganglioside GM3, hexasaccharide portion of globoH glycoceramide (GloboH), glycoprotein 75, Glypican-3 (GPC3), glycoprotein 100 (gp100), GPNMB, G protein-coupled receptor 20 (GPR20), G protein-coupled receptor class C group 5, member D (GPRC5D), Hepatitis A virus cellular receptor 1 (HAVCR1), human Epidermal Growth Factor Receptor 2 (HER-2), HER2/neu, HER3, HER4, HGF, high molecular weight-melanoma-associated antigen (HMWMAA), human papilloma virus E6 (HPV E6), human papilloma virus E7 (HPV E7), heat shock protein 70-2 mutated (mut hsp70-2), human scatter factor receptor kinase, human Telomerase reverse transcriptase (hTERT), HVEM, ICOS, insulin-like growth factor receptor 1 (IGF-1 receptor), IGF-I, IgG1, immunoglobulin lambda-like polypeptide 1 (IGLL1), IL-6, Interleukin 11 receptor alpha (IL-11Rα), IL-13, Interleukin-13 receptor subunit alpha-2 (IL-13Ra2 or CD213A2), insulin-like growth factor I receptor (IGF1-R), integrin α5β1, integrin αvβ3, intestinal carboxyl esterase, k-light chain, KCS1, kinase insert domain receptor (KDR), KIR, KIR2DL1, KIR2DL2, KIR2DL3, KIR3DL2, KIR-L, KG2D ligands, KIT (CD117), KLRGI, LAGE-1a, LAG3, lymphocyte-specific protein tyrosine kinase (LCK), Leukocyte immunoglobulin-like receptor subfamily A member 2 (LILRA2), legumain, Leukocyte-associated immunoglobulin-like receptor 1 (LAIR1), Lewis (Y) antigen, LeY, LG, LI cell adhesion molecule (LI-CAM), LIGHT, LMP2, lymphocyte antigen 6 complex, LTBR, locus K 9 (LY6K), Ly-6, lymphocyte antigen 75 (LY75), melanoma cancer testis antigen-1 (MAD-CT-1); melanoma cancer testis antigen-2 (MAD-CT-2), MAGE, Melanoma-associated antigen 1 (MAGE-A1), MAGE-A3 melanoma antigen recognized by T cells 1 (MelanA or MART1), MelanA/MART1, Mesothelin, MAGE A3, melanoma inhibitor of apoptosis (ML-IAP), melanoma-specific chondroitin-sulfate proteoglycan (MCSCP), MORAb-009, MS4A1, Mucin 1 (MUC1), MUC2, MUC3, MUC4, MUC5AC, MUC5b, MUC7, MUC16, mucin CanAg, Mullerian inhibitory substance (MIS) receptor type II, v-myc avian myelocytomatosis viral oncogene neuroblastoma derived homolog (MYCN), N-glycolylneuraminic acid, N-Acetyl glucosaminyl-transferase V (NA17), neural cell adhesion molecule (NCAM), NKG2A, NKG2C, NKG2D, NKG2E ligands, NKR-PIA, NPC-1C, NTB-A, mammary gland differentiation antigen (NY-BR-1), NY-ESO-1, oncofetal antigen (h5T4), Olfactory receptor 51E2 (OR51E2), OX40, plasma cell antigen, poly SA, proacrosin binding protein sp32 (OY-TES 1), p53, p53 mutant, pannexin 3 (PANX3), prostatic acid phosphatase (PAP), paired box protein Pax-3 (PAX3), Paired box protein Pax-5 (PAX5), prostate carcinoma tumor antigen-1 (PCTA-1 or Galectin 8), PD-1H, Platelet-derived growth factor receptor alpha (PDGFR-alpha), PDGFR-beta, PDL192, PEN-5, phosphatidylserine, placenta-specific 1 (PLAC1), Polysialic acid, Prostase, prostatic carcinoma cells, prostein, Protease Serine 21 (Testisin or PRSS21), Proteinase3 (PR1), prostate stem cell antigen (PSCA), prostate-specific membrane antigen (PSMA), Proteasome (Prosome, Macropain) Subunit, Beta Type, Receptor for Advanced Glycation Endproducts (RAGE-1), RANKL, Ras mutant, Ras Homolog Family Member C (RhoC), RON, Receptor tyrosine kinase-like orphan receptor 1 (ROR1), renal ubiquitous 1 (RU1), renal ubiquitous 2 (RU2), sarcoma translocation breakpoints, Squamous Cell Carcinoma Antigen Recognized By T Cells 3 (SART3), SAS, SDC1, SLAMF7, sialyl Lewis adhesion molecule (sLe), Siglec-3, Siglec-7, Siglec-9, sonic hedgehog (SHH), sperm protein 17 (SPA17), Stage-specific embryonic antigen-4 (SSEA-4), STEAP, sTn antigen, synovial sarcoma X breakpoint 2 (SSX2), Survivin, Tumor-associated glycoprotein 72 (TAG72), TCR5γ, TCRα, TCRβ, TCRγ Alternate Reading Frame Protein (TARP), telomerase, TIGIT, TNF-α precursor, tumor endothelial marker 1 (TEM1/CD248), tumor endothelial marker 7-related (TEM7R), tenascin C, TGF-β1, TGF-β2, transglutaminase 5 (TGS5), angiopoietin-binding cell surface receptor 2 (Tie 2), TIM1, TIM2, TIM3, Tn Ag, TRAIL-R1, TRAIL-R2, Tyrosinase-related protein 2 (TRP-2), thyroid stimulating hormone receptor (TSHR), tumor antigen CTAA16.88, Tyrosinase, uroplakin 2 (UPK2), VEGF-A, VEGFR-1, vascular endothelial growth factor receptor 2 (VEGFR2), and vimentin, Wilms tumor protein (WT1), or X Antigen Family Member 1A (XAGE1).

The present disclosure further provides nucleic acids comprising a nucleotide sequence encoding a polypeptide comprising a signal peptide, interleukin-18 (IL-18) and an interleukin-18 receptor (IL-18R) subunit. In certain embodiments, the IL-18 comprises an amino acid sequence that is at least 80% identical to amino acid residues 37 to 193 of SEQ ID NO: 2. In another embodiment the IL-18R subunit comprises an amino acid sequence that is at least 80% identical to amino acid residues 21-540 of SEQ ID NO: 6 or an amino acid sequence that is at least 80% identical to amino acid residues 20 to 599 of SEQ ID NO: 8. In certain embodiments, the polypeptide comprises an amino acid linker connecting IL-18 and the IL-18R subunit which may comprise a Myc linker sequence, a Whitlow linker sequence, $(GGGGS)_n$ (SEQ ID NO: 9) wherein n is 1-6, or any combination thereof. In certain embodiments, the signal sequence is selected from the group consisting of IL-18 signal sequence, IL-15 long signal sequence, and CD8 signal sequence.

In certain embodiments, the polypeptide comprises an amino acid sequence selected from SEQ ID NOs: 19, 21, 23, 25, 27, 29, 31, 33, 35, 37, 39 and 41. In certain embodiments, the polypeptide further comprises an immunoreceptor tyrosine-based activation motif (ITAM).

The present disclosure also provides polypeptides encoded by any of the nucleic acids described herein, expression vectors comprising any of the nucleic acids described herein, and immune cells comprising T cells or NK cells, the immune cells further comprising the nucleic acids, polypeptides and/or expression vectors as described herein. In certain embodiments, the immune cells further comprise a nucleic acid sequence encoding a chimeric antigen receptor (CAR) or T-cell receptor (TCR), which may bind specifically to a tumor antigen.

DETAILED DESCRIPTION

The present disclosure provides multiple means for overcoming the tumor microenvironment (TME) through modulating IL-18 signaling, particularly in the context of cell therapy. The present disclosure is based, at least in part, on the discovery that increased IL-18 signaling enhances proliferation and/or cytokine production of immune cells containing a CAR or a TCR. In particular, the co-expression of a TCR and a membrane-bound IL-18 polypeptide in a $TCR^+$ T cell, co-administration of $TCR^+$ T cells and IL-18, and contacting a T cell with IL-18 during activation, transduction, and expansion to produce a $TCR^+$ T cell, were all observed to increase proliferation and cytokine secretion of $TCR^+$ T cells. This common mechanism of increased IL-18 signaling may provide an option of foregoing some or all ancillary treatments such as prior conditioning of the host with total body irradiation, high-dose chemotherapy, and/or post-infusion cytokine support. Immune cells, such as T cells or NK cells, containing a CAR or TCR, as prepared as described herein or administered as described herein, may be capable of modulating the TME.

Without being bound by any theory, it is believed that modulation of IL-18 function can enable cell therapy products to overcome the hostile TME. Such strategies for modulating IL-18 function include: (1) co-expression of IL-18 in the form of a membrane-bound IL-18, (2) co-administration of IL-18 with an immune cell containing a CAR or TCR, and (3) contacting of immune cells in the presence of IL-18 during one or more phases, e.g., expansion, for the production of the immune cells containing a cell therapy product. The goal of these strategies is a potent and durable, anti-tumor response.

The compositions and methods described herein are believed to improve NK cell and T cell attributes including final product persistence, functionality, and/or phenotype of cells for cell therapy. In certain embodiments, these attributes may include improved T cell proliferation, delayed or inhibited T cell maturation or differentiation (e.g., phenotypically less differentiated immune cells), an increased population of stem cell like CD8+/CD4+ T cells, extended/improved in vivo persistence, improved cytotoxicity or ability to kills target cells, and/or improved cytokine/chemokine secretion. In certain embodiments, these attributes may include improved NK proliferation, delayed or inhibited NK cell maturation or differentiation (e.g., phenotypically less differentiated immune cells), extended/improved in vivo persistence, improved cytotoxicity or ability to kills target cells, and/or improved cytokine/chemokine secretion.

Any aspect or embodiment described herein may be combined with any other aspect or embodiment as disclosed herein. While the present disclosure has been described in conjunction with the detailed description thereof, the foregoing description is intended to illustrate and not limit the scope of the present disclosure, which is defined by the scope of the appended claims. Other aspects, advantages, and modifications are within the scope of the following claims. The patent and scientific literature referred to herein establishes the knowledge that is available to those with skill in the art. All United States patents and published or unpublished United States patent applications cited herein are incorporated by reference. All published foreign patents and patent applications cited herein are hereby incorporated by reference. All other published references, dictionaries, documents, manuscripts and scientific literature cited herein are hereby incorporated by reference. Other features and advantages of the disclosure will be apparent from the following Detailed Description, comprising the Examples, and the claims.

Definitions

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein may be used in practice or testing of the present disclosure. All publications, patent applications, patents and other references mentioned herein are incorporated by reference in their entirety. The materials, methods, and examples disclosed herein are illustrative only and not intended to be limiting.

The articles "a," "an," and "the" refer to one or to more than one (i.e., to at least one) of the grammatical object of the article. By way of example, "an element" can mean one element or more than one element.

Unless specifically stated or obvious from context, as used herein, the term "or" is understood to be inclusive and covers both "or" and "and".

The term "and/or" refer to each of the two specified features or components with or without the other. Thus, the term "and/or" as used in a phrase such as "A and/or B" herein is intended to include "A and B," "A or B," "A" (alone), and "B" (alone). Similarly, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

The terms "e.g.," and "i.e." are used merely by way of example, without limitation intended, and not to be construed as referring to only those items explicitly enumerated in the specification.

The terms "or more", "at least", "more than", and the like, e.g., "at least one" include but are not be limited to at least 1, 2, 3, 4, 5, 6, 7, 8, 9, 10, 11, 12, 13, 14, 15, 16, 17, 18, 1920, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more than the stated value. Also included is any greater number or fraction in between.

Conversely, the term "no more than" includes each value less than the stated value. For example, "no more than 100 nucleotides" includes 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, and 0 nucleotides. Also included is any lesser number or fraction in between.

The terms "plurality", "at least two", "two or more", "at least second", and the like include but not limited to at least 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more. Also included is any greater number or fraction in between.

Throughout the specification the word "comprising," or variations such as "comprises" or "comprising," is understood to imply the inclusion of a stated element, integer or step, or group of elements, integers or steps, but not the exclusion of any other element, integer or step, or group of elements, integers or steps. It is understood that wherever aspects are described herein with the language "comprising," otherwise analogous aspects described in terms of "consisting of" and/or "consisting essentially of" are also provided.

Unless specifically stated or evident from context, as used herein, the term "about" refers to a value or composition that is within an acceptable error range for the particular value or composition as determined by one of ordinary skill in the art, which will depend in part on how the value or composition is measured or determined, i.e., the limitations of the measurement system. For example, "about" or "approximately" may mean within one or more than one standard deviation per the practice in the art. "About" or "approximately" may mean a range of up to 10% (i.e., ±10%). Thus, "about" may be understood to be within 10%, 9%, 8%, 7%, 6%, 5%, 4%, 3%, 2%, 1%, 0.5%, 0.1%, 0.05%, 0.01%, or 0.001% greater or less than the stated value. For example, about 5 mg may include any amount between 4.5 mg and 5.5 mg. Furthermore, particularly with respect to biological systems or processes, the terms may mean up to an order of magnitude or up to 5-fold of a value. When particular values or compositions are provided in the instant disclosure, unless otherwise stated, the meaning of "about" or "approximately" should be assumed to be within an acceptable error range for that particular value or composition.

As described herein, any concentration range, percentage range, ratio range or integer range is to be understood to be inclusive of the value of any integer within the recited range and, when appropriate, fractions thereof (such as one-tenth and one-hundredth of an integer), unless otherwise indicated.

Units, prefixes, and symbols used herein are provided using their Systeme International de Unites (SI) accepted form. Numeric ranges are inclusive of the numbers defining the range.

"Administering" refers to the physical introduction of an agent to a subject, using any of the various methods and delivery systems known to those skilled in the art. Exemplary routes of administration for the formulations disclosed herein include intravenous, intramuscular, subcutaneous, intraperitoneal, spinal or other parenteral routes of administration, for example by injection or infusion. The phrase "parenteral administration" means modes of administration other than enteral and topical administration, usually by injection, and includes, without limitation, intravenous, intramuscular, intraarterial, intrathecal, intralymphatic, intralesional, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion, as well as in vivo electroporation. In some embodiments, the formulation is administered via a non-parenteral route, e.g., orally. Other non-parenteral routes include a topical, epidermal or mucosal route of administration, for example, intranasally, vaginally, rectally, sublingually or topically. Administering can also be performed, for example, once, a plurality of times, and/or over one or more extended periods.

The terms "AKT inhibitor," "AKTI," or "AKTi" can be used interchangeably and refers to any molecule (e.g., AKT antagonist), including, but not limited to a small molecule, a polynucleotide (e.g., DNA or RNA), or a polypeptide (e.g., an antibody or an antigen-binding portion thereof), capable of blocking, reducing, or inhibiting the activity of AKT. AKT is a serine/threonine kinase, also known as protein kinase B or PKB. An AKT inhibitor can act directly on AKT, e.g., by binding AKT, or it can act indirectly, e.g., by interfering with the interaction between AKT and a binding partner or by inhibiting the activity of another member of the PI3K-AKT-mTOR pathway. Nonlimiting examples of AKTi are shown in International Patent Application Publication No. WO17/070395. In certain embodiments, the AKT inhibitor is a compound selected from the group consisting of: (i) 3-[1-[[4-(7-phenyl-3H-imidazo[4, 5g]quinoxalin-6-yl)phenyl]methyl]piperidin-4-yl]-1H-benzimidazol-2-one; (ii) N,N dimethyl-1-[4-(6-phenyl-1H-imidazo[4,5-g]quinoxalin-7-yl)phenyl]metha-namine; and (iii) I-(I-[4-(3-phenylbenzo[g]quinoxalin-2-yl)benzyl]piperidin-4-yl)-1,3-dihydro-2H benzimidazol-2-one; A6730, B2311, 124018, GSK2110183 (afuresertib), Perifosine (KRX-0401), GDC-0068 (ipatasertib), RX-0201, VQD-002, LY294002, A-443654, A-674563, Akti-1, Akti-2, Akti-1/2, AR-42, API-59CJ-OMe, ATI-13148, AZD-5363, erucylphosphocholine, GSK-2141795 (GSK795), KP372-1, L-418, L-71-101, PBI-05204, PIA5, PX-316, SR13668, triciribine, GSK 690693 (CAS #937174-76-0), FPA 124 (CAS #902779-59-3), Miltefosine, PHT-427 (CAS #1 191951-57-1), 10-DEBC hydrochloride, Akt inhibitor III, Akt inhibitor VIII, MK-2206 dihydrochloride (CAS #1032350-13-2), SC79, AT7867 (CAS #857531-00-1), CCT128930 (CAS #885499-61-6), A-674563 (CAS #552325-73-2), AGL 2263, AS-041 164 (5-benzo[1,3]dioxol-5-ylmethylene-thiazolidine-2,4-dione), BML-257 (CAS #32387-96-5), XL-418, CAS #612847-09-3, CAS #98510-80-6, H-89 (CAS #127243-85-0), OXY-111A, 3-[1-[[4-(7-phenyl-3H-imidazo[4,5-g]quinoxalin-6-yl)phenyl]methyl]piperidin-4-yl]-1H-benzimidazol-2-one, N,N-dimethyl-1-[4-(6-phenyl-1H-imidazo[4,5-g]quinoxalin-7-yl)phenyl]metha-namine, 1-{1-[4-(3-phenylbenzo[g]quinoxalin-2-yl)benzyl]piperidin-4-yl}-1,3-dihydro-2H-benzimidazol-2-one and any combination thereof.

The term "amount" refers to "an amount effective" or "therapeutically effective amount," "effective dose," "effective amount" of an agent, such as a genetically modified therapeutic cell, e.g., T cell or NK cell, is any amount that achieves a beneficial or desired prophylactic or therapeutic result, including clinical results. A "therapeutically effective amount" of a genetically modified therapeutic cell may vary according to factors such as the disease state, age, sex, and weight of the individual, and the ability of the T cells or NK cells to elicit a desired response in the individual. A therapeutically effective amount is also one in which any toxic or detrimental effects of the virus or transduced therapeutic cells are outweighed by the therapeutically beneficial effects. The term "therapeutically effective amount" includes an amount that is effective to "treat" a subject (e.g., a patient). When a therapeutic amount is indicated, the precise amount of the compositions of the present disclosure to be administered may be determined by a physician with consideration of individual differences in age, weight, tumor size, extent of infection or metastasis, and condition of the patient (subject).

The term "antibody" (Ab) includes, without limitation, a glycoprotein immunoglobulin which binds specifically to an antigen. In general, an antibody may comprise at least two heavy (H) chains and two light (L) chains interconnected by disulfide bonds, or an antigen-binding molecule thereof. Each H chain comprises a heavy chain variable region (abbreviated herein as VH) and a heavy chain constant region. The heavy chain constant region comprises three constant domains, CH1, CH2 and CH3. Each light chain comprises a light chain variable region (abbreviated herein as VL) and a light chain constant region. The light chain constant region is comprises one constant domain, CL. The VH and VL regions may be further subdivided into regions of hypervariability, termed complementarity determining regions (CDRs), interspersed with regions that are more conserved, termed framework regions (FR). Each VH and VL comprises three CDRs and four FRs, arranged from amino-terminus to carboxy-terminus in the following order: FR1, CDR1, FR2, CDR2, FR3, CDR3, and FR4. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (C1q) of the classical complement system. In general, human antibodies are approximately 150 kD tetrameric agents composed of two identical heavy (H) chain polypeptides (about 50 kD each) and two identical light (L) chain polypeptides (about 25 kD each) that associate with each other into what is commonly referred to as a "Y-shaped" structure. The heavy and light chains are linked or connected to one another by a single disulfide bond; two other disulfide bonds connect the heavy chain hinge regions to one another, so that the dimers are connected to one another and the tetramer is formed. Naturally-produced antibodies are also glycosylated, e.g., on the CH2 domain.

The term "human antibody" is intended to comprise antibodies having variable and constant domain sequences generated, assembled, or derived from human immunoglobulin sequences, or sequences indistinguishable therefrom. In some embodiments, antibodies (or antibody components) may be considered to be "human" even though their amino acid sequences comprise residues or elements not encoded by human germline immunoglobulin sequences (e.g., variations introduced by in vitro random or site-specific mutagenesis or introduced by in vivo somatic mutation). The term "humanized" is intended to comprise antibodies having a variable domain with a sequence derived from a variable domain of a non-human species (e.g., a mouse), modified to be more similar to a human germline encoded sequence. In some embodiments, a "humanized" antibody comprises one or more framework domains having substantially the amino acid sequence of a human framework domain, and one or more complementary determining regions having substantially the amino acid sequence as that of a non-human antibody. In some embodiments, a humanized antibody comprises at least a portion of an immunoglobulin constant region (Fc), generally that of a human immunoglobulin constant domain. In some embodiments, a humanized antibodies may comprise a $C_H1$, hinge, $C_H2$, $C_H3$, and, optionally, a $C_H4$ region of a human heavy chain constant domain.

Antibodies can include, for example, monoclonal antibodies, recombinantly produced antibodies, monospecific antibodies, multispecific antibodies (including bispecific antibodies), human antibodies, engineered antibodies, humanized antibodies, chimeric antibodies, immunoglobulins, synthetic antibodies, tetrameric antibodies comprising two heavy chain and two light chain molecules, an antibody light chain monomer, an antibody heavy chain monomer, an antibody light chain dimer, an antibody heavy chain dimer, an antibody light chain-antibody heavy chain pair, intrabodies, antibody fusions (sometimes referred to herein as "antibody conjugates"), heteroconjugate antibodies, single domain antibodies, monovalent antibodies, single chain antibodies or single-chain Fvs (scFv), camelized antibodies, affybodies, Fab fragments, $F(ab')_2$ fragments, disulfide-linked Fvs (sdFv), anti-idiotypic (anti-Id) antibodies (including, e.g., anti-anti-Id antibodies), minibodies, domain antibodies, synthetic antibodies (sometimes referred to herein as "antibody mimetics"), and antigen binding fragments of any of the above. In certain embodiments, antibodies described herein refer to polyclonal antibody populations. Antibodies may also comprise, for example, Fab' fragments, Fd' fragments, Fd fragments, isolated CDRs, single chain Fvs, polypeptide-Fc fusions, single domain antibodies (e.g., shark single domain antibodies such as IgNAR or fragments thereof), camelid antibodies, single chain or Tandem diabodies (TandAb®), Anticalins®, Nanobodies® minibodies, BiTE® s, ankyrin repeat proteins or DARPINs®, Avimers®, DARTs, TCR-like antibodies, Adnectins®, Affilins®, Transbodies®, Affibodies®, TrimerX®, MicroProteins, Fynomers®, Centyrins®, and KALBITOR® s.

A "monoclonal antibody" is an antibody produced by a single clone of B lymphocytes or by a cell into which the light and heavy chain genes of a single antibody have been transfected. Monoclonal antibodies are produced by methods known to those of skill in the art, for instance by making hybrid antibody-forming cells from a fusion of myeloma cells with immune spleen cells. Monoclonal antibodies include humanized monoclonal antibodies.

A "chimeric antibody" has framework residues from one species, such as human, and CDRs (which generally confer antigen binding) from another species, such as a mouse. In some embodiments, a CAR contemplated herein comprises an antigen-specific binding domain that is a chimeric antibody or antigen binding fragment thereof.

An immunoglobulin may derive from any of the commonly known isotypes, including but not limited to IgA, secretory IgA, IgG, IgE and IgM. IgG subclasses are also well known to those in the art and include but are not limited to human IgG1, IgG2, IgG3 and IgG4. "Isotype" refers to the Ab class or subclass (e.g., IgM or IgG1) that is encoded by the heavy chain constant region genes. The term "antibody" includes, by way of example, both naturally occurring and non-naturally occurring Abs; monoclonal and polyclonal Abs; chimeric and humanized Abs; human or non-human Abs; wholly synthetic Abs; and single chain Abs. A nonhuman Ab may be humanized by recombinant methods to reduce its immunogenicity in man. Where not expressly stated, and unless the context indicates otherwise, the term "antibody" also includes an antigen binding fragment or an antigen-binding portion of any of the aforementioned immunoglobulins, and includes a monovalent and a divalent fragment or portion, and a single chain Ab.

An "antigen binding molecule," "antigen binding portion," or "antibody fragment" refers to any molecule that comprises the antigen binding parts (e.g., CDRs) of the antibody from which the molecule is derived. An antigen binding molecule can include the antigenic complementarity determining regions (CDRs). Examples of antibody fragments include, but are not limited to, Fab, Fab', F(ab')2, and Fv fragments, dAb, linear antibodies, scFv antibodies, and multispecific antibodies formed from antigen binding molecules. Peptibodies (i.e., Fc fusion molecules comprising peptide binding domains) are another example of suitable antigen binding molecules. In some embodiments, the antigen binding molecule binds to an antigen on a tumor cell. In some embodiments, the antigen binding molecule binds to an antigen on a cell involved in a hyperproliferative disease or to a viral or bacterial antigen. In further embodiments, the antigen binding molecule is an antibody fragment that specifically binds to the antigen, including one or more of the complementarity determining regions (CDRs) thereof. In further embodiments, the antigen binding molecule is a single chain variable fragment (scFv). In some embodiments, the antigen binding molecule comprises or consists of avimers.

In some instances, a CDR is substantially identical to one found in a reference antibody (e.g., an antibody of the present disclosure) and/or the sequence of a CDR provided in the present disclosure. In some embodiments, a CDR is substantially identical to a reference CDR (e.g., a CDR provided in the present disclosure) in that it is either identical in sequence or contains between 1, 2, 3, 4, or 5 (e.g. 1-5) amino acid substitutions as compared with the reference CDR. In some embodiments a CDR is substantially identical to a reference CDR in that it shows at least 85%, 86%, 87%, 88%, 89%, 90%, 91%, 92%, 93%, 94%, 95%, 96%, 97%, 98%, 99%, or 100% sequence identity with the reference CDR (e.g., 85-90%, 85-95%, 85-100%, 90-95%, 90-100%, or 95-100%). In some embodiments a CDR is substantially identical to a reference CDR in that it shows at least 96%, 96%, 97%, 98%, 99%, or 100% sequence identity with the reference CDR. In some embodiments a CDR is substantially identical to a reference CDR in that one amino acid within the CDR is deleted, added, or substituted as compared with the reference CDR while the CDR has an amino acid sequence that is otherwise identical with that of the reference CDR. In some embodiments a CDR is substantially identical to a reference CDR in that 2, 3, 4, or 5 (e.g. 2-5) amino acids within the CDR are deleted, added, or substituted as compared with the reference CDR while the CDR has an amino acid sequence that is otherwise identical to the reference CDR. In various embodiments, an antigen binding fragment binds a same antigen as a reference antibody.

An antigen binding fragment may be produced by any means. For example, in some embodiments, an antigen binding fragment may be enzymatically or chemically produced by fragmentation of an intact antibody. In some embodiments, an antigen binding fragment may be recombinantly produced (i.e., by expression of an engineered nucleic acid sequence). In some embodiments, an antigen binding fragment may be wholly or partially synthetically produced. In some embodiments, an antigen binding fragment may have a length of at least about 50, 60, 70, 80, 90, 100, 110, 120, 130, 140, 150, 160, 170, 180, 190 amino acids or more; in some embodiments at least about 200 amino acids (e.g., 50-100, 50-150, 50-200, or 100-200 amino acids).

The term "variable region" or "variable domain" is used interchangeably and are common in the art. The variable region typically refers to a portion of an antibody, generally, a portion of a light or heavy chain, typically about the amino-terminal 110 to 120 amino acids in the mature heavy chain and about 90 to 115 amino acids in the mature light chain, which differ extensively in sequence among antibodies and are used in the binding and specificity of a particular antibody for its particular antigen. The variability in sequence is concentrated in those regions called complementarity determining regions (CDRs) while the more highly conserved regions in the variable domain are called framework regions (FR). Without wishing to be bound by any particular mechanism or theory, it is believed that the CDRs of the light and heavy chains are primarily responsible for the interaction and specificity of the antibody with antigen. In certain embodiments, the variable region is a human variable region. In certain embodiments, the variable region comprises rodent or murine CDRs and human framework regions (FRs). In particular embodiments, the variable region is a primate (e.g., non-human primate) variable region. In certain embodiments, the variable region comprises rodent or murine CDRs and primate (e.g., non-human primate) framework regions (FRs).

A number of definitions of the CDRs are commonly in use: Kabat numbering, Chothia numbering, AbM numbering, or contact numbering. The AbM definition is a compromise between the two used by Oxford Molecular's AbM antibody modelling software. The contact definition is based on an analysis of the available complex crystal structures.

TABLE 1

| CDR Numbering | | | | |
|---|---|---|---|---|
| Loop | Kabat | AbM | Chothia | Contact |
| L1 | L24--L34 | L24--L34 | L24--L34 | L30--L36 |
| L2 | L50--L56 | L50--L56 | L50--L56 | L46--L55 |
| L3 | L89--L97 | L89--L97 | L89--L97 | L89--L96 |
| H1 | H31--H35B (Kabat Numbering | H26--H35B | H26--H32 . . . 34 | H30--H35B |
| H1 | H31--H35 (Chothia Numbering) | H26--H35 | H26--H32 | H30--H35 |
| H2 | H50--H65 | H50--H58 | H52--H56 | H47--H58 |
| H3 | H95--H102 | H95--H102 | H95--H102 | H93--H101 |

The term "Kabat numbering" and like terms are recognized in the art and refer to a system of numbering amino acid residues in the heavy and light chain variable regions of an antibody, or an antigen-binding molecule thereof. In certain aspects, the CDRs of an antibody can be determined according to the Kabat numbering system (see, e.g., Kabat E A & Wu T T (1971) Ann NY Acad Sci 190: 382-391 and Kabat E A et al., (1991) Sequences of Proteins of Immunological Interest, Fifth Edition, U.S. Department of Health and Human Services, NIH Publication No. 91-3242). Using the Kabat numbering system, CDRs within an antibody heavy chain molecule are typically present at amino acid positions 31 to 35, which optionally can include one or two additional amino acids, following 35 (referred to in the Kabat numbering scheme as 35A and 35B) (CDR1), amino acid positions 50 to 65 (CDR2), and amino acid positions 95 to 102 (CDR3). Using the Kabat numbering system, CDRs within an antibody light chain molecule are typically present at amino acid positions 24 to 34 (CDR1), amino acid positions 50 to 56 (CDR2), and amino acid positions 89 to 97 (CDR3). In a specific embodiment, the CDRs of the antibodies described herein have been determined according to the Kabat numbering scheme.

In certain aspects, the CDRs of an antibody can be determined according to the Chothia numbering scheme, which refers to the location of immunoglobulin structural loops (see, e.g., Chothia C & Lesk A M, (1987), *J Mol Biol* 196: 901-917; Al-Lazikani B et al., (1997) *J Mol Biol* 273: 927-948; Chothia C et al., (1992) *J Mol Biol* 227: 799-817; Tramontano A et al., (1990) *J Mol Biol* 215(1): 175-82; and U.S. Pat. No. 7,709,226). Typically, when using the Kabat numbering convention, the Chothia CDR-H1 loop is present at heavy chain amino acids 26 to 32, 33, or 34, the Chothia CDR-H2 loop is present at heavy chain amino acids 52 to 56, and the Chothia CDR-H3 loop is present at heavy chain amino acids 95 to 102, while the Chothia CDR-L1 loop is present at light chain amino acids 24 to 34, the Chothia CDR-L2 loop is present at light chain amino acids 50 to 56, and the Chothia CDR-L3 loop is present at light chain amino acids 89 to 97. The end of the Chothia CDR-HI loop when numbered using the Kabat numbering convention varies between H32 and H34 depending on the length of the loop (this is because the Kabat numbering scheme places the insertions at H35A and H35B; if neither 35A nor 35B is present, the loop ends at 32; if only 35A is present, the loop ends at 33; if both 35A and 35B are present, the loop ends at 34).

The terms "constant region" and "constant domain" are interchangeable and have a meaning common in the art. The constant region is an antibody portion, e.g., a carboxyl terminal portion of a light and/or heavy chain which is not directly involved in binding of an antibody to antigen but which can exhibit various effector functions, such as interaction with the Fc receptor. The constant region of an immunoglobulin molecule generally has a more conserved amino acid sequence relative to an immunoglobulin variable domain.

The term "heavy chain" when used in reference to an antibody can refer to any distinct type, e.g., alpha (α), delta (δ), epsilon (ε), gamma (γ) and mu (μ), based on the amino acid sequence of the constant domain, which give rise to IgA, IgD, IgE, IgG and IgM classes of antibodies, respectively, including subclasses of IgG, e.g., IgG1, IgG2, IgG3 and IgG4.

The term "light chain" when used in reference to an antibody can refer to any distinct type, e.g., kappa (κ) or lambda (λ) based on the amino acid sequence of the constant domains. Light chain amino acid sequences are well known in the art. In specific embodiments, the light chain is a human light chain.

The terms "VL" and "VL domain" are used interchangeably to refer to the light chain variable region of an antibody or an antigen-binding molecule thereof.

The terms "VH" and "VH domain" are used interchangeably to refer to the heavy chain variable region of an antibody or an antigen-binding molecule thereof.

The terms "constant region" and "constant domain" are interchangeable and have a meaning common in the art. The constant region is an antibody portion, e.g., a carboxyl terminal portion of a light and/or heavy chain which is not directly involved in binding of an antibody to antigen but which can exhibit various effector functions, such as interaction with the Fc receptor. The constant region of an immunoglobulin molecule generally has a more conserved amino acid sequence relative to an immunoglobulin variable domain.

"Binding affinity" generally refers to the strength of the sum total of non-covalent interactions between a single binding site of a molecule (e.g., an antibody) and its binding partner (e.g., an antigen). Unless indicated otherwise, as used herein, "binding affinity" refers to intrinsic binding affinity which reflects a 1:1 interaction between members of a binding pair (e.g., antibody and antigen). The affinity of a molecule X for its partner Y can generally be represented by the dissociation constant (KD). Affinity can be measured and/or expressed in a number of ways known in the art, including, but not limited to, equilibrium dissociation constant (KD), and equilibrium association constant (KA). The KD is calculated from the quotient of $k_{off}/k_{on}$, whereas KA is calculated from the quotient of $k_{on}/k_{off}$. $k_{on}$ refers to the association rate constant of, e.g., an antibody to an antigen, and $k_{off}$ refers to the dissociation of, e.g., an antibody to an antigen. The $k_{on}$ and $k_{off}$ can be determined by techniques known to one of ordinary skill in the art, such as BIACORE® or KinExA.

The term "cancer" relates generally to a class of diseases or conditions in which abnormal cells divide without control and may invade nearby tissues. Examples of cancers that can be treated by the methods of the present disclosure include, but are not limited to, cancers of the immune system including lymphoma, leukemia, myeloma, and other leukocyte malignancies. In some embodiments, the methods of the present disclosure can be used to reduce the tumor size of a tumor derived from, for example, bone cancer, pancreatic cancer, skin cancer, cancer of the head or neck, cutaneous or intraocular malignant melanoma, uterine cancer, ovarian cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, multiple myeloma, Hodgkin's Disease, non-Hodgkin's lymphoma (NHL), primary mediastinal large B cell lymphoma (PMBC), diffuse large B cell lymphoma (DLBCL), follicular lymphoma (FL), transformed follicular lymphoma, splenic marginal zone lymphoma (SMZL), cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, chronic or acute leukemia, acute myeloid leukemia, chronic myeloid leukemia, acute lymphoblastic leukemia (ALL) (including non T cell ALL), chronic lymphocytic leukemia (CLL), solid tumors of childhood, lymphocytic lymphoma, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, T-cell lymphoma, environmentally induced cancers including those induced by asbestos, other B cell malignancies, and combinations of said cancers. In one particular embodiment, the cancer is multiple myeloma. The particular cancer can be responsive to chemo- or radiation therapy or the cancer can be refractory. A refractory cancer refers to a cancer that is not amendable to surgical intervention and the cancer is either initially unresponsive to chemo- or radiation therapy or the cancer becomes unresponsive over time. Cancer further includes relapsed or refractory large B-cell lymphoma after two or more lines of systemic therapy, including diffuse large B-cell lymphoma (DLBCL) not otherwise specified, primary mediastinal large B-cell lymphoma after two or more lines of systemic therapy, high grade B-cell lymphoma, and DLBCL arising from follicular lymphoma.

The term “cancerous cell,” “cancer cell,” “tumor cell” or variant thereof refers to an individual cell of a cancerous growth or tissue. A tumor refers generally to a swelling or lesion formed by an abnormal growth of cells, which may be benign, pre-malignant, or malignant. Most cancers form tumors, but some, e.g., leukemia, do not necessarily form tumors. For those cancers that form tumors, the terms cancer (cell) and tumor (cell) are used interchangeably. The amount of a tumor in an individual is the “tumor burden” which may be measured as the number, volume, or weight of the tumor. Unless the context requires otherwise, the words “comprise”, “comprises” and “comprising” will be understood to imply the inclusion of a stated step or element or group of steps or elements but not the exclusion of any other step or element or group of steps or elements. By “consisting of” is meant to include, and be limited to, whatever follows the phrase “consisting of.” Thus, the phrase “consisting of” indicates that the listed elements are required or mandatory, and that no other elements may be present. By “consisting essentially of” is meant including any elements listed after the phrase, and be limited to other elements that do not interfere with or contribute to the activity or action specified in the disclosure for the listed elements.

A “conservative amino acid substitution” is one in which the amino acid residue is replaced with an amino acid residue having a similar side chain. Families of amino acid residues having side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine, tryptophan), nonpolar side chains (e.g., alanine, valine, leucine, isoleucine, proline, phenylalanine, methionine), beta-branched side chains (e.g., threonine, valine, isoleucine) and aromatic side chains (e.g., tyrosine, phenylalanine, tryptophan, histidine). In certain embodiments, one or more amino acid residues within a CDR(s) or within a framework region(s) of an antibody or antigen-binding molecule thereof can be replaced with an amino acid residue with a similar side chain. In general, two sequences are generally considered to be “substantially similar” if they contain a conservative amino acid substitution in corresponding positions. For example, certain amino acids are generally classified as “hydrophobic” or “hydrophilic” amino acids, and/or as having “polar” or “non-polar” side chains. Substitution of one amino acid for another of the same type may be considered a conservative substitution. Exemplary amino acid categorizations are summarized in Table 2:

TABLE 2

Exemplary amino acid categorizations

| Amino Acid | 3-Letter | 1-Letter | Property | Property | Hydropathy Index |
|---|---|---|---|---|---|
| Alanine | Ala | A | nonpolar | neutral | 1.8 |
| Arginine | Arg | R | polar | positive | −4.5 |
| Asparagine | Asn | N | polar | neutral | −3.5 |
| Aspartic acid | Asp | D | polar | negative | −3.5 |
| Cysteine | Cys | C | nonpolar | neutral | 2.5 |
| Glutamic acid | Glu | E | polar | negative | −3.5 |
| Glutamine | Gln | Q | polar | neutral | −3.5 |
| Glycine | Gly | G | nonpolar | neutral | −0.4 |
| Histidine | His | H | polar | positive | −3.2 |
| Isoleucine | Ile | I | nonpolar | neutral | 4.5 |
| Leucine | Leu | L | nonpolar | neutral | 3.8 |
| Lysine | Lys | K | polar | positive | −3.9 |
| Methionine | Met | M | nonpolar | neutral | 1.9 |
| Phenylalanine | Phe | F | nonpolar | neutral | 2.8 |
| Proline | Pro | P | nonpolar | neutral | −1.6 |
| Serine | Ser | S | polar | neutral | −0.8 |
| Threonine | Thr | T | polar | neutral | −0.7 |
| Tryptophan | Trp | W | nonpolar | neutral | −0.9 |
| Tyrosine | Tyr | Y | polar | neutral | −1.3 |
| Valine | Val | V | nonpolar | neutral | 4.2 |

By “decrease” or “lower,” or “lessen,” or “reduce,” or “abate” refers generally to the ability of a composition contemplated herein to produce, elicit, or cause a lesser physiological response (i.e., a downstream effect) compared to the response caused by either the vehicle alone (i.e., an active moiety) or a control molecule/composition. A “decrease” or “reduced” amount is typically a “statistically significant” amount, and may include an decrease that is 1.1, 1.2, 1.5, 2, 2.5, 3, 3.5, 4, 4.5, 5, 5.5, 6, 6.5, 7, 7.5, 8, 8.5, 9, 9.5, 10, 15, 20, 30 or more times (e.g., 500, 1000 times) (including all integers and decimal points in between and above 1, e.g., 1.5, 1.6, 1.7, 1.8, etc.) the response (reference response) produced by vehicle, a control composition.

The terms “enhance” or “promote,” or “increase” or “expand” refers generally to the ability of a composition contemplated herein to produce, elicit, or cause a greater physiological response (e.g., downstream effects) compared to the response caused by either vehicle or a control molecule/composition. A measurable physiological response may include an increase in T cell expansion, activation, persistence, and/or an increase in cancer cell death killing ability, among others apparent from the understanding in the art and the description herein. An “increased” or “enhanced” amount is typically a “statistically significant” amount, and may include an increase that is 1.1, 1.2, 1.5, 2, 2.5, 3, 3.5, 4, 4.5, 5, 5.5, 6, 6.5, 7, 7.5, 8, 8.5, 9, 9.5, 10, 15, 20, 30 or more times (e.g., 500, 1000 times) (including all integers and decimal points in between and above 1, e.g., 1.5, 1.6, 1.7, 1.8, etc.) the response produced by vehicle or a control composition.

The term “heterologous” means from any source other than naturally occurring sequences. For example, a heterologous nucleotide sequence refers to a nucleotide sequence other than that of the wild type human costimulatory protein-encoding sequence.

An “epitope” is a term in the art and refers to a localized region of an antigen to which an antibody can specifically bind. An epitope can be, for example, contiguous amino acids of a polypeptide (linear or contiguous epitope) or an epitope can, for example, come together from two or more non-contiguous regions of a polypeptide or polypeptides (conformational, non-linear, discontinuous, or non-contiguous epitope). In certain embodiments, the epitope to which an antibody binds can be determined by, e.g., NMR spectroscopy, X-ray diffraction crystallography studies, ELISA assays, hydrogen/deuterium exchange coupled with mass spectrometry (e.g., liquid chromatography electrospray mass spectrometry), array-based oligo-peptide scanning assays, and/or mutagenesis mapping (e.g., site-directed mutagenesis mapping). For X-ray crystallography, crystallization may be accomplished using any of the known methods in the art (e.g., Giegé R et al., (1994) *Acta Crystallogr D Biol Crystallogr* 50 (Pt 4): 339-350; McPherson A (1990) *Eur J Biochem* 189: 1-23; Chayen N E (1997) *Structure* 5: 1269-1274; McPherson A (1976) *J Biol Chem* 251: 6300-6303). Antibody:antigen crystals may be studied using well known X-ray diffraction techniques and may be refined using computer software such as X-PLOR (Yale University, 1992, distributed by Molecular Simulations, Inc.; see e.g. *Meth Enzymol* (1985) volumes 114 & 115, eds Wyckoff H W et al.; U.S. 2004/0014194), and BUSTER (Bricogne G (1993) *Acta Crystallogr D Biol Crystallogr* 49 (Pt 1): 37-60; Bricogne G (1997) *Meth Enzymol* 276A: 361-423, ed Carter C W; Roversi P et al., (2000) *Acta Crystallogr D Biol Crystallogr* 56 (Pt 10): 1316-1323). Mutagenesis mapping studies may be accomplished using any method known to one of skill in the art. See, e.g., Champe M et al., (1995) *J Biol Chem* 270: 1388-1394 and Cunningham B C & Wells J A (1989) *Science* 244: 1081-1085 for a description of mutagenesis techniques, including alanine scanning mutagenesis techniques.

The term "binding" generally refers to a non-covalent association between or among two or more entities. Direct binding involves physical contact between entities or moieties. "Indirect" binding involves physical interaction by way of physical contact with one or more intermediate entities. Binding between two or more entities may be assessed in any of a variety of contexts, e.g., where interacting entities or moieties are studied in isolation or in the context of more complex systems (e.g., while covalently or otherwise associated with a carrier entity and/or in a biological system such as a cell).

The terms "immunospecifically binds," "immunospecifically recognizes," "specifically binds," and "specifically recognizes" are analogous terms in the context of antibodies and refer to molecules that bind to an antigen (e.g., epitope or immune complex) as such binding is understood by one skilled in the art. For example, a molecule that specifically binds to an antigen may bind to other peptides or polypeptides, generally with lower affinity as determined by, e.g., immunoassays, BIACORE®, KinExA 3000 instrument (Sapidyne Instruments, Boise, ID), or other assays known in the art. In a specific embodiment, molecules that specifically bind to an antigen bind to the antigen with a $K_A$ that is at least 2 logs, 2.5 logs, 3 logs, 4 logs or greater than the $K_A$ when the molecules bind to another antigen. Binding may comprise preferential association of a binding motif, antibody, or antigen binding system with a target of the binding motif, antibody, or antigen binding system as compared to association of the binding motif, antibody, or antigen binding system with an entity that is not the target (i.e. non-target). In some embodiments, a binding motif, antibody, or antigen binding system selectively binds a target if binding between the binding motif, antibody, or antigen binding system and the target is greater than 2-fold, greater than 5-fold, greater than 10-fold, 20-fold, 30-fold, 40-fold, 50-fold, 60-fold, 70-fold, 80-fold, 90-fold, or greater than 100-fold as compared with binding of the binding motif, antibody, or antigen binding system and a non-target. In some embodiments, a binding motif, antibody, or antigen binding system selectively binds a target if the binding affinity is less than about $10^{-5}$ M, less than about $10^{-6}$ M, less than about $10^{-7}$ M, less than about $10^{-8}$ M, or less than about $10^{-9}$ M.

In another embodiment, molecules that specifically bind to an antigen bind with a dissociation constant ($K_d$) of about $1\times10^{-7}$ M. In some embodiments, the antigen binding molecule specifically binds an antigen with "high affinity" when the $K_d$ is about $1\times10^{-9}$ M to about $5\times10^{-9}$ M. In some embodiments, the antigen binding molecule specifically binds an antigen with "very high affinity" when the $K_d$ is $1\times10^{-10}$ M to about $5\times10^{-10}$ M. In one embodiment, the antigen binding molecule has a $K_d$ of $10^{-9}$ M. In one embodiment, the off-rate is less than about $1\times10^{-5}$.

"Chimeric antigen receptor" or "CAR" refers to a molecule engineered to comprise a binding motif and a means of activating immune cells (for example T cells such as naive T cells, central memory T cells, effector memory T cells or combination thereof or NK cells) upon antigen binding. CARs are also known as artificial T cell or NK cell receptors, chimeric T cell receptors, CAR-T, chimeric NK cells, CAR-NK or chimeric immunoreceptors. In some embodiments, a CAR comprises a binding motif, an extracellular domain, a transmembrane domain, one or more co-stimulatory domains, and an intracellular signaling domain. A T cell that has been genetically engineered to express a chimeric antigen receptor may be referred to as a CAR T cell. "Extracellular domain" (or "ECD") refers to a portion of a polypeptide that, when the polypeptide is present in a cell membrane, is understood to reside outside of the cell membrane, in the extracellular space.

An "antigen" refers to any molecule that provokes an immune response or is capable of being bound by an antibody or an antigen binding molecule. The immune response may involve either antibody production, or the activation of specific immunologically-competent cells, or both. A person of skill in the art would readily understand that any macromolecule, including virtually all proteins or peptides, can serve as an antigen. An antigen can be endogenously expressed, i.e. expressed by genomic DNA, or can be recombinantly expressed. An antigen can be specific to a certain tissue, such as a cancer cell, or it can be broadly expressed. In addition, fragments of larger molecules can act as antigens. In one embodiment, antigens are tumor antigens. A "target" is any molecule bound by a binding motif, antigen binding system, or binding agent, e.g., an antibody. In some embodiments, a target is an antigen or epitope of the present disclosure.

The term "neutralizing" refers to an antigen binding molecule, scFv, antibody, or a fragment thereof, that binds to a ligand and prevents or reduces the biological effect of that ligand. In some embodiments, the antigen binding molecule, scFv, antibody, or a fragment thereof, directly blocks a binding site on the ligand or otherwise alters the ligand's ability to bind through indirect means (such as structural or energetic alterations in the ligand). In some embodiments, the antigen binding molecule, scFv, antibody, or a fragment thereof prevents the protein to which it is bound from performing a biological function.

The term "autologous" refers to any material derived from the same individual to which it is later to be re-introduced. For example, the engineered autologous cell therapy (eACT™) method described herein involves collection of lymphocytes from a patient, which are then engineered to express, e.g., a CAR construct, and then administered back to the same patient.

The term "allogeneic" refers to any material derived from one individual which is then introduced to another individual of the same species, e.g., allogeneic T cell or NK cell transplantation.

The term "activation," "activated," or the like refers to the state of a cell, including and not be limited to an immune cell (e.g., a T cell), that has been sufficiently stimulated to induce detectable cellular proliferation. Activation may be associated with induced cytokine production and detectable effector functions. The term "activated T cells" refers to, among other things, T cells that are undergoing cell division. T cell activation may be characterized by increased T cell expression of one or more biomarker, including, but not limited to, CD57, PD1, CD107a, CD25, CD137, CD69, and/or CD71. Methods for activating and expanding T cells are known in the art and are described, e.g., in U.S. Pat. Nos. 6,905,874; 6,867,041; and 6,797,514; and International Patent Application Publication No. WO 2012/079000, the contents of which are hereby incorporated by reference in their entirety. In general, such methods include contacting cells (such as T cells) with an activating, stimulatory, or costimulatory agent (such as anti-CD3 and/or anti-CD28 antibodies) which may be attached, coated, or bound to a bead or other surface, in a solution (such as feeding, culture, and/or growth medium) with certain cytokines (such as IL-2, IL-7, and/or IL-15). The activation agent (such as anti-CD3 and/or anti-CD28 antibodies) attached to the same bead serve as a "surrogate" antigen presenting cell (APC). One example is the Dynabeads® system, a CD3/CD28 activator/stimulator system for physiological activation of human T cells. In one embodiment, the T cells are activated and stimulated to proliferate with certain antibodies and/or cytokines using the methods described in U.S. Pat. Nos. 6,040,177 and 5,827,642 and International Patent Application Publication No. WO2012/129514, the contents of which are hereby incorporated by reference in their entirety.

The terms "transduction" and "transduced" refer to the process whereby foreign DNA is introduced into a cell via viral vector (see Jones et al., "Genetics: principles and analysis," Boston: Jones & Bartlett Publ. (1998)). In some embodiments, the vector is a retroviral vector, a DNA vector, a RNA vector, an adenoviral vector, a baculoviral vector, an Epstein Barr viral vector, a papovaviral vector, a vaccinia viral vector, a herpes simplex viral vector, an adenovirus associated vector, a lentiviral vector, or any combination thereof.

"Transformation" refers to any process by which exogenous DNA is introduced into a host cell. Transformation may occur under natural or artificial conditions using various methods. Transformation may be achieved using any known method for the insertion of foreign nucleic acid sequences into a prokaryotic or eukaryotic host cell. In some embodiments, some transformation methodology is selected based on the host cell being transformed and/or the nucleic acid to be inserted. Methods of transformation may comprise, yet are not limited to, viral infection, electroporation, and lipofection. In some embodiments, a "transformed" cell is stably transformed in that the inserted DNA is capable of replication either as an autonomously replicating plasmid or as part of the host chromosome. In some embodiments, a transformed cell may express introduced nucleic acid.

As used herein, "expansion" refers to expanding a population of transduced immune cells for a particular time to produce a population of engineered immune cells. The predetermined time for expansion can be any suitable time which allows for the production of (i) a sufficient number of cells in the population of engineered immune cells for at least one dose for administering to a patient, (ii) a population of engineered immune cells with a favorable proportion of juvenile cells compared to a typical longer process, or (iii) both (i) and (ii). This time will depend on the cell surface receptor expressed by the immune cells, the vector used, the dose that is needed to have a therapeutic effect, and other variables. Thus, in some embodiments, the predetermined time for expansion can be 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, or more than 21 days.

The term "vector" refers to a recipient nucleic acid molecule modified to comprise or incorporate a provided nucleic acid sequence. One type of vector is a "plasmid," which refers to a circular double stranded DNA molecule into which additional DNA may be ligated. Another type of vector is a viral vector, wherein additional DNA segments may be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) may be integrated into the genome of a host cell upon introduction into the host cell, and thereby are replicated along with the host genome. Moreover, certain vectors comprise sequences that direct expression of inserted genes to which they are operatively linked. Such vectors may be referred to herein as "expression vectors." Standard techniques may be used for engineering of vectors, e.g., as found in Sambrook et al., Molecular Cloning: A Laboratory Manual (2d ed., Cold Spring Harbor Laboratory Press, Cold Spring Harbor, N.Y. (1989)), which is incorporated herein by reference for any purpose.

An "anti-tumor effect" as used herein, refers to a biological effect that may present as a decrease in tumor volume, a decrease in the number of tumor cells, a decrease in tumor cell proliferation, a decrease in the number of metastases, an increase in overall or progression-free survival, an increase in life expectancy, or amelioration of various physiological symptoms associated with the tumor. An anti-tumor effect may also refer to the prevention of the occurrence of a tumor, e.g., a vaccine.

A "cytokine", as used herein, refers to a non-antibody protein that is released by one cell in response to contact with a specific antigen, wherein the cytokine interacts with a second cell to mediate a response in the second cell. "Cytokine" as used herein is meant to refer to proteins released by one cell population that act on another cell as intercellular mediators. A cytokine may be endogenously expressed by a cell or administered to a subject. Cytokines may be released by immune cells, including macrophages, B cells, T cells, and mast cells to propagate an immune response. Cytokines may induce various responses in the recipient cell. Cytokines may include homeostatic cytokines, chemokines, pro-inflammatory cytokines, effectors, and acute-phase proteins. For example, homeostatic cytokines, including interleukin (IL)-7 and IL-15, promote immune cell survival and proliferation, and pro-inflammatory cytokines may promote an inflammatory response. Examples of homeostatic cytokines include, but are not limited to, IL-2, IL-4, IL-5, IL-7, IL-10, IL-12p70 (also called IL-12, which is composed of the subunits IL-12p35, IL-12p40), IL-15, and interferon (IFN) gamma. Examples of pro-inflammatory cytokines include, but are not limited to, IL-1a, IL-1b, IL-6, IL-13, IL-17a, IL-18, tumor necrosis factor (TNF)-α, TNF-β, fibroblast growth factor (FGF) 2, granulocyte macrophage colony-stimulating factor (GM-CSF), soluble intercellular adhesion molecule 1 (sICAM-1), soluble vascular adhesion molecule 1 (sVCAM-1), vascular endothelial growth factor (VEGF), VEGF-C, VEGF-D, and placental growth factor (PLGF). Examples of effectors include, but are not limited to, granzyme A, granzyme B, soluble Fas ligand (sFasL), and perforin. Examples of acute phase-proteins include, but are not limited to, C-reactive protein (CRP) and serum amyloid A (SAA).

"Chemokines" are a type of cytokine that mediates cell chemotaxis, or directional movement. Examples of chemokines include, but are not limited to, IL-8, IL-16, eotaxin, eotaxin-3, macrophage-derived chemokine (MDC or CCL22), monocyte chemotactic protein 1 (MCP-1 or CCL2), MCP-4, macrophage inflammatory protein 1α (MIP-1α, MIP-1a), MIP-1β (MIP-1b), gamma-induced protein 10 (IP-10), and thymus and activation regulated chemokine (TARC or CCL17).

The term "lymphocyte" includes natural killer (NK) cells, T cells, or B cells. NK cells are a type of cytotoxic (cell toxic) lymphocyte that represent a major component of the inherent immune system. NK cells reject tumors and cells infected by viruses. It works through the process of apoptosis or programmed cell death. They were termed "natural killers" because they do not require activation in order to kill cells. T-cells play a major role in cell-mediated-immunity (no antibody involvement). Its T-cell receptors (TCR) differentiate themselves from other lymphocyte types. The thymus, a specialized organ of the immune system, is primarily responsible for the T cell's maturation. There are six types of T-cells, namely: Helper T-cells (e.g., CD4+ cells), Cytotoxic T-cells (also known as TC, cytotoxic T lymphocyte, CTL, T-killer cell, cytolytic T cell, CD8+ T-cells or killer T cell), Memory T-cells ((i) stem memory $T_{SCM}$ cells, like naive cells, are CD45RO−, CCR7+, CD45RA+, CD62L+ (L-selectin), CD27+, CD28+ and IL-7Rα+, but they also express large amounts of CD95, IL-2Rβ, CXCR3, and LFA-1, and show numerous functional attributes distinctive of memory cells); (ii) central memory $T_{CM}$ cells express L-selectin and the CCR7, they secrete IL-2, but not IFNγ or IL-4, and (iii) effector memory $T_{EM}$ cells, however, do not express L-selectin or CCR7 but produce effector cytokines like IFNγ and IL-4), Regulatory T-cells (Tregs, suppressor T cells, or CD4+CD25+ regulatory T cells), Natural Killer T-cells (NKT) and Gamma Delta T-cells. B-cells, on the other hand, play a principal role in humoral immunity (with antibody involvement). It makes antibodies and antigens and performs the role of antigen-presenting cells (APCs) and turns into memory B-cells after activation by antigen interaction. In mammals, immature B-cells are formed in the bone marrow, where its name is derived from.

"Linker" or "linker domain" or "linker region" refers to an oligo- or polypeptide region from about 1 to 100 amino acids in length, which links together any of the domains/regions of a membrane-bound IL-18 (e.g., IL-18 and the IL-18R subunit), CAR or TCR. Linkers may be composed of flexible residues like glycine and serine so that the adjacent protein domains are free to move relative to one another. Longer linkers may be used when it is desirable to ensure that two adjacent domains do not sterically interfere with one another. Linkers may be cleavable or non-cleavable. Examples of cleavable linkers include 2A linkers (for example T2A), 2A-like linkers or functional equivalents thereof and combinations thereof. In some embodiments, the linkers include the picornaviral 2A-like linker, CHYSEL sequences of porcine teschovirus (P2A), virus (T2A) or combinations, variants and functional equivalents thereof. Other linkers will be apparent to those of skill in the art and may be used in connection with alternate embodiments of the disclosure. In some embodiments, a polypeptide linker is at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, 100 or more amino acids in length (e.g., 1 to 10, 1 to 20, 1 to 30, 1 to 40, 1 to 50, 1 to 60, 1 to 70, 1 to 80, 1 to 90, 1 to 100, 10 to 20, 10 to 30, 10 to 40, 10 to 50, 10 to 60, 10 to 70, 10 to 80, 10 to 90, or 10 to 100 amino acids in length). In some embodiments, a linker is characterized in that it tends not to adopt a rigid three-dimensional structure, and instead provides flexibility to the polypeptide.

"Single chain variable fragment", "single-chain antibody variable fragments" or "scFv" antibodies refer to forms of antibodies comprising the variable regions of only the heavy and light chains, connected by a linker peptide.

The term "genetically engineered" or "engineered" refers to a method of modifying the genome of a cell, specifically a T cell or NK cell, including, but not limited to, deleting a coding or non-coding region or a portion thereof or inserting a coding region or a portion thereof. In some embodiments, the cell that is modified is a lymphocyte, e.g., a T cell, which can either be obtained from a patient or a donor. In other embodiment, the cell that is modified is a NK cell. The cell can be modified to express an exogenous construct, such as, e.g., a chimeric antigen receptor (CAR) and/or a T cell receptor (TCR), which is incorporated into the cell's genome. Engineering generally comprises manipulation by the hand of man. For example, a polynucleotide is considered to be "engineered" when two or more sequences, that are not linked or connected together in that order in nature, are manipulated by the hand of man to be directly linked or connected to one another in the engineered polynucleotide. In the context of manipulation of cells by techniques of molecular biology, a cell or organism is considered to be "engineered" if it has been manipulated so that its genetic information is altered (e.g., new genetic material not previously present has been introduced, for example by transformation, somatic hybridization, transfection, transduction, or other mechanism, or previously present genetic material is altered or removed, for example by substitution or deletion mutation, or by other protocols). In some embodiments, a binding agent is a modified lymphocyte, e.g., a T cell, may be obtained from a patient or a donor. In other embodiments, a binding agent is a modified NK cell. An engineered cell may be modified to express an exogenous construct, such as, e.g., a chimeric antigen receptor (CAR) or a T cell receptor (TCR), which is incorporated into the cell's genome. Progeny of an engineered polynucleotide or binding agent are generally referred to as "engineered" even though the actual manipulation was performed on a prior entity. In some embodiments, "engineered" refers to an entity that has been designed and produced. The term "designed" refers to an agent (i) whose structure is or was selected by the hand of man; (ii) that is produced by a process requiring the hand of man; and/or (iii) that is distinct from natural substances and other known agents.

An "immune effector cell," is any cell of the immune system that that expresses one or more Fc receptors and has one or more effector functions (e.g., cytotoxic cell killing activity, secretion of cytokines, induction of ADCC and/or CDC). Examples of immune effector cells include T lymphocytes, for example pan $CD3^+$ T cells, cytotoxic T cells (CTLs; $CD8^+$ T cells), TILs, and helper T cells (HTLs; $CD4^+$ T cells), NK cells, one or more of monocytes, macrophages, neutrophils, dendritic cells, eosinophils, mast cells, platelets, large granular lymphocytes, Langerhans' cells, and B-lymphocytes. Effector cells may be of any organism comprising, without limitation, humans, mice, rats, rabbits, and monkeys.

An "immune response" refers to the action of a cell of the immune system (for example, T lymphocytes, B lymphocytes, natural killer (NK) cells, macrophages, eosinophils, mast cells, dendritic cells and neutrophils) and soluble macromolecules produced by any of these cells or the liver (including Abs, cytokines, and complement) that results in selective targeting, binding to, damage to, destruction of, and/or elimination from a vertebrate's body of invading pathogens, cells or tissues infected with pathogens, cancerous or other abnormal cells, or, in cases of autoimmunity or pathological inflammation, normal human cells or tissues.

The term "immunotherapy" refers to the treatment of a subject afflicted with, or at risk of contracting or suffering a recurrence of, a disease by a method comprising inducing, enhancing, suppressing or otherwise modifying an immune response. Examples of immunotherapy include, but are not limited to, T cell therapies, and Natural Killer (NK) cell based immunotherapies. T cell therapy may include adoptive T cell therapy, tumor-infiltrating lymphocyte (TIL) immunotherapy, autologous cell therapy, engineered autologous cell therapy (eACT™), and allogeneic T cell transplantation. However, one of skill in the art would recognize that the conditioning methods disclosed herein would enhance the effectiveness of any transplanted T cell therapy. Examples of T cell therapies are described in U.S. Patent Publication Nos. 2014/0154228 and 2002/0006409, U.S. Pat. Nos. 7,741,465, 6,319,494, 5,728,388, and International Patent Application Publication No. WO 2008/081035. NK cell based immunotherapies harness the power of the innate immune response and include both unmodified and engineered forms of NK cell treatment, including but not limited to, genetically engineered NK cells, CAR-engineered NK cells, CAR-engineered NK cell lines, TCR engineered NK cells and TCR engineered NK cell lines.

The NK and T cells of the immunotherapy can come from any source known in the art. For example, T cells can be differentiated in vitro from a hematopoietic stem cell population, or T cells can be obtained from a subject. Both T cells and NK cells can be obtained from, e.g., peripheral blood mononuclear cells (PBMCs), bone marrow, lymph node tissue, cord blood, thymus tissue, tissue from a site of infection, ascites, pleural effusion, spleen tissue, and tumors. In addition, the T cells can be derived from one or more T cell lines available in the art. T cells can also be obtained from a unit of blood collected from a subject using any number of techniques known to the skilled artisan, such as FICOLL™ separation and/or apheresis. Additional methods of isolating T cells for a T cell therapy are disclosed in U.S. Patent Publication No. 2013/0287748, which is herein incorporated by references in its entirety. Similarly, methods of isolating NK cells are also known in the art.

The terms "individual" and "subject" are often used interchangeably and refer to any animal that may be treated with the methods disclosed herein. Suitable subjects (e.g., patients) include laboratory animals (such as mouse, rat, rabbit, or guinea pig), farm animals, and domestic animals or pets (such as a cat or dog). Non-human primates and human patients, are included. In one embodiment, subjects may include human patients that have a cancer, have been diagnosed with a cancer, are suspected to have a cancer, or are at risk or having a cancer. As used herein, the term "patient" refers to a subject that may receive a treatment of a disease or condition such as cancer (e.g., a lymphoma or a leukemia). The terms "subject" and "patient" are used interchangeably herein.

The term "isolated peptide" or an "isolated polypeptide" and the like, refer to in vitro isolation and/or purification of a peptide or polypeptide molecule from a cellular environment, and from association with other components of the cell, i.e., it is not significantly associated with in vivo substances. Similarly, an "isolated cell" refers to a cell that has been obtained from an in vivo tissue or organ and is substantially free of extracellular matrix.

The term "isolated polynucleotide" refers to a polynucleotide that has been purified from the sequences which flank it in a naturally-occurring state, e.g., a DNA fragment that has been removed from the sequences that are normally adjacent to the fragment. An "isolated polynucleotide" also refers to a complementary DNA (cDNA), a recombinant DNA, or other polynucleotide that does not exist in nature and that has been made by the hand of man.

The terms "peptide," "polypeptide," and "protein" are used interchangeably, and refer to a compound comprised of amino acid residues covalently linked by peptide bonds i.e., as a sequence of amino acids. A protein or peptide contains at least two amino acids, and no limitation is placed on the maximum number of amino acids that can comprise a protein's or peptide's sequence. Polypeptides include any peptide or protein comprising two or more amino acids joined to each other by peptide bonds. Polypeptides are not limited to a specific length, e.g., they may comprise a full length protein sequence or a fragment of a full length protein, and may include post-translational modifications of the polypeptide, for example, glycosylations, acetylations, phosphorylations and the like, as well as other modifications known in the art, both naturally occurring and non-naturally occurring. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof.

The present disclosure contemplates polypeptides having at least 75% sequence identity to (such as, at least 75%, at least 80%, at least 90%, at least 95%, or 100% identity; e.g., 85-90%, 85-95%, 85-100%, 90-95%, 90-100%, or 95-100%) any and all of the amino acids described herein.

The term "modified immune cells" refer to T cells or NK cells that have been modified by the introduction of a polynucleotide encoding an engineered polypeptide as described herein. Modified immune cells include both genetic and non-genetic modifications (e.g., episomal or extrachromosomal).

By "maintain," or "preserve," or "maintenance," or "no change," or "no substantial change," or "no substantial decrease" refers generally to the ability of a composition contemplated herein to produce, elicit, or cause a lesser physiological response (i.e., downstream effect) in a cell, as compared to the response caused by either vehicle, a control molecule/composition. A comparable response is one that is not significantly different or measurably different from the reference response.

The term "malignant" refers to a cancer in which a group of tumor cells display one or more of uncontrolled growth (i.e., division beyond normal limits), invasion (i.e., intrusion on and destruction of adjacent tissues), and metastasis (i.e., spread to other locations in the body via lymph or blood). As used herein, the term "metastasize" refers to the spread of cancer from one part of the body to another. A tumor formed by cells that have spread is called a "metastatic tumor" or a "metastasis." The metastatic tumor contains cells that are like those in the original (primacy) tumor. As used herein, the term "benign" or "non-malignant" refers to tumors that may grow larger but do not spread to other parts of the body. Benign tumors are self-limited and typically do not invade or metastasize.

The term "proliferation" refers to an increase in cell division, either symmetric or asymmetric division of cells. In some embodiments, "proliferation" refers to the symmetric or asymmetric division of T cells. In some embodiments, "proliferation" refers to the symmetric or asymmetric division of NK cells. "Increased proliferation" occurs when there is an increase in the number of cells in a treated sample compared to cells in a non-treated sample.

The term "engineered Autologous Cell Therapy," which can be abbreviated as "eACT™," also known as adoptive cell transfer, is a process by which a patient's own T cells are collected and subsequently genetically altered to recognize and target one or more antigens expressed on the cell surface of one or more specific tumor cells or malignancies. T cells can be engineered to express, for example, chimeric antigen receptors (CAR) or T cell receptor (TCR). CAR positive (+) T cells are engineered to express an extracellular single chain variable fragment (scFv) with specificity for a particular tumor antigen linked to an intracellular signaling part comprising at least one costimulatory domain and at least one activating domain. The costimulatory domain can be derived from a naturally-occurring costimulatory domain, or a variant thereof, e.g., a variant having a truncated hinge domain ("THD"), and the activating domain can be derived from, e.g., CD3-zeta. In certain embodiments, the CAR is designed to have two, three, four, or more costimulatory domains. In some embodiments, the CAR is engineered such that the costimulatory domain is expressed as a separate polypeptide chain. Example CAR T cell therapies and constructs are described in U.S. Patent Publication Nos. 2013/0287748, 2014/0227237, 2014/0099309, and 2014/0050708, and these references are incorporated by reference in their entirety. "Adoptive cell therapy" or "ACT" involves transfer of immune cells with anti-tumor activity into a subject, e.g., a cancer patient. In some embodiments, ACT is a treatment approach that involves the use of lymphocytes (e.g., engineered lymphocytes) with anti-tumor activity.

The term "in vitro" refers to events occurring in an artificial environment, e.g., in a test tube, reaction vessel, cell culture, etc., rather than within a multi-cellular organism. The term "in vitro cell" refers to any cell which is cultured ex vivo. In particular, an in vitro cell can include a T cell. The term "in vivo" refers to events that occur within a multi-cellular organism, such as a human or a non-human animal.

"Antigen presenting cell" or "APC" refers to cells that process and present antigens to T-cells. Exemplary APCs comprise dendritic cells, macrophages, B cells, certain activated epithelial cells, and other cell types capable of TCR stimulation and appropriate T cell costimulation.

"Stimulation," as used herein, refers to a primary response induced by binding of a stimulatory molecule with its cognate ligand, wherein the binding mediates a signal transduction event. A "stimulatory molecule" is a molecule on a T cell, e.g., the T cell receptor (TCR)/CD3 complex, that specifically binds with a cognate stimulatory ligand present on an antigen present cell. A "stimulatory ligand" is a ligand that when present on an antigen presenting cell (e.g., an APC, a dendritic cell, a B-cell, and the like) can specifically bind with a stimulatory molecule on a T cell, thereby mediating a primary response by the T cell, including, but not limited to, activation, initiation of an immune response, proliferation, and the like. Stimulatory ligands include, but are not limited to, an anti-CD3 antibody (such as OKT3), an MHC Class I molecule loaded with a peptide, a superagonist anti-CD2 antibody, and a superagonist anti-CD28 antibody.

A "costimulatory signal," as used herein, refers to a signal, which in combination with a primary signal, such as TCR/CD3 ligation, leads to a T cell response, such as, but not limited to, proliferation and/or upregulation or down regulation of key molecules.

A "costimulatory ligand" as used herein, includes a molecule on an antigen presenting cell that specifically binds a cognate co-stimulatory molecule on a T cell. Binding of the costimulatory ligand provides a signal that mediates a T cell response, including, but not limited to, proliferation, activation, differentiation, and the like. A costimulatory ligand induces a signal that is in addition to the primary signal provided by a stimulatory molecule, for instance, by binding of a T cell receptor (TCR)/CD3 complex with a major histocompatibility complex (MHC) molecule loaded with peptide. A co-stimulatory ligand can include, but is not limited to, 3/TR6, 4-1BB ligand, agonist or antibody that binds Toll ligand receptor, B7-1 (CD80), B7-2 (CD86), CD30 ligand, CD40, CD7, CD70, CD83, herpes virus entry mediator (HVEM), human leukocyte antigen G (HLA-G), ILT4, immunoglobulin-like transcript (ILT) 3, inducible costimulatory ligand (ICOS-L), intercellular adhesion molecule (ICAM), ligand that specifically binds with B7-H3, lymphotoxin beta receptor, MHC class I chain-related protein A (MICA), MHC class I chain-related protein B (MICB), OX40 ligand, PD-L2, or programmed death (PD) L1. A co-stimulatory ligand includes, without limitation, an antibody that specifically binds with a co-stimulatory molecule present on a T cell, such as, but not limited to, 4-1BB, B7-H3, CD2, CD27, CD28, CD30, CD40, CD7, ICOS, ligand that specifically binds with CD83, lymphocyte function-associated antigen-1 (LFA-1), natural killer cell receptor C (NKG2C), OX40, PD-1, or tumor necrosis factor superfamily member 14 (TNFSF14 or LIGHT).

A "costimulatory molecule" is a cognate binding partner on a T cell that specifically binds with a costimulatory ligand, thereby mediating a costimulatory response by the T cell, such as, but not limited to, proliferation. Costimulatory molecules include, but are not limited to, 4-1BB/CD137, B7-H3, BAFFR, BLAME (SLAMF8), BTLA, CD 33, CD 45, CD100 (SEMA4D), CD103, CD134, CD137, CD154, CD16, CD160 (BY55), CD18, CD19, CD19a, CD2, CD22, CD247, CD27, CD276 (B7-H3), CD28, CD29, CD3 (alpha; beta; delta; epsilon; gamma; zeta), CD30, CD37, CD4, CD4, CD40, CD49a, CD49D, CD49f, CD5, CD64, CD69, CD7, CD80, CD83 ligand, CD84, CD86, CD8alpha, CD8beta, CD9, CD96 (Tactile), CD1-1a, CD1-1b, CD1-1c, CD1-1d, CDS, CEACAM1, CRT AM, DAP-10, DNAM1 (CD226), Fe gamma receptor, GADS, GITR, HVEM (LIGHTR), IA4, ICAM-1, ICAM-1, ICOS, Ig alpha (CD79a), IL2R beta, IL2R gamma, IL7R alpha, integrin, ITGA4, ITGA4, ITGA6, ITGAD, ITGAE, ITGAL, ITGAM, ITGAX, ITGB2, ITGB7, ITGB1, KIRDS2, LAT, LFA-1, LIGHT (tumor necrosis factor superfamily member 14; TNFSF14), LTBR, Ly9 (CD229), lymphocyte function-associated antigen-1 (LFA-1 (CD11a/CD18), MHC class I molecule, NKG2C, NKG2D, NKp30, NKp44, NKp46, NKp80 (KLRF1), OX40, PAG/Cbp, PD-1, PSGL1, SELPLG (CD162), signaling lymphocytic activation molecule, SLAM (SLAMF1; CD150; IPO-3), SLAMF4 (CD244; 2B4), SLAMF6 (NTB-A; Lyl08), SLAMF7, SLP-76, TNF, TNFr, TNFR2, Toll ligand receptor, TRANCE/RANKL, VLA1, or VLA-6, or fragments, truncations, or combinations thereof.

The terms "modulate", "improve," "increase," "inhibit," and "reduce" indicate a change in values that are relative to a baseline or other reference measurement. In some embodiments, an appropriate reference measurement may comprise a measurement in certain system (e.g., in a single individual) under otherwise comparable conditions absent presence of (e.g., prior to and/or after) an agent or treatment, or in presence of an appropriate comparable reference agent. In some embodiments, an appropriate reference measurement may comprise a measurement in comparable system known or expected to respond in a comparable way, in presence of the relevant agent or treatment. Exemplary modulations include at least about 1%, about 2%, about 5%, about 10%, about 25%, about 50%, about 75%, or about 100% change.

The term "substantially" refers to a quantity, level, value, number, frequency, percentage, dimension, size, amount, weight or length that is 80%, 85%, 90%, 91%, 92%, 93%, 94%, 95%, 96%, 97%, 98%, 99% or higher of a reference quantity, level, value, number, frequency, percentage, dimension, size, amount, weight or length. In one embodiment, "substantially the same" refers to a quantity, level, value, number, frequency, percentage, dimension, size, amount, weight or length that produces an effect, e.g., a physiological effect, that is approximately the same as a reference quantity, level, value, number, frequency, percentage, dimension, size, amount, weight or length.

"Treatment" or "treating" of a subject refers to any type of intervention or process performed on, or the administration of an active agent to, the subject with the objective of reversing, alleviating, ameliorating, inhibiting, slowing down or preventing the onset, progression, development, severity or recurrence of a symptom, complication or condition, or biochemical indicia associated with a disease. In one embodiment, "treatment" or "treating" includes a partial remission. In another embodiment, "treatment" or "treating" includes a complete remission. In some embodiments, treatment may be of a subject who does not exhibit signs of the relevant disease, disorder and/or condition and/or of a subject who exhibits only early signs of the disease, disorder, and/or condition. In some embodiments, such treatment may be of a subject who exhibits one or more established signs of the relevant disease, disorder and/or condition. In some embodiments, treatment may be of a subject who has been diagnosed as suffering from the relevant disease, disorder, and/or condition. In some embodiments, treatment may be of a subject known to have one or more susceptibility factors that are statistically correlated with increased risk of development of the relevant disease, disorder, and/or condition.

The term "agent" may refer to a molecule or entity of any class comprising, or a plurality of molecules or entities, any of which may be, for example, a polypeptide, nucleic acid, saccharide, lipid, small molecule, metal, cell, or organism (for example, a fraction or extract thereof) or component thereof. In some embodiments, an agent may be utilized in isolated or pure form. In some embodiments, an agent may be utilized in a crude or impure form. In some embodiments, an agent may be provided as a population, collection, or library, for example that may be screened to identify or characterize members present therein.

Two events or entities are "associated" with one another if the presence, level, and/or form of one is correlated with that of the other. For example, an entity (e.g., polypeptide, genetic signature, metabolite, microbe, etc.) is considered to be associated with a disease, disorder, or condition, if its presence, level, and/or form correlates with incidence of and/or susceptibility to the disease, disorder, or condition (e.g., across a relevant population). For example, two or more entities are physically "associated" with one another if they interact, directly or indirectly, so that they are and/or remain in physical proximity with one another (e.g., bind). In additional examples, two or more entities that are physically associated with one another are covalently linked or connected to one another, or non-covalently associated, for example by means of hydrogen bonds, van der Waals interaction, hydrophobic interactions, magnetism, and combinations thereof.

The term "immunocompromised" as used herein refers to a subject who has an immunodeficiency. The subject is very vulnerable to opportunistic infections, infections caused by organisms that usually do not cause disease in a person with a healthy immune system, but can affect people with a poorly functioning or suppressed immune system.

By "secreted" is meant a polypeptide that is released from a cell via the secretory pathway through the endoplasmic reticulum, Golgi apparatus, and as a vesicle that transiently fuses at the cell plasma membrane, releasing the proteins outside of the cell.

By "signal sequence" is meant a peptide sequence generally present at the N-terminus of newly synthesized proteins that directs their entry into the secretory pathway.

By "membrane-bound IL-18", it is meant an IL-18 polypeptide that has a signal sequence that when expressed directs the IL-18 polypeptide to the cellular membrane. The membrane-bound IL-18 polypeptide is further tethered to the cellular membrane (and not secreted) by linking to a membrane bound protein, such as IL-18 receptor subunit.

The term "persistence" refers to the ability of, e.g., one or more transplanted immune cells administered to a subject or their progenies (e.g., NK cells or differentiated or matured T cells) to remain in the subject at a detectable level for a period of time. As used herein, increasing the persistence of one or more transplanted immune cells or their progenies (e.g., NK cells or differentiated or matured T cells) refers to increasing the amount of time the transplanted immune cells are detectable in a subject after administration. For example, the in vivo persistence of one or more transplanted immune cells may be increased by at least about at least about 1 day, at least about 2 days, at least about 3 days, at least about 4 days, at least about 5 days, at least about 6 days, at least about 7 days, at least about 8 days, at least about 9 days, at least about 10 days, at least about 11 days, at least about 12 days, at least about 13 days, at least about 14 days, at least about 3 weeks, at least about 4 weeks, at least about 1 month, at least about 2 months, at least about 3 months, at least about 4 months, at least about 5 months, or at least about 6 months. In addition, the in vivo persistence of one or more transplanted immune cells may be increased by at least about 1.5-fold, at least about 2-fold, at least about 2.5-fold, at least about 3-fold, at least about 3.5-fold, at least about 4-fold, at least about 4.5-fold, at least about 5-fold, at least about 6-fold, at least about 7-fold, at least about 8-fold, at least about 9-fold, or at least about 10-fold compared to the one or more transplanted immune cells that were not prepared by the present methods disclosed herein.

The term "identity" refers to the overall relatedness between polymeric molecules, e.g., between nucleic acid molecules (e.g., DNA molecules and/or RNA molecules) and/or between polypeptide molecules. Methods for the calculation of a percent identity as between two provided polypeptide sequences are known. Calculation of the percent identity of two nucleic acid or polypeptide sequences, for example, may be performed by aligning the two sequences for optimal comparison purposes (e.g., gaps may be introduced in one or both of a first and a second sequences for optimal alignment and non-identical sequences may be disregarded for comparison purposes). The nucleotides or amino acids at corresponding positions are then compared. When a position in the first sequence is occupied by the same residue (e.g., nucleotide or amino acid) as the corresponding position in the second sequence, then the molecules are identical at that position. The percent identity between the two sequences is a function of the number of identical positions shared by the sequences, optionally taking into account the number of gaps, and the length of each gap, which may need to be introduced for optimal alignment of the two sequences. Comparison or alignment of sequences and determination of percent identity between two sequences may be accomplished using a mathematical algorithm, such as BLAST (basic local alignment search tool). In some embodiments, polymeric molecules are considered to be "homologous" to one another if their sequences are at least 25%, 30%, 35%, 40%, 45%, 50%, 55%, 60%, 65%, 70%, 75%, 80%, 85%, 90%, 95%, or 99% identical (e.g., 85-90%, 85-95%, 85-100%, 90-95%, 90-100%, or 95-100%).

To calculate percent identity, the sequences being compared are typically aligned in a way that gives the largest match between the sequences. One example of a computer program that can be used to determine percent identity is the GCG program package, which includes GAP (Devereux et al., 1984, *Nucl. Acid Res.* 12:387; Genetics Computer Group, University of Wisconsin, Madison, Wis.). The computer algorithm GAP is used to align the two polypeptides or polynucleotides for which the percent sequence identity is to be determined. The sequences are aligned for optimal matching of their respective amino acid or nucleotide (the "matched span," as determined by the algorithm). In certain embodiments, a standard comparison matrix (see, Dayhoff et al., 1978, Atlas of Protein Sequence and Structure 5:345-352 for the PAM 250 comparison matrix; Henikoff et al., 1992, *Proc. Natl. Acad. Sci. U.S.A.* 89:10915-10919 for the BLOSUM 62 comparison matrix) is also used by the algorithm. Other algorithms are also available for comparison of amino acid or nucleic acid sequences, comprising those available in commercial computer programs such as BLASTN for nucleotide sequences and BLASTP, gapped BLAST, and PSI-BLAST for amino acid sequences. Exemplary programs are described in Altschul, et al., Basic local alignment search tool, J. Mol. Biol., 215(3): 403-410, 1990; Altschul, et al., Methods in Enzymology; Altschul, et al., "Gapped BLAST and PSI-BLAST: a new generation of protein database search programs," Nucleic Acids Res. 25:3389-3402, 1997; Baxevanis, et al., Bioinformatics: A Practical Guide to the Analysis of Genes and Proteins, Wiley, 1998; and Misener, et al., (eds.), Bioinformatics Methods and Protocols (Methods in Molecular Biology, Vol. 132), Humana Press, 1999. In addition to identifying similar sequences, the programs mentioned above generally provide an indication of the degree of similarity. In some embodiments, two sequences are considered to be substantially similar if at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, at least 99% or more of their corresponding residues are similar and/or identical over a relevant stretch of residues (e.g., 85-90%, 85-95%, 85-100%, 90-95%, 90-100%, or 95-100%). In some embodiments, the relevant stretch is a complete sequence. In some embodiments, the relevant stretch is at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, at least 100, at least 125, at least 150, at least 175, at least 200, at least 225, at least 250, at least 275, at least 300, at least 325, at least 350, at least 375, at least 400, at least 425, at least 450, at least 475, at least 500 or more residues. Sequences with substantial sequence similarity may be homologs of one another.

"Corresponding to" may be used to designate the position/identity of a structural element in a molecule or composition through comparison with an appropriate reference molecule or composition. For example, in some embodiments, a monomeric residue in a polymer (e.g., an amino acid residue in a polypeptide or a nucleic acid residue in a polynucleotide) may be identified as "corresponding to" a residue in an appropriate reference polymer. For example, for purposes of simplicity, residues in a polypeptide may be designated using a canonical numbering system based on a reference related polypeptide, so that an amino acid "corresponding to" a residue at position 100, for example, need not actually be the 100th amino acid in an amino acid chain provided it corresponds to the residue found at position 100 in the reference polypeptide. Various sequence alignment strategies are available, comprising software programs such as, for example, BLAST, CS-BLAST, CUDASW++, DIAMOND, FASTA, GGSEARCH/GLSEARCH, Genoogle, HMMER, HHpred/HHsearch, IDF, Infernal, KLAST, USEARCH, parasail, PSI-BLAST, PSI-Search, ScalaBLAST, Sequilab, SAM, SSEARCH, SWAPHI, SWAPHI-LS, SWIMM, or SWIPE that may be utilized, for example, to identify "corresponding" residues in polypeptides and/or nucleic acids in accordance with the present disclosure.

"Combination therapy" refers to those situations in which a subject is simultaneously exposed to two or more therapeutic regimens (e.g., two or more therapeutic moieties). In some embodiments, the two or more regimens may be administered simultaneously; in some embodiments, such regimens may be administered sequentially (e.g., all "doses" of a first regimen are administered prior to administration of any doses of a second regimen); in some embodiments, such agents are administered in overlapping dosing regimens. In some embodiments, "administration" of combination therapy may involve administration of one or more agent(s) or modality(ies) to a subject receiving the other agent(s) or modality(ies) in the combination. For clarity, combination therapy does not require that individual agents be administered together in a single composition (or even necessarily at the same time), although in some embodiments, two or more agents, or active moieties thereof, may be administered together in a combination composition, or even in a combination compound (e.g., as part of a single chemical complex or covalent entity).

The term "domain" refers to a portion of an entity. In some embodiments, a "domain" is associated with a structural and/or functional feature of the entity, e.g., so that, when the domain is physically separated from the rest of its parent entity, it substantially or entirely retains the structural and/or functional feature. In some embodiments, a domain may comprise a portion of an entity that, when separated from that (parent) entity and linked or connected with a different (recipient) entity, substantially retains and/or imparts on the recipient entity one or more structural and/or functional features, e.g., that characterized it in the parent entity. In some embodiments, a domain is a portion of a molecule (e.g., a small molecule, carbohydrate, lipid, nucleic acid, or polypeptide). In some embodiments, a domain is a section of a polypeptide; in some such embodiments, a domain is characterized by a structural element (e.g., an amino acid sequence or sequence motif, α-helix character, β-sheet character, coiled-coil character, random coil character, etc.), and/or by a functional feature (e.g., binding activity, enzymatic activity, folding activity, signaling activity, etc.).

The term "dosage form" may be used to refer to a physically discrete unit of an active agent (e.g., an antigen binding system or antibody) for administration to a subject. Generally, each such unit contains a predetermined quantity of active agent. In some embodiments, such quantity is a unit dosage amount (or a whole fraction thereof) appropriate for administration in accordance with a dosing regimen that has been determined to correlate with a desired or beneficial outcome when administered to a relevant population. The total amount of a therapeutic composition or agent administered to a subject is determined by one or more medical practitioners and may involve administration of more than one dosage forms.

The term "dosing regimen" may be used to refer to a set of one or more unit doses that are administered individually to a subject. In some embodiments, a given therapeutic agent has a recommended dosing regimen, which may involve one or more doses. In some embodiments, a dosing regimen comprises a plurality of doses each of which is separated in time from other doses. In some embodiments, a dosing regimen comprises a plurality of doses and consecutive doses are separated from one another by time periods of equal length; in some embodiments, a dosing regimen comprises a plurality of doses and consecutive doses are separated from one another by time periods of at least two different lengths. In some embodiments, all doses within a dosing regimen are of the same unit dose amount. In some embodiments, different doses within a dosing regimen are of different amounts. In some embodiments, a dosing regimen comprises a first dose in a first dose amount, followed by one or more additional doses in a second dose amount different from the first dose amount. In some embodiments, a dosing regimen is periodically adjusted to achieve a desired or beneficial outcome.

"Effector function" refers to a biological result of interaction of an antibody Fc region with an Fc receptor or ligand. Effector functions comprise, without limitation, antibody-dependent cell-mediated cytotoxicity (ADCC), antibody-dependent cell-mediated phagocytosis (ADCP), and complement-mediated cytotoxicity (CMC). An effector function may be antigen binding dependent, antigen binding independent, or both. ADCC refers to lysis of antibody-bound target cells by immune effector cells. Without wishing to be bound by any theory, ADCC is generally understood to involve Fc receptor (FcR)-bearing effector cells recognizing and subsequently killing antibody-coated target cells (e.g., cells that express on their surface antigens to which an antibody is bound). Effector cells that mediate ADCC may comprise immune cells, comprising yet not limited to, one or more of natural killer (NK) cells, macrophages, neutrophils, eosinophils.

The term "excipient" refers to an agent that may be comprised in a composition, for example to provide or contribute to a desired consistency or stabilizing effect. In some embodiments, a suitable excipient may comprise, for example, starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol, or the like.

A "fragment" or "portion" of a material or entity as described herein has a structure that comprises a discrete portion of the whole, e.g., of a physical entity or abstract entity. In some embodiments, a fragment lacks one or more moieties found in the whole. In some embodiments, a fragment consists of or comprises a characteristic structural element, domain or moiety found in the whole. In some embodiments, a polymer fragment comprises or consists of at least 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 275, 300, 325, 350, 375, 400, 425, 450, 475, 500 or more monomeric units (e.g., residues) as found in the whole polymer. In some embodiments, a polymer fragment comprises or consists of at least about 5%, 10%, 15%, 20%, 25%, 30%, 25%, 40%, 45%, 50%, 55%, 60%, 65%, 70%, 75%, 80%, 85%, 90%, 95%, 96%, 97%, 98%, 99% or more of the monomeric units (e.g., residues) found in the whole polymer (e.g., 85-90%, 85-95%, 85-100%, 90-95%, 90-100%, or 95-100%). The whole material or entity may in some embodiments be referred to as the "parent" of the fragment.

The term "fusion polypeptide" or "fusion protein" generally refers to a polypeptide comprising at least two segments. Generally, a polypeptide containing at least two such segments is considered to be a fusion polypeptide if the two segments are moieties that (1) are not comprised in nature in the same peptide, and/or (2) have not previously been linked or connected to one another in a single polypeptide, and/or (3) have been linked or connected to one another through action of the hand of man.

The term "gene product" or "expression product" generally refers to an RNA transcribed from the gene (pre- and/or post-processing) or a polypeptide (pre- and/or post-modification) encoded by an RNA transcribed from the gene.

The term "isolated" refers to a substance that (1) has been separated from at least some components with which it was associated at an earlier time or with which the substance would otherwise be associated, and/or (2) is present in a composition that comprises a limited or defined amount or concentration of one or more known or unknown contaminants. An isolated substance, in some embodiments, may be separated from about 10%, about 20%, about 30%, about 40%, about 50%, about 60%, about 70%, about 80%, about 90%, about 91%, about 92%, about 93%, about 94%, about 95%, about 96%, about 97%, about 98%, about 99%, or more than about 99% (e.g., 85-90%, 85-95%, 85-100%, 90-95%, 90-100%, or 95-100%) of other non-substance components with which the substance was associated at an earlier time, e.g., other components or contaminants with which the substance was previously or otherwise would be associated. In certain instances, a substance is isolated if it is present in a composition that comprises a limited or reduced amount or concentration of molecules of a same or similar type. For instance, in certain instances, a nucleic acid, DNA, or RNA substance is isolated if it is present in a composition that comprises a limited or reduced amount or concentration of non-substance nucleic acid, DNA, or RNA molecules. For instance, in certain instances, a polypeptide substance is isolated if it is present in a composition that comprises a limited or reduced amount or concentration of non-substance polypeptide molecules. In certain embodiments, an amount may be, e.g., an amount measured relative to the amount of a desired substance present in a composition. In certain embodiments, a limited amount may be an amount that is no more than 100% of the amount of substance in a composition, e.g., no more than 1%, 5%, 10%, 20%, 30%, 40%, 50%, 60%, 70%, 80%, 90%, or 95% of the amount of substance in a composition (e.g., 85-90%, 85-95%, 85-100%, 90-95%, 90-100%, or 95-100%). In certain instances, a composition is pure or substantially pure with respect to a selected substance. In some embodiments, an isolated substance is about 80%, about 85%, about 90%, about 91%, about 92%, about 93%, about 94%, about 95%, about 96%, about 97%, about 98%, about 99%, or more than about 99% pure (e.g., 85-90%, 85-95%, 85-100%, 90-95%, 90-100%, or 95-100%). A substance is "pure" if it is substantially free of other components or of contaminants. In some embodiments, a substance may still be considered "isolated" or even "pure," after having been combined with certain other components such as, for example, one or more carriers or excipients (e.g., buffer, solvent, water, etc.); in such embodiments, percent isolation or purity of the substance is calculated without comprising such carriers or excipients.

"Nucleic acid" refers to any polymeric chain of nucleotides. A nucleic acid may be DNA, RNA, or a combination thereof. In some embodiments, a nucleic acid comprises one or more natural nucleic acid residues. In some embodiments, a nucleic acid comprises of one or more nucleic acid analogs. In some embodiments, nucleic acids are prepared by one or more of isolation from a natural source, enzymatic synthesis by polymerization based on a complementary template (in vivo or in vitro), reproduction in a recombinant cell or system, and chemical synthesis. In some embodiments, a nucleic acid is at least 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 20, 225, 250, 275, 300, 325, 350, 375, 400, 425, 450, 475, 500, 600, 700, 800, 900, 1000, 1500, 2000, 2500, 3000, 3500, 4000, 4500, 5000 or more residues long (e.g., 20 to 100, 20 to 500, 20 to 1000, 20 to 2000, or 20 to 5000 or more residues). In some embodiments, a nucleic acid is partly or wholly single stranded; in some embodiments, a nucleic acid is partly or wholly double stranded. In some embodiments a nucleic acid has a nucleotide sequence comprising at least one element that encodes, or is the complement of a sequence that encodes, a polypeptide.

The present disclosure contemplates nucleic acids having at least 75% sequence identity to (such as, at least 75%, at least 80%, at least 90%, at least 95%, or 100% identity; e.g., 85-90%, 85-95%, 85-100%, 90-95%, 90-100%, or 95-100%) any and all of the nucleic acids described herein.

"Operably linked" refers to a juxtaposition where the components described are in a relationship permitting them to function in their intended manner. For example, a control element "operably linked" to a functional element is associated in such a way that expression and/or activity of the functional element is achieved under conditions compatible with the control element.

The term "pharmaceutically acceptable" refers to a molecule or composition that, when administered to a recipient, is not deleterious to the recipient thereof, or that any deleterious effect is outweighed by a benefit to the recipient thereof. With respect to a carrier, diluent, or excipient used to formulate a composition as disclosed herein, a pharmaceutically acceptable carrier, diluent, or excipient must be compatible with the other ingredients of the composition and not deleterious to the recipient thereof, or any deleterious effect must be outweighed by a benefit to the recipient. The term "pharmaceutically acceptable carrier" means a pharmaceutically-acceptable material, composition or vehicle, such as a liquid or solid filler, diluent, excipient, or solvent encapsulating material, involved in carrying or transporting an agent from one portion of the body to another (e.g., from one organ to another). Each carrier present in a pharmaceutical composition must be "acceptable" in the sense of being compatible with the other ingredients of the formulation and not deleterious to the patient, or any deleterious effect must be outweighed by a benefit to the recipient. Some examples of materials which may serve as pharmaceutically acceptable carriers comprise: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; pH buffered solutions; polyesters, polycarbonates and/or polyanhydrides; and other non-toxic compatible substances employed in pharmaceutical formulations.

The term "pharmaceutical composition" refers to a composition in which an active agent is formulated together with one or more pharmaceutically acceptable carriers. In some embodiments, the active agent is present in a unit dose amount appropriate for administration in a therapeutic regimen that shows a statistically significant probability of achieving a predetermined therapeutic effect when administered to a relevant subject or population. In some embodiments, a pharmaceutical composition may be formulated for administration in solid or liquid form, comprising, without limitation, a form adapted for the following: oral administration, for example, drenches (aqueous or non-aqueous solutions or suspensions), tablets, e.g., those targeted for buccal, sublingual, and systemic absorption, boluses, powders, granules, pastes for application to the tongue; parenteral administration, for example, by subcutaneous, intramuscular, intravenous or epidural injection as, for example, a sterile solution or suspension, or sustained-release formulation; topical application, for example, as a cream, ointment, or a controlled-release patch or spray applied to the skin, lungs, or oral cavity; intravaginally or intrarectally, for example, as a pessary, cream, or foam; sublingually; ocularly; transdermally; or nasally, pulmonary, and to other mucosal surfaces. The term "reference" describes a standard or control relative to which a comparison is performed. For example, in some embodiments, an agent, animal, individual, population, sample, sequence, or value of interest is compared with a reference or control that is an agent, animal, individual, population, sample, sequence, or value. In some embodiments, a reference or control is tested, measured, and/or determined substantially simultaneously with the testing, measuring, or determination of interest. In some embodiments, a reference or control is a historical reference or control, optionally embodied in a tangible medium. Generally, a reference or control is determined or characterized under comparable conditions or circumstances to those under assessment. When sufficient similarities are present to justify reliance on and/or comparison to a selected reference or control.

"Regulatory T cells" ("Treg", "Treg cells", or "Tregs") refer to a lineage of CD4+ T lymphocytes that participate in controlling certain immune activities, e.g., autoimmunity, allergy, and response to infection. Regulatory T cells may regulate the activities of T cell populations, and may also influence certain innate immune system cell types. Tregs may be identified by the expression of the biomarkers CD4, CD25 and Foxp3, and low expression of CD127. Naturally occurring Treg cells normally constitute about 5-10% of the peripheral CD4+ T lymphocytes. However, Treg cells within a tumor microenvironment (i.e. tumor-infiltrating Treg cells), Treg cells may make up as much as 20-30% of the total CD4+ T lymphocyte population.

The term "sample" generally refers to an aliquot of material obtained or derived from a source of interest. In some embodiments, a source of interest is a biological or environmental source. In some embodiments, a source of interest may comprise a cell or an organism, such as a cell population, tissue, or animal (e.g., a human). In some embodiments, a source of interest comprises biological tissue or fluid. In some embodiments, a biological tissue or fluid may comprise amniotic fluid, aqueous humor, ascites, bile, bone marrow, blood, breast milk, cerebrospinal fluid, cerumen, chyle, chime, ejaculate, endolymph, exudate, feces, gastric acid, gastric juice, lymph, mucus, pericardial fluid, perilymph, peritoneal fluid, pleural fluid, pus, rheum, saliva, sebum, semen, serum, smegma, sputum, synovial fluid, sweat, tears, urine, vaginal secretions, vitreous humour, vomit, and/or combinations or component(s) thereof. In some embodiments, a biological fluid may comprise an intracellular fluid, an extracellular fluid, an intravascular fluid (blood plasma), an interstitial fluid, a lymphatic fluid, and/or a transcellular fluid. In some embodiments, a biological fluid may comprise a plant exudate. In some embodiments, a biological tissue or sample may be obtained, for example, by aspirate, biopsy (e.g., fine needle or tissue biopsy), swab (e.g., oral, nasal, skin, or vaginal swab), scraping, surgery, washing or lavage (e.g., brocheoalvealar, ductal, nasal, ocular, oral, uterine, vaginal, or other washing or lavage). In some embodiments, a biological sample comprises cells obtained from an individual. In some embodiments, a sample is a "primary sample" obtained directly from a source of interest by any appropriate means. In some embodiments, as will be clear from context, the term "sample" refers to a preparation that is obtained by processing (e.g., by removing one or more components of and/or by adding one or more agents to) a primary sample. Such a "processed sample" may comprise, for example nucleic acids or proteins extracted from a sample or obtained by subjecting a primary sample to one or more techniques such as amplification or reverse transcription of nucleic acid, isolation and/or purification of certain components, etc.

The phrase "therapeutic agent" may refer to any agent that elicits a desired pharmacological effect when administered to an organism. In some embodiments, an agent is considered to be a therapeutic agent if it demonstrates a statistically significant effect across an appropriate population. In some embodiments, the appropriate population may be a population of model organisms or human subjects. In some embodiments, an appropriate population may be defined by various criteria, such as a certain age group, gender, genetic background, preexisting clinical conditions, in accordance with presence or absence of a biomarker, etc. In some embodiments, a therapeutic agent is a substance that may be used to alleviate, ameliorate, relieve, inhibit, prevent, delay onset of, reduce severity of, and/or reduce incidence of one or more symptoms or features of a disease, disorder, and/or condition. In some embodiments, a therapeutic agent is an agent that has been or is required to be approved by a government agency before it may be marketed for administration to humans. In some embodiments, a therapeutic agent is an agent for which a medical prescription is required for administration to humans.

Unless defined otherwise, all technical and scientific terms used herein have the same meaning as commonly understood by one of ordinary skill in the art to which this disclosure is related. For example, Juo, "The Concise Dictionary of Biomedicine and Molecular Biology", 2nd ed., (2001), CRC Press; "The Dictionary of Cell & Molecular Biology", 5th ed., (2013), Academic Press; and "The Oxford Dictionary Of Biochemistry And Molecular Biology", Cammack et al. eds., 2nd ed, (2006), Oxford University Press, provide those of skill in the art with a general dictionary for many of the terms used in this disclosure.

The disclosure may employ, unless indicated specifically to the contrary, methods of chemistry, biochemistry, organic chemistry, molecular biology, microbiology, recombinant DNA techniques, genetics, immunology, and cell biology that are within the skill of the art, many of which are described below for the purpose of illustration. Such techniques are explained fully in the literature. See, e.g., Sambrook, et al., *Molecular Cloning: A Laboratory Manual* (3rd Edition, 2001); Maniatis et al., *Molecular Cloning: A Laboratory Manual* (1982); Ausubel et al., *Current Protocols in Molecular Biology* (John Wiley and Sons, updated July 2008); *Short Protocols in Molecular Biology: A Compendium of Methods from Current Protocols in Molecular Biology*, Greene Pub. Associates and Wiley-Interscience; Glover, DNA Cloning: A PracticalApproach, vol. I & II (IRL Press, Oxford, 1985); Anand, *Techniques for the Analysis of Complex Genomes*, (Academic Press, New York, 1992); *Transcription and Translation* (B. Hames & S. Higgins, Eds., 1984); Perbal, *A Practical Guide to Molecular Cloning* (1984); *Harlow and Lane, Antibodies*, (Cold Spring Harbor Laboratory Press, Cold Spring Harbor, N.Y., 1998) *Current Protocols in Immunology Q*. E. Coligan, A. M. Kruisbeek, D. H. Margulies, E. M. Shevach and W. Strober, eds., 1991); *Annual Review of Immunology*; as well as monographs in journals such as Advances in Immunology.

In one aspect, the disclosure provides a polypeptide comprising a signal peptide, interleukin-18 (IL-18) and an interleukin-18 receptor (IL-18R) subunit. Such a polypeptide, when expressed from its corresponding nucleic acid, is believed to be directed to the cell membrane by virtue of its signal sequence. After the signal sequence is cleaved off, the remaining polypeptide is believe to be membrane-bound by virtue of the IL-18R subunit.

Interleukin 18 (also known as IFN-γ-inducing factor (IGIF), IL-1γ and IL1F4) is a pro-inflammatory cytokine that increases immune activity of certain immunoresponsive cells. IL-18 is produced by macrophages, T cells and other cells. IL-18 functions by binding to the interleukin-18 receptor, increasing MyD88 signaling which drives a proinflammatory response through NF-κB and AP-1. Together with other cytokines, such as IL-12, IL-18 can induce cell-mediated immunity. After stimulation with IL-18, endogenous natural killer (NK) cells, certain T cells, and APCs release other cytokines, such as interferon-γ (IFN-γ), IL-2 and TNF-α, which can further activate other types of immunoresponsive cells.

As used herein, unless expressly stated otherwise, the term "IL-18" refers to the mature form of IL-18 (i.e., without a signal peptide). The protein product of IL-18 can have any amino acid sequence known in the art, for example as available in the NCBI Gene database at Gene ID: 3606, updated on 9 Aug. 2020, which is specifically incorporated herein be reference. In one embodiment, IL-18 has the amino acid sequence corresponding to NCBI Reference Sequence Nos. NP_001553.1 (isoform 1) or NP_001230140.1 (isoform 2), lacking the signal sequence (i.e., the mature form thereof). These isoforms are encoded by the nucleotide sequences corresponding to NCBI Reference Sequence Nos. NM-001562.4 and NM_001243211.2, respectively.

In certain embodiments, a IL-18 polypeptide refers to a polypeptide which has at least 75% sequence identity (such as, at least 75%, at least 80%, at least 90%, at least 95%, or 100% identity; e.g., 85-90%, 85-95%, 85-100%, 90-95%, 90-100%, or 95-100%) to the mature form of IL-18, or a fragment thereof that has activity similar to a full-length mature form.

In one embodiment, a nucleotide sequence encoding for wild-type human IL-18 isoform 2 having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 1. This sequence is a codon-optimized sequence.

```
                                        [SEQ ID NO: 1]
ATGGCCGCTGAGCCCGTGGAAGATAACTGCATCAACTTCGTCGCCATGA

AGTTCATCGACAACACCCTGTACTTTATCGCCGAGGACGACGAGAACCT

GGAAAGCGACTACTTCGGCAAGCTGGAAAGCAAGCTGAGCGTGATCCGG

AACCTGAACGACCAGGTGCTGTTCATCGATCAGGGCAACAGACCCCTGT

TCGAGGACATGACCGACAGCGACTGCAGAGACAACGCCCCTCGGACCAT

CTTCATCATCAGCATGTACAAGGACAGCCAGCCTAGAGGCATGGCCGTG

ACCATCTCTGTGAAGTGCGAGAAGATCAGCACCCTGAGCTGCGAGAACA

AGATCATCAGCTTCAAAGAGATGAACCCGCCGGACAACATCAAGGACAC

CAAGAGCGACATCATATTCTTCCAGCGGAGCGTGCCCGGCCACGACAAC

AAGATGCAGTTTGAGAGCAGCAGCTACGAGGGCTACTTCCTGGCCTGCG

AGAAAGAGCGGGACCTGTTCAAGCTGATCCTGAAGAAAGAGGACGAACT

GGGCGACCGCAGCATCATGTTCACCGTGCAGAACGAGGAC
```

Another embodiment described herein is an amino acid sequence of IL-18 isoform 2 with its native signal sequence, having at least 75% sequence identity to (such as, at least 75%, at least 80%, at least 90%, at least 95%, or 100% identity; e.g., 85-90%, 85-95%, 85-100%, 90-95%, 90-100%, or 95-100%) (the mature IL-18 sequence, i.e., without the signal sequence, is in bold):

[SEQ ID NO: 2]

MAAEPVEDNCINFVAMKFIDNTLYFIAEDDENLESDYFGKLESKLSVIR

NLNDQVLFIDQGNRPLFEDMTDSDCRDNAPRTIFIISMYKDSQPRGMAV

TISVKCEKISTLSCENKIISFKEMNPPDNIKDTKSDIIFFQRSVPGHDN

KMQFESSSYEGYFLACEKERDLFKLILKKEDELGDRSIMFTVQNED.

In certain embodiments, IL-18 comprises, consists essentially of, or consists of amino acid residues 37 to 193 or SEQ ID NO: 2. In certain embodiments, IL-18 comprises an amino acid sequence that is at least 80%, 85%, 90% or 95% identical to amino acid residues 37 to 193 of SEQ ID NO: 2.

The polypeptides disclosed herein comprise a signal sequence. The signal sequence can be the native IL-18 signal sequence or a heterologous signal sequence, for example, the IL-2 signal sequence, the CD8 signal sequence, the IL-15 signal sequence, or any suitable peptide with essentially equivalent activity. In one embodiment described herein the signal sequence is as shown by the amino acid sequence of MALPVTALLLPLALLLHAARP (SEQ ID NO: 3). In another embodiment described herein the signal sequence is the IL-15 signal sequence, as shown by the amino acid sequence of

```
                                        (SEQ ID NO: 4)
MRISKPHLRSISIQCYLCLLLNSHFLTEAGIHVFILGCFSAGLPKTEA
```

The IL-18 receptor binds IL-18 to facilitate IL-18 mediated signal transduction. It is a heteromeric complex of alpha- (IL-18Rα) and beta- (IL-18Rβ) chains encoded by IL-18R1 and IL-18RAP, respectively. IL-18Ra is the ligand binding subunit of IL18 receptor, while IL-18Rβ enhances the IL-18 binding activity of IL-18Rα. Co-expression of IL18R1 and IL-18RAP is typically required for the activation of NF-κB and MAPK8 (INK) in response to IL-18.

The IL-18 polypeptides described herein can be bound to the cellular membrane, e.g., through interaction with the IL-18 receptor subunit, to continuously drive an IL-18 mediated response. As used herein, an IL-18R subunit refers to a mature form of IL-18Rα or IL-18Rβ. In one embodiment, the IL-18R subunit is a mature form of IL-18Rα (e.g., amino acid residues 19 to 540 of SEQ ID NO: 6 or amino acid residues 21 to 540 of SEQ ID NO: 6). In one embodiment, the IL-18R subunit is a mature form of IL-18Rβ, (e.g., amino acid residues 20 to 599 of SEQ ID NO: 8).

The protein product of IL-18R1 (18Ra) can have any amino acid sequence known in the art, for example as available in the NCBI Gene database at Gene ID: 8809, updated on 1 Aug. 2020, which is specifically incorporated herein be reference. In one embodiment, IL-18Ra has the amino acid sequence corresponding to NCBI Reference Sequence Nos. NP_003846.1 (isoform 1), NP_001269328.1 (isoform 2), NP_001358347.1 (isoform 3), NP_001358348.1 (isoform 4), NP_001358349.1 (isoform 5), NP_001358350.1 (isoform 6), NP_001358351.1 (isoform 7), NP_001358352.1 (isoform 8), NP_001358353.1 (isoform 8), lacking the signal sequence (i.e., the mature forms thereof). These isoforms are encoded by the nucleotide sequences corresponding to NCBI Reference Sequence Nos. NM_003855.5, NM_001282399.2, NM_001371418.1, NM_001371419.1, NM_001371420.1, NM_001371421.1, NM_001371422.1, NM_001371423.1, and NM_001371424.1, respectively. The below constructs utilize the IL-18R1 isoform 1 sequences, but it is understood that a person skilled in the art can readily make similar constructs utilizing any other IL-18R1 isoform.

Another embodiment described herein is a nucleotide sequence encoding human IL-18R1 isoform 1 having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 5. The sequence is codon optimized.

```
                                        [SEQ ID NO: 5]
ATGAACTGCAGAGAGCTGCCCCTGACACTGTGGGTGCTGATCTCTGTGTCTAC

CGCCGAGAGCTGCACCAGCAGACCTCACATCACAGTGGTGGAAGGCGAGCC
```

-continued

CTTCTACCTGAAGCACTGCAGCTGTTCTCTGGCCCACGAGATCGAGACAACC

ACCAAGAGCTGGTACAAGAGCAGCGGCAGCCAAGAGCACGTGGAACTGAAC

CCTAGAAGCAGCAGCAGAATCGCCCTGCACGACTGCGTGCTGGAATTCTGGC

CTGTCGAGCTGAACGATACCGGCAGCTACTTCTTCCAGATGAAGAACTACACC

CAGAAATGGAAGCTGAACGTGATCCGGCGGAACAAGCACAGCTGCTTCACCG

AGAGACAAGTGACCAGCAAGATCGTGGAAGTGAAGAAGTTCTTTCAGATCAC

GTGCGAGAACTCCTACTACCAGACACTGGTCAACAGCACCAGCCTGTACAAG

AACTGCAAGAAGCTCCTGCTCGAGAACAACAAGAACCCCACCATCAAGAAG

AACGCCGAGTTCGAGGACCAGGGCTACTACAGCTGCGTGCACTTCCTGCACC

ACAACGGCAAGCTGTTCAACATCACCAAGACCTTCAATATCACCATCGTCGAG

GACCGCAGCAACATCGTGCCTGTTCTGCTGGGCCCCAAGCTGAATCATGTGGC

TGTGGAACTGGGCAAGAACGTGCGGCTGAATTGCAGCGCCCTGCTGAACGAA

GAGGACGTGATCTACTGGATGTTCGGCGAGGAAAACGGCAGCGACCCCAACA

TCCACGAAGAGAAAGAAATGCGGATCATGACCCCTGAAGGCAAGTGGCACG

CCAGCAAGGTGCTGCGGATCGAGAATATCGGCGAGAGCAACCTGAACGTGCT

GTACAACTGTACCGTGGCCAGCACCGGCGGCACAGATACCAAGTCCTTTATCC

TCGTGCGGAAGGCCGACATGGCTGACATTCCAGGCCACGTGTTCACCCGGGG

CATGATCATTGCCGTGCTGATCCTGGTGGCCGTCGTGTGTCTGGTCACCGTGT

GTGTGATCTACAGAGTGGACCTGGTCCTGTTCTACCGGCACCTGACCAGAAG

GGACGAGACACTGACCGACGGCAAGACCTACGATGCCTTCGTGTCCTACCTG

AAAGAGTGCAGACCCGAGAACGGCGAAGAACACACCTTCGCCGTGGAAATC

CTGCCTAGAGTGCTGGAAAAGCACTTCGGCTACAAGCTGTGCATCTTCGAGC

GCGACGTTGTGCCTGGCGGAGCTGTGGTGGATGAGATCCACAGCCTGATCGA

GAAGTCCAGACGGCTGATCATCGTGCTGAGCAAGAGCTACATGAGCAACGAA

GTCCGCTACGAGCTGGAAAGCGGACTGCACGAAGCCCTGGTGGAACGGAAG

ATCAAGATCATCCTGATTGAGTTCACCCCTGTGACCGACTTCACATTCCTGCCT

CAGAGCCTGAAGCTGCTGAAGTCCCACAGAGTGCTGAAGTGGAAAGCCGAC

AAGAGCCTGAGCTACAACAGCCGGTTTTGGAAGAACCTGCTGTACCTGATGC

CTGCCAAGACCGTGAAGCCCGGCAGAGATGAACCTGAGGTTCTGCCTGTGCT

GAGCGAGTCCTAA

Another embodiment described herein is a human IL-18Rα amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) to SEQ ID NO: 6 (mature polypeptide without signal sequence is in bold).

[SEQ ID NO: 6]

MNCRELPLTLWVLISVSTAESCTSRPHITVVEGEPFYLKHCSCSLAHEI

ETTTKSWYKSSGSQEHVELNPRSSSRIALHDCVLEFWPVELNDTGSYFF

QMKNYTQKWKLNVIRRNKHSCFTERQVTSKIVEVKKFFQITCENSYYQT

LVNSTSLYKNCKKLLLENNKNPTIKKNAEFEDQGYYSCVHFLHHNGKLF

NITKTFNITIVEDRSNIVPVLLGPKLNHVAVELGKNVRLNCSALLNEED

-continued

VIYWMFGEENGSDPNIHEEKEMRIMTPEGKWHASKVLRIENIGESNLNV

LYNCTVASTGGTDTKSFILVRKADMADIPGHVFTRGMIIAVLILVAVVC

LVTVCVIYRVDLVLFYRHLTRRDETLTDGKTYDAFVSYLKECRPENGEE

HTFAVEILPRVLEKHFGYKLCIFERDVVPGGAVVDEIHSLIEKSRRLII

VLSKSYMSNEVRYELESGLHEALVERKIKIILIEFTPVTDFTFLPQSLK

LLKSHRVLKWKADKSLSYNSRFWKNLLYLMPAKTVKPGRDEPEVLPVLS

E

The protein product of IL-18RAP (18Rβ) can have any amino acid sequence known in the art, for example as available in the NCBI Gene database at Gene ID: 8807, updated on 1 Aug. 2020, which is specifically incorporated herein be reference. In one embodiment, IL-18Rβ has the amino acid sequence corresponding to NCBI Reference Sequence Nos. NP_003844.1, lacking the signal sequence (i.e., the mature form thereof). This protein is encoded by the nucleotide sequence corresponding to NCBI Reference Sequence Nos. NM_003853.3.

Another embodiment described herein is a nucleic acid sequence encoding human IL-18Rβ having at least 75% sequence identity to (such as, at least 75%, at least 80%, at least 90%, at least 95%, or 100% identity; e.g., 85-90%, 85-95%, 85-100%, 90-95%, 90-100%, or 95-100%) to SEQ ID NO: 7. The sequence is codon-optimized.

[SEO ID NO: 7]

```
ATGCTGTGTCTCGGCTGGATCTTCCTGTGGCTGGTGGCCGGCGAGAGAATCAA
GGGCTTCAATATCAGCGGCTGCAGCACCAAGAAACTGCTGTGGACCTACAGC
ACCCGCAGCGAAGAGGAATTCGTGCTGTTCTGCGACCTGCCTGAGCCTCAGA
AGTCCCACTTCTGCCACCGGAACAGACTGAGCCCTAAACAGGTGCCCGAGCA
TCTGCCTTTCATGGGCAGCAACGATCTGAGCGACGTGCAGTGGTATCAGCAGC
CCAGCAATGGCGACCCTCTGGAAGATATCAGAAAGAGCTACCCTCACATCATC
CAGGACAAGTGCACCCTGCACTTTCTGACCCCTGGCGTGAACAACAGCGGCA
GCTACATCTGCAGACCCAAGATGATCAAGAGCCCCTACGACGTGGCCTGCTGC
GTGAAGATGATCCTGGAAGTGAAGCCCCAGACCAACGCCAGCTGCGAGTATA
GCGCCAGCCACAAGCAGGATCTGCTGCTGGGCTCTACAGGCAGCATCAGCTG
TCCTAGCCTGAGCTGTCAGAGCGACGCTCAGTCTCCTGCCGTGACCTGGTACA
AGAACGGCAAGCTGCTGAGCGTGGAACGGTCCAACAGAATCGTGGTGGACG
AGGTGTACGACTACCACCAGGGCACCTACGTGTGCGACTACACCCAGAGCGA
TACCGTGTCTAGCTGGACCGTCAGAGCCGTGGTGCAAGTGCGGACAATCGTG
GGCGATACCAAGCTGAAGCCCGACATTCTGGACCCCGTGGAAGATACACTGG
AAGTGGAACTGGGCAAGCCCCTGACCATCAGCTGCAAGGCCAGATTCGGCTT
CGAGCGGGTGTTCAACCCCGTGATCAAGTGGTACATCAAGGACAGCGACCTG
GAATGGGAAGTGTCCGTGCCTGAGGCCAAGTCCATCAAGAGCACACTGAAGG
ACGAGATCATCGAGCGGAACATCATCCTGGAAAAAGTGACCCAGCGGGACCT
GCGGAGAAAGTTCGTGTGCTTCGTGCAGAACTCCATCGGCAACACCACACAG
AGCGTGCAGCTGAAAGAAAAGCGCGGCGTGGTGCTGCTGTACATCCTGCTGG
GAACAATCGGCACCCTGGTGGCTGTTCTGGCTGCTTCTGCCCTGCTGTATCGG
CACTGGATCGAGATCGTGCTGCTCTACAGAACCTACCAGAGCAAGGATCAGA
CCCTGGGCGACAAGAAGGACTTCGACGCCTTTGTGTCCTACGCCAAGTGGTC
CAGCTTTCCCAGCGAGGCCACAAGCTCCCTGAGCGAAGAACATCTGGCCCTG
TCTCTGTTCCCCGACGTGCTGGAAAACAAATACGGCTACAGCCTGTGCCTGCT
GGAAAGAGATGTTGCCCCTGGCGGAGTGTACGCCGAGGATATCGTGTCCATCA
TCAAGCGGAGCAGACGGGGCATCTTCATTCTGAGCCCCAACTACGTGAACGG
CCCCAGCATCTTTGAACTGCAAGCCGCCGTGAACCTGGCTCTGGACGATCAG
ACACTGAAGCTGATTCTGATCAAGTTCTGCTACTTCCAAGAGCCTGAGAGCCT
GCCTCACCTGGTCAAAAAGGCCCTGAGAGTGCTGCCCACCGTGACTTGGAGA
GGCCTGAAAAGCGTGCCACCTAACAGCCGGTTCTGGGCCAAGATGAGATACC
ACATGCCTGTGAAGAACTCCCAGGGCTTCACCTGGAACCAGCTGCGGATCAC
CAGCAGAATCTTCCAGTGGAAGGGCCTGAGCCGGACCGAGACAACAGGCAG
AAGCTCCCAGCCTAAAGAGTGGTGA
```

Another embodiment described herein is a human IL-18Rβ amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 8 (mature polypeptide without signal sequence is in bold)

[SEQ ID NO: 8]

MLCLGWIFLWLVAGERIKGFNISGCSTKKLLWTYSTRSEEEFVLFCDLP

EPQKSHFCHRNRLSPKQVPEHLPFMGSNDLSDVQWYQQPSNGDPLEDIR

KSYPHIIQDKCTLHFLTPGVNNSGSYICRPKMIKSPYDVACCVKMILEV

KPQTNASCEYSASHKQDLLLGSTGSISCPSLSCQSDAQSPAVTWYKNGK

LLSVERSNRIVVDEVYDYHQGTYVCDYTQSDTVSSWTVRAVVQVRTIVG

DTKLKPDILDPVEDTLEVELGKPLTISCKARFGFERVENPVIKWYIKDS

DLEWEVSVPEAKSIKSTLKDEIERNIILEKVTQRDLRRKFVCFVQNSIG

NTTQSVQLKEKRGVVLLYILLGTIGTLVAVLAASALLYRHWIEIVLLYR

TYQSKDQTLGDKKDFDAFVSYAKWSSFPSEATSSLSEEHLALSLFPDVL

ENKYGYSLCLLERDVAPGGVYAEDIVSIIKRSRRGIFILSPNYVNGPSI

FELQAAVNLALDDQTLKLILIKFCYFQEPESLPHLVKKALRVLPTVTWR

GLKSVPPNSRFWAKMRYHMPVKNSQGFTWNQLRITSRIFQWKGLSRTET

TGRSSQPKEW

In some embodiments, the IL-18 domain, IL-18Rα domain, or IL-18Rβ domain, or the entire construct, comprises or is a sequence that is at least 60% identical, at least 65% identical, at least 70% identical, at least 75% identical, at least 80% identical, at least 85%, at least 90% identical, at least 95% identical, at least 98% identical, at least 99% identical, or 100% identical to a wild-type IL-18, IL-18Rα, or IL-18Rβ (e.g., SEQ ID NOs: 2, 6 or 8), or a mature form of any of the foregoing, or a construct provided herein. In some embodiments, an IL-18 domain, IL-18Rα domain, or IL-18Rβ domain, or the entire construct, includes a sequence that differs from any of SEQ ID NOs: 2, 6 or 8, or the mature portion thereof, by one to 25 amino acids (e.g., 1, 2, 3, 4, 5, 6, 7, 8, 9, 10, 11, 12, 13, 14, 15, 16, 17, 18, 19, 20, 21, 22, 23, 24, or 25 amino acids). In certain embodiments, conservative substitutions are preferred. In some embodiments, any of the domains includes one or more additional amino acids (e.g., 1 to about 100 amino acids, 1 to about 80 amino acids, 1 to about 60 amino acids, 1 to about 40 amino acids, 1 to about 20 amino acids, 1 to about 10 amino acids, about 5 to about 100 amino acids, about 5 to about 80 amino acids, about 5 to about 60 amino acids, about 5 to about 40 amino acids, about 5 to about 20 amino acids, about 10 to about 100 amino acids, about 10 to about 80 amino acids, about 10 to about 60 amino acids, about 10 to about 40 amino acids, or about 10 to about 20 amino acids) in addition to the respectively wild-type mature sequences. Additionally or alternatively, any of the domains can lack one to about 25 amino acids (e.g., 1, 2, 3, 4, 5, 6, 7, 8, 9, 10, 11, 12, 13, 14, 15, 16, 17, 18, 19, 20, 21, 22, 23, 24, or 25 amino acids) compared to any of the respective wild-type mature sequences.

In some embodiments, a nucleic acid encoding the IL-18 domain, IL-18Rα domain, or IL-18Rβ domain, comprises or is a sequence that is at least 80% identical, at least 85% identical, at least 90% identical, at least 95% identical, at least 96% identical, at least 97% identical, at least 98% identical, at least 99% identical, or 100% identical to a wild-type IL-18, IL-18R1, or IL-18RAP nucleic acid sequence, the nucleic acid encoding the mature form of any of the foregoing, or a codon-optimized version of any of the foregoing. In some embodiments, a nucleic acid encoding an IL-18 domain, IL-18Rα domain, or IL-18Rβ domain, includes a sequence that differs from a wild-type IL-18, IL-18R1, or IL-18RAP sequence, the nucleic acid encoding the mature form of any of the foregoing, or a codon-optimized version of any of the foregoing, by one to about 75 nucleotides (e.g., 1 to about 70 nucleotides, 1 to about 60 nucleotides, 1 to about 50 nucleotides, 1 to about 40 nucleotides, 1 to about 30 nucleotides, 1 to about 20 nucleotides, 1 to about 10 nucleotides, about 5 nucleotides to about 75 nucleotides, about 5 nucleotides to about 70 nucleotides, about 5 nucleotides to about 60 nucleotides, about 5 nucleotides to about 50 nucleotides, about 5 nucleotides to about 40 nucleotides, about 5 nucleotides to about 30 nucleotides, about 5 nucleotides to about 20 nucleotides, about 5 nucleotides to about 10 nucleotides). In some embodiments, a nucleic acid encoding the IL-18 domain, IL-18Rα domain, or IL-18Rβ domain, the nucleic acid encoding the mature form of any of the foregoing, or a codon-optimized version of any of the foregoing, includes one or more additional nucleotides (e.g., 1 to about 300 nucleotides, 1 to about 250 nucleotides, 1 to about 200 nucleotides, 1 to about 150 nucleotides, 1 to about 100 nucleotides, 1 to about 50 nucleotides, about 5 nucleotides to about 300 nucleotides, about 5 nucleotides to about 250 nucleotides, about 5 nucleotides to about 200 nucleotides, about 5 nucleotides to about 150 nucleotides, about 5 nucleotides to about 100 nucleotides, or about 5 nucleotides to about 50 nucleotides), e.g., in addition to the sequence of a wild-type IL-18, IL-18R1, or IL-18RAP sequence, the nucleic acid encoding the mature form of any of the foregoing, or a codon-optimized version of any of the foregoing. Additionally or alternatively, a nucleic acid encoding the IL-18 domain, IL-18Rα domain, or IL-18Rβ domain, the nucleic acid encoding the mature form of any of the foregoing, or a codon-optimized version of any of the foregoing, can lack one to 75 nucleotides (e.g., 1 to about 70 nucleotides, 1 to about 65 nucleotides, 1 to about 60 nucleotides, 1 to about 55 nucleotides, 1 to about 50 nucleotides, 1 to about 45 nucleotides, 1 to 40 nucleotides, 1 to about 35 nucleotides, 1 to about 30 nucleotides, 1 to about 25 nucleotides, 1 to about 20 nucleotides, 1 to about 15 nucleotides, 1 to about 10 nucleotides, or 1 to about 5 nucleotides) from the 5'-end of a wild-type IL-18, IL-18R1, or IL-18RAP sequence, the nucleic acid encoding the mature form of any of the foregoing, or a codon-optimized version of any of the foregoing, and/or lack one to sixty nucleotides (e.g., 1 to about 60 nucleotides, 1 to about 55 nucleotides, 1 to about 50 nucleotides, 1 to about 45 nucleotides, 1 to 40 nucleotides, 1 to about 35 nucleotides, 1 to about 30 nucleotides, 1 to about 25 nucleotides, 1 to about 20 nucleotides, 1 to about 15 nucleotides, 1 to about 10 nucleotides, or 1 to about 5 nucleotides) from the 3'-end of a wild-type IL-18, IL-18R1, or IL-18RAP sequence, the nucleic acid encoding the mature form of any of the foregoing, or a codon-optimized version of any of the foregoing.

In certain embodiments, the IL-18 and IL-18R subunit can be linked as described herein. In particular embodiments, the linker sequence comprises sets of glycine and serine repeats such as $(Gly_4Ser)_n$ (SEQ ID NO: 47), where n is a positive integer equal to or greater than 1. In one embodiment, the linker can be $(Gly_4Ser)_4$ (SEQ ID NO: 10) or $(Gly_4Ser)_3$ (SEQ ID NO: 11). In particular embodiments, the linker sequence is a Whitlow linker. In some embodiments, the Whitlow linker has the amino acid sequence of GSTSGSGKPGSGEGSTKG (SEQ ID NO: 12). In some embodiments, the nucleotide sequence encoding the Whitlow linker sequence is

GGCAGCACCAGCGGCAGCGGCAAACCGGGCAGCGGCGAAGGCAGCACCA
AAGGC (SEQ ID NO: 13). Additional sequences can be used as linker sequences. In particular embodiments, a Myc sequence is used alone or in combination with either of the above linkers. In some embodiments, the nucleic acid sequence of the Myc sequence is GAACAGAAGCTGATAAGTGAGGAGGACTTG (SEQ ID NO: 14). In some embodiments the amino acid sequence of the Myc sequence of SEQ ID NO: 14 is EQKLISEEDL (SEQ ID NO: 15). Exemplary constructs as used in the Examples described below.

In one embodiment described herein is a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) to SEQ ID NO: 16.

[SEQ ID NO: 16]
ATGGCTCTGCCTGTGACAGCTCTGCTGCTGCCTCTGGCTCTGCTTCTGC

ATGCCGCCAGACCTTACTTCGGCAAGCTGGAAAGCAAGCTGAGCGTGAT

CCGGAACCTGAACGACCAGGTGCTGTTCATCGACCAGGGCAACAGACCC

CTGTTCGAGGACATGACCGACAGCGACTGCAGAGACAACGCCCCTCGGA

CCATCTTCATCATCAGCATGTACAAGGACAGCCAGCCTAGAGGCATGGC

CGTGACCATCTCTGTGAAGTGCGAGAAGATCAGCACCCTGAGCTGCGAG

AACAAGATCATCAGCTTCAAAGAGATGAACCCGCCGGACAACATCAAGG

ACACCAAGAGCGACATCATATTCTTCCAGCGGAGCGTGCCCGGCCACGA

CAACAAGATGCAGTTTGAGAGCAGCAGCTACGAGGGCTACTTCCTGGCC

TGCGAGAAAGAGCGGGACCTGTTCAAGCTGATCCTGAAGAAAGAGGACG

AACTGGGCGACCGCAGCATCATGTTCACCGTGCAGAACGAGGAC

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) to SEQ ID 15. Bold sequences represent the mature IL-18.

[SEQ ID NO: 17]
MALPVTALLLPLALLLHAARPYFGKLESKLSVIRNLNDQVLFIDQGNRP

LFEDMTDSDCRDNAPRTIFIISMYKDSQPRGMAVTISVKCEKISTLSCE

-continued

NKIISFKEMNPPDNIKDTKSDIIFFQRSVPGHDNKMQFESSSYEGYFLA

CEKERDLFKLILKKEDELGDRSIMFTVQNED.

Another embodiment described herein is nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 18.

[SEQ ID NO: 18]
ATGAGAATCAGCAAGCCCCACCTGAGATCCATCAGCATCCAGTGCTACC

TGTGCCTGCTGCTGAACAGCCACTTTCTGACAGAGGCCGGCATCCACGT

GTTCATCCTGGGCTGTTTTTCTGCCGGCCTGCCTAAGACCGAGGCCTAC

TTTGGCAAGCTGGAAAGCAAGCTGAGCGTGATCCGGAACCTGAACGACC

AGGTGCTGTTCATCGACCAGGGCAACAGACCCCTGTTCGAGGACATGAC

CGACAGCGACTGCAGAGACAACGCCCCTCGGACCATCTTCATCATCAGC

ATGTACAAGGACAGCCAGCCTAGAGGCATGGCCGTGACCATCTCTGTGA

AGTGCGAGAAGATCAGCACCCTGAGCTGCGAGAACAAGATCATCAGCTT

CAAAGAGATGAACCCGCCGGACAACATCAAGGACACCAAGAGCGACATC

ATATTCTTCCAGCGGAGCGTGCCCGGCCACGACAACAAGATGCAGTTTG

AGAGCAGCAGCTACGAGGGCTACTTCCTGGCCTGCGAGAAAGAGCGGGA

CCTGTTCAAGCTGATCCTGAAGAAAGAGGACGAACTGGGCGACCGCAGC

ATCATGTTCACCGTGCAGAACGAGGAC.

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 19. Bold sequences represent the mature IL-18.

[SEQ ID NO: 19]
MRISKPHLRSISIQCYLCLLLNSHFLTEAGIHVFILGCFSAGLPKTEAY

FGKLESKLSVIRNLNDQVLFIDQGNRPLFEDMTDSDCRDNAPRTIFIIS

MYKDSQPRGMAVTISVKCEKISTLSCENKIISFKEMNPPDNIKDTKSDI

IFFQRSVPGHDNKMQFESSSYEGYFLACEKERDLFKLILKKEDELGDRS

IMFTVQNED.

Another embodiment described herein is a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 20.

[SEQ ID NO: 20]
ATGGCTCTGCCTGTGACAGCTCTGCTGCTGCCTCTGGCTCTGCTTCTGCATGC

CGCCAGACCTTACTTCGGCAAGCTGGAAAGCAAGCTGAGCGTGATCCGGAAC

CTGAACGACCAGGTGCTGTTCATCGACCAGGGCAACAGACCCCTGTTCGAGG

ACATGACCGACAGCGACTGCAGAGACAACGCCCCTCGGACCATCTTCATCAT

CAGCATGTACAAGGACAGCCAGCCTAGAGGCATGGCCGTGACCATCTCTGTG

-continued

```
AAGTGCGAGAAGATCAGCACCCTGAGCTGCGAGAACAAGATCATCAGCTTCA

AAGAGATGAACCCGCCGGACAACATCAAGGACACCAAGAGCGACATCATATT

CTTCCAGCGGAGCGTGCCCGGCCACGACAACAAGATGCAGTTTGAGAGCAGC

AGCTACGAGGGCTACTTCCTGGCCTGCGAGAAAGAGCGGGACCTGTTCAAGC

TGATCCTGAAGAAAGAGGACGAACTGGGCGACCGCAGCATCATGTTCACCGT

GCAGAATGAGGATGGCGGCGGAGGATCTGGCGGAGGTGGAAGCGGAGGCGG

TGGAAGCTGTACAAGCAGACCTCACATCACCGTGGTGGAAGGCGAGCCCTTC

TACCTGAAGCACTGCAGCTGTTCTCTGGCCCACGAGATCGAGACAACCACCA

AGTCCTGGTACAAGAGCAGCGGCAGCCAAGAGCACGTGGAACTGAACCCTA

GAAGCAGCTCCAGAATCGCCCTGCACGACTGCGTGCTGGAATTCTGGCCTGT

CGAGCTGAACGATACCGGCAGCTACTTCTTCCAGATGAAGAACTACACCCAG

AAATGGAAGCTCAACGTGATCAGGCGGAACAAGCACAGCTGCTTCACCGAG

AGACAAGTGACCAGCAAGATCGTGGAAGTGAAGAAGTTCTTTCAGATCACGT

GCGAGAACTCCTACTACCAGACACTGGTCAACAGCACCAGCCTGTACAAGAA

CTGCAAGAAGCTGCTCCTCGAGAACAACAAGAACCCCACCATCAAGAAGAA

CGCCGAGTTCGAGGATCAGGGCTACTACAGCTGCGTGCACTTCCTGCACCAC

AATGGCAAGCTGTTCAACATCACCAAGACCTTCAATATCACCATCGTCGAGGA

CCGCTCCAACATCGTGCCTGTTCTGCTGGGCCCCAAGCTGAATCATGTGGCTG

TGGAACTGGGCAAGAACGTGCGGCTGAATTGCAGCGCCCTGCTGAACGAAG

AGGACGTGATCTACTGGATGTTCGGCGAGGAAAACGGCAGCGACCCCAACAT

CCACGAAGAGAAAGAAATGCGGATCATGACCCCTGAAGGCAAGTGGCACGC

CAGCAAGGTGCTGCGGATCGAGAATATCGGCGAGAGCAACCTGAATGTGCTG

TACAACTGCACCGTGGCCAGCACCGGCGGCACCGATACCAAGTCTTTTATCCT

CGTGCGGAAGGCCGACATGGCTGACATTCCAGGCCACGTGTTCACCCGGGGC

ATGATCATTGCCGTGCTGATTCTGGTGGCCGTCGTGTGTCTGGTCACCGTGTGT

GTGATCTACAGAGTGGACCTGGTCCTGTTCTACCGGCACCTGACCAGAAGGG

ACGAGACACTGACCGACGGCAAGACCTACGATGCCTTCGTGTCCTACCTGAA

AGAGTGCAGACCCGAGAACGGCGAAGAACACACCTTCGCCGTGGAAATCCT

GCCTAGAGTGCTGGAAAAGCACTTCGGCTACAAGCTGTGCATCTTCGAGCGC

GACGTTGTGCCTGGCGGAGCTGTGGTGGATGAGATCCACAGCCTGATCGAGA

AGTCCAGACGGCTGATCATCGTGCTGAGCAAGAGCTACATGAGCAACGAAGT

CCGCTACGAGCTGGAATCCGGACTGCACGAAGCCCTGGTGGAACGGAAGATC

AAGATCATTCTGATCGAGTTCACCCCTGTGACCGACTTCACATTCCTGCCTCA

GAGCCTGAAGCTGCTGAAGTCCCACAGAGTGCTGAAGTGGAAAGCCGACAA

GAGCCTGAGCTACAACAGCCGGTTTTGGAAGAACCTGCTGTACCTGATGCCT

GCCAAGACCGTGAAGCCCGGCAGAGATGAGCCCGAAGTTCTGCCAGTGCTG

AGCGAGTCTTGA.
```

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 21. Underlined sequences are the signal peptide (not bold) and mature IL-18 polypeptide (bold). The bold sequences (not underlined) are a mature form of IL-18Rα.

[SEQ ID NO: 21]

MALPVTALLLPLALLLHAARPYFGKLESKLSVIRNLNDQVLFIDQGNRPLFED
MTDSDCRDNAPRTIFIISMYKDSQPRGMAVTISVKCEKISTLSCENKIISFKEM
NPPDNIKDTKSDIIFFQRSVPGHDNKMQFESSSYEGYFLACEKERDLFKLILK
KEDELGDRSIMFTVQNEDGGGGSGGGGSGGGGSCTSRPHITVVEGEPFYLKH
CSCSLAHEIETTTKSWYKSSGSQEHVELNPRSSSRIALHDCVLEFWPVELND
TGSYFFQMKNYTQKWKLNVIRRNKHSCFTERQVTSKIVEVKKFFQITCENS
YYQTLVNSTSLYKNCKKLLLENNKNPTIKKNAEFEDQGYYSCVHFLHHNGK
LFNITKTFNITIVEDRSNIVPVLLGPKLNHVAVELGKNVRLNCSALLNEEDVIY
WMFGEENGSDPNIHEEKEMRIMTPEGKWHASKVLRIENIGESNLNVLYNCT
VASTGGTDTKSFILVRKADMADIPGHVFTRGMIIAVLILVAVVCLVTVCVIYR
VDLVLFYRHLTRRDETLTDGKTYDAFVSYLKECRPENGEEHTFAVEILPRVL
EKHFGYKLCIFERDVVPGGAVVDEIHSLIEKSRRLIIVLSKSYMSNEVRYELE
SGLHEALVERKIKIILIEFTPVTDFTFLPQSLKLLKSHRVLKWKADKSLSYNS
RFWKNLLYLMPAKTVKPGRDEPEVLPVLSE.

Another embodiment described herein is a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ NO: 22.

[SEQ ID NO: 22]

ATGGCTCTGCCTGTGACAGCTCTGCTGCTGCCTCTGGCTCTGCTTCTGCATGC
CGCCAGACCTTACTTCGGCAAGCTGGAAAGCAAGCTGAGCGTGATCCGGAA
CCTGAACGACCAGGTGCTGTTCATCGACCAGGGCAACAGACCCCTGTTCGA
GGACATGACCGACAGCGACTGCAGAGACAACGCCCCTCGGACCATCTTCAT
CATCAGCATGTACAAGGACAGCCAGCCTAGAGGCATGGCCGTGACCATCTCT
GTGAAGTGCGAGAAGATCAGCACCCTGAGCTGCGAGAACAAGATCATCAGC
TTCAAAGAGATGAACCCGCCGGACAACATCAAGGACACCAAGAGCGACATC
ATATTCTTCCAGCGGAGCGTGCCCGGCCACGACAACAAGATGCAGTTTGAG
AGCAGCAGCTACGAGGGCTACTTCCTGGCCTGCGAGAAAGAGCGGGACCTG
TTCAAGCTGATCCTGAAGAAAGAGGACGAACTGGGCGACCGCAGCATCATG
TTCACCGTGCAGAATGAGGATGGCGGCGGAGGATCTGGCGGAGGTGGAAGC
GGAGGCGGAGGAAGCGGTGGCGGCGGATCTTGTACATCTAGACCCCACATC
ACCGTGGTGGAAGGCGAGCCCTTTTACCTGAAGCACTGCAGCTGTTCTCTG
GCCCACGAGATCGAGACAACCACCAAGTCCTGGTACAAGAGCAGCGGCAG
CCAAGAGCACGTGGAACTGAACCCTAGAAGCAGCTCCAGAATCGCCCTGCA
CGACTGCGTGCTGGAATTCTGGCCTGTCGAGCTGAACGATACCGGCAGCTAC
TTCTTCCAGATGAAGAACTACACCCAGAAATGGAAGCTCAACGTGATCAGG
CGGAACAAGCACAGCTGCTTCACCGAGAGACAAGTGACCAGCAAGATCGT
GGAAGTGAAGAAGTTCTTTCAGATCACGTGCGAGAACTCCTACTACCAGAC
ACTGGTCAACAGCACCAGCCTGTACAAGAACTGCAAGAAGCTGCTCCTCGA
GAACAACAAGAACCCCACCATCAAGAAGAACGCCGAGTTCGAGGATCAGG

-continued

GCTACTACAGCTGCGTGCACTTCCTGCACCACAATGGCAAGCTGTTCAACAT

CACCAAGACCTTCAATATCACCATCGTCGAGGACCGCTCCAACATCGTGCCT

GTTCTGCTGGGCCCCAAGCTGAATCATGTGGCTGTGGAACTGGGCAAGAAC

GTGCGGCTGAATTGCAGCGCCCTGCTGAACGAAGAGGACGTGATCTACTGG

ATGTTCGGCGAGGAAAACGGCAGCGACCCCAACATCCACGAAGAGAAAGA

AATGCGGATCATGACCCCTGAAGGCAAGTGGCACGCCAGCAAGGTGCTGCG

GATCGAGAATATCGGCGAGAGCAACCTGAATGTGCTGTACAACTGCACCGTG

GCCAGCACCGGCGGCACCGATACCAAGTCTTTTATCCTCGTGCGGAAGGCCG

ACATGGCTGACATTCCAGGCCACGTGTTCACCCGGGGCATGATCATTGCCGT

GCTGATTCTGGTGGCCGTCGTGTGTCTGGTCACCGTGTGTGTGATCTACAGA

GTGGACCTGGTCCTGTTCTACCGGCACCTGACCAGAAGGGACGAGACACTG

ACCGACGGCAAGACCTACGATGCCTTCGTGTCCTACCTGAAAGAGTGCAGA

CCCGAGAACGGCGAAGAACACACCTTCGCCGTGGAAATCCTGCCTAGAGTG

CTGGAAAAGCACTTCGGCTACAAGCTGTGCATCTTCGAGCGCGACGTTGTG

CCTGGCGGAGCTGTGGTGGATGAGATCCACAGCCTGATCGAGAAGTCCAGA

CGGCTGATCATCGTGCTGAGCAAGAGCTACATGAGCAACGAAGTCCGCTAC

GAGCTGGAATCCGGACTGCACGAAGCCCTGGTGGAACGGAAGATCAAGATC

ATTCTGATCGAGTTCACCCCTGTGACCGACTTCACATTCCTGCCTCAGAGCC

TGAAGCTGCTGAAGTCCCACAGAGTGCTGAAGTGGAAAGCCGACAAGAGC

CTGAGCTACAACAGCCGGTTTTGGAAGAACCTGCTGTACCTGATGCCTGCCA

AGACCGTGAAGCCCGGCAGAGATGAGCCCGAAGTTCTGCCAGTGCTGAGCG

AGTCTTGA.

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 23. Underlined sequences represent the signal peptide (not bold) and mature IL-18 polypeptide (bold). The bold sequences (not underlined) represent a mature form of IL-18Rα.

[SEQ ID NO: 23]

MALPVTALLLPLALLLHAARPYFGKLESKLSVIRNLNDQVLFIDOGNRPLFED

MTDSDCRDNAPRTIFIISMYKDSQPRGMAVTISVKCEKISTLSCENKIISFKEM

NPPDNIKDTKSDIIFFQRSVPGHDNKMQFESSSYEGYFLACEKERDLFKLILK

KEDELGDRSIMFTVQNEDGGGGSGGGGSGGGGSGGGGSCTSRPHITVVEGEP

FYLKHCSCSLAHEIETTTKSWYKSSGSQEHVELNPRSSSRIALHDCVLEFWP

VELNDTGSYFFQMKNYTQKWKLNVIRRNKHSCFTERQVTSKIVEVKKFFQI

TCENSYYQTLVNSTSLYKNCKKLLLENNKNPTIKKNAEFEDQGYYSCVHFL

HHNGKLFNITKTFNITIVEDRSNIVPVLLGPKLNHVAVELGKNVRLNCSALLN

EEDVIYWMFGEENGSDPNIHEEKEMRIMTPEGKWHASKVLRIENIGESNLN

VLYNCTVASTGGTDTKSFILVRKADMADIPGHVFTRGMIIAVLILVAVVCLVT

VCVIYRVDLVLFYRHLTRRDETLTDGKTYDAFVSYLKECRPENGEEHTFAVE

ILPRVLEKHFGYKLCIFERDVVPGGAVVDEIHSLIEKSRRLIIVLSKSYMSNEV

RYELESGLHEALVERKIKIILIEFTPVTDFTFLPQSLKLLKSHRVLKWKADKS

LSYNSRFWKNLLYLMPAKTVKPGRDEPEVLPVLSE.

Another embodiment described herein is a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 24.

[SEQ ID NO: 24]

```
ATGGCTCTGCCTGTGACAGCTCTGCTGCTGCCTCTGGCTCTGCTTCTGCATGC

CGCCAGACCTTACTTCGGCAAGCTGGAAAGCAAGCTGAGCGTGATCCGGAAC

CTGAACGACCAGGTGCTGTTCATCGACCAGGGCAACAGACCCCTGTTCGAGG

ACATGACCGACAGCGACTGCAGAGACAACGCCCCTCGGACCATCTTCATCAT

CAGCATGTACAAGGACAGCCAGCCTAGAGGCATGGCCGTGACCATCTCTGTG

AAGTGCGAGAAGATCAGCACCCTGAGCTGCGAGAACAAGATCATCAGCTTCA

AAGAGATGAACCCGCCGGACAACATCAAGGACACCAAGAGCGACATCATATT

CTTCCAGCGGAGCGTGCCCGGCCACGACAACAAGATGCAGTTTGAGAGCAGC

AGCTACGAGGGCTACTTCCTGGCCTGCGAGAAAGAGCGGGACCTGTTCAAGC

TGATCCTGAAGAAAGAGGACGAACTGGGCGACCGCAGCATCATGTTCACCGT

GCAGAATGAGGATGGCGGCGGAGGATCTGGCGGAGGTGGAAGCGGAGGCGG

AGGCAGCTTTAATATCAGCGGCTGCAGCACCAAGAAACTGCTGTGGACCTAC

AGCACCCGCAGCGAAGAGGAATTCGTGCTGTTCTGCGACCTGCCTGAGCCTC

AGAAGTCCCACTTCTGCCACCGGAACAGACTGAGCCCTAAACAGGTGCCCGA

GCATCTGCCTTTCATGGGCAGCAACGATCTGAGCGACGTGCAGTGGTATCAGC

AGCCCAGCAATGGCGACCCTCTGGAAGATATCAGAAAGAGCTACCCTCACAT

CATCCAGGACAAGTGCACCCTGCACTTTCTGACCCCTGGCGTGAACAACAGC

GGCAGCTACATCTGCAGACCCAAGATGATCAAGAGCCCCTACGACGTGGCCT

GCTGCGTGAAGATGATCCTGGAAGTGAAGCCCCAGACCAACGCCAGCTGCGA

GTATAGCGCCAGCCACAAGCAGGATCTGCTGCTCGGCTCTACAGGCAGCATCA

GCTGTCCTAGCCTGTCCTGTCAGAGCGACGCTCAGTCTCCTGCCGTGACCTGG

TACAAGAATGGCAAGCTGCTGTCCGTGGAACGGTCCAACAGAATCGTGGTGG

ACGAGGTGTACGACTACCACCAGGGCACCTACGTGTGCGACTACACCCAGAG

CGATACCGTGTCTAGCTGGACCGTCAGAGCCGTGGTGCAAGTGCGGACAATC

GTGGGCGATACCAAGCTGAAGCCCGACATTCTGGACCCCGTGGAAGATACAC

TGGAAGTGGAACTGGGCAAGCCCCTGACCATCAGCTGCAAGGCCAGATTCGG

CTTCGAGCGGGTGTTCAACCCCGTGATCAAGTGGTACATTAAGGACAGCGAC

CTGGAATGGGAAGTGTCCGTGCCTGAGGCCAAGTCCATCAAGAGCACACTGA

AGGACGAGATCATCGAGCGGAACATCATCCTGGAAAAAGTGACCCAGAGGG

ACCTGCGGCGGAAGTTCGTGTGCTTTGTGCAGAACTCCATCGGCAACACCAC

ACAGAGCGTGCAGCTGAAAGAAAAGCGCGGCGTGGTGCTGCTGTACATCCTG

CTGGGAACAATCGGCACACTGGTGGCTGTGCTGGCTGCATCTGCCCTGCTGTA

TAGACACTGGATCGAGATCGTCCTGCTGTACCGGACCTACCAGAGCAAGGATC

AGACCCTGGGCGACAAGAAGGACTTCGACGCCTTTGTGTCCTACGCCAAGTG

GTCCAGCTTTCCCAGCGAGGCCACATCTAGCCTGAGCGAGGAACATCTGGCC

CTGTCTCTGTTCCCCGACGTGCTGGAAAACAAATACGGCTACAGCCTGTGCCT

GCTGGAAAGAGATGTTGCCCCTGGCGGAGTGTACGCCGAGGATATCGTGTCC
```

-continued

ATCATCAAGCGGAGCAGACGGGGCATCTTCATTCTGAGCCCCAACTACGTGAA

CGGCCCCAGCATCTTTGAACTGCAAGCCGCCGTGAACCTGGCTCTGGACGAT

CAGACACTGAAGCTCATCCTGATCAAGTTCTGCTACTTCCAAGAGCCTGAGAG

CCTGCCTCACCTGGTCAAAAAGGCCCTGAGAGTGCTGCCCACCGTGACTTGG

AGAGGCCTGAAAAGCGTGCCACCTAACAGCCGGTTCTGGGCCAAGATGAGAT

ACCACATGCCTGTGAAGAACAGCCAGGGCTTCACCTGGAACCAGCTGCGGAT

CACCAGCCGGATCTTTCAGTGGAAGGGCCTGAGCAGAACCGAGACAACCGG

CAGAAGCTCCCAGCCTAAAGAGTGGTGA.

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 25. Underlined sequences represent the signal peptide (not bold) and mature IL-18 polypeptide (bold). The bold sequences (not underlined) represent the mature form of IL-18Rβ.

[SEQ ID NO: 25]

MALPVTALLLPLALLLHAARPYFGKLESKLSVIRNLNDQVLFIDQGNRPLFED

MTDSDCRDNAPRTIFIISMYKDSQPRGMAVTISVKCEKISTLSCENKIISFKEM

NPPDNIKDTKSDIIFFQRSVPGHDNKMQFESSSYEGYFLACEKERDLFKLILK

KEDELGDRSIMFTVQNEDGGGGSGGGGSGGGGSFNISGCSTKKLLWTYSTRS

EEEFVLFCDLPEPQKSHFCHRNRLSPKQVPEHLPFMGSNDLSDVQWYQQPS

NGDPLEDIRKSYPHIIQDKCTLHFLTPGVNNSGSYICRPKMIKSPYDVACCVK

MILEVKPQTNASCEYSASHKQDLLLGSTGSISCPSLSCQSDAQSPAVTWYKN

GKLLSVERSNRIVVDEVYDYHQGTYVCDYTQSDTVSSWTVRAVVQVRTIVG

DTKLKPDILDPVEDTLEVELGKPLTISCKARFGFERVENPVIKWYIKDSDLE

WEVSVPEAKSIKSTLKDEIIERNIILEKVTQRDLRRKFVCFVQNSIGNTTQSV

QLKEKRGVVLLYILLGTIGTLVAVLAASALLYRHWIEIVLLYRTYQSKDQTL

GDKKDFDAFVSYAKWSSFPSEATSSLSEEHLALSLFPDVLENKYGYSLCLLE

RDVAPGGVYAEDIVSIIKRSRRGIFILSPNYVNGPSIFELQAAVNLALDDQTLK

LILIKFCYFQEPESLPHLVKKALRVLPTVTWRGLKSVPPNSRFWAKMRYHM

PVKNSQGFTWNQLRITSRIFQWKGLSRTETTGRSSQPKEW.

Another embodiment described herein is a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 26.

[SEQ ID NO: 26]

ATGGCTCTGCCTGTGACAGCTCTGCTGCTGCCTCTGGCTCTGCTTCTGCATGC

CGCCAGACCTTACTTCGGCAAGCTGGAAAGCAAGCTGAGCGTGATCCGGAAC

CTGAACGACCAGGTGCTGTTCATCGACCAGGGCAACAGACCCCTGTTCGAGG

ACATGACCGACAGCGACTGCAGAGACAACGCCCCTCGGACCATCTTCATCAT

CAGCATGTACAAGGACAGCCAGCCTAGAGGCATGGCCGTGACCATCTCTGTG

AAGTGCGAGAAGATCAGCACCCTGAGCTGCGAGAACAAGATCATCAGCTTCA

AAGAGATGAACCCGCCGGACAACATCAAGGACACCAAGAGCGACATCATATT

-continued

```
CTTCCAGCGGAGCGTGCCCGGCCACGACAACAAGATGCAGTTTGAGAGCAGC
AGCTACGAGGGCTACTTCCTGGCCTGCGAGAAAGAGCGGGACCTGTTCAAGC
TGATCCTGAAGAAAGAGGACGAACTGGGCGACCGCAGCATCATGTTCACCGT
GCAGAATGAGGATGGCGGCGGAGGATCTGGCGGAGGTGGAAGCGGAGGCGG
AGGAAGCGGTGGCGGCGGATCCTTTAATATCAGCGGCTGCAGCACCAAGAAA
CTGCTGTGGACCTACAGCACCCGCAGCGAAGAGGAATTCGTGCTGTTCTGCG
ACCTGCCTGAGCCTCAGAAGTCCCACTTCTGCCACCGGAACAGACTGAGCCC
TAAACAGGTGCCCGAGCATCTGCCTTTCATGGGCAGCAACGATCTGAGCGAC
GTGCAGTGGTATCAGCAGCCCAGCAATGGCGACCCTCTGGAAGATATCAGAA
AGAGCTACCCTCACATCATCCAGGACAAGTGCACCCTGCACTTTCTGACCCCT
GGCGTGAACAACAGCGGCAGCTACATCTGCAGACCCAAGATGATCAAGAGCC
CCTACGACGTGGCCTGCTGCGTGAAGATGATCCTGGAAGTGAAGCCCCAGAC
CAACGCCAGCTGCGAGTATAGCGCCAGCCACAAGCAGGATCTGCTGCTCGGC
TCTACAGGCAGCATCAGCTGTCCTAGCCTGTCCTGTCAGAGCGACGCTCAGTC
TCCTGCCGTGACCTGGTACAAGAATGGCAAGCTGCTGTCCGTGGAACGGTCC
AACAGAATCGTGGTGGACGAGGTGTACGACTACCACCAGGGCACCTACGTGT
GCGACTACACCCAGAGCGATACCGTGTCTAGCTGGACCGTCAGAGCCGTGGT
GCAAGTGCGGACAATCGTGGGCGATACCAAGCTGAAGCCCGACATTCTGGAC
CCCGTGGAAGATACACTGGAAGTGGAACTGGGCAAGCCCCTGACCATCAGCT
GCAAGGCCAGATTCGGCTTCGAGCGGGTGTTCAACCCCGTGATCAAGTGGTA
CATTAAGGACAGCGACCTGGAATGGGAAGTGTCCGTGCCTGAGGCCAAGTCC
ATCAAGAGCACACTGAAGGACGAGATCATCGAGCGGAACATCATCCTGGAAA
AAGTGACCCAGAGGGACCTGCGGCGGAAGTTCGTGTGCTTTGTGCAGAACTC
CATCGGCAACACCACACAGAGCGTGCAGCTGAAAGAAAAGCGCGGCGTGGT
GCTGCTGTACATCCTGCTGGGAACAATCGGCACACTGGTGGCTGTGCTGGCTG
CATCTGCCCTGCTGTATAGACACTGGATCGAGATCGTCCTGCTGTACCGGACC
TACCAGAGCAAGGATCAGACCCTGGGCGACAAGAAGGACTTCGACGCCTTTG
TGTCCTACGCCAAGTGGTCCAGCTTTCCCAGCGAGGCCACATCTAGCCTGAGC
GAGGAACATCTGGCCCTGTCTCTGTTCCCCGACGTGCTGGAAAACAAATACG
GCTACAGCCTGTGCCTGCTGGAAAGAGATGTTGCCCCTGGCGGAGTGTACGC
CGAGGATATCGTGTCCATCATCAAGCGGAGCAGACGGGGCATCTTCATTCTGA
GCCCCAACTACGTGAACGGCCCCAGCATCTTTGAACTGCAAGCCGCCGTGAA
CCTGGCTCTGGACGATCAGACACTGAAGCTCATCCTGATCAAGTTCTGCTACT
TCCAAGAGCCTGAGAGCCTGCCTCACCTGGTCAAAAAGGCCCTGAGAGTGCT
GCCCACCGTGACTTGGAGAGGCCTGAAAAGCGTGCCACCTAACAGCCGGTTC
TGGGCCAAGATGAGATACCACATGCCTGTGAAGAACAGCCAGGGCTTCACCT
GGAACCAGCTGCGGATCACCAGCCGGATCTTTCAGTGGAAGGGCCTGAGCAG
AACCGAGACAACCGGCAGAAGCTCCCAGCCTAAAGAGTGGTGA.
```

Another embodiment described herein is an amino acid sequence having at least 7500 sequence identity to (such as, at least 75%, at least 800%, at least 90%, at least 95%, or 100% identity; e.g., 85-90%, 85-95%, 85-100%, 90-95%, 90-100%, or 95-100%) SEQ ID NO: 27. Underlined sequences represent the signal peptide (not bold) and mature IL-18 polypeptide (bold). The bold sequences (not underlined) represent the mature form of IL-18Rβ

[SEQ ID NO: 27]

MALPVTALLLPLALLLHAARPYFGKLESKLSVIRNLNDQVLFIDOGNRPLFED

MTDSDCRDNAPRTIFIISMYKDSQPRGMAVTISVKCEKISTLSCENKIISFKEM

NPPDNIKDTKSDIIFFQRSVPGHDNKMQFESSSYEGYFLACEKERDLFKLILK

KEDELGDRSIMFTVQNEDGGGGSGGGGSGGGGSGGGGSFNISGCSTKKLLWT

YSTRSEEEFVLFCDLPEPQKSHFCHRNRLSPKQVPEHLPFMGSNDLSDVQW

YQQPSNGDPLEDIRKSYPHIIQDKCTLHFLTPGVNNSGSYICRPKMIKSPYDV

ACCVKMILEVKPQTNASCEYSASHKQDLLLGSTGSISCPSLSCQSDAQSPAVT

WYKNGKLLSVERSNRIVVDEVYDYHQGTYVCDYTQSDTVSSWTVRAVVQV

RTIVGDTKLKPDILDPVEDTLEVELGKPLTISCKARFGFERVENPVIKWYIKD

SDLEWEVSVPEAKSIKSTLKDEHERNIILEKVTQRDLRRKFVCFVQNSIGNTT

QSVQLKEKRGVVLLYILLGTIGTLVAVLAASALLYRHWIEIVLLYRTYQSKDQ

TLGDKKDFDAFVSYAKWSSFPSEATSSLSEEHLALSLFPDVLENKYGYSLCLL

ERDVAPGGVYAEDIVSIIKRSRRGIFILSPNYVNGPSIFELQAAVNLALDDQTL

KLILIKFCYFQEPESLPHLVKKALRVLPTVTWRGLKSVPPNSRFWAKMRYH

MPVKNSQGFTWNQLRITSRIFQWKGLSRTETTGRSSQPKEW.

Another embodiment described herein is a nucleic acid sequence having at least 7500 sequence identity to (such as, at least 7500 at least 80%, at least 900%, at least 9500 or 100% identity; e.g., 85-90%, 85-95%, 85-100%, 90-95%, 90-100%, or 95-100%) SEQ ID NO: 28

[SEQ ID NO: 28]

ATGGCTCTGCCTGTGACAGCTCTGCTGCTGCCTCTGGCTCTGCTTCTGCATGC

CGCCAGACCTTACTTCGGCAAGCTGGAAAGCAAGCTGAGCGTGATCCGGAA

CCTGAACGACCAGGTGCTGTTCATCGACCAGGGCAACAGACCCCTGTTCGAG

GACATGACCGACAGCGACTGCAGAGACAACGCCCCTCGGACCATCTTCATCA

TCAGCATGTACAAGGACAGCCAGCCTAGAGGCATGGCCGTGACCATCTCTGT

GAAGTGCGAGAAGATCAGCACCCTGAGCTGCGAGAACAAGATCATCAGCTT

CAAAGAGATGAACCCGCCGGACAACATCAAGGACACCAAGAGCGACATCAT

ATTCTTCCAGCGGAGCGTGCCCGGCCACGACAACAAGATGCAGTTTGAGAGC

AGCAGCTACGAGGGCTACTTCCTGGCCTGCGAGAAAGAGCGGGACCTGTTCA

AGCTGATCCTGAAGAAAGAGGACGAACTGGGCGACCGCAGCATCATGTTCA

CCGTGCAGAATGAGGATGGCGGCGGAGGATCTGGCGGAGGTGGAAGCGGAG

GCGGAGGAAGCGGTGGCGGCGGATCCGAACAGAAGCTGATAAGTGAGGAG

GACTTGTTTAATATCAGCGGCTGCAGCACCAAGAAACTGCTGTGGACCTACA

GCACCCGCAGCGAAGAGGAATTCGTGCTGTTCTGCGACCTGCCTGAGCCTCA

GAAGTCCCACTTCTGCCACCGGAACAGACTGAGCCCTAAACAGGTGCCCGAG

CATCTGCCTTTCATGGGCAGCAACGATCTGAGCGACGTGCAGTGGTATCAGC

AGCCCAGCAATGGCGACCCTCTGGAAGATATCAGAAAGAGCTACCCTCACAT

CATCCAGGACAAGTGCACCCTGCACTTTCTGACCCCTGGCGTGAACAACAGC

GGCAGCTACATCTGCAGACCCAAGATGATCAAGAGCCCCTACGACGTGGCCT

GCTGCGTGAAGATGATCCTGGAAGTGAAGCCCCAGACCAACGCCAGCTGCG

-continued

```
AGTATAGCGCCAGCCACAAGCAGGATCTGCTGCTCGGCTCTACAGGCAGCAT

CAGCTGTCCTAGCCTGTCCTGTCAGAGCGACGCTCAGTCTCCTGCCGTGACCT

GGTACAAGAATGGCAAGCTGCTGTCCGTGGAACGGTCCAACAGAATCGTGG

TGGACGAGGTGTACGACTACCACCAGGGCACCTACGTGTGCGACTACACCCA

GAGCGATACCGTGTCTAGCTGGACCGTCAGAGCCGTGGTGCAAGTGCGGAC

AATCGTGGGCGATACCAAGCTGAAGCCCGACATTCTGGACCCCGTGGAAGAT

ACACTGGAAGTGGAACTGGGCAAGCCCCTGACCATCAGCTGCAAGGCCAGA

TTCGGCTTCGAGCGGGTGTTCAACCCCGTGATCAAGTGGTACATTAAGGACA

GCGACCTGGAATGGGAAGTGTCCGTGCCTGAGGCCAAGTCCATCAAGAGCA

CACTGAAGGACGAGATCATCGAGCGGAACATCATCCTGGAAAAAGTGACCC

AGAGGGACCTGCGGCGGAAGTTCGTGTGCTTTGTGCAGAACTCCATCGGCAA

CACCACACAGAGCGTGCAGCTGAAAGAAAAGCGCGGCGTGGTGCTGCTGTA

CATCCTGCTGGGAACAATCGGCACACTGGTGGCTGTGCTGGCTGCATCTGCC

CTGCTGTATAGACACTGGATCGAGATCGTCCTGCTGTACCGGACCTACCAGA

GCAAGGATCAGACCCTGGGCGACAAGAAGGACTTCGACGCCTTTGTGTCCTA

CGCCAAGTGGTCCAGCTTTCCCAGCGAGGCCACATCTAGCCTGAGCGAGGAA

CATCTGGCCCTGTCTCTGTTCCCCGACGTGCTGGAAAACAAATACGGCTACA

GCCTGTGCCTGCTGGAAAGAGATGTTGCCCCTGGCGGAGTGTACGCCGAGGA

TATCGTGTCCATCATCAAGCGGAGCAGACGGGGCATCTTCATTCTGAGCCCC

AACTACGTGAACGGCCCCAGCATCTTTGAACTGCAAGCCGCCGTGAACCTGG

CTCTGGACGATCAGACACTGAAGCTCATCCTGATCAAGTTCTGCTACTTCCA

AGAGCCTGAGAGCCTGCCTCACCTGGTCAAAAAGGCCCTGAGAGTGCTGCCC

ACCGTGACTTGGAGAGGCCTGAAAAGCGTGCCACCTAACAGCCGGTTCTGGG

CCAAGATGAGATACCACATGCCTGTGAAGAACAGCCAGGGCTTCACCTGGA

ACCAGCTGCGGATCACCAGCCGGATCTTTCAGTGGAAGGGCCTGAGCAGAA

CCGAGACAACCGGCAGAAGCTCCCAGCCTAAAGAGTGGTGA.
```

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 29.

```
                                                    [SEQ ID NO: 29]
MALPVTALLLPLALLLHAARPYFGKLESKLSVIRNLNDQVLFIDQGNRPLFEDMT

DSDCRDNAPRTIFIISMYKDSQPRGMAVTISVKCEKISTLSCENKIISFKEMNPPDN

IKDTKSDIIFFQRSVPGHDNKMQFESSSYEGYFLACEKERDLFKLILKKEDELGDR

SIMFTVQNEDGGGGSGGGGSGGGGSGGGGSEQKLISEEDLFNISGCSTKKLLWT

YSTRSEEEFVLFCDLPEPQKSHFCHRNRLSPKQVPEHLPFMGSNDLSDVQWYQQ

PSNGDPLEDIRKSYPHIIQDKCTLHFLTPGVNNSGSYICRPKMIKSPYDVACCVK

MILEVKPQTNASCEYSASHKQDLLLGSTGSISCPSLSCQSDAQSPAVTWYKNGKL

LSVERSNRIVVDEVYDYHQGTYVCDYTQSDTVSSWTVRAVVQVRTIVGDTKLK

PDILDPVEDTLEVELGKPLTISCKARFGFERVFNPVIKWYIKDSDLEWEVSVPEAK

SIKSTLKDEIIERNIILEKVTQRDLRRKFVCFVQNSIGNTTQSVQLKEKRGVVLLYI
```

-continued

LLGTIGTLVAVLAASALLYRHWIEIVLLYRTYQSKDQTLGDKKDFDAFVSYAKW

SSFPSEATSSLSEEHLALSLFPDVLENKYGYSLCLLERDVAPGGVYAEDIVSIIKRS

RRGIFILSPNYVNGPSIFELQAAVNLALDDQTLKLILIKFCYFQEPESLPHLVKKAL

RVLPTVTWRGLKSVPPNSRFWAKMRYHMPVKNSQGFTWNQLRITSRIFQWKGL

SRTETTGRSSQPKEW.

Another embodiment described herein is a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 30.

[SEQ ID NO: 30]

ATGGCTCTGCCTGTGACAGCTCTGCTGCTGCCTCTGGCTCTGCTTCTGCATGCCGCCA

GACCTTACTTCGGCAAGCTGGAAAGCAAGCTGAGCGTGATCCGGAACCTGAACGAC

CAGGTGCTGTTCATCGACCAGGGCAACAGACCCCTGTTCGAGGACATGACCGACAG

CGACTGCAGAGACAACGCCCCTCGGACCATCTTCATCATCAGCATGTACAAGGACA

GCCAGCCTAGAGGCATGGCCGTGACCATCTCTGTGAAGTGCGAGAAGATCAGCACC

CTGAGCTGCGAGAACAAGATCATCAGCTTCAAAGAGATGAACCCGCCGGACAACAT

CAAGGACACCAAGAGCGACATCATATTCTTCCAGCGGAGCGTGCCCGGCCACGACA

ACAAGATGCAGTTTGAGAGCAGCAGCTACGAGGGCTACTTCCTGGCCTGCGAGAAA

GAGCGGGACCTGTTCAAGCTGATCCTGAAGAAAGAGGACGAACTGGGCGACCGCAG

CATCATGTTCACCGTGCAGAATGAGGATGGCGGCGGAGGATCTGGCGGAGGTGGAA

GCGGAGGCGGAGGAAGCGGTGGCGGCGGATCCggctccacctctggatccggcaagcc cggatctggcgagggatccaccaagggcTTTAATATCAGCGGCTGCAGCACCAAGAAA

CTGCTGTGGACCTACAGCACCCGCAGCGAAGAGGAATTCGTGCTGTTCTGCGACCTGC

CTGAGCCTCAGAAGTCCCACTTCTGCCACCGGAACAGACTGAGCCCTAAACAGGTGCC

CGAGCATCTGCCTTTCATGGGCAGCAACGATCTGAGCGACGTGCAGTGGTATCAGCAG

CCCAGCAATGGCGACCCTCTGGAAGATATCAGAAAGAGCTACCCTCACATCATCCAGG

ACAAGTGCACCCTGCACTTTCTGACCCCTGGCGTGAACAACAGCGGCAGCTACATCTG

CAGACCCAAGATGATCAAGAGCCCCTACGACGTGGCCTGCTGCGTGAAGATGATCCTG

GAAGTGAAGCCCCAGACCAACGCCAGCTGCGAGTATAGCGCCAGCCACAAGCAGGATC

TGCTGCTCGGCTCTACAGGCAGCATCAGCTGTCCTAGCCTGTCCTGTCAGAGCGACGC

TCAGTCTCCTGCCGTGACCTGGTACAAGAATGGCAAGCTGCTGTCCGTGGAACGGTCC

AACAGAATCGTGGTGGACGAGGTGTACGACTACCACCAGGGCACCTACGTGTGCGACT

ACACCCAGAGCGATACCGTGTCTAGCTGGACCGTCAGAGCCGTGGTGCAAGTGCGGA

CAATCGTGGGCGATACCAAGCTGAAGCCCGACATTCTGGACCCCGTGGAAGATACA

CTGGAAGTGGAACTGGGCAAGCCCCTGACCATCAGCTGCAAGGCCAGATTCGGCTT

CGAGCGGGTGTTCAACCCCGTGATCAAGTGGTACATTAAGGACAGCGACCTGGAAT

GGGAAGTGTCCGTGCCTGAGGCCAAGTCCATCAAGAGCACACTGAAGGACGAGATC

ATCGAGCGGAACATCATCCTGGAAAAAGTGACCCAGAGGGACCTGCGGCGGAAGTT

CGTGTGCTTTGTGCAGAACTCCATCGGCAACACCACACAGAGCGTGCAGCTGAAAG

AAAAGCGCGGCGTGGTGCTGCTGTACATCCTGCTGGGAACAATCGGCACACTGGTG

-continued

GCTGTGCTGGCTGCATCTGCCCTGCTGTATAGACACTGGATCGAGATCGTCCTGCTG

TACCGGACCTACCAGAGCAAGGATCAGACCCTGGGCGACAAGAAGGACTTCGACGC

CTTTGTGTCCTACGCCAAGTGGTCCAGCTTTCCCAGCGAGGCCACATCTAGCCTGAG

CGAGGAACATCTGGCCCTGTCTCTGTTCCCCGACGTGCTGGAAAACAAATACGGCTA

CAGCCTGTGCCTGCTGGAAAGAGATGTTGCCCCTGGCGGAGTGTACGCCGAGGATAT

CGTGTCCATCATCAAGCGGAGCAGACGGGGCATCTTCATTCTGAGCCCCAACTACGT

GAACGGCCCCAGCATCTTTGAACTGCAAGCCGCCGTGAACCTGGCTCTGGACGATCA

GACACTGAAGCTCATCCTGATCAAGTTCTGCTACTTCCAAGAGCCTGAGAGCCTGCC

TCACCTGGTCAAAAAGGCCCTGAGAGTGCTGCCCACCGTGACTTGGAGAGGCCTGA

AAAGCGTGCCACCTAACAGCCGGTTCTGGGCCAAGATGAGATACCACATGCCTGTG

AAGAACAGCCAGGGCTTCACCTGGAACCAGCTGCGGATCACCAGCCGGATCTTTCA

GTGGAAGGGCCTGAGCAGAACCGAGACAACCGGCAGAAGCTCCCAGCCTAAAGAGT

GGTGA.

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 31.

[SEQ ID NO: 31]

MALPVTALLLPLALLLHAARPYFGKLESKLSVIRNLNDQVLFIDQGNRPLFEDMT

DSDCRDNAPRTIFIISMYKDSQPRGMAVTISVKCEKISTLSCENKIISFKEMNPPDN

IKDTKSDIIFFQRSVPGHDNKMQFESSSYEGYFLACEKERDLFKLILKKEDELGDR

SIMFTVQNEDGGGGSGGGGSGGGGSGGGGSGSTSGSGKPGSGEGSTKGFNISGC

STKKLLWTYSTRSEEEFVLFCDLPEPQKSHFCHRNRLSPKQVPEHLPFMGSNDLS

DVQWYQQPSNGDPLEDIRKSYPHIIQDKCTLHFLTPGVNNSGSYICRPKMIKSPY

DVACCVKMILEVKPQTNASCEYSASHKQDLLLGSTGSISCPSLSCQSDAQSPAVT

WYKNGKLLSVERSNRIVVDEVYDYHQGTYVCDYTQSDTVSSWTVRAVVQVRT

IVGDTKLKPDILDPVEDTLEVELGKPLTISCKARFGFERVFNPVIKWYIKDSDLEW

EVSVPEAKSIKSTLKDEIIERNIILEKVTQRDLRRKFVCFVQNSIGNTTQSVQLKEK

RGVVLLYILLGTIGTLVAVLAASALLYRHWIEIVLLYRTYQSKDQTLGDKKDFD

AFVSYAKWSSFPSEATSSLSEEHLALSLFPDVLENKYGYSLCLLERDVAPGGVYA

EDIVSIIKRSRRGIFILSPNYVNGPSIFELQAAVNLALDDQTLKLILIKFCYFQEPES

LPHLVKKALRVLPTVTWRGLKSVPPNSRFWAKMRYHMPVKNSQGFTWNQLRI

TSRIFQWKGLSRTETTGRSSQPKEW

Another embodiment described herein is a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 32.

[SEQ ID NO: 32]

ATGGCTCTGCCTGTGACAGCTCTGCTGCTGCCTCTGGCTCTGCTTCTGCATGC

CGCCAGACCTTACTTCGGCAAGCTGGAAAGCAAGCTGAGCGTGATCCGGAA

CCTGAACGACCAGGTGCTGTTCATCGACCAGGGCAACAGACCCCTGTTCGAG

-continued

GACATGACCGACAGCGACTGCAGAGACAACGCCCCTCGGACCATCTTCATCA

TCAGCATGTACAAGGACAGCCAGCCTAGAGGCATGGCCGTGACCATCTCTGT

GAAGTGCGAGAAGATCAGCACCCTGAGCTGCGAGAACAAGATCATCAGCTT

CAAAGAGATGAACCCGCCGGACAACATCAAGGACACCAAGAGCGACATCAT

ATTCTTCCAGCGGAGCGTGCCCGGCCACGACAACAAGATGCAGTTTGAGAGC

AGCAGCTACGAGGGCTACTTCCTGGCCTGCGAGAAAGAGCGGGACCTGTTCA

AGCTGATCCTGAAGAAAGAGGACGAACTGGGCGACCGCAGCATCATGTTCA

CCGTGCAGAATGAGGATGGCGGCGGAGGATCTGGCGGAGGTGGAAGCGGAG

GCGGAGGAAGCGGTGGCGGCGGATCCggctccacctctggatccggcaagcc cggatctggcgagggatccaccaagggcGAACAGAAGCTGATAAGTGAGGAG

GACTTGTTTAATATCAGCGGCTGCAGCACCAAGAAACTGCTGTGGACCTACAG

CACCCGCAGCGAAGAGGAATTCGTGCTGTTCTGCGACCTGCCTGAGCCTCAGA

AGTCCCACTTCTGCCACCGGAACAGACTGAGCCCTAAACAGGTGCCCGAGCAT

CTGCCTTTCATGGGCAGCAACGATCTGAGCGACGTGCAGTGGTATCAGCAGCC

CAGCAATGGCGACCCTCTGGAAGATATCAGAAAGAGCTACCCTCACATCATCC

AGGACAAGTGCACCCTGCACTTTCTGACCCCTGGCGTGAACAACAGCGGCAGC

TACATCTGCAGACCCAAGATGATCAAGAGCCCCTACGACGTGGCCTGCTGCGT

GAAGATGATCCTGGAAGTGAAGCCCCAGACCAACGCCAGCTGCGAGTATAGCG

CCAGCCACAAGCAGGATCTGCTGCTCGGCTCTACAGGCAGCATCAGCTGTCCT

AGCCTGTCCTGTCAGAGCGACGCTCAGTCTCCTGCCGTGACCTGGTACAAGAA

TGGCAAGCTGCTGTCCGTGGAACGGTCCAACAGAATCGTGGTGGACGAGGTGT

ACGACTACCACCAGGGCACCTACGTGTGCGACTACACCCAGAGCGATACCGTG

TCTAGCTGGACCGTCAGAGCCGTGGTGCAAGTGCGGACAATCGTGGGCGATAC

CAAGCTGAAGCCCGACATTCTGGACCCCGTGGAAGATACACTGGAAGTGGAAC

TGGGCAAGCCCCTGACCATCAGCTGCAAGGCCAGATTCGGCTTCGAGCGGGT

GTTCAACCCCGTGATCAAGTGGTACATTAAGGACAGCGACCTGGAATGGGA

AGTGTCCGTGCCTGAGGCCAAGTCCATCAAGAGCACACTGAAGGACGAGAT

CATCGAGCGGAACATCATCCTGGAAAAAGTGACCCAGAGGGACCTGCGGCG

GAAGTTCGTGTGCTTTGTGCAGAACTCCATCGGCAACACCACACAGAGCGTG

CAGCTGAAAGAAAAGCGCGGCGTGGTGCTGCTGTACATCCTGCTGGGAACA

ATCGGCACACTGGTGGCTGTGCTGGCTGCATCTGCCCTGCTGTATAGACACT

GGATCGAGATCGTCCTGCTGTACCGGACCTACCAGAGCAAGGATCAGACCCT

GGGCGACAAGAAGGACTTCGACGCCTTTGTGTCCTACGCCAAGTGGTCCAGC

TTTCCCAGCGAGGCCACATCTAGCCTGAGCGAGGAACATCTGGCCCTGTCTC

TGTTCCCCGACGTGCTGGAAAACAAATACGGCTACAGCCTGTGCCTGCTGGA

AAGAGATGTTGCCCCTGGCGGAGTGTACGCCGAGGATATCGTGTCCATCATC

AAGCGGAGCAGACGGGGCATCTTCATTCTGAGCCCCAACTACGTGAACGGCC

CCAGCATCTTTGAACTGCAAGCCGCCGTGAACCTGGCTCTGGACGATCAGAC

ACTGAAGCTCATCCTGATCAAGTTCTGCTACTTCCAAGAGCCTGAGAGCCTG

CCTCACCTGGTCAAAAAGGCCCTGAGAGTGCTGCCCACCGTGACTTGGAGAG

-continued

GCCTGAAAAGCGTGCCACCTAACAGCCGGTTCTGGGCCAAGATGAGATACC

ACATGCCTGTGAAGAACAGCCAGGGCTTCACCTGGAACCAGCTGCGGATCAC

CAGCCGGATCTTTCAGTGGAAGGGCCTGAGCAGAACCGAGACAACCGGCAG

AAGCTCCCAGCCTAAAGAGTGGTGA.

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 33.

[SEQ ID NO: 33]

MALPVTALLLPLALLLHAARPYFGKLESKLSVIRNLNDQVLFIDQGNRPLFEDMT

DSDCRDNAPRTIFIISMYKDSQPRGMAVTISVKCEKISTLSCENKIISFKEMNPPDN

IKDTKSDIIFFQRSVPGHDNKMQFESSSYEGYFLACEKERDLFKLILKKEDELGDR

SIMFTVQNEDGGGGSGGGGSGGGGSGGGGSGSTSGSGKPGSGEGSTKGEQKLIS

EEDLFNISGCSTKKLLWTYSTRSEEEFVLFCDLPEPQKSHFCHRNRLSPKQVPEHL

PFMGSNDLSDVQWYQQPSNGDPLEDIRKSYPHIIQDKCTLHFLTPGVNNSGSYIC

RPKMIKSPYDVACCVKMILEVKPQTNASCEYSASHKQDLLLGSTGSISCPSLSCQ

SDAQSPAVTWYKNGKLLSVERSNRIVVDEVYDYHQGTYVCDYTQSDTVSSWT

VRAVVQVRTIVGDTKLKPDILDPVEDTLEVELGKPLTISCKARFGFERVFNPVIK

WYIKDSDLEWEVSVPEAKSIKSTLKDEIIERNIILEKVTQRDLRRKFVCFVQNSIG

NTTQSVQLKEKRGVVLLYILLGTIGTLVAVLAASALLYRHWIEIVLLYRTYQSKD

QTLGDKKDFDAFVSYAKWSSFPSEATSSLSEEHLALSLFPDVLENKYGYSLCLLE

RDVAPGGVYAEDIVSIIKRSRRGIFILSPNYVNGPSIFELQAAVNLALDDQTLKLIL

IKFCYFQEPESLPHLVKKALRVLPTVTWRGLKSVPPNSRFWAKMRYHMPVKNS

QGFTWNQLRITSRIFQWKGLSRTETTGRSSQPKEW.

Another embodiment described herein is a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 34.

[SEQ ID NO: 34]

ATGGCTCTGCCTGTGACAGCTCTGCTGCTGCCTCTGGCTCTGCTTCTGCATGC

CGCCAGACCTTACTTCGGCAAGCTGGAAAGCAAGCTGAGCGTGATCCGGAA

CCTGAACGACCAGGTGCTGTTCATCGACCAGGGCAACAGACCCCTGTTCGAG

GACATGACCGACAGCGACTGCAGAGACAACGCCCCTCGGACCATCTTCATCA

TCAGCATGTACAAGGACAGCCAGCCTAGAGGCATGGCCGTGACCATCTCTGT

GAAGTGCGAGAAGATCAGCACCCTGAGCTGCGAGAACAAGATCATCAGCTT

CAAAGAGATGAACCCGCCGGACAACATCAAGGACACCAAGAGCGACATCAT

ATTCTTCCAGCGGAGCGTGCCCGGCCACGACAACAAGATGCAGTTTGAGAGC

AGCAGCTACGAGGGCTACTTCCTGGCCTGCGAGAAAGAGCGGGACCTGTTCA

AGCTGATCCTGAAGAAAGAGGACGAACTGGGCGACCGCAGCATCATGTTCA

CCGTGCAGAATGAGGATGGCGGCGGAGGATCTGGCGGAGGTGGAAGCGGAG

GCGGAGGAAGCGGTGGCGGCGGATCCGGCGGTGGCGGTTCAGGCGGTGGCG

-continued

GATCTTTTAATATCAGCGGCTGCAGCACCAAGAAACTGCTGTGGACCTACAG

CACCCGCAGCGAAGAGGAATTCGTGCTGTTCTGCGACCTGCCTGAGCCTCAG

AAGTCCCACTTCTGCCACCGGAACAGACTGAGCCCTAAACAGGTGCCCGAGC

ATCTGCCTTTCATGGGCAGCAACGATCTGAGCGACGTGCAGTGGTATCAGCA

GCCCAGCAATGGCGACCCTCTGGAAGATATCAGAAAGAGCTACCCTCACATC

ATCCAGGACAAGTGCACCCTGCACTTTCTGACCCCTGGCGTGAACAACAGCG

GCAGCTACATCTGCAGACCCAAGATGATCAAGAGCCCCTACGACGTGGCCTG

CTGCGTGAAGATGATCCTGGAAGTGAAGCCCCAGACCAACGCCAGCTGCGA

GTATAGCGCCAGCCACAAGCAGGATCTGCTGCTCGGCTCTACAGGCAGCATC

AGCTGTCCTAGCCTGTCCTGTCAGAGCGACGCTCAGTCTCCTGCCGTGACCTG

GTACAAGAATGGCAAGCTGCTGTCCGTGGAACGGTCCAACAGAATCGTGGT

GGACGAGGTGTACGACTACCACCAGGGCACCTACGTGTGCGACTACACCCA

GAGCGATACCGTGTCTAGCTGGACCGTCAGAGCCGTGGTGCAAGTGCGGAC

AATCGTGGGCGATACCAAGCTGAAGCCCGACATTCTGGACCCCGTGGAAGAT

ACACTGGAAGTGGAACTGGGCAAGCCCCTGACCATCAGCTGCAAGGCCAGA

TTCGGCTTCGAGCGGGTGTTCAACCCCGTGATCAAGTGGTACATTAAGGACA

GCGACCTGGAATGGGAAGTGTCCGTGCCTGAGGCCAAGTCCATCAAGAGCA

CACTGAAGGACGAGATCATCGAGCGGAACATCATCCTGGAAAAAGTGACCC

AGAGGGACCTGCGGCGGAAGTTCGTGTGCTTTGTGCAGAACTCCATCGGCAA

CACCACACAGAGCGTGCAGCTGAAAGAAAAGCGCGGCGTGGTGCTGCTGTA

CATCCTGCTGGGAACAATCGGCACACTGGTGGCTGTGCTGGCTGCATCTGCC

CTGCTGTATAGACACTGGATCGAGATCGTCCTGCTGTACCGGACCTACCAGA

GCAAGGATCAGACCCTGGGCGACAAGAAGGACTTCGACGCCTTTGTGTCCTA

CGCCAAGTGGTCCAGCTTTCCCAGCGAGGCCACATCTAGCCTGAGCGAGGAA

CATCTGGCCCTGTCTCTGTTCCCCGACGTGCTGGAAAACAAATACGGCTACA

GCCTGTGCCTGCTGGAAAGAGATGTTGCCCCTGGCGGAGTGTACGCCGAGGA

TATCGTGTCCATCATCAAGCGGAGCAGACGGGGCATCTTCATTCTGAGCCCC

AACTACGTGAACGGCCCCAGCATCTTTGAACTGCAAGCCGCCGTGAACCTGG

CTCTGGACGATCAGACACTGAAGCTCATCCTGATCAAGTTCTGCTACTTCCA

AGAGCCTGAGAGCCTGCCTCACCTGGTCAAAAAGGCCCTGAGAGTGCTGCCC

ACCGTGACTTGGAGAGGCCTGAAAAGCGTGCCACCTAACAGCCGGTTCTGGG

CCAAGATGAGATACCACATGCCTGTGAAGAACAGCCAGGGCTTCACCTGGA

ACCAGCTGCGGATCACCAGCCGGATCTTTCAGTGGAAGGGCCTGAGCAGAA

CCGAGACAACCGGCAGAAGCTCCCAGCCTAAAGAGTGGTGA.

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 35.

[SEQ ID NO: 35]

MALPVTALLLPLALLLHAARPYFGKLESKLSVIRNLNDQVLFIDQGNRPLFEDMT

DSDCRDNAPRTIFIISMYKDSQPRGMAVTISVKCEKISTLSCENKIISFKEMNPPDN

IKDTKSDIIFFQRSVPGHDNKMQFESSSYEGYFLACEKERDLFKLILKKEDELGDR

SIMFTVQNEDGGGGSGGGGSGGGGSGGGGSGGGGSGGGGSFNISGCSTKKLLW

TYSTRSEEEFVLFCDLPEPQKSHFCHRNRLSPKQVPEHLPFMGSNDLSDVQWYQ

QPSNGDPLEDIRKSYPHIIQDKCTLHFLTPGVNNSGSYICRPKMIKSPYDVACCVK

MILEVKPQTNASCEYSASHKQDLLLGSTGSISCPSLSCQSDAQSPAVTWYKNGKL

LSVERSNRIVVDEVYDYHQGTYVCDYTQSDTVSSWTVRAVVQVRTIVGDTKLK

PDILDPVEDTLEVELGKPLTISCKARFGFERVFNPVIKWYIKDSDLEWEVSVPEAK

SIKSTLKDEIIERNIILEKVTQRDLRRKFVCFVQNSIGNTTQSVQLKEKRGVVLLYI

LLGTIGTLVAVLAASALLYRHWIEIVLLYRTYQSKDQTLGDKKDFDAFVSYAKW

SSFPSEATSSLSEEHLALSLFPDVLENKYGYSLCLLERDVAPGGVYAEDIVSIIKRS

RRGIFILSPNYVNGPSIFELQAAVNLALDDQTLKLILIKFCYFQEPESLPHLVKKAL

RVLPTVTWRGLKSVPPNSRFWAKMRYHMPVKNSQGFTWNQLRITSRIFQWKGL

SRTETTGRSSQPKEW.

Another embodiment described herein is a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 36.

[SEQ ID NO: 36]

ATGGCTCTGCCTGTGACAGCTCTGCTGCTGCCTCTGGCTCTGCTTCTGCATGC

CGCCAGACCTTACTTCGGCAAGCTGGAAAGCAAGCTGAGCGTGATCCGGAA

CCTGAACGACCAGGTGCTGTTCATCGACCAGGGCAACAGACCCCTGTTCGAG

GACATGACCGACAGCGACTGCAGAGACAACGCCCCTCGGACCATCTTCATCA

TCAGCATGTACAAGGACAGCCAGCCTAGAGGCATGGCCGTGACCATCTCTGT

GAAGTGCGAGAAGATCAGCACCCTGAGCTGCGAGAACAAGATCATCAGCTT

CAAAGAGATGAACCCGCCGGACAACATCAAGGACACCAAGAGCGACATCAT

ATTCTTCCAGCGGAGCGTGCCCGGCCACGACAACAAGATGCAGTTTGAGAGC

AGCAGCTACGAGGGCTACTTCCTGGCCTGCGAGAAAGAGCGGGACCTGTTCA

AGCTGATCCTGAAGAAAGAGGACGAACTGGGCGACCGCAGCATCATGTTCA

CCGTGCAGAATGAGGATGGCGGCGGAGGATCTGGCGGAGGTGGAAGCGGAG

GCGGAGGAAGCGGTGGCGGCGGATCCGGTGGCGGCGGTTCAGGCGGTGGCG

GATCTGAACAGAAGCTGATAAGTGAGGAGGACTTGTTTAATATCAGCGGCTG

CAGCACCAAGAAACTGCTGTGGACCTACAGCACCCGCAGCGAAGAGGAATT

CGTGCTGTTCTGCGACCTGCCTGAGCCTCAGAAGTCCCACTTCTGCCACCGG

AACAGACTGAGCCCTAAACAGGTGCCCGAGCATCTGCCTTTCATGGGCAGCA

ACGATCTGAGCGACGTGCAGTGGTATCAGCAGCCCAGCAATGGCGACCCTCT

-continued

```
GGAAGATATCAGAAAGAGCTACCCTCACATCATCCAGGACAAGTGCACCCT

GCACTTTCTGACCCCTGGCGTGAACAACAGCGGCAGCTACATCTGCAGACCC

AAGATGATCAAGAGCCCCTACGACGTGGCCTGCTGCGTGAAGATGATCCTGG

AAGTGAAGCCCCAGACCAACGCCAGCTGCGAGTATAGCGCCAGCCACAAGC

AGGATCTGCTGCTCGGCTCTACAGGCAGCATCAGCTGTCCTAGCCTGTCCTGT

CAGAGCGACGCTCAGTCTCCTGCCGTGACCTGGTACAAGAATGGCAAGCTGC

TGTCCGTGGAACGGTCCAACAGAATCGTGGTGGACGAGGTGTACGACTACCA

CCAGGGCACCTACGTGTGCGACTACACCCAGAGCGATACCGTGTCTAGCTGG

ACCGTCAGAGCCGTGGTGCAAGTGCGGACAATCGTGGGCGATACCAAGCTG

AAGCCCGACATTCTGGACCCCGTGGAAGATACACTGGAAGTGGAACTGGGC

AAGCCCCTGACCATCAGCTGCAAGGCCAGATTCGGCTTCGAGCGGGTGTTCA

ACCCCGTGATCAAGTGGTACATTAAGGACAGCGACCTGGAATGGGAAGTGT

CCGTGCCTGAGGCCAAGTCCATCAAGAGCACACTGAAGGACGAGATCATCG

AGCGGAACATCATCCTGGAAAAAGTGACCCAGAGGGACCTGCGGCGGAAGT

TCGTGTGCTTTGTGCAGAACTCCATCGGCAACACCACACAGAGCGTGCAGCT

GAAAGAAAAGCGCGGCGTGGTGCTGCTGTACATCCTGCTGGGAACAATCGG

CACACTGGTGGCTGTGCTGGCTGCATCTGCCCTGCTGTATAGACACTGGATC

GAGATCGTCCTGCTGTACCGGACCTACCAGAGCAAGGATCAGACCCTGGGCG

ACAAGAAGGACTTCGACGCCTTTGTGTCCTACGCCAAGTGGTCCAGCTTTCC

CAGCGAGGCCACATCTAGCCTGAGCGAGGAACATCTGGCCCTGTCTCTGTTC

CCCGACGTGCTGGAAAACAAATACGGCTACAGCCTGTGCCTGCTGGAAAGA

GATGTTGCCCCTGGCGGAGTGTACGCCGAGGATATCGTGTCCATCATCAAGC

GGAGCAGACGGGGCATCTTCATTCTGAGCCCCAACTACGTGAACGGCCCCAG

CATCTTTGAACTGCAAGCCGCCGTGAACCTGGCTCTGGACGATCAGACACTG

AAGCTCATCCTGATCAAGTTCTGCTACTTCCAAGAGCCTGAGAGCCTGCCTC

ACCTGGTCAAAAAGGCCCTGAGAGTGCTGCCCACCGTGACTTGGAGAGGCCT

GAAAAGCGTGCCACCTAACAGCCGGTTCTGGGCCAAGATGAGATACCACAT

GCCTGTGAAGAACAGCCAGGGCTTCACCTGGAACCAGCTGCGGATCACCAG

CCGGATCTTTCAGTGGAAGGGCCTGAGCAGAACCGAGACAACCGGCAGAAG

CTCCCAGCCTAAAGAGTGGTGA.
```

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 37.

```
                                                  [SEQ ID NO: 37]
MALPVTALLLPLALLLHAARPYFGKLESKLSVIRNLNDQVLFIDQGNRPLFEDMT

DSDCRDNAPRTIFIISMYKDSQPRGMAVTISVKCEKISTLSCENKIISFKEMNPPDN

IKDTKSDIIFFQRSVPGHDNKMQFESSSYEGYFLACEKERDLFKLILKKEDELGDR

SIMFTVQNEDGGGGSGGGGSGGGGSGGGGSGGGGSGGGGSEQKLISEEDLFNIS

GCSTKKLLWTYSTRSEEEFVLFCDLPEPQKSHFCHRNRLSPKQVPEHLPFMGSND
```

-continued

```
LSDVQWYQQPSNGDPLEDIRKSYPHIIQDKCTLHFLTPGVNNSGSYICRPKMIKSP

YDVACCVKMILEVKPQTNASCEYSASHKQDLLLGSTGSISCPSLSCQSDAQSPAV

TWYKNGKLLSVERSNRIVVDEVYDYHQGTYVCDYTQSDTVSSWTVRAVVQVR

TIVGDTKLKPDILDPVEDTLEVELGKPLTISCKARFGFERVFNPVIKWYIKDSDLE

WEVSVPEAKSIKSTLKDEIIERNIILEKVTQRDLRRKFVCFVQNSIGNTTQSVQLK

EKRGVVLLYILLGTIGTLVAVLAASALLYRHWIEIVLLYRTYQSKDQTLGDKKD

FDAFVSYAKWSSFPSEATSSLSEEHLALSLFPDVLENKYGYSLCLLERDVAPGGV

YAEDIVSIIKRSRRGIFILSPNYVNGPSIFELQAAVNLALDDQTLKLILIKFCYFQEP

ESLPHLVKKALRVLPTVTWRGLKSVPPNSRFWAKMRYHMPVKNSQGFTWNQL

RITSRIFQWKGLSRTETTGRSSQPKEW
```

Another embodiment described herein is a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 38.

[SEQ ID NO: 38]

```
ATGGCTCTGCCTGTGACAGCTCTGCTGCTGCCTCTGGCTCTGCTTCTGCATGC

CGCCAGACCTTACTTCGGCAAGCTGGAAAGCAAGCTGAGCGTGATCCGGAA

CCTGAACGACCAGGTGCTGTTCATCGACCAGGGCAACAGACCCCTGTTCGAG

GACATGACCGACAGCGACTGCAGAGACAACGCCCCTCGGACCATCTTCATCA

TCAGCATGTACAAGGACAGCCAGCCTAGAGGCATGGCCGTGACCATCTCTGT

GAAGTGCGAGAAGATCAGCACCCTGAGCTGCGAGAACAAGATCATCAGCTT

CAAAGAGATGAACCCGCCGGACAACATCAAGGACACCAAGAGCGACATCAT

ATTCTTCCAGCGGAGCGTGCCCGGCCACGACAACAAGATGCAGTTTGAGAGC

AGCAGCTACGAGGGCTACTTCCTGGCCTGCGAGAAAGAGCGGGACCTGTTCA

AGCTGATCCTGAAGAAAGAGGACGAACTGGGCGACCGCAGCATCATGTTCA

CCGTGCAGAATGAGGATGGCGGCGGAGGATCTGGCGGAGGTGGAAGCGGAG

GCGGAGGAAGCGGTGGCGGCGGATCCGGTGGCGGCGGTTCAGGCGGTGGCG

GATCTggctccacctctggatccggcaagcccggatctggcgagggatccacc

aagggcGAACAGAAGCTGATAAGTGAGGAGGACTTGTTTAATATCAGCGGCTG

CAGCACCAAGAAACTGCTGTGGACCTACAGCACCCGCAGCGAAGAGGAATTCG

TGCTGTTCTGCGACCTGCCTGAGCCTCAGAAGTCCCACTTCTGCCACCGGAAC

AGACTGAGCCCTAAACAGGTGCCCGAGCATCTGCCTTTCATGGGCAGCAACGA

TCTGAGCGACGTGCAGTGGTATCAGCAGCCCAGCAATGGCGACCCTCTGGAAG

ATATCAGAAAGAGCTACCCTCACATCATCCAGGACAAGTGCACCCTGCACTTT

CTGACCCCTGGCGTGAACAACAGCGGCAGCTACATCTGCAGACCCAAGATGAT

CAAGAGCCCCTACGACGTGGCCTGCTGCGTGAAGATGATCCTGGAAGTGAAGC

CCCAGACCAACGCCAGCTGCGAGTATAGCGCCAGCCACAAGCAGGATCTGCTG

CTCGGCTCTACAGGCAGCATCAGCTGTCCTAGCCTGTCCTGTCAGAGCGACGC

TCAGTCTCCTGCCGTGACCTGGTACAAGAATGGCAAGCTGCTGTCCGTGGAAC

GGTCCAACAGAATCGTGGTGGACGAGGTGTACGACTACCACCAGGGCACCTAC

GTGTGCGACTACACCCAGAGCGATACCGTGTCTAGCTGGACCGTCAGAGCCGT
```

-continued

GGTGCAAGTGCGGACAATCGTGGGCGATACCAAGCTGAAGCCCGACATTCTGG

ACCCCGTGGAAGATACACTGGAAGTGGAACTGGGCAAGCCCCTGACCATCA

GCTGCAAGGCCAGATTCGGCTTCGAGCGGGTGTTCAACCCCGTGATCAAGTG

GTACATTAAGGACAGCGACCTGGAATGGGAAGTGTCCGTGCCTGAGGCCAA

GTCCATCAAGAGCACACTGAAGGACGAGATCATCGAGCGGAACATCATCCT

GGAAAAAGTGACCCAGAGGGACCTGCGGCGGAAGTTCGTGTGCTTTGTGCA

GAACTCCATCGGCAACACCACACAGAGCGTGCAGCTGAAAGAAAAGCGCGG

CGTGGTGCTGCTGTACATCCTGCTGGGAACAATCGGCACACTGGTGGCTGTG

CTGGCTGCATCTGCCCTGCTGTATAGACACTGGATCGAGATCGTCCTGCTGTA

CCGGACCTACCAGAGCAAGGATCAGACCCTGGGCGACAAGAAGGACTTCGA

CGCCTTTGTGTCCTACGCCAAGTGGTCCAGCTTTCCCAGCGAGGCCACATCTA

GCCTGAGCGAGGAACATCTGGCCCTGTCTCTGTTCCCCGACGTGCTGGAAAA

CAAATACGGCTACAGCCTGTGCCTGCTGGAAAGAGATGTTGCCCCTGGCGGA

GTGTACGCCGAGGATATCGTGTCCATCATCAAGCGGAGCAGACGGGGCATCT

TCATTCTGAGCCCCAACTACGTGAACGGCCCCAGCATCTTTGAACTGCAAGC

CGCCGTGAACCTGGCTCTGGACGATCAGACACTGAAGCTCATCCTGATCAAG

TTCTGCTACTTCCAAGAGCCTGAGAGCCTGCCTCACCTGGTCAAAAAGGCCC

TGAGAGTGCTGCCCACCGTGACTTGGAGAGGCCTGAAAAGCGTGCCACCTAA

CAGCCGGTTCTGGGCCAAGATGAGATACCACATGCCTGTGAAGAACAGCCA

GGGCTTCACCTGGAACCAGCTGCGGATCACCAGCCGGATCTTTCAGTGGAAG

GGCCTGAGCAGAACCGAGACAACCGGCAGAAGCTCCCAGCCTAAAGAGTGG

TGA.

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 39.

[SEQ ID NO: 39]

MALPVTALLLPLALLLHAARPYFGKLESKLSVIRNLNDQVLFIDQGNRPLFEDMT

DSDCRDNAPRTIFIISMYKDSQPRGMAVTISVKCEKISTLSCENKIISFKEMNPPDN

IKDTKSDIIFFQRSVPGHDNKMQFESSSYEGYFLACEKERDLFKLILKKEDELGDR

SIMFTVQNEDGGGGSGGGGSGGGGSGGGGSGGGGSGGGGSGSTSGSGKPGSGE

GSTKGEQKLISEEDLFNISGCSTKKLLWTYSTRSEEEFVLFCDLPEPQKSHFCHRN

RLSPKQVPEHLPFMGSNDLSDVQWYQQPSNGDPLEDIRKSYPHIIQDKCTLHELT

PGVNNSGSYICRPKMIKSPYDVACCVKMILEVKPQTNASCEYSASHKQDLLLGS

TGSISCPSLSCQSDAQSPAVTWYKNGKLLSVERSNRIVVDEVYDYHQGTYVCDY

TQSDTVSSWTVRAVVQVRTIVGDTKLKPDILDPVEDTLEVELGKPLTISCKARFG

FERVFNPVIKWYIKDSDLEWEVSVPEAKSIKSTLKDEIIERNIILEKVTQRDLRRKF

VCFVQNSIGNTTQSVQLKEKRGVVLLYILLGTIGTLVAVLAASALLYRHWIEIVL

LYRTYQSKDQTLGDKKDFDAFVSYAKWSSFPSEATSSLSEEHLALSLFPDVLEN

KYGYSLCLLERDVAPGGVYAEDIVSIIKRSRRGIFILSPNYVNGPSIFELQAAVNL

-continued

ALDDQTLKLILIKFCYFQEPESLPHLVKKALRVLPTVTWRGLKSVPPNSRFWAK

MRYHMPVKNSQGFTWNQLRITSRIFQWKGLSRTETTGRSSQPKEW.

Another embodiment described herein is a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 40.

[SEQ ID NO: 40]

atggctctgcctgtgacagCTCTGCTGCTGCCTCTGGCTCTGCTTCTGCATGCC

GCCAGACCTTACTTCGGCAAGCTGGAAAGCAAGCTGAGCGTGATCCGGAACCTG

AACGACCAGGTGCTGTTCATCGACCAGGGCAACAGACCCCTGTTCGAGGACATG

ACCGACAGCGACTGCAGAGACAACGCCCCTCGGACCATCTTCATCATCAGCATG

TACAAGGACAGCCAGCCTAGAGGCATGGCCGTGACCATCTCTGTGAAGTGCG

AGAAGATCAGCACCCTGAGCTGCGAGAACAAGATCATCAGCTTCAAAGAGA

TGAACCCGCCGGACAACATCAAGGACACCAAGAGCGACATCATATTCTTCCA

GCGGAGCGTGCCCGGCCACGACAACAAGATGCAGTTTGAGAGCAGCAGCTA

CGAGGGCTACTTCCTGGCCTGCGAGAAAGAGCGGGACCTGTTCAAGCTGATC

CTGAAGAAAGAGGACGAACTGGGCGACCGCAGCATCATGTTCACCGTGCAG

AATGAGGATGGCGGCGGAGGATCTGGCGGAGGTGGAAGCGGAGGCGGAGG

AAGCGGTGGCGGCGGATCCggctccacctctggatccggcaagcccggatctgg cgagggatccaccaagggcGAACAGAAgctgataagtgaggaggacttgtgtac atctagaccccacATCACCGTGGTGGAAGGCGAGCCCTTTTACCTGAAGCACTG CAGCTGTTCTCTGGCCCACGAGATCGAGACAACCACCAAGTCCtggTACAAGAG

CAGCGGCAGCCAAGAGCACGTGGAACTGAACCCTAGAAGCAGCTCCAGAATCGC

CCTGCACGACTGCGTGCTGGAATTCTGGCCTGTCGAGCTGAACGATACCGGCAG

CTACTTCTTCCAGATGAAGaACTACACCCAGAAATGGaAGCTCAACGTGATCag

GCGGAACAAGCACAGCTGCTTCACCGAGAGACAAGTGACCAGCAAGATCGTGGA

AGTGAAGAAGTTCTTTCAGATCACGTGCGAGAACTCCTACTACCAGACACTGGT

CAACAGCACCAGCCTGTACAAGAACTGCAAGAAGCTGCTCCTCGAGAACAACAA

GAACCCCACCATCAAGAAGAACGCCGAGTTCGAGGATCAGGGCTACTACAGCTG

CGTGCACTTCCTGCACCACAATGGCAAGCTGTTCAACATCACCAAGACCTTCAA

TATCACCATCGTCGAGGACCGCTCCAACATCGTGCCTGTTCTGCTGGGCCCCAA

GCTGAATCATGTGGCTGTGGAACTGGGCAAGAACGTGCGGCTGAATTGCAGCGC

CCTGCTGAACGAAGAGGACGTGATCTACTGGATGTTCGGCGAGGAAAACGGCAG

CGACCCCAACATCCACGAAGAGAAAGAAATGCGGATCATGACCCCTGAAGGC

AAGTGGCACGCCAGCAAGGTGCTGCGGATCGAGAATATCGGCGAGAGCAAC

CTGAATGTGCTGTACAACTGCACCGTGGCCAGCACCGGCGGCACCGATACCA

AGTCTTTTATCCTCGTGCGGaaggccgacatggctgacattccagGCCACGTGT

TCACCCGGGGCATGATCATTGCCGTGCTGATTCTGGTGGCCGTCGTGTGTCTGG

TCACCGTGTGTGTGATCTACAGAGTGGACCTGGTCCTGTTCTACCGGCACCTGA

CCAGAAGGGACGAGACACTGACCGACGGCAAGACCTACGATGCCTTCGTGTCCT

ACCTGAAAGAGTGCAGACCCGAGAACGGCGAAGAACACACCTTCGCCGTGGAAA

-continued

```
TCCTGCCTAGAGTGCTGGAAAAGCACTTCGGCTACAAGCTGTGCATCTTCGA

GCGCGACGTTGTGCCTGGCGGAGCTGTGGTGGATGAGATCCACAGCCTGATC

GAGAAGTCCAGACGGCTGATCATCGTGCTGAGCAAGAGCTACATGAGCAAC

GAAGTCCGCTACGAGCTGGAATCCGGACTGCACGAAGCCCTGGTGGAACGG

AAGATCAAGATCATTCTGATCGAGTTCACCCCTGTGACCGACTTCACATTCCT

GCCTCAGAGCCTGAAGCTGCTGAAGTCCCACAGAGTGCTGAAGTGGAAAGC

CGACAAGAGCCTGAGCTACAACAGCCGGTTTTGGAAGAACCTGCTGTACCTG

ATGCCTGCCAAGACCGTGAAGCCCGGCAGAGATGAGCCCGAAGTTCTGCCAg

tgctgagcgagtcttga.
```

Another embodiment described herein is an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 41.

```
                                                  [SEQ ID NO: 41]
MALPVTALLLPLALLLHAARPYFGKLESKLSVIRNLNDQVLFIDQGNRPLFEDMT

DSDCRDNAPRTIFIISMYKDSQPRGMAVTISVKCEKISTLSCENKIISFKEMNPPDN

IKDTKSDIIFFQRSVPGHDNKMQFESSSYEGYFLACEKERDLFKLILKKEDELGDR

SIMFTVQNEDGGGGSGGGGSGGGGSGGGGSGSTSGSGKPGSGEGSTKGEQKLIS

EEDLCTSRPHITVVEGEPFYLKHCSCSLAHEIETTTKSWYKSSGSQEHVELNPRSS

SRIALHDCVLEFWPVELNDTGSYFFQMKNYTQKWKLNVIRRNKHSCFTERQVTS

KIVEVKKFFQITCENSYYQTLVNSTSLYKNCKKLLLENNKNPTIKKNAEFEDQGY

YSCVHFLHHNGKLFNITKTFNITIVEDRSNIVPVLLGPKLNHVAVELGKNVRLNC

SALLNEEDVIYWMFGEENGSDPNIHEEKEMRIMTPEGKWHASKVLRIENIGESNL

NVLYNCTVASTGGTDTKSFILVRKADMADIPGHVFTRGMIIAVLILVAVVCLVT

VCVIYRVDLVLFYRHLTRRDETLTDGKTYDAFVSYLKECRPENGEEHTFAVEILP

RVLEKHFGYKLCIFERDVVPGGAVVDEIHSLIEKSRRLIIVLSKSYMSNEVRYELE

SGLHEALVERKIKIILIEFTPVTDFTFLPQSLKLLKSHRVLKWKADKSLSYNSRFW

KNLLYLMPAKTVKPGRDEPEVLPVLSES*.
```

The present disclosure is also directed to any of the membrane-bound IL-18 constructs described herein further comprising an immunoreceptor tyrosine-based activation motif or ITAM. ITAMs include a tyrosine separated from a leucine or isoleucine by any two other amino acids, and can thus be represented as, e.g., Tyr-X-X-Leu/Ile. ITAMs are typically repeated (e.g., two or more times) in the cytoplasmic tails of certain cell surface proteins of the immune system, and are typically separated by between six and eight amino acids.

In some embodiments, a membrane-bound IL-18 includes an ITAM, or portion thereof, from an endogenous mammalian (e.g., human) polypeptide, wherein endogenous mammalian (e.g., human) polypeptide is selected from the group of: CD3ζ (also referred to as CD3 zeta), CD3δ (CD3 delta), CD3ε (CD3 epsilon), CD3γ (CD3 gamma), DAP12, FCεR1γ (Fc epsilon receptor I gamma chain), FcRy, FcRft, CD35, CD22, CD79A (antigen receptor complex-associated protein alpha chain), CD79B (antigen receptor complex-associated protein beta chain), and CD66d. The letters "CD" is the previous sentence stand for "Cluster of Differentiation." For example, CD3 stands for "Cluster of Differentiation 3."

Any ITAM, or portion thereof, that serves to mediate signaling in an endogenous mammalian (e.g., human) transmembrane protein suitable for use in accordance with compositions and methods disclosed herein. In some embodiments, a membrane-bound IL-18 includes an ITAM, or portion thereof, from human CD3 zeta (e.g. Accession No. P20963, e.g., an ITAM present in amino acids 52-164 of SEQ ID NO: 42, or a portion thereof, or SEQ ID NO: 43 or a portion thereof).

In some embodiments, an ITAM comprises an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) to: the sequence of amino acids 52-164 of SEQ ID NO: 42 (or a portion thereof), or the sequence of SEQ ID NO: 43 (or a portion thereof).

```
                                          [SEQ ID NO: 42]
MKWKALFTAAILQAQLPITEAQSFGLLDPKLCYLLDGILFIYGVILTAL

FLRVKFSRSADAPAYQQGQNQLYNELNLGRREEYDVLDKRRGRDPEMGG
```

-continued

KPQRRKNPQEGLYNELQKDKMAEAYSEIGMKGERRRGKGHDGLYQGLST

ATKDTYDALHMQALPPR

[SEQ ID NO: 43]

LRVKFSRSADAPAYQQGQNQLYNELNLGRREEYDVLDKRRGRDPEMGGK

PRRKNPQEGLYNELQKDKMAEAYSEIGMKGERRRGKGHDGLYQGLSTAT

KDTYDALHMQALPPR

In some embodiments, an ITAM comprises a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 44 (or a portion thereof).

[SEQ ID NO: 44]

CTGAGAGTGAAGTTCAGCAGGAGCGCAGACGCCCCCGCGTACCAGCAGG

GCCAGAACCAGCTCTATAACGAGCTCAATCTAGGACGAAGAGAGGAGTA

CGATGTTTTGGACAAGAGACGTGGCCGGGACCCTGAGATGGGGGGAAAG

CCGAGAAGGAAGAACCCTCAGGAAGGCCTGTACAATGAACTGCAGAAAG

ATAAGATGGCGGAGGCCTACAGTGAGATTGGGATGAAAGGCGAGCGCCG

GAGGGGCAAGGGGCACGATGGCCTTTACCAGGGTCTCAGTACAGCCACC

AAGGACACCTACGACGCCCTTCACATGCAGGCCCTGCCCCCTCGC

As will be appreciated by those of ordinary skill in the art, certain polypeptides have two or more isoforms that differ at least in their primary polypeptide sequence. For example, different isoforms can be generated as a result of alternative splicing. A membrane-bound IL-18 disclosed herein can include an ITAM that includes a sequence of amino acids from any isoform of an endogenous mammalian transmembrane polypeptide having an ITAM including, e.g., a mammalian (e.g., human) isoform of: CD3ζ, CD3D, CD3E, CD3G, DAP12, FCER1G, FcRy, FcRft, CD35, CD22, CD79A, CD79B, or CD66d.

In some embodiments, an ITAM, or portion thereof, of a membrane-bound IL-18 includes a sequence of amino acids having one or more (e.g., two, three, four, or five) amino acid substitutions, deletions, or additions as compared to an ITAM of one or more of an ITAM in an endogenous mammalian (e.g., human) transmembrane protein, such as, CD3ζ, CD3D, CD3E, CD3G, DAP12, FCER1G, FcRy, FcRft, CD35, CD22, CD79A, CD79B, or CD66d. For example, the tyrosine and leucine or isoleucine of an ITAM could be retained, while the two amino acids separating them could be replaced with different amino acids.

In some embodiments, a membrane-bound IL-18 includes an ITAM that is a chimeric ITAM having portions of an ITAM from two or more endogenous mammalian (e.g., human) transmembrane polypeptides including, without limitation, CD3ζ, CD3D, CD3E, CD3G, DAP12, FCER1G, FcRy, FcRft, CD35, CD22, CD79A, CD79B, or CD66d (including, without limitation, a mammalian or human homolog of any of these polypeptides), such that the two or more ITAM portions together constitute a functional ITAM. In some embodiments, such a portion of a chimeric ITAM can include one or more amino acid substitutions, deletions, or additions as compared to a corresponding portion of a wild type ITAM.

In some embodiments, a membrane-bound IL-18 includes two or more ITAMs, e.g., two, three, four, or five, or more ITAMs. In some embodiments, the two or more ITAMs are identical (e.g., they have the same amino acid sequence). In some embodiments, the two or more ITAMs are not identical. For example, the ITAMs can be selected from different endogenous mammalian (e.g., human) transmembrane polypeptides including, without limitation, CD3ζ, CD3D, CD3E, CD3G, DAP12, FCER1G, FcRy, FcRft, CD35, CD22, CD79A, CD79B (including, without limitation, a mammalian or human homolog of any of these polypeptides). In some embodiments, the two or more ITAMs can differ from each other by one or more amino acid substitutions, deletions, or additions.

The present disclosure also comprises conjugates in which an IL-18 polypeptide of the present disclosure is associated with a detectable moiety. In certain embodiments, a conjugate comprises one or more detectable moieties, i.e., is "labeled" with one or more such moieties. In some such embodiments, a conjugate of the present disclosure is useful in diagnostic or imaging applications, e.g., diagnosing or imaging cancer. Any of a wide variety of detectable moieties may be used in labeled conjugates described herein. Suitable detectable moieties comprise, without limitation: various ligands, radionuclides; fluorescent dyes; chemiluminescent agents (such as, for example, acridinum esters, stabilized dioxetanes, and the like); bioluminescent agents; spectrally resolvable inorganic fluorescent semiconductors nanocrystals (i.e., quantum dots); microparticles; metal nanoparticles (e.g., gold, silver, copper, platinum, etc.); nanoclusters; paramagnetic metal ions; enzymes; colorimetric labels (such as, for example, dyes, colloidal gold, and the like); biotin; dioxigenin; haptens; and proteins for which antisera or monoclonal antibodies are available.

In one aspect, IL-18, for example, a recombinant human IL-18, is co-administered with the cell therapy product, e.g., a CAR cell or TCR containing cell, such as an NK or T cell. Any exogenous IL-18 can be used in the methods described herein. In some embodiments, the exogenous IL-18 is human IL-18. In some embodiments, the exogenous IL-18 is wild-type IL-18. In other embodiments, the exogenous IL-18 is recombinant IL-18. The IL-18 can be produced and obtained by any method known in the art, including but not limited to, being isolated from one more IL-18 producing cells or obtaining a commercially available IL-18.

In aspects of the disclosure involving co-administration of IL-18, the present disclosure provides methods comprising administering a cell expressing a CAR or TCR, as described herein, in combination with IL-18. IL-18 can be delivered in combination with, e.g., simultaneously, or sequentially with administration of the CAR- or TCR-expressing cell. IL-18 may be administered at the same time, in the same composition or in different compositions, or a different times, e.g., within 1, 2, 3, 4, 5, 6, 7, 8, 9, 10, 15, 20, 25, 30, or 45 mins of each other, or 1, 1.5, 2, 2.5, or 3 hours of each other. Alternatively, IL-18 can be delivered after a prolonged period of time after administration of the CAR- or TCR-expressing cell, e.g., after assessment of the subject's response to the CAR- or TCR-expressing cell. In one embodiment the cytokine is administered to the subject shortly after administration (e.g., administered 1 day, 2 days, 3 days, 4 days, 5 days, 6 days, or 7 days after administration) of the cell or population of cells as described herein. In other embodiments, the IL-18 is administered to the subject after a prolonged period of time (e.g., at least 2 weeks, 3 weeks, 4 weeks, 6 weeks, 8 weeks, 10 weeks, or more) after administration of the cell or population of cells, or after assessment of the subject's response to the cell.

The appropriate dose of IL-18 can readily be determined by a person skilled in the art.

In one aspect, the present disclosure relates to methods for preparing, culturing, or manufacturing immune cells by contacting the cells with IL-18 during one or more phases of manufacture of a CAR-T cell or TCR+ cell. Such phases include activation, transduction and expansion. IL-18 can be present at any or all steps in this process. Details on manufacture including activation, transduction and expansion are provided herein. Manufacturing T cells in the presence of IL-18 can increase NK or T cell potency as measured by cytokine production, cytotoxicity, and antigen driven proliferation.

Any exogenous IL-18 can be used in the methods described herein. In some embodiments, the exogenous IL-18 is human IL-18. In some embodiments, the exogenous IL-18 is wild-type IL-18. In other embodiments, the exogenous IL-18 is recombinant IL-18. The IL-18 can be produced and obtained by any methods known in the art, including but not limited to isolated IL-18 from one more IL-18 producing cells or obtaining a commercially available IL-18.

In certain embodiments, other cytokines can be utilized in combination with IL-18. Suitable soluble cytokines include, but are not limited to, IL-2, IL-7, IL-12, IL-15 and combinations thereof. In one embodiment, a combination of IL-7 and IL-18 is used. In another embodiment, IL-15 and IL-18 is used. In yet another embodiment, IL-7, IL-15 and IL-18 are used.

In one embodiment, the present disclosure relates to methods of producing cells comprising contacting one or more cells obtained from a donor subject with IL-18 and an AKT inhibitor and at least one of exogenous IL-7, exogenous IL-12 and exogenous IL-15 (or combinations thereof).

The contacting can comprise adding (i) IL-18, (ii) the AKT inhibitor and (iii) exogenous IL-7 and/or exogenous IL-15 directly to the one or more T cells or to the buffer or medium containing the T cells, mixing (i) IL-18, (ii) the AKT inhibitor, and (iii) exogenous IL-7 and/or exogenous IL-15 with other components, and/or adding the one or more cells to a medium comprising (i) IL-18, (ii) the AKT inhibitor and (iii) exogenous IL-7 and/or exogenous IL-15. In certain embodiments, the one or more T cells are not contacted with exogenous Interleukin-2 (IL-2).

The one or more T cells can be contacted with an AKT inhibitor and exogenous IL-7, IL-15 and/or IL-18 through any means known in the art. For example, the AKT inhibitor and IL-7/IL-15/IL-18 can be added to a culture medium used to culture the one or more T cells. Alternatively, the AKT inhibitor and IL-7/IL-15/IL-18 can be produced by one or more cells co-cultured with the one or more T cells, e.g., by a feeder cell layer. The AKT inhibitor, IL-7, IL-15 and IL-18 can be added together or can be added individually. For example, the AKT inhibitor can be added to the culture medium and IL-7, IL-15 and/or IL-18 can be produced by a cell co-cultured with the one or more T cells.

In addition, the one or more T cells can be contacted with the AKT inhibitor and exogenous IL-7 and/or exogenous IL-15 at the same time, at different times, at overlapping times, or sequentially. One or more T cells can be collected from a subject in need of a T cell therapy or from a donor. Once collected, the one or more T cells can be processed for any suitable period of time before being administered to a subject. During this time, the one or more T cells can be contacted with the AKT inhibitor, exogenous IL-7, exogenous IL-15 and/or exogenous IL-18 for any period of time between the collection of the T cells from the donor and the administration of a subject. For example, the one or more T cells can be contacted with, e.g., cultured in the presence of, the AKT inhibitor, exogenous IL-7, exogenous IL-15 and/or exogenous IL-18 for at least about 1 day, at least about 2 days, at least about 3 days, at least about 4 days, at least about 5 days, at least about 6 days, at least about 7 days, at least about 8 days, at least about 9 days, at least about 10 days, at least about 11 days, at least about 12 days, at least about 13 days, or at least about 14 days. In some embodiments, the one or more T cells are contacted with, e.g., cultured in the presence of, the AKT inhibitor, exogenous IL-7, exogenous IL-15 and/or exogenous IL-18 for about 1 day to about 14 days, for about 1 day to about 10 days, for about 1 day to about 7 days, from about 1 day to about 6 days, from about 1 day to about 5 days, from about 1 day to about 4 days, from about 1 day to about 3 days, from about 1 day to about 2 days, from about 2 days to about 3 days, from about 2 days to about 4 days, from about 2 days to about 5 days, or from about 2 days to about 6 days. In one particular embodiment, the one or more T cells are contacted with, e.g., cultured in the presence of, the AKT inhibitor, exogenous IL-7, exogenous IL-15 and/or exogenous IL-18 from the day the T cells are collected (e.g., day-0) until the day the T cells are administered to a subject. In another embodiment, the T cells are contacted with, e.g., cultured in the presence of, the AKT inhibitor, exogenous IL-7, exogenous IL-15 and/or exogenous IL-18 from day 0 to administration, from day 1 to administration, from day 2 to administration, from day 3 to administration from day 4 to administration, from day 5 to administration, or from day 6 to administration. In some embodiments, the one or more T cells are washed prior to administration to remove the AKT inhibitor, exogenous IL-7, exogenous IL-15 and/or exogenous IL-18.

In particular embodiments, the contacting with an AKTi and at least one of IL-7, IL-15 and IL-18 is performed for at least 1, at least about 2, at least about 3, at least about 4, at least about 5, at least about 6, at least about 7, at least about 8, at least about 9, at least about 10, at least about 11, at least about 12, or about 13 days. In other embodiments, the contacting with an AKTi and at least one of IL-7, IL-15, and IL-18 is performed more than one day to less than 14 days, less than 13 days, less than 12 days, less than 11 days, less than 10 days, less than 9 days, or less than 8 days. Any concentration of IL-18 can be used in the methods described herein. For example, the present method can include contacting the one or more T cells with at least about 0.001 ng/ml IL-18, at least about 0.005 ng/ml IL-18, at least about 0.01 ng/ml IL-18, at least about 0.05 ng/ml IL-18, at least about 0.1 ng/ml IL-18, at least about 0.5 ng/ml IL-18, at least about 1.0 ng/ml IL-18, at least about 1 ng/ml IL-18, at least about 2 ng/ml IL-18, at least about 3 ng/ml IL-18, at least about 4 ng/ml IL-18, at least about 5 ng/ml IL-18, at least about 6 ng/ml IL-18, at least about 7 ng/ml IL-18, at least about 8 ng/ml IL-18, at least about 9 ng/ml IL-18, at least about 10 ng/ml IL-18, at least about 11 ng/ml IL-18, at least about 12 ng/ml IL-18, at least about 13 ng/ml IL-18, at least about 14 ng/ml IL-18, at least about 15 ng/ml IL-18, at least about 20 ng/ml IL-18, at least about 25 ng/ml IL-18, at least about 30 ng/ml IL-18, at least about 35 ng/ml IL-18, at least about 40 ng/ml IL-18, at least about 45 ng/ml IL-18, at least about 50 ng/ml IL-18, at least about 100 ng/ml IL-18, at least about 200 ng/ml IL-18, at least about 300 ng/ml IL-18, at least about 400 ng/ml IL-18, at least about 500 ng/ml IL-18, or at least about 1000 ng/ml IL-18. In one embodiment, the one or more T cells are contacted with about 0.001 to about 500 ng/ml IL-18, about 0.01 to about 100 ng/ml IL-18, about 0.1 to about 50 ng/ml IL-18, about 1 to about 10 ng/ml IL-18, about 1 to about 5 ng/ml IL-18, about 5 to about 10 ng/ml IL-18, about 3 to about 18 ng/ml IL-18, or about 4 to about 6 ng/ml IL-18. In one particular embodiment, the one or more T cells are contacted with about 5 ng/ml IL-18.

In one embodiment, the immune cells, e.g., NK cell or T cells transduced with a CAR or TCR, are contacted during expansion in an appropriate media comprising IL-18 that may, optionally, contain one or more additional factors for proliferation and/or viability, including serum (e.g., fetal bovine or human serum), GM-CSF, IFN-γ, insulin, interleukin-2 (IL-2), IL-4, IL-7, IL-10, IL-12, IL-15, IL-21, TGFβ, and TNF-α or any other additives for the growth of cells. In one embodiment, the cells are expanded in an appropriate media that includes IL-18 and one or more (e.g., 2, 3, 4, or 5 or more) additional interleukins that result in at least a 200-fold (e.g., 200-fold, 250-fold, 300-fold, 350-fold) increase in cells over a 14 day expansion period, e.g., as measured by a method described herein such as flow cytometry. In another embodiment, the cells are expanded in an appropriate media that includes IL-18 in combination with soluble IL-12 or IL-15 or combinations thereof.

In one embodiment, the cells are expanded in culture in the presence of IL-18 for 5 days, and the resulting cells are more potent than the same cells expanded in culture for 5 days under the same culture conditions but in the absence of IL-18. Potency can be defined, e.g., by various T cell functions, e.g., proliferation, target cell killing, cytokine production, activation, migration, or combinations thereof. In one embodiment, the immune cells, comprising a CAR or TCR, are expanded for 5 days in the presence of IL-18 and show at least an one, two, three or four fold increase in cells doublings upon antigen stimulation as compared to the same cells expanded in culture for 5 days under the same culture conditions but in the absence of IL-18. In one embodiment, the immune cells, comprising a CAR or TCR, are expanded in culture for 5 days, and the resulting cells exhibit higher proinflammatory cytokine production, e.g., IFN-γ and/or GM-CSF levels, as compared to the same cells expanded in culture for 5 days under the same culture conditions but in the absence of IL-18. In one embodiment, the immune cells comprising a CAR or TCR expanded for 5 days show at least a one, two, three, four, five, ten fold or more increase in pg/ml of proinflammatory cytokine production, e.g., IFN-γ, TNFα and/or GM-CSF levels, as compared to the same cells expanded in culture for 5 days under the same culture conditions but in the absence of IL-18.

Additional details on manufacture of cells using an AKT inhibitor and exogenous IL-7 and/or exogenous IL-15 can be found in International Patent Application Publication No. WO17/070395.

In another aspect, endogenous IL-18 expression can be enhanced using standard recombinant engineering. Any targeted genome editing methods can be used to modified the promoter/enhancer region of the IL-18 gene locus, and thereby enhance the endogenous expression of IL-18 in an immune cell. In certain embodiments, a constitutive promoter can be placed to the IL-18 gene locus to drive IL-18 gene expression. Suitable constitutive promoters include, but are not limited to, a CMV promoter, an EF1a promoter, a SV40 promoter, a PGK1 promoter, an Ubc promoter, a beta-actin promoter, and a CAG promoter. Alternatively, a conditional or inducible promoter can be placed to the IL-18 gene locus to drive IL-18 gene expression. Examples of conditional promoters include, but are not limited to, a tetracycline response element (TRE) promoter and an estrogen response element (ERE) promoter. In addition, enhancer elements can be placed in regions other than the promoter region.

The present disclosure provides methods and compositions for improving the efficacy of antigen binding systems, such as CARs and TCRs, comprising a binding motif that binds to an antigen of interest, e.g., a tumor antigen. In certain embodiments, the antigen binding system is a chimeric antigen receptor (CAR). In certain embodiments, the antigen binding system is a T-cell receptor (TCR). The antigen binding system can bind to a tumor antigen or a pathogen antigen.

Chimeric antigen receptors (CARs) are engineered receptors that may direct or redirect T cells (e.g., patient or donor T cells) to target a selected antigen. A CAR may be engineered to recognize an antigen and, when bound to that antigen, activate the immune cell to attack and destroy the cell bearing that antigen. When these antigens exist on tumor cells, an immune cell that expresses the CAR may target and kill the tumor cell. CARs generally comprise an extracellular binding motif that mediates antigen binding, a transmembrane domain that spans, or is understood to span, the cell membrane when the antigen binding system is present at a cell surface or cell membrane, and an intracellular (or cytoplasmic) signaling domain.

According to at least one non-limiting view, there have been at least three "generations" of CAR compositions. In a first generation of CARs, a binding motif (e.g., a single chain fragment variable, binding motif) is linked or connected to a signaling domain (e.g., CD3ζ) via a transmembrane domain, optionally comprising a hinge domain and one or more spacers. In a second generation of CARs, a costimulatory domain (such as CD28, 4-1BB, or OX-40) is introduced with the signaling domain (e.g., CD3ζ). In a third generation of CARs, a second costimulatory domain is included.

TCRs are heterodimers composed of an α-chain and a β-chain. TCR signaling requires recruitment of signaling proteins that generate an immune synapse. In addition, TCR localization at the plasma membrane depends on CD3 complex, which is expressed in T cells. Engineered single chain TCRs may be generated, e.g., using transmembrane and signaling domains of CAR constructs, methods and constructs for which are known (e.g., sTCR and TCR-CAR molecules, e.g., fusion of a TCRβ chain with CD28 TM and CD28 and CD3ζ signaling modules).

The antigen binding system may comprise a VH and a VL. In some embodiments, the VH and the VL are connected by a linker (L).

In some embodiments, an antigen binding system further comprises a costimulatory domain, and/or an extracellular domain (e.g., a "hinge" or "spacer" region), and/or a transmembrane domain, and/or an intracellular (signaling) domain, and/or a CD3-zeta or CD3-epsilon activation domain.

One or more antigen binding motifs determine the target(s) of an antigen binding system. A binding motif of an antigen binding system may comprise any binding motif. Binding motifs are used in chimeric antigen receptors at least in part because they may be engineered to be expressed as part of a single chain along with the other CAR components. See, for example, U.S. Pat. Nos. 7,741,465, and 6,319,494 as well as Eshhar et al., *Cancer Immunol Immunotherapy* (1997) 45: 131-136, Krause et al., *J. Exp. Med.*, Volume 188, No. 4, 1998 (619-626); Finney et al., *Journal of Immunology,* 1998, 161: 2791-2797, each of which is incorporated herein by reference with respect to binding motif domains in CARs. A binding motif, or scFv, is a single chain antigen binding fragment comprising a heavy chain variable domain and a light chain variable domain, which heavy chain variable domain and light chain variable domain are linked or connected together. See, for example, U.S. Pat. Nos. 7,741,465, and 6,319,494 as well as Eshhar et al., *Cancer Immunol Immunotherapy* (1997) 45: 131-136, each of which is incorporated herein by reference with respect to binding motif domains. When derived from a parent antibody, a binding motif may retain some of, retain all of, or essentially retain the parent antibody's binding of a target antigen.

In various embodiments, the binding motif binds to a tumor antigen. In certain embodiments, the tumor antigen is selected from the group consisting of 2B4 (CD244), 4-1BB, 5T4, A33 antigen, adenocarcinoma antigen, adrenoceptor beta 3 (ADRB3), A kinase anchor protein 4 (AKAP-4), alpha-fetoprotein (AFP), anaplastic lymphoma kinase (ALK), Androgen receptor, B7H3 (CD276), 02-integrins, BAFF, B-lymphoma cell, B cell maturation antigen (BCMA), bcr-abl (oncogene fusion protein consisting of breakpoint cluster region (BCR) and Abelson murine leukemia viral oncogene homolog 1 (Abl)), BhCG, bone marrow stromal cell antigen 2 (BST2), CCCTC-Binding Factor (Zinc Finger Protein)-Like (BORIS or Brother of the Regulator of Imprinted Sites), BST2, C242 antigen, 9-0-acetyl-CA19-9 marker, CA-125, CAEX, calreticulin, carbonic anhydrase 9 (CAIX), C-MET, CCR4, CCR5, CCR8, CD2, CD3, CD4, CD5, CD8, CD7, CD10, CD16, CD19, CD20, CD22, CD23 (IgE receptor), CD24, CD25, CD27, CD28, CD30 (TNFRSF8), CD33, CD34, CD38, CD40, CD40L, CD41, CD44, CD44V6, CD49f, CD51, CD52, CD56, CD63, CD70, CD72, CD74, CD79a, CD79b, CD80, CD84, CD96, CD97, CD100, CD123, CD125, CD133, CD137, CD138, CD150, CD152 (CTLA-4), CD160, CD171, CD179a, CD200, CD221, CD229, CD244, CD272 (BTLA), CD274 (PDL-1, B7H1), CD279 (PD-1), CD352, CD358, CD300 molecule-like family member f (CD300LF), Carcinoembryonic antigen (CEA), claudin 6 (CLDN6), C-type lectin-like molecule-1 (CLL-1 or CLECL1), C-type lectin domain family 12 member A (CLEC12A), a cytomegalovirus (CMV) infected cell antigen, CNT0888, CRTAM (CD355), CS-1 (also referred to as CD2 subset 1, CRACC, CD319, and 19A24), CTLA-4, Cyclin B 1, chromosome X open reading frame 61 (CXORF61), Cytochrome P450 1B 1 (CYP1B1), DNAM-1 (CD226), desmoglein 4, DR3, DR5, E-cadherin neoepitope, epidermal growth factor receptor (EGFR), EGF1R, epidermal growth factor receptor variant III (EGFRvIII), epithelial glycoprotein-2 (EGP-2), epithelial glycoprotein-40 (EGP-40), EGF-like module-containing mucin-like hormone receptor-like 2 (EMR2), elongation factor 2 mutated (ELF2M), endosialin, Epithelial cell adhesion molecule (EPCAM), ephrin type-A receptor 2 (EphA2), Ephrin B2, receptor tyrosine-protein kinases erb-B2,3,4 (erb-B2,3,4), ERBB, ERBB2 (Her2/neu), ERG (transmembrane protease, serine 2 (TMPRSS2) ETS fusion gene), ETA, ETS translocation-variant gene 6, located on chromosome 12p (ETV6-AML), Fc fragment of IgA receptor (FCAR or CD89), fibroblast activation protein alpha (FAP), FBP, Fc receptor-like 5 (FCRL5), fetal acetylcholine receptor (AChR), fibronectin extra domain-B, Fms-Like Tyrosine Kinase 3 (FLT3), folate-binding protein (FBP), folate receptor 1, folate receptor α, Folate receptor β, Fos-related antigen 1, Fucosyl, Fucosyl GM1; GM2, ganglioside G2 (GD2), ganglioside GD3 (aNeu5Ac(2-8)aNeu5Ac(2-3)bDGalp(1-4)bDGlcp(1-1)Cer), o-acetyl-GD2 ganglioside (OAcGD2), GITR (TNFRSF 18), GM1, ganglioside GM3 (aNeu5Ac(2-3)bDGalp(1-4)bDGlcp(1-1)Cer), GP 100, hexasaccharide portion of globoH glycoceramide (GloboH), glycoprotein 75, Glypican-3 (GPC3), glycoprotein 100 (gp100), GPNMB, G protein-coupled receptor 20 (GPR20), G protein-coupled receptor class C group 5, member D (GPRC5D), Hepatitis A virus cellular receptor 1 (HAVCR1), human Epidermal Growth Factor Receptor 2 (HER-2), HER2/neu, HER3, HER4, HGF, high molecular weight-melanoma-associated antigen (HMWMAA), human papilloma virus E6 (HPV E6), human papilloma virus E7 (HPV E7), heat shock protein 70-2 mutated (mut hsp70-2), human scatter factor receptor kinase, human Telomerase reverse transcriptase (hTERT), HVEM, ICOS, insulin-like growth factor receptor 1 (IGF-1 receptor), IGF-I, IgG1, immunoglobulin lambda-like polypeptide 1 (IGLL1), IL-6, Interleukin 11 receptor alpha (IL-11Ra), IL-13, Interleukin-13 receptor subunit alpha-2 (IL-13Ra2 or CD213A2), insulin-like growth factor I receptor (IGF1-R), integrin $\alpha5\beta1$, integrin $\alpha v\beta$, intestinal carboxyl esterase, κ-light chain, KCS1, kinase insert domain receptor (KDR), KIR, KIR2DL1, KIR2DL2, KIR2DL3, KIR3DL2, KIR-L, KG2D ligands, KIT (CD117), KLRGI, LAGE-1a, LAG3, lymphocyte-specific protein tyrosine kinase (LCK), Leukocyte immunoglobulin-like receptor subfamily A member 2 (LILRA2), legumain, Leukocyte-associated immunoglobulin-like receptor 1 (LAIR1), Lewis (Y) antigen, LeY, LG, LI cell adhesion molecule (LI-CAM), LIGHT, LMP2, lymphocyte antigen 6 complex, LTBR, locus K 9 (LY6K), Ly-6, lymphocyte antigen 75 (LY75), melanoma cancer testis antigen-1 (MAD-CT-1); melanoma cancer testis antigen-2 (MAD-CT-2), MAGE, Melanoma-associated antigen 1 (MAGE-A1), MAGE-A3 melanoma antigen recognized by T cells 1 (MelanA or MART1), MelanA/MART1, Mesothelin, MAGE A3, melanoma inhibitor of apoptosis (ML-IAP), melanoma-specific chondroitin-sulfate proteoglycan (MCSCP), MORAb-009, MS4A1, Mucin 1 (MUC1), MUC2, MUC3, MUC4, MUC5AC, $MUC5_b$, MUC7, MUC16, mucin CanAg, Mullerian inhibitory substance (MIS) receptor type II, v-myc avian myelocytomatosis viral oncogene neuroblastoma derived homolog (MYCN), N-glycolylneuraminic acid, N-Acetyl glucosaminyl-transferase V (NA17), neural cell adhesion molecule (NCAM), NKG2A, NKG2C, NKG2D, NKG2E ligands, NKR-PIA, NPC-1C, NTB-A, mammary gland differentiation antigen (NY-BR-1), NY-ESO-1, oncofetal antigen (h5T4), Olfactory receptor 51E2 (OR51E2), OX40, plasma cell antigen, poly SA, proacrosin binding protein sp32 (OY-TES 1), p53, p53 mutant, pannexin 3 (PANX3), prostatic acid phosphatase (PAP), paired box protein Pax-3 (PAX3), Paired box protein Pax-5 (PAX5), prostate carcinoma tumor antigen-1 (PCTA-1 or Galectin 8), PD-1H, Platelet-derived growth factor receptor alpha (PDGFR-alpha), PDGFR-beta, PDL192, PEN-5, phosphatidylserine, placenta-specific 1 (PLAC1), Polysialic acid, Prostase, prostatic carcinoma cells, prostein, Protease Serine 21 (Testisin or PRSS21), Proteinase3 (PR1), prostate stem cell antigen (PSCA), prostate-specific membrane antigen (PSMA), Proteasome (Prosome, Macropain) Subunit, Beta Type, Receptor for Advanced Glycation Endproducts (RAGE-1), RANKL, Ras mutant, Ras Homolog Family Member C (RhoC), RON, Receptor tyrosine kinase-like orphan receptor 1 (ROR1), renal ubiquitous 1 (RU1), renal ubiquitous 2 (RU2), sarcoma translocation breakpoints, Squamous Cell Carcinoma Antigen Recognized By T Cells 3 (SART3), SAS, SDC1, SLAMF7, sialyl Lewis adhesion molecule (sLe), Siglec-3, Siglec-7, Siglec-9, sonic hedgehog (SHH), sperm protein 17 (SPA17), Stage-specific embryonic antigen-4 (SSEA-4), STEAP, sTn antigen, synovial sarcoma X breakpoint 2 (SSX2), Survivin, Tumor-associated glycoprotein 72 (TAG72), TCRa, TCRb, TCR5γ, TCR Gamma Alternate Reading Frame Protein (TARP), telomerase, TIGIT, TNF-α precursor, tumor endothelial marker 1 (TEM1/CD248), tumor endothelial marker 7-related (TEM7R), tenascin C, TGF beta 2, TGF-β, transglutaminase 5 (TGS5), angiopoietin-binding cell surface receptor 2 (Tie 2), TIM1, TIM2, TIM3, Tn Ag, TRAIL-R1, TRAIL-R2, Tyrosinase-related protein 2 (TRP-2), thyroid stimulating hormone receptor (TSHR), tumor antigen CTAA16.88, Tyrosinase, ROR1, TAG-72, uroplakin 2 (UPK2), VEGF-A, VEGFR-1, vascular endothelial growth factor receptor 2 (VEGFR2), and vimentin, Wilms tumor protein (WT1), or X Antigen Family Member 1A (XAGE1). See also International Patent Application Publication No. WO2015/142675.

A hinge may be an extracellular domain of an antigen binding system positioned between the binding motif and the transmembrane domain. A hinge may also be referred to as an extracellular domain or as a "spacer." A hinge may contribute to receptor expression, activity, and/or stability. In some embodiments, a hinge domain is positioned between a binding motif and a transmembrane domain. A hinge may also provide flexibility to access the targeted antigen. Hinges comprise immunoglobulin-like hinge domains.

In some embodiments, an antigen binding system may comprise a hinge that is, is from, or is derived from (e.g., comprises all or a fragment of) an immunoglobulin-like hinge domain. In some embodiments, a hinge domain is from or derived from an immunoglobulin. In some embodiments, a hinge domain is selected from the hinge of IgG1, IgG2, IgG3, IgG4, IgA, IgD, IgE, or IgM, or a fragment thereof.

A hinge may be derived from a natural source or from a synthetic source. In some embodiments, an antigen binding system may comprise a hinge that is, is from, or is derived from (e.g., comprises all or a fragment of) CD2, CD3 delta, CD3 epsilon, CD3 gamma, CD4, CD7, CD8.alpha., CD8.beta., CD11a (ITGAL), CD11b (ITGAM), CD11c (ITGAX), CD11d (ITGAD), CD18 (ITGB2), CD19 (B4), CD27 (TNFRSF7), CD28, CD28T, CD29 (ITGB1), CD30 (TNFRSF8), CD40 (TNFRSF5), CD48 (SLAMF2), CD49a (ITGA1), CD49d (ITGA4), CD49f (ITGA6), CD66a (CEACAM1), CD66b (CEACAM8), CD66c (CEACAM6), CD66d (CEACAM3), CD66e (CEACAM5), CD69 (CLEC2), CD79A (B-cell antigen receptor complex-associated alpha chain), CD79B (B-cell antigen receptor complex-associated beta chain), CD84 (SLAMF5), CD96 (Tactile), CD100 (SEMA4D), CD103 (ITGAE), CD134 (OX40), CD137 (4-11B), CD150 (SLAMF1), CD158A (KIR2DL1), CD158B1 (KIR2DL2), CD158B2 (KIR2DL3), CD158C (KIR3DP1), CD158D (KIRDL4), CD158F1 (KIR2DL5A), CD158F2 (KIR2DL5B), CD158K (KIR3DL2), CD160 (BY55), CD162 (SELPLG), CD226 (DNAM1), CD229 (SLAMF3), CD244 (SLAMF4), CD247 (CD3-zeta), CD258 (LIGHT), CD268 (BAFFR), CD270 (TNFSF14), CD272 (BTLA), CD276 (B7-H3), CD279 (PD-1), CD314 (NKG2D), CD319 (SLAMF7), CD335 (NK-p46), CD336 (NK-p44), CD337 (NK-p30), CD352 (SLAMF6), CD353 (SLAMF8), CD355 (CRTAM), CD357 (TNFRSF18), inducible T cell co-stimulator (ICOS), LFA-1 (CD11a/CD18), NKG2C, DAP-10, ICAM-1, NKp80 (KLRF1), IL-2R beta, IL-2R gamma, IL-7R alpha, LFA-1, SLAMF9, LAT, GADS (GrpL), SLP-76 (LCP2), PAG1/CBP, a CD83 ligand, Fc gamma receptor, MHC class 1 molecule, MHC class 2 molecule, a TNF receptor protein, an immunoglobulin protein, a cytokine receptor, an integrin, activating NK cell receptors, or Toll ligand receptor, or which is a fragment or combination thereof.

In some embodiments, an antigen binding system may comprise a hinge that is, is from, or is derived from (e.g., comprises all or a fragment of) a hinge of CD8 alpha. In some embodiments a hinge is, is from, or is derived from a hinge of CD28, such as a truncated CD28 hinge, see for example, International Patent Application Publication No. WO/2017/173256. In some embodiments, a hinge is, is from, or is derived from a fragment of a hinge of CD8 alpha or a fragment of a hinge of CD28, wherein the fragment is anything less than the whole. In some embodiments, a fragment of a CD8 alpha hinge or a fragment of a CD28 hinge comprises an amino acid sequence that excludes at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, or at least 20 amino acids at the N-terminus or C-Terminus, or both, of a CD8 alpha hinge, or of a CD28 hinge.

Polynucleotide and polypeptide sequences of these hinge domains are known. In some embodiments, the polynucleotide encoding a hinge domain comprises a nucleotide sequence at least about 60%, at least about 65%, at least about 70%, at least about 75%, at least about 80%, at least about 85%, at least about 90%, at least about 95%, at least about 96%, at least about 97%, at least about 98%, at least about 99%, or about 100% (e.g., 85-90%, 85-95%, 85-100%, 90-95%, 90-100%, or 95-100%) identical to a nucleotide sequence known. In some embodiments, the polypeptide sequence of a hinge domain comprises a polypeptide sequence at least about 60%, at least about 65%, at least about 70%, at least about 75%, at least about 80%, at least about 85%, at least about 90%, at least about 95%, at least about 96%, at least about 97%, at least about 98%, at least about 99%, or about 100% (e.g., 85-90%, 85-95%, 85-100%, 90-95%, 90-100%, or 95-100%) identical to a known polypeptide sequence.

In general, a "transmembrane domain" (e.g., of an antigen binding system) refers to a domain having an attribute of being present in the membrane when present in a molecule at a cell surface or cell membrane (e.g., spanning a portion or all of a cellular membrane). A costimulatory domain for an antigen binding system of the present disclosure may further comprise a transmembrane domain and/or an intracellular signaling domain. It is not required that every amino acid in a transmembrane domain be present in the membrane. For example, in some embodiments, a transmembrane domain is characterized in that a designated stretch or portion of a protein is substantially located in the membrane. Amino acid or nucleic acid sequences may be analyzed using a variety of algorithms to predict protein subcellular localization (e.g., transmembrane localization). The programs psort (PSORT.org) and Prosite (prosite.expasy.org) are exemplary of such programs.

The type of transmembrane domain comprised in an antigen binding system described herein is not limited to any type. In some embodiments, a transmembrane domain is selected that is naturally associated with a binding motif and/or intracellular domain. In some instances, a transmembrane domain comprises a modification of one or more amino acids (e.g., deletion, insertion, and/or substitution), e.g., to avoid binding of such domains to a transmembrane domain of the same or different surface membrane proteins to minimize interactions with other members of the receptor complex.

A transmembrane domain may be derived either from a natural or from a synthetic source. Where the source is natural, a domain may be derived from any membrane-bound or transmembrane protein. Exemplary transmembrane domains may be derived from (e.g., may comprise at least a transmembrane domain of) an alpha, beta or zeta chain of a T-cell receptor, CD28, CD3 epsilon, CD3 delta, CD3 gamma, CD45, CD4, CD5, CD7, CD8, CD8 alpha, CD8beta, CD9, CD11a, CD11b, CD11c, CD11d, CD16, CD22, CD27, CD33, CD37, CD64, CD80, CD86, CD134, CD137, TNFSFR25, CD154, 4-1BB/CD137, activating NK cell receptors, an Immunoglobulin protein, B7-H3, BAFFR, BLAME (SLAMF8), BTLA, CD100 (SEMA4D), CD103, CD160 (BY55), CD18, CD19, CD19a, CD2, CD247, CD276 (B7-H3), CD29, CD30, CD40, CD49a, CD49D, CD49f, CD69, CD84, CD96 (Tactile), CDS, CEACAM1, CRT AM, cytokine receptor, DAP-10, DNAM1 (CD226), Fc gamma receptor, GADS, GITR, HVEM (LIGHTR), IA4, ICAM-1, ICAM-1, Ig alpha (CD79a), IL-2R beta, IL-2R gamma, IL-7R alpha, inducible T cell costimulator (ICOS), integrins, ITGA4, ITGA4, ITGA6, ITGAD, ITGAE, ITGAL, ITGAM, ITGAX, ITGB2, ITGB7, ITGB1, KIRDS2, LAT, LFA-1, LFA-1, a ligand that binds with CD83, LIGHT, LIGHT, LTBR, Ly9 (CD229), lymphocyte function-associated antigen-1 (LFA-1; CD1-1a/CD18), MHC class 1 molecule, NKG2C, NKG2D, NKp30, NKp44, NKp46, NKp80 (KLRF1), OX-40, PAG/Cbp, programmed death-1 (PD-1), PSGL1, SELPLG (CD162), Signaling Lymphocytic Activation Molecules (SLAM proteins), SLAM (SLAMF1; CD150; IPO-3), SLAMF4 (CD244; 2B4), SLAMF6 (NTB-A; Ly108), SLAMF7, SLP-76, TNF receptor proteins, TNFR2, TNFSF14, a Toll ligand receptor, TRANCE/RANKL, VLA1, or VLA-6, or a fragment, truncation, or a combination thereof. In some embodiments, a transmembrane domain may be synthetic (and can, e.g., comprise predominantly hydrophobic residues such as leucine and valine). In some embodiments, a triplet of phenylalanine, tryptophan and valine are comprised at each end of a synthetic transmembrane domain. In some embodiments, a transmembrane domain is directly linked or connected to a cytoplasmic domain. In some embodiments, a short oligo- or polypeptide linker (e.g., between 2 and 10 amino acids in length) may form a linkage between a transmembrane domain and an intracellular domain. In some embodiments, a linker is a glycine-serine doublet.

Polynucleotide and polypeptide sequences of transmembrane domains provided herein are known. In some embodiments, the polynucleotide encoding a transmembrane domain comprises a nucleotide sequence at least about 60%, at least about 65%, at least about 70%, at least about 75%, at least about 80%, at least about 85%, at least about 90%, at least about 95%, at least about 96%, at least about 97%, at least about 98%, at least about 99%, or about 100% (e.g., 85-90%, 85-95%, 85-100%, 90-95%, 90-100%, or 95-100%) identical to a known nucleotide sequence. In some embodiments, the polypeptide sequence of a transmembrane domain comprises a polypeptide sequence at least about 60%, at least about 65%, at least about 70%, at least about 75%, at least about 80%, at least about 85%, at least about 90%, at least about 95%, at least about 96%, at least about 97%, at least about 98%, at least about 99%, or about 100% (e.g., 85-90%, 85-95%, 85-100%, 90-95%, 90-100%, or 95-100%) identical to a known polypeptide sequence. Optionally, short spacers may form linkages between any or some of the extracellular, transmembrane, and intracellular domains of the CAR.

The intracellular domain (or cytoplasmic domain) comprises one or more signaling domains that, upon binding of target antigen to the binding motif, cause and/or mediate an intracellular signal, e.g., that activates one or more immune cell effector functions (e.g., native immune cell effector functions). In some embodiments, signaling domains of an intracellular domain mediate activation at least one of the normal effector functions of the immune cell. Effector function of a T cell, for example, may be cytolytic activity or helper activity comprising the secretion of cytokines. In some embodiments, signaling domains of an intracellular domain mediate T cell activation, proliferation, survival, and/or other T cell function. An intracellular domain may comprise a signaling domain that is an activating domain. An intracellular domain may comprise a signaling domain that is a costimulatory signaling domain.

Intracellular signaling domains that may transduce a signal upon binding of an antigen to an immune cell are known, any of which may be comprised in an antigen binding system of the present disclosure. For example, cytoplasmic sequences of a T cell receptor (TCR) are known to initiate signal transduction following TCR binding to an antigen (see, e.g., Brownlie et al., *Nature Rev. Immunol.* 13:257-269 (2013)).

In some embodiments, a signaling domain and/or activation domain comprises an immunoreceptor tyrosine-based activation motif (ITAM). Examples of ITAM containing cytoplasmic signaling sequences comprise those derived from TCR zeta, FcR gamma, FcR beta, CD3 zeta, CD3 gamma, CD3 delta, CD3 epsilon, CD5, CD22, CD79a, CD79b, and CD66d (see, e.g., Love et al., *Cold Spring Harb. Perspect. Biol.* 2:a002485 (2010); Smith-Garvin et al., *Annu. Rev. Immunol.* 27:591-619 (2009)).

In certain embodiments, suitable signaling domains comprise, without limitation, 4-1BB/CD137, activating NK cell receptors, an Immunoglobulin protein, B7-H3, BAFFR, BLAME (SLAMF8), BTLA, CD100 (SEMA4D), CD103, CD160 (BY55), CD18, CD19, CD19a, CD2, CD247, CD27, CD276 (B7-H3), CD28, CD29, CD3 delta, CD3 epsilon, CD3 gamma, CD30, CD4, CD40, CD49a, CD49D, CD49f, CD69, CD7, CD84, CD8alpha, CD8beta, CD96 (Tactile), CD11a, CD11b, CD11c, CD11d, CDS, CEACAM1, CRT AM, cytokine receptor, DAP-10, DNAM1 (CD226), Fc gamma receptor, GADS, GITR, HVEM (LIGHTR), IA4, ICAM-1, ICAM-1, Ig alpha (CD79a), IL-2R beta, IL-2R gamma, IL-7R alpha, inducible T cell costimulator (ICOS), integrins, ITGA4, ITGA4, ITGA6, ITGAD, ITGAE, ITGAL, ITGAM, ITGAX, ITGB2, ITGB7, ITGB1, KIRDS2, LAT, LFA-1, LFA-1, ligand that binds with CD83, LIGHT, LIGHT, LTBR, Ly9 (CD229), Ly108), lymphocyte function-associated antigen-1 (LFA-1; CD1-1a/CD18), MHC class 1 molecule, NKG2C, NKG2D, NKp30, NKp44, NKp46, NKp80 (KLRF1), OX-40, PAG/Cbp, programmed death-1 (PD-1), PSGL1, SELPLG (CD162), Signaling Lymphocytic Activation Molecules (SLAM proteins), SLAM (SLAMF1; CD150; IPO-3), SLAMF4 (CD244; 2B4), SLAMF6 (NTB-A, SLAMF7, SLP-76, TNF receptor proteins, TNFR2, TNFSF14, a Toll ligand receptor, TRANCE/RANKL, VLA1, or VLA-6, or a fragment, truncation, or a combination thereof.

A CAR may comprise a costimulatory signaling domain, e.g., to increase signaling potency. See U.S. Pat. Nos. 7,741,465, and 6,319,494, as well as Krause et al. and Finney et al. (supra), Song et al., *Blood* 119:696-706 (2012); Kalos et al., *Sci Transl. Med.* 3:95 (2011); Porter et al., *N. Engl. J. Med.* 365:725-33 (2011), and Gross et al., *Annu. Rev. Pharmacol. Toxicol.* 56:59-83 (2016). Signals generated through a TCR alone may be insufficient for full activation of a T cell and a secondary or co-stimulatory signal may increase activation. Thus, in some embodiments, a signaling domain further comprises one or more additional signaling domains (e.g., costimulatory signaling domains) that activate one or more immune cell effector functions (e.g., a native immune cell effector function described herein). In some embodiments, a portion of such costimulatory signaling domains may be used, as long as the portion transduces the effector function signal. In some embodiments, a cytoplasmic domain described herein comprises one or more cytoplasmic sequences of a T cell co-receptor (or fragment thereof). Non-limiting examples of co-stimulatory domains include, but are not limited to, 4-1BB (also known as TNFRSF9, CD137, CDw137, ILA, and tumor necrosis factor receptor superfamily member 9), 4-1BBL/CD137, BAFFR, BLAME (SLAMF8), activating NK receptors, BTLA (also known as CD272 and BTLA1), CARD11, CD2 (also known as LFA-2, SRBC, T11, and CD2 molecule), CD3 gamma, CD3 delta, CD3 epsilon, CD4, CD7 (also known as GP40, LEU-9, TP41, Tp40, and CD7 molecule), CD8alpha, CD8beta, CD11a, CD11b, CD11c, CD11d, CD18, CD19, CD19a, CD27 (also known as S152, 5152.LPFS2, T14, TNFRSF7, and Tp55), CD28 (also known as Tp44), CD29, CD30 (also known as TNFRSF8, D1S166E, and Ki-1), CD40L (also known as CD40LG, CD154, HIGM1, IGM, IMD3, T-BAM, TNFSF5, TRAP, gp39, hCD40L, and CD40 ligand), CD40 (also known as Bp50, CDW40, TNFRSF5, p50, CD40 (protein), and CD40 molecule), CD49a, CD49D, CD49f, CD54 (ICAM), CD69, CD80 (also known as B7, B7-1, B7.1, BB1, CD28LG, CD28LG1, LAB7, and CD80 molecule), CD83 (and a ligand that specifically binds with CD83), CD84, CD86, CD96 (Tactile), CD100 (SEMA4D), CD103, CD160 (also known as BY55, NK1, NK28, and CD160 molecule), CD244 (also known as 2B4, NAIL, NKR2B4, Nmrk, SLAMF4, and CD244 molecule), CD247, CD276 (also known as, B7-H3,4Ig-B7-H3, B7H3, B7RP-2), CD366, CDS, CEACAM1, CRT AM, cytokine receptors, DAP10, DNAM1 (CD226), Fc gamma receptor, GADS, GITR (also known as TNFRSF18, RP5-902P8.2, AITR, CD357, and GITR-D), GITRL, HVEM (also known as TNFRSF14, RP3-395M20.6, ATAR, CD270, HVEA, HVEM, LIGHTR, and TR2), ICAM-1, ICOS (also known as inducible T cell costimulatory, AILTIM, CD278, and CVID1), Ig alpha (CD79a), IL2R beta, IL2R gamma, IL7R alpha, immunoglobulin-like proteins, integrins, ITGA4, IA4, ITGA6, ITGAD, ITGAE, ITGAL, ITGAM, ITGAX, ITGB 1, ITGB2, ITGB7, KIRDS2, LAG3 (also known as CD223 and lymphocyte activating 3), LAT, LFA-1 (also known as Lymphocyte function-associated antigen 1 and CD11a/CD18), LIGHT (also known as TNFSF14, CD258, HVEML, LTg, TR2, TNLG1D, and tumor necrosis factor superfamily member 14), LTBR, Ly9 (CD229), MHC class I molecule, NKG2C (also known as CD314, D12S2489E, KLR, NKG2-D, NKG2D, and killer cell lectin like receptor K1), NKG2D, NKp30, NKp44, NKp46, NKp80 (KLRF1), OX40 (also known as TNFRSF4, ACT35, RP5-902P8.3, IMD16, CD134, TXGP1L, and tumor necrosis factor receptor superfamily member 4), PAG/Cbp, PD-1 (also known as PDCD1, CD279, PD-1, SLEB2, hPD-1, hPD-1, hSLEI, and Programmed cell death 1), PD-L1 (also known as CD274, B7-H, B7H1, PD-L1, PDCDILI, PDCDILGI, PDL1, CD274 molecule, and Programmed cell death 1 ligand 1), PSGL1, SELPLG (CD162), signaling lymphocytic activation molecules (SLAM proteins such as SLAM (SLAMF1, CD150, IPO-3), SLAMF4 (CD244, 2B4), SLAMF6 (NTB-A, Lyl08), and SLAMF7), SLP76, TIM3 (also known as HAVCR2, HAVcr-2, KIM-3, TIM3, TIMD-3, TIMD3, Tim-3, and hepatitis A virus cellular receptor 2), TNF receptor proteins, TNFR2, Toll ligand receptor, TLR1, TLR2, TLR3, TLR4, TLR5, TLR6, TLR7, TLR8, TLR9, TLR10, TNFR2, TRANCE/RANKL, TRIM, VLA1, VLA-6, and ZAP70. An exemplary costimulatory protein has the amino acid sequence of a costimulatory protein found naturally on T cells, the complete native amino acid sequence of which costimulatory protein is described in NCBI Reference Sequence: NP_006130.1. In certain instances, a CAR comprises a 4-1BB costimulatory domain.

The polynucleotide and polypeptide sequences of signaling domains provided herein are known. In some embodiments, the polynucleotide encoding a signaling domain comprises a nucleotide sequence at least about 60%, at least about 65%, at least about 70%, at least about 75%, at least about 80%, at least about 85%, at least about 90%, at least about 95%, at least about 96%, at least about 97%, at least about 98%, at least about 99%, or about 100% (e.g., 85-90%, 85-95%, 85-100%, 90-95%, 90-100%, or 95-100%) identical to a known nucleotide sequence. In some embodiments, the polypeptide sequence of a signaling domain comprises a polypeptide sequence at least about 60%, at least about 65%, at least about 70%, at least about 75%, at least about 80%, at least about 85%, at least about 90%, at least about 95%, at least about 96%, at least about 97%, at least about 98%, at least about 99%, or about 100% (e.g., 85-90%, 85-95%, 85-100%, 90-95%, 90-100%, or 95-100%) identical to a known polypeptide sequence.

Components of a CAR may be exchanged or "swapped" using routine techniques of biotechnology for equivalent components. To provide just a few non-limiting and partial examples, a CAR of the present disclosure may comprise a binding motif as provided herein in combination with a hinge provided herein and a costimulatory domain provided herein. In certain examples, a CAR of the present disclosure may comprise a leader sequence together with a binding motif as provided herein in combination with a hinge provided herein and a costimulatory domain provided herein.

Various CAR sequences, components, and/or frameworks are known, comprising without limitation sequences of hinges, spacers, transmembrane domains, costimulatory domains, stimulatory domains, binding motifs, and variants of each, and a CAR with desired binding and components or architecture can be readily constructed if, e.g., a heavy chain variable domain sequence or CDR sequences and a light chain variable domain sequence or CDR sequences are provided.

The present disclosure comprises conjugates in which an antibody of the present disclosure is associated with a therapeutic agent or a detectable moiety. In various embodiments, the therapeutic agent is an anti-cancer agent as provided herein. In certain embodiments, provided conjugate comprises one or more detectable moieties, i.e., is "labeled" with one or more such moieties. In some such embodiments, a conjugate of the present disclosure is useful in diagnostic or imaging applications, e.g., diagnosing or imaging cancer. Any of a wide variety of detectable moieties may be used in labeled antibody conjugates described herein. Suitable detectable moieties comprise, without limitation: various ligands, radionuclides; fluorescent dyes; chemiluminescent agents (such as, for example, acridinum esters, stabilized dioxetanes, and the like); bioluminescent agents; spectrally resolvable inorganic fluorescent semiconductors nanocrystals (i.e., quantum dots); microparticles;

metal nanoparticles (e.g., gold, silver, copper, platinum, etc.); nanoclusters; paramagnetic metal ions; enzymes; colorimetric labels (such as, for example, dyes, colloidal gold, and the like); biotin; dioxigenin; haptens; and proteins for which antisera or monoclonal antibodies are available. The present disclosure also provides nucleic acids that encode any of the variety of membrane-bound IL-18 polypeptides, or any of the CARs or TCRs, described herein. In one embodiment, a recombinant nucleic acid construct comprises a nucleic acid molecule encoding a membrane-bound IL18.

The present disclosure comprises vectors that comprise nucleic acids of the present disclosure and/or that encode IL-18 polypeptides of the present disclosure or comprise nucleic acids encoding any of the CARs or TCRs described herein. Any vector may be suitable for the present disclosure. In some embodiments, the vector is a viral vector. In some embodiments, the vector is a retroviral vector, a DNA vector, a murine leukemia virus vector, an SFG vector, a plasmid, a RNA vector, an adenoviral vector, a baculoviral vector, an Epstein Barr viral vector, a papovaviral vector, a vaccinia viral vector, a herpes simplex viral vector, an adenovirus associated vector (AAV), a lentiviral vector, or any combination thereof. Suitable exemplary vectors include e.g., pGAR, pBABE-puro, pBABE-neo largeTcDNA, pBABE-hygro-hTERT, pMKO.1 GFP, MSCV-IRES-GFP, pMSCV PIG (Puro IRES GFP empty plasmid), pMSCV-loxp-dsRed-loxp-eGFP-Puro-WPRE, MSCV IRES Luciferase, pMIG, MDH1-PGK-GFP_2.0, TtRMPVIR, pMSCV-IRES-mCherry FP, pRetroX GFP T2A Cre, pRXTN, pLncEXP, and pLXIN-Luc.

A recombinant expression vector may be any suitable recombinant expression vector. Suitable vectors comprise those designed for propagation and expansion or for expression or both, such as plasmids and viruses. For example, a vector may be selected from the pUC series (Fermentas Life Sciences, Glen Burnie, Md.), the pBluescript series (Stratagene, LaJolla, Calif), the pET series (Novagen, Madison, Wis.), the pGEX series (Pharmacia Biotech, Uppsala, Sweden), and the pEX series (Clontech, Palo Alto, Calif.). Bacteriophage vectors, such as λGT10, λGT11, λZapII (Stratagene), λEMBL4, and λNM1149, also may be used. Examples of plant expression vectors useful in the context of the disclosure comprise pBI01, pBI101.2, pBI101.3, pBI121 and pBIN19 (Clontech). Examples of animal expression vectors useful in the context of the disclosure comprise pcDNA, pEUK-C1, pMAM, and pMAMneo (Clontech). In some embodiments, a bicistronic IRES vector (e.g., from Clontech) is used to comprise both a nucleic acid encoding an antigen binding system and an inducible expression construct described herein.

Recombinant expression vectors may be prepared using standard recombinant DNA techniques described in, for example, Sambrook et al., Molecular Cloning: A Laboratory Manual, 3rd ed., Cold Spring Harbor Press, Cold Spring Harbor, N.Y. 2001; and Ausubel et al., Current Protocols in Molecular Biology, Greene Publishing Associates and John Wiley & Sons, NY, 1994. Constructs of expression vectors, which are circular or linear, may be prepared to contain a replication system functional in a prokaryotic or eukaryotic host cell. Replication systems may be derived, e.g., from ColEl, 2μ plasmid, λ, SV40, bovine papilloma virus, and the like.

A recombinant expression vector may comprise one or more marker genes, which allow for selection of transformed or transfected hosts. Marker genes comprise biocide resistance, e.g., resistance to antibiotics, heavy metals, etc., complementation in an auxotrophic host to provide prototrophy, and the like. Suitable marker genes for the recombinant expression vectors comprise, for instance, neomycin/G418 resistance genes, puromycin resistance genes, hygromycin resistance genes, histidinol resistance genes, tetracycline resistance genes, and ampicillin resistance genes.

Vectors useful in the context of the disclosure may be "naked" nucleic acid vectors (i.e., vectors having little or no proteins, sugars, and/or lipids encapsulating them), or vectors complexed with other molecules. Other molecules that may be suitably combined with the vectors comprise without limitation viral coats, cationic lipids, liposomes, polyamines, gold particles, and targeting moieties such as ligands, receptors, or antibodies that target cellular molecules.

In certain embodiments, a membrane-bound IL-18 polypeptide and a CAR or TCR can be constructed in a single, multicistronic expression cassette, in multiple expression cassettes of a single vector, or in multiple vectors. In one embodiment, the disclosure provides sets of vectors that include a first vector that includes a sequence that encodes any of the membrane-bound IL-18 constructs described herein, and a second vector that includes a sequence that encodes a CAR or TCR. In some embodiments, one or both of the first vector and the second vector is a lentiviral, retroviral or an adenoviral vector. In some embodiments, the second vector further includes a promoter sequence and/or an enhancer sequence that is operably linked to the sequence encoding the CAR or TCR. In some embodiments, the second vector further includes a poly(A) sequence operably linked to the sequence encoding the CAR or TCR. In one embodiment, the disclosure provides a polycistronic expression cassette. Examples of elements which create polycistronic expression cassette include, but is not limited to, various viral and non-viral Internal Ribosome Entry Sites (IRES, e.g., FGF-1 IRES, FGF-2 IRES, VEGF IRES, IGF-II IRES, NF-KB IRES, RUNX1 IRES, p53 IRES, hepatitis A IRES, hepatitis C IRES, pestivirus IRES, aphthovirus IRES, picornavirus IRES, poliovirus IRES and encephalomyocarditis virus IRES) and cleavable linkers (e.g., 2A peptides, e.g., P2A, T2A, E2A and F2A peptides). Combinations of retroviral vector and an appropriate packaging line are also suitable, where the capsid proteins will be functional for infecting human cells. Various amphotropic virus-producing cell lines are known, including, but not limited to, PA12 (Miller et al., 1985, *Mol. Cell. Biol.* 5:431-437); PA317 (Miller et al., 1986, *Mol. Cell. Biol.* 6:2895-2902); and CRIP (Danos et al., 1988, *Proc. Natl. Acad. Sci. USA* 85:6460-6464). Non-amphotropic particles are suitable too, e.g., particles pseudotyped with VSVG, RD 114 or GALV envelope and any other known in the art.

Vector DNA may be introduced into a cell, e.g., an immune cell, via conventional transformation, transfection, or transduction techniques. The terms "transformation" and "transfection" encompass a variety of art-recognized techniques for introducing foreign nucleic acid (e.g., DNA) into a cell, such as calcium phosphate or calcium chloride co-precipitation, DEAE-dextran-mediated transfection, lipofection, gene gun, nanoparticle-mediated delivery, or electroporation. Transduction comprises viral delivery of a vector to a cell, e.g., by a vector disclosed herein, comprising without limitation retrovirus, lentivirus, and AAV.

The present disclosure comprises cells that comprise, express, or are engineered (e.g., transformed or transduced) to comprise or express, at least one vector or nucleic acid of the present disclosure. In one embodiment, the present disclosure provides cells (1) comprising (a) a CAR or TCR, and (b) a membrane-bound IL-18 polypeptide. The immune cells can be transduced with a CAR or TCR and a membrane-bound IL-18 polypeptide such that the cells express the CAR or TCR and the membrane-bound IL-18 polypeptide.

Chimeric antigen receptors (CARs or CAR-Ts) and engineered T cell receptors (TCRs) may be readily inserted into and expressed by immune cells, e.g., T cells. In certain embodiments, cells (e.g., immune cells such as T cells) are obtained from a donor subject. In some embodiments, the donor subject is human patient afflicted with a cancer or a tumor. In other embodiments, the donor subject is a human patient not afflicted with a cancer or a tumor. In some embodiments, an engineered cell is autologous to a subject. In some embodiments, an engineered cell is allogeneic to a subject.

In certain embodiments, the presently disclosed immune cells (e.g., have increased secretion of anti-tumor cytokines, including, but not limited to, IL-18, IL-2, IFN-γ, and TNF-α. In certain embodiments, the immune cells have decreased secretion of cytokines associated with cytokine release syndrome (CRS), e.g., IL-6.

Any cell may be used as a host cell for the polynucleotides, the vectors, or the polypeptides of the present disclosure. In some embodiments, the cell can be a prokaryotic cell, fungal cell, yeast cell, or higher eukaryotic cells such as a mammalian cell. Suitable prokaryotic cells include, without limitation, eubacteria, such as Gram-negative or Gram-positive organisms, for example, Enterobactehaceae such as *Escherichia*, e.g., *E. coli; Enterobacter; Erwinia; Klebsiella; Proteus; Salmonella*, e.g., *Salmonella typhimurium; Serratia*, e.g., *Serratia marcescans*, and *Shigella*; Bacilli such as *B. subtilis* and B. lichenformis; *Pseudomonas* such as *P. aeruginosa*; and *Streptomyces*. In some embodiments, the cell is a human cell. In some embodiments, the cell is an immune cell. In some embodiments, the immune cell is selected from the group consisting of a T cell, a B cell, a tumor infiltrating lymphocyte (TIL), a TCR expressing cell, a natural killer (NK) cell, a dendritic cell, a granulocyte, an innate lymphoid cell, a megakaryocyte, a monocyte, a macrophage, a platelet, a thymocyte, and a myeloid cell. In one embodiment, the immune cell is a T cell. In another embodiment, the immune cell is an NK cell. In certain embodiments, the T cell is a tumor-infiltrating lymphocyte (TIL), autologous T cell, engineered autologous T cell (eACT™), an allogeneic T cell, a heterologous T cell, or any combination thereof.

In one embodiment, a membrane bound IL-18 and/or a CAR or TCR as provided herein is introduced into T cells. The T cells may come from any source known in the art. For example, T cells may be differentiated in vitro from a hematopoietic stem cell population, or T cells may be obtained from a subject. T cells may be obtained from, e.g., peripheral blood mononuclear cells (PBMCs), bone marrow, lymph node tissue, cord blood, thymus tissue, tissue from a site of infection, ascites, pleural effusion, spleen tissue, and tumors. In addition, the T cells may be derived from one or more T cell lines available in the art. T cells may also be obtained from a unit of blood collected from a subject using any number of techniques known to the skilled artisan, such as FICOLL™ separation and/or apheresis. In some embodiments, the cells collected by apheresis are washed to remove the plasma fraction and placed in an appropriate buffer or media for subsequent processing. In some embodiments, the cells are washed with PBS. As will be appreciated, a washing step may be used, such as by using a semiautomated flow through centrifuge, e.g., the Cobe™ 2991 cell processor, the Baxter CytoMate™, or the like. In some embodiments, the washed cells are resuspended in one or more biocompatible buffers, or other saline solution with or without buffer. In some embodiments, the undesired components of the apheresis sample are removed. Additional methods of isolating T cells for a T cell therapy are disclosed in U.S. Patent Publication No. 2013/0287748, and International Patent Application Publication Nos. WO2015/120096 and WO2017/070395, all of which are herein incorporated by reference in their totality for the purposes of describing these methods and in their entirety.

In some embodiments, T cells are isolated from PBMCs by lysing the red blood cells and depleting the monocytes, e.g., by using centrifugation through a PERCOLL™ gradient. In some embodiments, a specific subpopulation of T cells, such as CD4+, CD8+, CD28+, CD45RA+, and CD45RO+ T cells is further isolated by positive or negative selection techniques known in the art. For example, enrichment of a T cell population by negative selection may be accomplished with a combination of antibodies directed to surface markers unique to the negatively selected cells. In some embodiments, cell sorting and/or selection via negative magnetic immunoadherence or flow cytometry that uses a cocktail of monoclonal antibodies directed to cell surface markers present on the cells negatively selected may be used. For example, to enrich for CD4+ cells by negative selection, a monoclonal antibody cocktail typically includes antibodies to CD8, CD11b, CD14, CD16, CD20, and HLA-DR. In some embodiments, flow cytometry and cell sorting are used to isolate cell populations of interest for use in the present disclosure.

In some embodiments, PBMCs are used directly for genetic modification with the immune cells using methods as described herein. In some embodiments, after isolating the PBMCs, T lymphocytes are further isolated, and both cytotoxic and helper T lymphocytes are sorted into naive, memory, and effector T cell subpopulations either before or after genetic modification and/or expansion. In some embodiments, CD8+ cells are further sorted into naive, central memory, and effector cells by identifying cell surface antigens that are associated with each of these types of CD8+ cells. In some embodiments, the expression of phenotypic markers of central memory T cells includes CCR7, CD3, CD28, CD45RO, CD62L, and CD127 and are negative for granzyme B. In some embodiments, central memory T cells are CD8+, CD45RO+, and CD62L+ T cells. In some embodiments, effector T cells are negative for CCR7, CD28, CD62L, and CD127 and positive for granzyme B and perforin. In some embodiments, CD4+ T cells are further sorted into subpopulations. For example, CD4+ T helper cells may be sorted into naive, central memory, and effector cells by identifying cell populations that have cell surface antigens.

In some embodiments, the immune cells, e.g., NK cell or T cells, are genetically modified following isolation using known methods, or the immune cells are activated and expanded (or differentiated in the case of progenitors) in vitro prior to being genetically modified. In another embodiment, the immune cells, e.g., NK cell or T cells, are genetically modified with a CAR or TCR as described herein (e.g., transduced with a viral vector comprising one or more nucleotide sequences encoding a CAR or TCR), optionally genetically modified with a membrane-bound IL-18 (e.g., transduced with a viral vector comprising one or more nucleotide sequences encoding a membrane bound IL-18), and then are activated and/or expanded in vitro. Methods for activating and expanding T cells are known in the art and are described, e.g., in U.S. Pat. Nos. 6,905,874; 6,867,041; and 6,797,514; and International Patent Application Publication No. WO 2012/079000, the contents of which are hereby incorporated by reference in their entirety. Generally, such methods include contacting PBMC or isolated T cells with a stimulatory agent and costimulatory agent, such as anti-CD3 and anti-CD28 antibodies, generally attached to a bead or other surface, in a culture medium with appropriate cytokines, such as IL-2, and optionally IL-18. Anti-CD3 and anti-CD28 antibodies attached to the same bead serve as a "surrogate" antigen presenting cell (APC). One example is The Dynabeads® system, a CD3/CD28 activator/stimulator system for physiological activation of human T cells. In other embodiments, the T cells are activated and stimulated to proliferate with feeder cells and appropriate antibodies and cytokines using methods such as those described in U.S. Pat. Nos. 6,040,177 and 5,827,642 and International Patent Application Publication No. WO 2012/129514, the contents of which are hereby incorporated by reference in their entirety.

The methods described herein can further comprise enriching a population of lymphocytes obtained from a donor. Enrichment of a population of lymphocytes, e.g., the one or more T cells, can be accomplished by any suitable separation method including, but not limited to, the use of a separation medium (e.g., FICOLL-PAQUE™, ROSETTESEP™ HLA Total Lymphocyte enrichment cocktail, Lymphocyte Separation Medium (LSA) (MP Biomedical Cat. No. 0850494X), or the like), cell size, shape or density separation by filtration or elutriation, mmunomagnetic separation (e.g., magnetic activated cell sorting system, MACS), fluorescent separation (e.g., fluorescence activated cell sorting system, FACS), or bead based column separation.

The methods described herein can further comprise stimulating the population of lymphocytes with one or more T-cell stimulating agents to produce a population of activated T cells under a suitable condition. Any combination of one or more suitable T cell stimulating agents can be used to produce a population of activated T cells including, including, but not limited to, an antibody or functional fragment thereof which targets a T-cell stimulatory or co-stimulatory molecule (e.g., anti-CD2 antibody, anti-CD3 antibody, anti-CD28 antibody, or a functional fragment thereof), or any other suitable mitogen (e.g., tetradecanoyl phorbol acetate (TPA), phytohaemagglutinin (PHA), concanavalin A (conA), lipopolysaccharide (LPS), pokeweed mitogen (PWM)), or a natural ligand to a T-cell stimulatory or co-stimulatory molecule.

Suitable conditions for stimulating the population of lymphocytes as described herein can include a temperature, for an amount of time, and/or in the presence of a level of $CO_2$. In certain embodiments, the temperature for stimulation is about 34° C., about 35° C., about 36° C., about 37° C., or about 38° C. In certain embodiments, the temperature for stimulation is about 34-38° C. In certain embodiments, the temperature for stimulation is from about 35-37° C. In certain embodiments, the temperature for stimulation is from about 36-38° C. In certain embodiments, the temperature for stimulation is about 36-37° C. or about 37° C.

Another condition for stimulating the population of lymphocytes as described herein can include a time for stimulation. In some embodiments, the time for stimulation is about 24-72 hours. In some embodiments, the time for stimulation is about 24-36 hours, about 30-42 hours, about 36-48 hours, about 40-52 hours, about 42-54 hours, about 44-56 hours, about 46-58 hours, about 48-60 hours, about 54-66 hours, or about 60-72 hours. In one particular embodiment, the time for stimulation is about 48 hours or at least about 48 hours. In other embodiments, the time for stimulation is about 44-52 hours. In certain embodiments, the time for stimulation is about 40-44 hours, about 40-48 hours, about 40-52 hours, or about 40-56 hours.

Other conditions for stimulating the population of lymphocytes as described herein can include a $CO_2$ level. In some embodiments, the level of $CO_2$ for stimulation is about 1.0-10% $CO_2$. In some embodiments, the level of $CO_2$ for stimulation is about 1.0%, about 2.0%, about 3.0%, about 4.0%, about 5.0%, about 6.0%, about 7.0%, about 8.0%, about 9.0%, or about 10.0% $CO_2$. In one embodiment, the level of $CO_2$ for stimulation is about 3-7% $CO_2$. In other embodiments, the level of $CO_2$ for stimulation is about 4-6% $CO_2$. In still other embodiments, the level of $CO_2$ for stimulation is about 4.5-5.5% $CO_2$. In one particular embodiment, the level of $CO_2$ for stimulation is about 5% $CO_2$.

The conditions for stimulating the population of lymphocytes can comprise a temperature, for an amount of time for stimulation, and/or in the presence of a level of $CO_2$ in any combination. For example, the step of stimulating the population of lymphocytes can comprise stimulating the population of lymphocytes with one or more T-cell stimulating agents at a temperature of about 36-38° C., for an amount of time of about 44-52 hours, and in the presence of a level of $CO_2$ of about 4.5-5.5% $CO_2$.

The concentration of lymphocytes useful for the methods herein is about $1.0\text{-}10.0\times10^6$ cells/mL. In certain embodiments, the concentration of lymphocytes is about $1.0\text{-}2.0\times10^6$ cells/mL, about $1.0\text{-}3.0\times10^6$ cells/mL, about $1.0\text{-}4.0\times10^6$ cells/mL, about $1.0\text{-}5.0\times10^6$ cells/mL, about $1.0\text{-}6.0\times10^6$ cells/mL, about $1.0\text{-}7.0\times10^6$ cells/mL, about $1.0\text{-}8.0\times10^6$ cells/mL, $1.0\text{-}9.0\times10^6$ cells/mL, or about $1.0\text{-}10.0\times10^6$ cells/mL. In certain embodiments, the concentration of lymphocytes is about $1.0\text{-}2.0\times10^6$ cells/mL. In certain embodiments, the concentration of lymphocytes is about $1.0\text{-}1.2\times10^6$ cells/mL, about $1.0\text{-}1.4\times10^6$ cells/mL, about $1.0\text{-}1.6\times10^6$ cells/mL, about $1.0\text{-}1.8\times10^6$ cells/mL, or about $1.0\text{-}2.0\times10^6$ cells/mL. In certain embodiments, the concentration of lymphocytes is at least about $1.0\times10^6$ cells/mL, at least about $1.1\times10^6$ cells/mL, at least about $1.2\times10^6$ cells/mL, at least about $1.3\times10^6$ cells/mL, at least about $1.4\times10^6$ cells/mL, at least about $1.5\times10^6$ cells/mL, at least about $1.6\times10^6$ cells/mL, at least about $1.7\times10^6$ cells/mL, at least about $1.8\times10^6$ cells/mL, at least about $1.9\times10^6$ cells/mL, at least about $2.0\times10^6$ cells/mL, at least about $4.0\times10^6$ cells/mL, at least about $6.0\times10^6$ cells/mL, at least about $8.0\times10^6$ cells/mL, or at least about $10.0\times10^6$ cells/mL.

An anti-CD3 antibody (or functional fragment thereof), an anti-CD28 antibody (or functional fragment thereof), or a combination of anti-CD3 and anti-CD28 antibodies can be used in accordance with the step of stimulating the population of lymphocytes. Any soluble or immobilized anti-CD2, anti-CD3 and/or anti-CD28 antibody or functional fragment thereof can be used (e.g., clone OKT3 (anti-CD3), clone 145-2C11 (anti-CD3), clone UCHT1 (anti-CD3), clone L293 (anti-CD28), clone 15E8 (anti-CD28)). In some aspects, the antibodies can be purchased commercially from vendors known in the art including, but not limited to, Miltenyi Biotec, BD Biosciences (e.g., MACS GMP CD3 pure 1 mg/mL, Part No. 170-076-116), and eBioscience, Inc. Further, one skilled in the art would understand how to produce an anti-CD3 and/or anti-CD28 antibody by standard methods. In some embodiments, the one or more T cell stimulating agents that are used in accordance with the step of stimulating the population of lymphocytes include an antibody or functional fragment thereof which targets a T-cell stimulatory or costimulatory molecule in the presence of a T cell cytokine. In one aspect, the one or more T cell stimulating agents include an anti-CD3 antibody and IL-2 or IL-18. In certain embodiments, the T cell stimulating agent includes an anti-CD3 antibody at a concentration of from about 20 ng/mL-100 ng/mL. In certain embodiments, the concentration of anti-CD3 antibody is about 20 ng/mL, about 30 ng/mL, about 40 ng/mL, about 50 ng/mL, about 60 ng/mL, about 70 ng/mL, about 80 ng/mL, about 90 ng/mL, or about 100 ng/mL. In one particular embodiment, the concentration of anti-CD3 antibody is about 50 ng/mL. In an alternative embodiment, T cell activation is not needed. In such embodiment, the step of stimulating the population of lymphocytes to produce a population of activated T cells is omitted from the method, and the population of lymphocytes, which can be enriched for T lymphocytes, is transduced in accordance with the steps below.

The methods described herein can comprise transducing the population of activated T cells with a viral vector comprising a nucleic acid molecule which encodes a membrane-bound IL-18 and/or a CAR or TCR, using a single cycle transduction to produce a population of transduced T cells. In embodiments utilizing a viral vector with a membrane-bound IL-18, the viral vector may be separate from the viral vector encoding the CAR or TCR or a viral vector may encode both the membrane-bound IL-18 and the CAR or TCR. Transducing the population of activated immune cells as described herein may be performed for a period of time, at certain temperature and/or in the presence of a specific level of $CO_2$ in any combination: a temperature of about 36-38° C., for an amount of time of about 16-24 hours, and in the presence of a level of $CO_2$ of about 4.5-5.5% $CO_2$. The immune cells may be prepared by the combination of any one of the methods of the application with any manufacturing method of preparing T cells for immunotherapy, including, without limitation, those described in International Patent Application Publication Nos. WO2015/120096 and WO2017/070395, which are herein incorporated by reference in their totality for the purposes of describing these methods; any and all methods used in the preparation of Axicabtagene ciloleucel or Yescarta®; any and all methods used in the preparation of Tisagenlecleucel/Kymriah™; any and all methods used in the preparation of "off-the-shelf" T cells for immunotherapy; and any other methods of preparing lymphocytes for administration to humans. The manufacturing process may be adapted to remove circulating tumor cells from the cells obtained from the patient.

Several recombinant viruses have been used as viral vectors to deliver genetic material to a cell. Viral vectors that can be used in accordance with the transduction step can be any ecotropic or amphotropic viral vector including, but not limited to, recombinant retroviral vectors, recombinant lentiviral vectors, recombinant adenoviral vectors, and recombinant adeno-associated viral (AAV) vectors. In some embodiments, the method further comprises transducing the one or more NK cells or T cells with a retrovirus. In one embodiment, the viral vector used to transduce the population of NK cells or activated T cells is an MSGV1 gamma retroviral vector. In certain embodiments, the viral vector used to transduce the population of NK cells or activated T cells is the PG13-CD19-H3 Vector described by Kochenderfer, J. Immunother. 32(7): 689-702 (2009). According to one aspect of this embodiment, the viral vector is grown in a suspension culture in a medium which is specific for viral vector manufacturing referred to herein as a "viral vector inoculum." Any suitable growth media and/or supplements for growing viral vectors can be used in the viral vector inoculum in accordance with the methods described herein. According to some aspects, the viral vector inoculum is then be added to the serum-free culture media described below during the transduction step.

The conditions for transducing the population of NK cells or activated T cells as described herein can comprise a specific time, at a specific temperature and/or in the presence of a specific level of $CO_2$. In certain embodiments, the temperature for transduction is about 34° C., about 35° C., about 36° C., about 37° C., or about 38° C. In one embodiment, the temperature for transduction is about 34-38° C. In another embodiment, the temperature for transduction is from about 35-37° C. In another embodiment, the temperature for transduction is from about 36-38° C. In still another embodiment, the temperature for transduction is about 36-37° C. In one particular embodiment, the temperature for transduction is about 37° C.

In certain embodiments, the time for transduction is about 12-36 hours. In some embodiments, the time for transduction is about 12-16 hours, about 12-20 hours, about 12-24 hours, about 12-28 hours, or about 12-32 hours. In other embodiments, the time for transduction is about 20 hours or at least about 20 hours. In one embodiment, the time for transduction is about 16-24 hours. In other embodiments, the time for transduction is at least about 14 hours, at least about 16 hours, at least about 18 hours, at least about 20 hours, at least about 22 hours, at least about 24 hours, or at least about 26 hours.

In certain embodiments, the level of $CO_2$ for transduction is about 1.0-10% $CO_2$. In other embodiments, the level of $CO_2$ for transduction is about 1.0%, about 2.0%, about 3.0%, about 4.0%, about 5.0%, about 6.0%, about 7.0%, about 8.0%, about 9.0%, or about 10.0% $CO_2$. In one embodiment, the level of $CO_2$ for transduction is about 3-7% $CO_2$. In another embodiment, the level of $CO_2$ for transduction can be about 4-6% $CO_2$. In another embodiment, the level of $CO_2$ for transduction is about 4.5-5.5% $CO_2$. In one particular embodiment, the level of $CO_2$ for transduction is about 5% $CO_2$.

In some embodiments, transducing the population of activated T cells as described herein can be performed for a particular time, at a specific temperature and/or in the presence of a specific level of $CO_2$ in any combination: a temperature of about 36-38° C., for an amount of time of about 16-24 hours, and in the presence of a level of $CO_2$ of about 4.5-5.5% $CO_2$.

The methods described herein can comprise expanding the population of transduced one or more NK cells or T cells for a particular time to produce a population of engineered NK cells or T cells. The predetermined time for expansion can be any suitable time which allows for the production of (i) a sufficient number of cells in the population of engineered NK cells or T cells for at least one dose for administering to a patient, (ii) a population of engineered T cells with a favorable proportion of juvenile cells compared to a typical longer process, or (iii) both (i) and (ii). This time will depend on the cell surface receptor expressed by the NK cells or T cells, the vector used, the dose that is needed to have a therapeutic effect, and other variables. Thus, in some embodiments, the predetermined time for expansion can be 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, or more than 21 days. In some aspects, the time for expansion is shorter than expansion methods known in the art. For example, the predetermined time for expansion can be shorter by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, or can be shorter by more than 75%. In one aspect, the time for expansion is about 3 days, and the time from enrichment of the population of lymphocytes to producing the engineered NK cells or T cells is about 6 days.

The conditions for expanding the population of transduced NK cells or T cells can include a temperature and/or in the presence of a level of $CO_2$. In certain embodiments, the temperature is about 34° C., about 35° C., about 36° C., about 37° C., or about 38° C. In one embodiment, the temperature is about 34-38° C. In another embodiment, the temperature is from about 35-37° C. In another embodiment, the temperature is from about 36-38° C. In yet another embodiment, the temperature is about 36-37° C. In one particular embodiment the temperature is about 37° C. In certain embodiments, the level of $CO_2$ is 1.0-10% $CO_2$. In other embodiments, the level of $CO_2$ is about 1.0%, about 2.0%, about 3.0%, about 4.0%, about 5.0%, about 6.0%, about 7.0%, about 8.0%, about 9.0%, or about 10.0% $CO_2$. In one embodiment, the level of $CO_2$ is about 4.5-5.5% $CO_2$. In another embodiment, the level of $CO_2$ is about 5% $CO_2$. In other embodiments, the level of $CO_2$ is about 3.5%, about 4.0%, about 4.5%, about 5.0%, about 5.5%, or about 6.5% $CO_2$. In some embodiments, the conditions for expanding the population of transduced NK cells or T cells include a temperature and/or in the presence of a level of $CO_2$ in any combination. For example, conditions for expanding the population of transduced T cells comprise a temperature of about 36-38° C. and in the presence of a level of $CO_2$ of about 4.5-5.5% $CO_2$.

Each step of the manufacturing described herein can be performed in a closed system. In certain embodiments, the closed system is a closed bag culture system, using any suitable cell culture bags (e.g., Miltenyi Biotec MACS® GMP Cell Differentiation Bags, Origen Biomedical PermaLife Cell Culture bags). In some embodiments, the cell culture bags used in the closed bag culture system are coated with a recombinant human fibronectin fragment during the transduction step. The recombinant human fibronectin fragment can include three functional domains: a central cell-binding domain, heparin-binding domain II, and a CS1-sequence. The recombinant human fibronectin fragment can be used to increase gene efficiency of retroviral transduction of immune cells by aiding colocalization of target cells and viral vector. In certain embodiments, the recombinant human fibronectin fragment is RETRONECTIN® (Takara Bio, Japan). In certain embodiments, the cell culture bags are coated with recombinant human fibronectin fragment at a concentration of about 1-60 g/mL or about 1-40 g/mL. In other embodiments, the cell culture bags are coated with recombinant human fibronectin fragment at a concentration of about 1-20 g/mL, 20-40 g/mL, or 40-60 g/mL. In some embodiments, the cell culture bags are coated with about 1 g/mL, about 2 g/mL, about 3 g/mL, about 4 g/mL, about 5 g/mL, about 6 g/mL, about 7 g/mL, about 8 g/mL, about 9 g/mL, about 10 g/mL, about 11 g/mL, about 12 g/mL, about 13 g/mL, about 14 g/mL, about 15 g/mL, about 16 g/mL, about 17 g/mL, about 18 g/mL, about 19 g/mL, or about 20 g/mL recombinant human fibronectin fragment. In other embodiments, the cell culture bags are coated with about 2-5 g/mL, about 2-10 g/mL, about 2-20 g/mL, about 2-25 g/mL, about 2-30 g/mL, about 2-35 g/mL, about 2-40 g/mL, about 2-50 g/mL, or about 2-60 g/mL recombinant human fibronectin fragment. In certain embodiments, the cell culture bags are coated with at least about 2 g/mL, at least about 5 g/mL, at least about 10 g/mL, at least about 15 g/mL, at least about 20 g/mL, at least about 25 g/mL, at least about 30 g/mL, at least about 40 g/mL, at least about 50 g/mL, or at least about 60 g/mL recombinant human fibronectin fragment. In one particular embodiment, the cell culture bags are coated with at least about 10 g/mL recombinant human fibronectin fragment. The cell culture bags used in the closed bag culture system can optionally be blocked with human albumin serum (HSA) during the transduction step. In an alternative embodiment, the cell culture bags are not blocked with HSA during the transduction step.

The population of engineered immune cells produced by the methods described above may optionally be cryopreserved so that the cells may be used later. A method for cryopreservation of a population of engineered immune cells also is provided herein. Such a method may include a step of washing and concentrating the population of engineered immune cells with a diluent solution. For example, the diluent solution is normal saline, 0.9% saline, PlasmaLyte A (PL), 5% dextrose/0.45% NaCl saline solution (D5), human serum albumin (HSA), or a combination thereof. Also, HSA may be added to the washed and concentrated cells for improved cell viability and cell recovery after thawing. In another aspect, the washing solution is normal saline and washed and concentrated cells are supplemented with HSA (5%). The method may also include a step of generating a cryopreservation mixture, wherein the cryopreservation mixture includes the diluted population of cells in the diluent solution and a suitable cryopreservative solution. The cryopreservative solution may be any suitable cryopreservative solution including, but not limited to, CryoStor10 (BioLife Solution), mixed with the diluent solution of engineered immune cells at a ratio of 1:1 or 2:1. HSA may be added to provide a final concentration of about 1.0-10%, about 1.0%, about 2.0%, about 3.0%, about 4.0%, about 5.0%, about 6.0%, about 7.0%, about 8.0%, about 9.0%, about 10.0%, about 1-3% HSA, about 1-4% HSA, about 1-5% HSA, about 1-7% HSA, about 2-4% HSA, about 2-5% HSA, about 2-6% HSA, about 2-7% HSA or about 2.5% HSA in the cryopreserved mixture. Cryopreservation of a population of engineered immune cells may comprise washing cells with 0.9% normal saline, adding HSA at a final concentration of 5% to the washed cells, and diluting the cells 1:1 with CryoStor™ CS10 (for a final concentration of 2.5% HSA in the final cryopreservation mixture). In some aspect, the method also includes a step of freezing the cryopreservation mixture. Also, the cryopreservation mixture is frozen in a controlled rate freezer using a defined freeze cycle at a cell concentration of between about $1\times10^6$ to about $1.5\times10^7$ cells/mL of cryopreservation mixture. The method may also include a step of storing the cryopreservation mixture in vapor phase liquid nitrogen.

The population of engineered immune cells produced by the methods described herein may be cryopreserved at a predetermined dose. The predetermined dose may be a therapeutically effective dose, which may be any therapeutically effective dose as provided below. The predetermined dose of engineered immune cells may depend on the binding motif that is expressed by the immune cells (e.g., the affinity and density of the binding motif expressed on the cell), the type of target cell, the nature of the disease or pathological condition being treated, or a combination of both. The binding motif that is expressed by the engineered immune cells may be any antigen or molecule to be targeted by a CAR or TCR. In certain aspects, the predetermined dose of engineered immune cells expressing a CAR or a TCR may be more than about 1 million to less than about 3 million transduced engineered NK cells or T cells/kg. In one embodiment, the predetermined dose of engineered NK cells or T cells expressing a CAR or a TCR may be more than about 1 million to about 2 million transduced engineered NK cells or T cells per kilogram of body weight (cells/kg). The predetermined dose of engineered NK cells or T cells expressing a CAR or a TCR may be more than 1 million to about 2 million, at least about 2 million to less than about 3 million transduced engineered NK cells or T cells per kilogram of body weight (cells/kg). In one embodiment, the predetermined dose of engineered NK cells or T cells expressing a CAR or a TCR may be about 2 million transduced engineered T cells/kg. In another embodiment, the predetermined dose of engineered NK cells or T cells expressing a CAR or a TCR may be at least about 2 million transduced engineered NK cells or T cells/kg. Examples of the predetermined dose of engineered NK cells or T cells expressing a CAR or a TCR may be about 2.0 million, about 2.1 million, about 2.2 million, about 2.3 million, about 2.4 million, about 2.5 million, about 2.6 million, about 2.7 million, about 2.8 million, or about 2.9 million transduced engineered NK cells or T cells/kg. In one embodiment, the population of engineered T cells may be cryopreserved at a predetermined dose of about 1 million engineered NK cells or T cells per kilogram of body weight (cells/kg). In certain embodiment, the population of engineered NK cells or T cells may be cryopreserved at a predetermined dose of from about 500,000 to about 1 million engineered NK cells or T cells/kg. In certain embodiment, the population of engineered NK cells or T cells may be cryopreserved at a predetermined dose of at least about 1 million, at least about 2 million, at least about 3 million, at least about 4 million, at least about 5 million, at least about 6 million, at least about 7 million, at least about 8 million, at least about 9 million, at least about 10 million engineered NK cells or T cells/kg. In other aspects, the population of engineered NK cells or T cells may be cryopreserved at a predetermined dose of less than 1 million cells/kg, 1 million cells/kg, 2 million cells/kg, 3 million cells/kg, 4 million cells/kg, 5 million cells/kg, 6 million cells/kg, 7 million cells/kg, 8 million cells/kg, 9 million cells/kg, 10 million cells/kg, more than 10 million cells/kg, more than 20 million cells/kg, more than 30 million cells/kg, more than 40 million cells/kg, more than 50 million cells/kg, more than 60 million cells/kg, more than 70 million cells/kg, more than 80 million cells/kg, more than 90 million cells/kg, or more than 100 million cells/kg. In certain aspects, the population of engineered NK cells or T cells may be cryopreserved at a predetermined dose of from about 1 million to about 2 million engineered NK cells or T cells/kg. The population of engineered NK cells or T cells may be cryopreserved at a predetermined dose between about 1 million cells to about 2 million cells/kg, about 1 million cells to about 3 million cells/kg, about 1 million cells to about 4 million cells/kg, about 1 million cells to about 5 million cells/kg, about 1 million cells to about 6 million cells/kg, about 1 million cells to about 7 million cells/kg, about 1 million cells to about 8 million cells/kg, about 1 million cells to about 9 million cells/kg, about 1 million cells to about 10 million cells/kg. The predetermined dose of the population of engineered NK cells or T cells may be calculated based on a subject's body weight. In one example, the population of engineered NK cells or T cells may be cryopreserved in about 0.5-200 mL of cryopreservation media. Additionally, the population of engineered T cells may be cryopreserved in about 0.5 mL, about 1.0 mL, about 5.0 mL, about 10.0 mL, about 20 mL, about 30 mL, about 40 mL, about 50 mL, about 60 mL, about 70 mL, about 80 mL, about 90 mL, or about 100 mL, about 10-30 mL, about 10-50 mL, about 10-70 mL, about 10-90 mL, about 50-70 mL, about 50-90 mL, about 50-110 mL, about 50-150 mL, or about 100-200 mL of cryopreservation media. In certain aspects, the population of engineered NK cells or T cells may be preferably cryopreserved in about 50-70 mL of cryopreservation media.

The present disclosure also provides compositions (e.g., pharmaceutical compositions) that include any of the nucleic acids, vectors, sets of nucleic acids, sets of vectors, or cells described herein. For example, provided herein is a composition that includes any of the nucleic acids or sets of nucleic acids described herein, or any of the vectors or sets of vectors provided herein, and a pharmaceutically acceptable solvent or carrier. Also provided herein are pharmaceutical compositions that include any of the variety of sets of vectors provided herein (e.g., sets of vectors that include a first vector that includes any of the nucleic acids encoding a membrane-bound IL-18, and a second vector that includes a nucleic acid sequence encoding a CAR or TCR) and a pharmaceutically acceptable carrier. In some embodiments, the composition comprises a pharmaceutically acceptable carrier, diluent, solubilizer, emulsifier, preservative and/or adjuvant. In some embodiments, the composition comprises an excipient. In another embodiment, the composition comprises a NK cells or T cell comprising a CAR or a TCR and optionally a membrane-bound IL-18.

In other embodiments, the composition is selected for parenteral delivery, for inhalation, or for delivery through the digestive tract, such as orally. The preparation of such pharmaceutically acceptable compositions is within the ability of one skilled in the art. In certain embodiments, buffers are used to maintain the composition at physiological pH or at a slightly lower pH, typically within a pH range of from about 5 to about 8. In certain embodiments, when parenteral administration is contemplated, the composition is in the form of a pyrogen-free, parenterally acceptable aqueous solution comprising a composition described herein, with or without additional therapeutic agents, in a pharmaceutically acceptable vehicle. In certain embodiments, the vehicle for parenteral injection is sterile distilled water in which composition described herein, with or without at least one additional therapeutic agent, is formulated as a sterile, isotonic solution, properly preserved. In certain embodiments, the preparation involves the formulation of the desired molecule with polymeric compounds (such as polylactic acid or polyglycolic acid), beads or liposomes, that provide for the controlled or sustained release of the product, which are then be delivered via a depot injection. In certain embodiments, implantable drug delivery devices are used to introduce the desired molecule.

In some embodiments, a composition can be any of the cells described herein (e.g., any of the cells described herein previously obtained from a subject, e.g., a subject identified or diagnosed as having a cancer). In one embodiment, cells comprise a nucleic acid encoding a membrane-bound IL-18 and/or any of the CARs or TCRs described herein. In one embodiment, cells comprising a CAR or TCR are manufacture in the presence of IL-18. In one embodiment, cells comprising a CAR or TCR are for use in co-administration with IL-18. In a composition including any of the cells described herein, the composition can further include a cell culture medium or a pharmaceutically acceptable buffer (e.g., phosphate-buffered saline).

Pharmaceutical compositions may comprise a CAR- or TCR-expressing cell, e.g., a plurality of TCR- or CAR-expressing cells, as described herein, in combination with one or more pharmaceutically or physiologically acceptable carriers, diluents or excipients. Such compositions may comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives.

Pharmaceutical composition of the present disclosure may be formulated for administration according to any embodiment set forth herein, at least one non-limiting example of which is intravenous administration. A composition may be formulated for intravenous, intratumoral, intraarterial, intramuscular, intraperitoneal, intrathecal, epidural, and/or subcutaneous administration routes. Preferably, the composition is formulated for a parenteral route of administration. A composition suitable for parenteral administration may be an aqueous or nonaqueous, isotonic sterile injection solution, which may contain antioxidants, buffers, bacteriostats, and solutes, for example, that render the composition isotonic with the blood of the intended recipient. An aqueous or nonaqueous sterile suspension may contain one or more suspending agents, solubilizers, thickening agents, stabilizers, and preservatives. Pharmaceutical compositions of the present disclosure may be administered in a manner appropriate to the disease to be treated (or prevented).

In various embodiments, engineered NK or T cells described herein may be incorporated into a pharmaceutical composition. As disclosed herein, a pharmaceutical composition comprising an engineered T cell may be in any form. Such forms comprise, e.g., liquid, semi-solid and solid dosage forms, such as liquid solutions (e.g., injectable and infusible solutions), dispersions or suspensions, tablets, pills, powders, liposomes and suppositories.

Pharmaceutical compositions comprising a binding agent of the present disclosure may be formulated by known methods (such as described in Remington's Pharmaceutical Sciences, 17th edition, ed. Alfonso R. Gennaro, Mack Publishing Company, Easton, Pa. (1985)). In various instances, a pharmaceutical composition comprising a binding agent of the present disclosure may be formulated to comprise a pharmaceutically acceptable carrier or excipient. Examples of pharmaceutically acceptable carriers comprise, without limitation, any and all solvents, dispersion media, coatings, antibacterial and antifungal agents, isotonic and absorption delaying agents, and the like that are physiologically compatible. Compositions comprising engineered T cells may comprise a pharmaceutically acceptable salt, e.g., an acid addition salt or a base addition salt.

The sterile composition for injection may be formulated in accordance with conventional pharmaceutical practices using distilled water for injection as a vehicle. For example, physiological saline or an isotonic solution containing glucose and other supplements such as D-sorbitol, D-mannose, D-mannitol, and sodium chloride may be used as an aqueous solution for injection, optionally in combination with a suitable solubilizing agent, for example, alcohol such as ethanol and polyalcohol such as propylene glycol or polyethylene glycol, and a nonionic surfactant such as polysorbate 80™, HCO-50 and the like.

Non-limiting examples of oily liquids comprise sesame oil and soybean oil, and may be combined with benzyl benzoate or benzyl alcohol as a solubilizing agent. Other items that may be comprised in a composition are a buffer such as a phosphate buffer, or sodium acetate buffer, a soothing agent such as procaine hydrochloride, a stabilizer such as benzyl alcohol or phenol, and an antioxidant. The formulated injection may be packaged in a suitable ampule.

In one embodiment, a pharmaceutical composition is substantially free of detectable levels of a contaminant, e.g., of endotoxin, *mycoplasma*, replication competent lentivirus (RCL), p24, VSV-G nucleic acid, HIV gag, residual anti-CD3/anti-CD28 coated beads, mouse antibodies, pooled human serum, bovine serum albumin, bovine serum, culture media components, vector packaging cell or plasmid components, a bacterium and a fungus. In one embodiment, the bacterium is at least one selected from the group consisting of *Alcaligenes faecalis, Candida albicans, Escherichia coli, Haemophilus influenzae, Neisseria meningitides, Pseudomonas aeruginosa, Staphylococcus aureus, Streptococcus pneumonia*, and/or *Streptococcus pyogenes* group A.

In some embodiments, an engineered cell is treated ex vivo with interleukin-2 (IL-2) prior to infusion into a cancer patient, and the cancer patient is treated with IL-2 after infusion. Furthermore, in some embodiments, a cancer patient may undergo preparative lymphodepletion—the temporary ablation of the immune system—prior to administration of a binding agent. A combination of IL-2 treatment and preparative lymphodepletion may enhance persistence of a binding agent. In some embodiments, an engineered cell is transduced or transfected with a nucleic acid encoding a cytokine (e.g., a membrane-bound IL-18), which nucleic acid may be engineered to provide for constitutive, regulatable, or temporally-controlled expression of the cytokine. Suitable cytokines comprise, for example, cytokines which act to enhance the survival of T lymphocytes during the contraction phase, which may facilitate the formation and survival of memory T lymphocytes.

Dosage administered to a subject in some embodiments, may vary with the embodiment, the composition employed, the method of administration, and the site and subject being treated. However, a dose should be sufficient to provide a therapeutic response. A clinician may determine the therapeutically effective amount of a composition to be administered to a human or other subject in order to treat or prevent a medical condition. The precise amount of the composition required to be therapeutically effective may depend upon numerous factors, e.g., such as the activity of the binding agent, and the route of administration.

A suitable number of engineered cells comprising a CAR or TCR may be administered to a subject. While a single engineered cell described herein is capable of expanding and providing a therapeutic benefit, in some embodiments, $10^2$ or more, e.g., $10^3$ or more, $10^4$ or more, $10^5$ or more, or $10^8$ or more, engineered cells are administered. In some embodiments, $10^{12}$ or less, e.g., $10^{11}$ or less, $10^9$ or less, $10^7$ or less, or $10^5$ or less, engineered cells described herein are administered to a subject. In some embodiments, $10^2$-$10^5$, $10^4$-$10^7$, $10^3$-$10^9$, or $10^5$-$10^{10}$ engineered cells described herein are administered. A pharmaceutical composition comprising cells comprising a CAR or TCR may be administered, e.g., a dosage of $10^4$ to $10^9$ cells/kg body weight (e.g., $10^5$ to $10^6$ cells/kg body weight). In another embodiment, the therapeutically effective amount of the T cells is about $10^4$ cells, about $10^5$ cells, about $10^6$ cells, about $10^7$ cells, or about $10^8$ cells. The pharmaceutical composition may be administered at a dosage of, e.g., about $2\times10^6$ cells/kg, about $3\times10^6$ cells/kg, about $4\times10^6$ cells/kg, about $5\times10^6$ cells/kg, about $6\times10^6$ cells/kg, about $7\times10^6$ cells/kg, about $8\times10^6$ cells/kg, about $9\times10^6$ cells/kg, about $1\times10^7$ cells/kg, about $2\times10^7$ cells/kg, about $3\times10^7$ cells/kg, about $4\times10^7$ cells/kg, about $5\times10^7$ cells/kg, about $6\times10^7$ cells/kg, about $7\times10^7$ cells/kg, about $8\times10^7$ cells/kg, or about $9\times10^7$ cells/kg.

A dose of engineered T cells as described herein may be administered to a mammal at one time or in a series of subdoses administered over a suitable period of time, e.g., on a daily, semi-weekly, weekly, bi-weekly, semi-monthly, bi-monthly, semi-annual, or annual basis, as needed. A dosage unit comprising an effective amount of a binding agent may be administered in a single daily dose, or the total daily dosage may be administered in two, three, four, or more divided doses administered daily, as needed.

A suitable means of administration may be selected by a medical practitioner. Route of administration may be parenteral, for example, administration by injection, transnasal administration, transpulmonary administration, or transcutaneous administration. Administration may be systemic or local by intravenous injection, intramuscular injection, intraperitoneal injection, subcutaneous injection. In some embodiments, a composition is selected for parenteral delivery, for inhalation, or for delivery through the digestive tract, such as orally. Dose and method of administration may vary depending on the weight, age, condition, and the like of the subject, and may be suitably selected.

Selection or use of any form may depend, in part, on the intended mode of administration and therapeutic application. For example, a composition comprising an engineered cell of the present disclosure intended for systemic or local delivery may be in the form of injectable or infusible solutions. Accordingly, the compositions comprising an engineered of the present disclosure may be formulated for administration by a parenteral mode (e.g., intravenous, subcutaneous, intraperitoneal, or intramuscular injection). Parenteral administration refers to modes of administration other than enteral and topical administration, usually by injection, and comprise, without limitation, intravenous, intranasal, intraocular, pulmonary, intramuscular, intraarterial, intrathecal, intracapsular, intraorbital, intracardiac, intradermal, intrapulmonary, intraperitoneal, transtracheal, subcutaneous, subcuticular, intraarticular, subcapsular, subarachnoid, intraspinal, epidural, intracerebral, intracranial, intracarotid and intrasternal injection and infusion.

In various embodiments, a pharmaceutical composition comprising an engineered cell of the present disclosure may be formulated as a solution, microemulsion, dispersion, liposome, or other ordered structure suitable for stable storage at high concentration. Sterile injectable solutions may be prepared by incorporating a composition comprising an engineered cell of the present disclosure in the required amount in an appropriate solvent with one or a combination of ingredients enumerated above, as required, followed by filter sterilization. Generally, dispersions are prepared by incorporating a composition comprising an engineered cell of the present disclosure into a sterile vehicle that contains a basic dispersion medium and the required other ingredients from those enumerated above. The proper fluidity of a solution may be maintained, for example, by the use of a coating such as lecithin, by the maintenance of the required particle size in the case of dispersion and by the use of surfactants. Prolonged absorption of injectable compositions comprising a binding agent of the present disclosure may be brought about by comprising in the composition comprising a binding agent of the present disclosure a reagent that delays absorption, for example, monostearate salts, and gelatin.

A pharmaceutical composition comprising an engineered cell of the present disclosure may be administered parenterally in the form of an injectable formulation comprising a sterile solution or suspension in water or another pharmaceutically acceptable liquid. For example, the pharmaceutical composition comprising an antigen binding system may be formulated by suitably combining the engineered cell with pharmaceutically acceptable vehicles or media, such as sterile water and physiological saline, vegetable oil, emulsifier, suspension agent, surfactant, stabilizer, flavoring excipient, diluent, vehicle, preservative, binder, followed by mixing in a unit dose form required for generally accepted pharmaceutical practices. The amount of active ingredient comprised in the pharmaceutical preparations is such that a suitable dose within the designated range is provided. Non-limiting examples of oily liquid comprise sesame oil and soybean oil, and it may be combined with benzyl benzoate or benzyl alcohol as a solubilizing agent. Other items that may be comprised are a buffer such as a phosphate buffer, or sodium acetate buffer, a soothing agent such as procaine hydrochloride, a stabilizer such as benzyl alcohol or phenol, and an antioxidant. The formulated injection may be packaged in a suitable ampule.

In some embodiments, a composition comprising an antigen binding system may be formulated for storage at a temperature below 0° C. (e.g., −20° C. or −80° C.). In some embodiments, the composition comprising an engineered cell of the present disclosure may be formulated for storage for up to 2 years (e.g., one month, two months, three months, four months, five months, six months, seven months, eight months, nine months, 10 months, 11 months, 1 year, 1½ years, or 2 years) at 2-8° C. (e.g., 4° C.). Thus, in some embodiments, the compositions comprising an antigen binding system are stable in storage for at least 1 year at 2-8° C. (e.g., 4° C.).

In some instances, a pharmaceutical composition comprising an engineered of the present disclosure may be formulated as a solution. In some embodiments, a composition comprising an engineered cell of the present disclosure may be formulated, for example, as a buffered solution at a suitable concentration and suitable for storage at 2-8° C. (e.g., 4° C.). Pharmaceutical compositions comprising an engineered cell as described herein may be formulated in immunoliposome compositions. Liposomes with enhanced circulation time are disclosed in, e.g., U.S. Pat. No. 5,013,556.

In certain embodiments, compositions comprising an engineered cell of the present disclosure may be formulated with a carrier that will protect the composition against rapid release, such as a controlled release formulation, comprising implants and microencapsulated delivery systems. Biodegradable, biocompatible polymers may be used, such as ethylene vinyl acetate, polyanhydrides, polyglycolic acid, collagen, polyorthoesters, and polylactic acid. Many methods for the preparation of such formulations are known. See, e.g., J. R. Robinson (1978) "Sustained and Controlled Release Drug Delivery Systems," Marcel Dekker, Inc., New York.

In various embodiments, subcutaneous administration may be accomplished by means of a device, such as a syringe, a prefilled syringe, an auto-injector (e.g., disposable or reusable), a pen injector, a patch injector, a wearable injector, an ambulatory syringe infusion pump with subcutaneous infusion sets, or other device for combining with binding agent drug for subcutaneous injection.

An injection system of the present disclosure may employ a delivery pen as described in U.S. Pat. No. 5,308,341. Pen devices are commonly used for self-delivery of insulin to patients with diabetes. Such devices may comprise at least one injection needle (e.g., a 31 gauge needle of about 5 to 8 mm in length), are generally pre-filled with one or more therapeutic unit doses of a therapeutic solution, and are useful for rapidly delivering solution to a subject with as little pain as possible. One medication delivery pen comprises a vial holder into which a vial of a therapeutic or other medication may be received. The pen may be an entirely mechanical device or it may be combined with electronic circuitry to accurately set and/or indicate the dosage of medication that is injected into the user. See, e.g., U.S. Pat. No. 6,192,891. In some embodiments, the needle of the pen device is disposable and the kits comprise one or more disposable replacement needles. Pen devices suitable for delivery of any one of the presently featured compositions comprising a binding agent of the present disclosure are also described in, e.g., U.S. Pat. Nos. 6,277,099; 6,200,296; and 6,146,361, the disclosures of each of which are incorporated herein by reference in their entirety. A microneedle-based pen device is described in, e.g., U.S. Pat. No. 7,556,615, the disclosure of which is incorporated herein by reference in its entirety. See also the Precision Pen Injector (PPI) device, MOLLY™, manufactured by Scandinavian Health Ltd.

In some embodiments, a composition comprising an engineered cell of the present disclosure may be delivered to a subject by way of local administration that does not rely upon transport of the engineered cell to its intended target tissue or site via the vascular system. For example, the composition comprising an engineered cell of the present disclosure may be delivered by injection or implantation of the composition comprising an engineered cell of the present disclosure or by injection or implantation of a device containing the composition comprising an engineered cell of the present disclosure. In certain embodiments, following local administration in the vicinity of a target tissue or site, the composition comprising an engineered cell of the present disclosure, or one or more components thereof, may diffuse to an intended target tissue or site that is not the site of administration.

A pharmaceutical solution may comprise a therapeutically effective amount of a composition comprising an engineered cell of the present disclosure. Such effective amounts may be readily determined based, in part, on the effect of the administered composition comprising an engineered cell of the present disclosure, or the combinatorial effect of the composition comprising an engineered cell of the present disclosure and one or more additional active agents, e.g., IL-18, IL-12 and/or IL-15, if more than one agent is used. A therapeutically effective amount of a composition comprising engineered T cells of the present disclosure may also vary according to factors such as the disease state, age, sex, and weight of the individual, and the ability of the composition (and one or more additional active agents) to elicit a desired response in the individual, e.g., amelioration of at least one condition parameter, e.g., amelioration of at least one symptom of the complement-mediated disorder. For example, a therapeutically effective amount of a composition comprising an engineered cell of the present disclosure may inhibit (lessen the severity of or eliminate the occurrence of) and/or prevent a disorder, and/or any one of the symptoms of the disorder. A therapeutically effective amount is also one in which any toxic or detrimental effects of the composition comprising an engineered cell of the present disclosure are outweighed by the therapeutically beneficial effects.

A composition comprising an engineered cell of the present disclosure may be administered as a fixed dose, or in a milligram per kilogram (mg/kg) dose. In some embodiments, the dose may also be chosen to reduce or avoid production of antibodies or other host immune responses against one or more of the binding motifs molecules in the composition comprising an engineered cell of the present disclosure. While in no way intended to be limiting, exemplary dosages of a binding agent, such as a composition comprising an engineered cell of the present disclosure comprise, e.g., 1-1000 mg/kg, 1-100 mg/kg, 0.5-50 mg/kg, 0.1-100 mg/kg, 0.5-25 mg/kg, 1-20 mg/kg, and 1-10 mg/kg. Exemplary dosages of a composition comprising an engineered cell of the present disclosure comprise, without limitation, 0.1 mg/kg, 0.5 mg/kg, 1.0 mg/kg, 2.0 mg/kg, 4 mg/kg, 8 mg/kg, or 20 mg/kg.

Suitable human doses of any of the compositions comprising a binding agent of the present disclosure may further be evaluated in, e.g., Phase I dose escalation studies. See, e.g., van Gurp et al. (2008) *Am J Transplantation* 8(8):1711-1718; Hanouska et al. (2007) *Clin Cancer Res* 13(2, part 1):523-531; and Hetherington et al. (2006) *Antimicrobial Agents and Chemotherapy* 50(10): 3499-3500.

The present disclosure provides methods and uses for increasing an immune response to a target antigen in a subject in need thereof, comprising administering, to the subject, an effective amount of immune cells as disclosed herein, wherein said immune cells 1) comprise a membrane-bound IL-18; 2) are co-administered to a patient with IL-18; and/or 3) are contacted with IL-18 during expansion. The present invention also provides methods for treating and/or preventing a cancer in a subject comprising administering, to the subject, an effective amount of immune cells as disclosed herein, wherein said immune cells 1) comprise a membrane-bound IL-18; 2) are co-administered to a patient with IL-18; and/or 3) are contacted with IL-18 during expansion. The present disclosure further provides a method of increasing cytokine production in response to a cancer or pathogen in a subject, comprising administering, to the subject, an effective amount of immune cells disclosed herein, wherein the immune cells 1) comprise a membrane-bound IL-18; 2) are co-administered with IL-18; and/or 3) are contacted with IL-18 during expansion. The presently disclosed subject matter also provides a method of reducing tumor burden in a subject, the method comprising administering, to the subject, an effective amount of immune cells disclosed herein, wherein immune cells 1) comprise a membrane-bound IL-18; 2) are co-administered with IL-18; and/or 3) are contacted with IL-18 during expansion. Methods and uses of the present disclosure comprising administration of an pharmaceutically effective amount of the engineered cells of the present disclosure may also be used to increase T cell mediated cytotoxicity of target cells (compared to a control without any IL-18), increase production of IFN-γ and/or TNFα (compared to a control without IL-18), reduce the size of a tumor, kill tumor cells, prevent tumor cell proliferation, prevent growth of a tumor, eliminate a tumor from a patient, prevent relapse of a tumor, prevent tumor metastasis, induce remission in a patient, or any combination thereof. In certain embodiments, a method provided herein induces a complete response. In some embodiments, a method provided herein induces a partial response.

Cancers that may be treated include tumors that are not vascularized, not yet substantially vascularized, or vascularized. The cancer may also include solid or non-solid tumors. In some embodiments, the cancer is a hematologic cancer. In some embodiments, the cancer is of the white blood cells. In other embodiments, the cancer is of the plasma cells. In some embodiments, the cancer is leukemia, lymphoma, or myeloma. In certain embodiments, the cancer is acute lymphoblastic leukemia (ALL) (including non T cell ALL), acute lymphoid leukemia (ALL), and hemophagocytic lymphohistocytosis (HLH)), B cell prolymphocytic leukemia, B-cell acute lymphoid leukemia ("BALL"), blastic plasmacytoid dendritic cell neoplasm, Burkitt's lymphoma, chronic lymphocytic leukemia (CLL), chronic myelogenous leukemia (CML), chronic myeloid leukemia (CML), chronic or acute granulomatous disease, chronic or acute leukemia, diffuse large B cell lymphoma, diffuse large B cell lymphoma (DLBCL), follicular lymphoma, follicular lymphoma (FL), hairy cell leukemia, hemophagocytic syndrome (Macrophage Activating Syndrome (MAS), Hodgkin's Disease, large cell granuloma, leukocyte adhesion deficiency, malignant lymphoproliferative conditions, MALT lymphoma, mantle cell lymphoma, Marginal zone lymphoma, monoclonal gammapathy of undetermined significance (MGUS), multiple myeloma, myelodysplasia and myelodysplastic syndrome (MDS), myeloid diseases including but not limited to acute myeloid leukemia (AML), non-Hodgkin's lymphoma (NHL), plasma cell proliferative disorders (e.g., asymptomatic myeloma (smoldering multiple myeloma or indolent myeloma), plasmablastic lymphoma, plasmacytoid dendritic cell neoplasm, plasmacytomas (e.g., plasma cell dyscrasia; solitary myeloma; solitary plasmacytoma; extramedullary plasmacytoma; and multiple plasmacytoma), POEMS syndrome (Crow-Fukase syndrome; Takatsuki disease; PEP syndrome), primary mediastinal large B cell lymphoma (PMBC), small cell- or a large cell-follicular lymphoma, splenic marginal zone lymphoma (SMZL), systemic amyloid light chain amyloidosis, T-cell acute lymphoid leukemia ("TALL"), T-cell lymphoma, transformed follicular lymphoma, Waldenstrom macroglobulinemia, or a combination thereof. In other embodiments, the cancer can be any of sarcomas (e.g., synovial sarcoma, osteogenic sarcoma, leiomyosarcoma uteri, and alveolar rhabdomyosarcoma), hepatocellular carcinoma, glioma, head cancers (e.g., squamous cell carcinoma), neck cancers (e.g., squamous cell carcinoma), bone cancer, brain cancer, breast cancer, cancer of the anus, anal canal, or anorectum, cancer of the eye, cancer of the intrahepatic bile duct, cancer of the joints, cancer of the neck, gall bladder, or pleura, cancer of the nose, nasal cavity, or middle ear, cancer of the oral cavity, cancer of the vulva, colon cancers (e.g., colon carcinoma), esophageal cancer, cervical cancer, gastric cancer, gastrointestinal carcinoid tumor, hypopharynx cancer, larynx cancer, liver cancers (e.g., hepatocellular carcinoma), lung cancers (e.g., non-small cell lung carcinoma), malignant mesothelioma, melanoma, nasopharynx cancer, ovarian cancer, pancreatic cancer, peritoneum, omentum, and mesentery cancer, pharynx cancer, prostate cancer, rectal cancer, kidney cancers (e.g., renal cell carcinoma), small intestine cancer, soft tissue cancer, stomach cancer, testicular cancer, thyroid cancer, and urothelial cancers (e.g., ureter cancer and urinary bladder cancer).

In various instances, a method of using an engineered cell comprising a CAR or TCR as provided herein to treat cancer is an autologous cell therapy. In various instances, a method of using an engineered cell comprising a CAR or TCR as provided herein to treat cancer is an allogeneic cell therapy.

In various embodiments, a cell therapy provided herein for use in the present disclosure may be administered to a subject in a course of treatment that further comprises administration of one or more additional therapeutic agents or therapies that are not a cell therapy provided herein. In certain embodiments, the present disclosure provides combination therapy for the treatment of cancer, the treatment comprising administering an anti-cancer agent to a subject receiving and/or in need of a cell therapy provided herein.

In certain embodiments, administration of an engineered cell comprising a CAR or TCR as provided herein may be to a subject having previously received, scheduled to receive, or in the course of a treatment regimen comprising an additional anti-cancer therapy. In various embodiments, an additional agent or therapy administered in combination with the engineered cell may be administered at the same time as the engineered cell, on the same day as the engineered cell, or in the same week as the engineered cell. In various embodiments, an additional agent or therapy administered in combination with an engineered cell comprising a CAR or TCR as provided herein may be administered such that administration of the engineered cell and the additional agent or therapy are separated by one or more hours before or after, one or more days before or after, one or more weeks before or after, or one or more months before or after administration of the engineered cell. In various embodiments, the administration frequency of one or more additional agents may be the same as, similar to, or different from the administration frequency of the engineered cell.

An agent or therapy used in combination with an engineered cell comprising a CAR or TCR as provided herein may be administered in a single therapeutic composition or dose together with the engineered cell, at the same time as the engineered cell in the form of a separate composition, or in a manner temporally distinct from the administration of the engineered cell. When an engineered cell comprising a CAR or TCR as provided herein is to be used in combination with an additional agent, the engineered cell may be co-formulated with the additional agent or the engineered cell may be formulated separately from the additional agent formulation.

In some embodiments, the methods further comprise administering a chemotherapeutic. In certain embodiments, the chemotherapeutic selected is a lymphodepleting (preconditioning) chemotherapeutic. Beneficial preconditioning treatment regimens, along with correlative beneficial biomarkers are described in U.S. Provisional Patent Applications 62/262,143 and 62/167,750 which are hereby incorporated by reference in their entirety herein. These describe, e.g., methods of conditioning a patient in need of a T cell therapy comprising administering to the patient specified beneficial doses of cyclophosphamide (between 200 mg/m$^2$/day and 2000 mg/m$^2$/day) and specified doses of fludarabine (between 20 mg/m$^2$/day and 900 mg/m$^2$/day). One such dose regimen involves treating a patient comprising administering daily to the patient about 500 mg/m$^2$/day of cyclophosphamide and about 60 mg/m$^2$/day of fludarabine for three days prior to administration of a therapeutically effective amount of engineered T cells to the patient. In other embodiments, the engineered cells containing a CAR or TCR), and the chemotherapeutic agent are administered each in an amount effective to treat the disease or condition in the subject.

In certain embodiments, compositions comprising CAR- and/or TCR-expressing immune cells disclosed herein may be administered in conjunction with any number of chemotherapeutic agents. Examples of chemotherapeutic agents include alkylating agents such as thiotepa and cyclophosphamide (CYTOXAN™); alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethylenethiophosphaoramide and trimethylolomelamine resume; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, ranimustine; antibiotics such as aclacinomysins, actinomycin, authramycin, azaserine, bleomycins, cactinomycin, calicheamicin, carabicin, carminomycin, carzinophilin, chromomycins, dactinomycin, daunorubicin, detorubicin, 6-diazo-5-oxo-L-norleucine, doxorubicin, epirubicin, esorubicin, idarubicin, marcellomycin, mitomycins, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine, 5-FU; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; amsacrine; bestrabucil; bisantrene; edatraxate; defofamine; demecolcine; diaziquone; elformithine; elliptinium acetate; etoglucid; gallium nitrate; hydroxyurea; lentinan; lonidamine; mitoguazone; mitoxantrone; mopidamol; nitracrine; pentostatin; phenamet; pirarubicin; podophyllinic acid; 2-ethylhydrazide; procarbazine; PSK®; razoxane; sizofiran; spirogermanium; tenuazonic acid; triaziquone; 2,2',2"-trichlorotriethylamine; urethan; vindesine; dacarbazine; mannomustine; mitobronitol; mitolactol; pipobroman; gacytosine; arabinoside ("Ara-C"); cyclophosphamide; thiotepa; taxoids, e.g. paclitaxel (TAXOL™, Bristol-Myers Squibb) and doxetaxel (TAXOTERE®, Rhone-Poulenc Rorer); chlorambucil; gemcitabine; 6-thioguanine; mercaptopurine; methotrexate; platinum analogs such as cisplatin and carboplatin; vinblastine; platinum; etoposide (VP-16); ifosfamide; mitomycin C; mitoxantrone; vincristine; vinorelbine; navelbine; novantrone; teniposide; daunomycin; aminopterin; xeloda; ibandronate; CPT-11; topoisomerase inhibitor RFS2000; difluoromethylomithine (DMFO); retinoic acid derivatives such as Targretin™ (bexarotene), Panretin™, (alitretinoin); ONTAK™ (denileukin diftitox); esperamicins; capecitabine; and pharmaceutically acceptable salts, acids or derivatives of any of the above. In some embodiments, compositions comprising CAR- and/or TCR-expressing immune cells disclosed herein may be administered in conjunction with an anti-hormonal agent that acts to regulate or inhibit hormone action on tumors such as anti-estrogens including for example tamoxifen, raloxifene, aromatase inhibiting 4(5)-imidazoles, 4-hydroxytamoxifen, trioxifene, keoxifene, LY117018, onapristone, and toremifene (Fareston); and anti-androgens such as flutamide, nilutamide, bicalutamide, leuprolide, and goserelin; and pharmaceutically acceptable salts, acids or derivatives of any of the above. Combinations of chemotherapeutic agents are also administered where appropriate, including, but not limited to CHOP, i.e., Cyclophosphamide (Cytoxan®), Doxorubicin (hydroxydoxorubicin), Vincristine (Oncovin®), and Prednisone.

In some embodiments, the chemotherapeutic agent is administered at the same time or within one week after the administration of the engineered cell containing a CAR or TCR or nucleic acid encoding a CAR or TCR. In other embodiments, the chemotherapeutic agent is administered from 1 to 4 weeks or from 1 week to 1 month, 1 week to 2 months, 1 week to 3 months, 1 week to 6 months, 1 week to 9 months, or 1 week to 12 months after the administration of the engineered cell or nucleic acid. In some embodiments, the chemotherapeutic agent is administered at least 1 month before administering the engineered cell or nucleic acid. In some embodiments, the methods further comprise administering two or more chemotherapeutic agents.

A variety of additional therapeutic agents may be used in conjunction with the compositions described herein. For example, potentially useful additional therapeutic agents include PD-1 inhibitors such as nivolumab (OPDIVO®), pembrolizumab (KEYTRUDA®), pembrolizumab, pidilizumab (CureTech), and atezolizumab (Roche). Additional therapeutic agents suitable for use in combination with the disclosure include, but are not limited to, ibrutinib (IMBRUVICA®), ofatumumab (ARZERRA®), rituximab (RITUXAN®), bevacizumab (AVASTIN®), trastuzumab (HERCEPTIN®), trastuzumab emtansine (KADCYLA®), imatinib (GLEEVEC®), cetuximab (ERBITUX®), panitumumab (VECTIBIX®), catumaxomab, ibritumomab, ofatumumab, tositumomab, brentuximab, alemtuzumab, gemtuzumab, erlotinib, gefitinib, vandetanib, afatinib, lapatinib, neratinib, axitinib, masitinib, pazopanib, sunitinib, sorafenib, toceranib, lestaurtinib, axitinib, cediranib, lenvatinib, nintedanib, pazopanib, regorafenib, semaxanib, sorafenib, sunitinib, tivozanib, toceranib, vandetanib, entrectinib, cabozantinib, imatinib, dasatinib, nilotinib, ponatinib, radotinib, bosutinib, lestaurtinib, ruxolitinib, pacritinib, cobimetinib, selumetinib, trametinib, binimetinib, alectinib, ceritinib, crizotinib, aflibercept, adipotide, denileukin diftitox, mTOR inhibitors such as Everolimus and Temsirolimus, hedgehog inhibitors such as sonidegib and vismodegib, CDK inhibitors such as CDK inhibitor (palbociclib).

In additional embodiments, the composition comprising CAR- and/or TCR-containing immune cells are administered with an anti-inflammatory agent. Anti-inflammatory agents or drugs can include, but are not limited to, steroids and glucocorticoids (including betamethasone, budesonide, dexamethasone, hydrocortisone acetate, hydrocortisone, hydrocortisone, methylprednisolone, prednisolone, prednisone, triamcinolone), nonsteroidal anti-inflammatory drugs (NSAIDS) including aspirin, ibuprofen, naproxen, methotrexate, sulfasalazine, leflunomide, anti-TNF medications, cyclophosphamide and mycophenolate. Exemplary NSAIDs include ibuprofen, naproxen, naproxen sodium, Cox-2 inhibitors, and sialylates. Exemplary analgesics include acetaminophen, oxycodone, tramadol of proporxyphene hydrochloride. Exemplary glucocorticoids include cortisone, dexamethasone, hydrocortisone, methylprednisolone, prednisolone, or prednisone. Exemplary biological response modifiers include molecules directed against cell surface markers (e.g., CD4, CD5, etc.), cytokine inhibitors, such as the TNF antagonists, (e.g., etanercept (ENBREL®), adalimumab (HUMIRA®) and infliximab (REMICADE®), chemokine inhibitors and adhesion molecule inhibitors. The biological response modifiers include monoclonal antibodies as well as recombinant forms of molecules. Exemplary DMARDs include azathioprine, cyclophosphamide, cyclosporine, methotrexate, penicillamine, leflunomide, sulfasalazine, hydroxychloroquine, Gold (oral (auranofin) and intramuscular), and minocycline.

In certain embodiments, the compositions described herein are administered in conjunction with a cytokine.

"Cytokine" is meant to refer to proteins released by one cell population that act on another cell as intercellular mediators. Examples of cytokines are lymphokines, monokines, and traditional polypeptide hormones. Included among the cytokines are growth hormones such as human growth hormone, N-methionyl human growth hormone, and bovine growth hormone; parathyroid hormone; thyroxine; insulin; proinsulin; relaxin; prorelaxin; glycoprotein hormones such as follicle stimulating hormone (FSH), thyroid stimulating hormone (TSH), and luteinizing hormone (LH); hepatic growth factor (HGF); fibroblast growth factor (FGF); prolactin; placental lactogen; mullerian-inhibiting substance; mouse gonadotropin-associated peptide; inhibin; activin; vascular endothelial growth factor; integrin; thrombopoietin (TPO); nerve growth factors (NGFs) such as NGF-beta; platelet-growth factor; transforming growth factors (TGFs) such as TGF-alpha and TGF-beta; insulin-like growth factor-I and -II; erythropoietin (EPO); osteoinductive factors; interferons such as interferon-alpha, beta, and -gamma; colony stimulating factors (CSFs) such as macrophage-CSF (M-CSF); granulocyte-macrophage-CSF (GM-CSF); and granulocyte-CSF (G-CSF); interleukins (ILs) such as IL-1, IL-1alpha, IL-2, IL-3, IL-4, IL-5, IL-6, IL-7, IL-8, IL-9, IL-10, IL-11, IL-12; IL-15, a tumor necrosis factor such as TNF-alpha or TNF-beta; and other polypeptide factors including LIF and kit ligand (KL). As used herein, the term cytokine includes proteins from natural sources or from recombinant cell culture, and biologically active equivalents of the native sequence cytokines. A "cytokine," as used herein also refers to a non-antibody protein that is released by one cell in response to contact with a specific antigen, wherein the cytokine interacts with a second cell to mediate a response in the second cell. A cytokine can be endogenously expressed by a cell or administered to a subject. Cytokines may be released by immune cells, including macrophages, B cells, T cells, and mast cells to propagate an immune response. Cytokines can induce various responses in the recipient cell. Cytokines can include homeostatic cytokines, chemokines, pro-inflammatory cytokines, effectors, and acute-phase proteins. For example, homeostatic cytokines, including interleukin (IL) 7 and IL-15, promote immune cell survival and proliferation, and pro-inflammatory cytokines can promote an inflammatory response. Examples of homeostatic cytokines include, but are not limited to, IL-2, IL-4, IL-5, IL-7, IL-10, IL-12 (e.g. IL-12p40 and IL-12p35), IL-15, and interferon (IFN) gamma. Examples of pro-inflammatory cytokines include, but are not limited to, IL-1a, IL-1b, IL-6, IL-13, IL-17a, tumor necrosis factor (TNF)-alpha, TNF-beta, fibroblast growth factor (FGF) 2, granulocyte macrophage colony-stimulating factor (GM-CSF), soluble intercellular adhesion molecule 1 (sICAM-1), soluble vascular adhesion molecule 1 (sVCAM-1), vascular endothelial growth factor (VEGF), VEGF-C, VEGF-D, and placental growth factor (PLGF). Examples of effectors include, but are not limited to, granzyme A, granzyme B, soluble Fas ligand (sFasL), and perforin. Examples of acute phase-proteins include, but are not limited to, C-reactive protein (CRP) and serum amyloid A (SAA).

All publications, patents, and patent applications mentioned in this specification are herein incorporated by reference to the same extent as if each individual publication, patent, or patent application was specifically and individually indicated to be incorporated by reference. However, the citation of a reference herein should not be construed as an acknowledgement that such reference is prior art to the present disclosure. To the extent that any of the definitions or terms provided in the references incorporated by reference differ from the terms and discussion provided herein, the present terms and definitions control. The contents of all references cited throughout this application are expressly incorporated herein by reference.

EXAMPLES

Example 1

To determine the effect of IL-18 co-administration on the cytotoxic activity of TCR containing T cells, an in vitro co-culture assay (i.e., an assay where $TCR^+$ T cells are co-incubated in the same well together with target cells expressing the antigen of interest) was used to measure percent cytotoxicity of target cells. $TCR^+$ T cells were produced as follows. Apheresis isolated healthy donor $CD4^+$ and $CD8^+$ T cells were stimulated with OKT3 antibody (Miltenyi Biotec) coated onto a plate and soluble anti-CD28 antibodies (BD Biosciences) on Day 0 in OpT basal medium supplemented with serum replacement and T cell supplement (Gibco ThermoFisher Scientific) containing IL-2 (300 IU/mL) or IL-7/IL-15/AKTi-VIII (IL-7/IL-15 at 10 ng/mL, AKTi-VIII (Millipore) at 1 μM). At Day 2, T cells were transduced with a retroviral vector encoding for a TCR MAGE construct according to the nucleic acid sequence of SEQ ID NO: 44.

(SEQ ID NO: 45)

```
ATGGCATGCCCTGGCTTCCTGTGGGCACTTGTGATCTCCACCTGTCTTGAATT

TAGCATGGCTCAGACAGTCACTCAGTCTCAACCAGAGATGTCTGTGCAGGAG

GCAGAGACCGTGACCCTGAGCTGCACATATGACACCAGTGAGAGTGATTATT

ATTTATTCTGGTACAAGCAGCCTCCCAGCAGGCAGATGATTCTCGTTATTCGC

CAAGAAGCTTATAAGCAACAGAATGCAACAGAGAATCGTTTCTCTGTGAACT

TCCAGAAAGCAGCCAAATCCTTCAGTCTCAAGATCTCAGACTCACAGCTGGG

GGATGCCGCGATGTATTTCTGTGCTCTCCGGAGCTCAGGAACCTACAAATAC

ATCTTTGGAACAGGCACCAGGCTGAAGGTTTTAGCAAATATCCAGAACCCTG

AACCTGCTGTGTACCAGTTAAAAGATCCTCGGTCTCAGGACAGCACCCTCTG

CCTGTTCACCGACTTTGACTCCCAAATCAATGTGCCGAAAACCATGGAATCT
```

-continued

```
GGAACGTTCATCACTGACAAAACTGTGCTGGACATGAAAGCTATGGATTCCA
AGAGCAATGGGGCCATTGCCTGGAGCAACCAGACAAGCTTCACCTGCCAAG
ATATCTTCAAAGAGACCAACGCCACCTACCCCAGTTCAGACGTTCCCTGTGA
TGCCACGTTGACTGAGAAAAGCTTTGAAACAGATATGAACCTAAACTTTCAA
AACCTGTCAGTTATGGGACTCCGAATCCTCCTGCTGAAAGTAGCCGGATTTA
ACCTGCTCATGACGCTGAGGCTGTGGTCCAGTCGGGCCAAGCGGTCCGGATC
CGGAGCCACCAACTTCAGCCTGCTGAAGCAGGCCGGCGACGTGGAGGAGAA
CCCCGGCCCCATGGGCACCAGGCTCCTCTTCTGGGTGGCCTTCTGTCTCCTGG
GGGCAGATCACACAGGAGCTGGAGTCTCCCAGTCCCCCAGTAACAAGGTCA
CAGAGAAGGGAAAGGATGTAGAGCTCAGGTGTGATCCAATTTCAGGTCATA
CTGCCCTTTACTGGTACCGACAGAGCCTGGGGCAGGGCCTGGAGTTTTTAAT
TTACTTCCAAGGCAACAGTGCACCAGACAAATCAGGGCTGCCCAGTGATCGC
TTCTCTGCAGAGAGGACTGGGGGATCCGTCTCCACTCTGACGATCCAGCGCA
CACAGCAGGAGGACTCGGCCGTGTATCTCTGTGCCAGCATCCGGACAGGGCC
TTTTTTCTCTGGAAACACCATATATTTTGGAGAGGGAAGTTGGCTCACTGTTG
TAGAGGACCTGAGAAACGTGACCCCACCCAAGGTCTCCTTGTTTGAGCCATC
AAAAGCAGAGATTGCAAACAAACAAAAGGCTACCCTCGTGTGCTTGGCCAG
GGGCTTCTTCCCTGACCACGTGGAGCTGAGCTGGTGGGTGAATGGCAAGGAG
GTCCACAGTGGGGTCAGCACGGACCCTCAGGCCTACAAGGAGAGCAATTAT
AGCTACTGCCTGAGCAGCCGCCTGAGGGTCTCTGCTACCTTCTGGCACAATC
CTCGAAACCACTTCCGCTGCCAAGTGCAGTTCCATGGGCTTTCAGAGGAGGA
CAAGTGGCCAGAGGGCTCACCCAAACCTGTCACACAGAACATCAGTGCAGA
GGCCTGGGGCCGAGCAGACTGTGGAATCACTTCAGCATCCTATCATCAGGGG
GTTCTGTCTGCAACCATCCTCTATGAGATCCTACTGGGGAAGGCCACCCTAT
ATGCTGTGCTGGTCAGTGGCCTGGTGCTGATGGCTATGGTCAAAAGAAAGAA
CTCATGA.
```

The amino acid sequence of the TCR MAGE construct has the sequence of SEQ ID NO: 45.

```
                                                    (SEQ ID NO: 46)
MACPGFLWALVISTCLEFSMAQTVTQSQPEMSVQEAETVTLSCTYDTSESDYYL
FWYKQPPSRQMILVIRQEAYKQQNATENRFSVNFQKAAKSFSLKISDSQLGDAA
MYFCALRSSGTYKYIFGTGTRLKVLANIQNPEPAVYQLKDPRSQDSTLCLFTDFD
SQINVPKTMESGTFITDKTVLDMKAMDSKSNGAIAWSNQTSFTCQDIFKETNAT
YPSSDVPCDATLTEKSFETDMNLNFQNLSVMGLRILLLKVAGENLLMTLRLWSS
RAKRSGSGATNFSLLKQAGDVEENPGPMGTRLLFWVAFCLLGADHTGAGVSQS
PSNKVTEKGKDVELRCDPISGHTALYWYRQSLGQGLEFLIYFQGNSAPDKSGLPS
DRFSAERTGGSVSTLTIQRTQQEDSAVYLCASIRTGPFFSGNTIYFGEGSWLTVVE
DLRNVTPPKVSLFEPSKAEIANKQKATLVCLARGFFPDHVELSWWVNGKEVHS
```

-continued

GVSTDPQAYKESNYSYCLSSRLRVSATFWHNPRNHFRCQVQFHGLSEEDKWPE

GSPKPVTQNISAEAWGRADCGITSASYHQGVLSATILYEILLGKATLYAVLVSGL

VLMAMVKRKNS.

TCR retroviral vector was washed off after 24 hr post-transduction, and T cells were cultured further during an expansion phase. Fresh media containing IL-2 or IL-7/IL-15/AKTi-VIII was replenished at Days 5, 7, and 9. TCR+ T cells were cryopreserved at day 9 with CryoStor 10 (StemCell Technologies). As controls, Non-transduced (NTD) T cells generated from the same subject were used. Cells were normalized for cell counts during expansion. Transduction efficiency was evaluated by flow cytometry at Days 5-9 by staining with a panel of antibodies (anti-CD3, anti-CD4, anti-CD8, and anti-mTCRβ antibodies) in the presence of a fixable viability dye and analyzed by flow cytometry. The anti-mTCRβ antibody is an antibody that binds the murine TCRβ constant region. Transduction efficiency for all samples were approximately equivalent and within an acceptable range.

For initial studies, TCR+ T cells grown in media supplemented with IL-2 were thawed, rested overnight, and then co-cultured with either MAGE-positive target cells, e.g., H1299 cells, or MAGE-negative target cells, e.g., MV411 cells, at a 4:1 effector:target (E:T) ratio. The target cells were engineered to express luciferase. IL-18 at a concentration of 200 ng/mL was added at Day 0 of the co-culture. On Days 1 and 4 after co-culture initiation, D-luciferin substrate was added at a final concentration of 0.14 mg/mL and incubated at 37° C. for 10 minutes. T-cell mediated cytotoxicity was measured in triplicate (N=3) by measuring the luciferase signal of target cells and TCR+ T cells co-cultured together and subtracting the luciferase signal emitted by target cells plated alone (Brown et al., 2005, J. Immunol. Methods 297:39-52). Luminescent signal was determined by a VarioSkan™ LUX or VarioSkan® Flash multimode microplate reader.

In the absence of IL-18, TCR+ T cell mediated cytotoxicity of target cells was 28.1% as measured on Day 4 (Day 1 data not shown). The addition of IL-18 at Day 0 of a co-culture increased the cytotoxicity of target cells to 70.8% as measured on Day 4.

Additional cytotoxicity studies were conducted to determine the effect of IL-18 on TCR+ T cells that were grown in media supplemented with IL-7/IL-15/AKTi-VIII compared to media supplemented with IL-2. MV411 cells were incubated (i.e., pulsed) with TCR MAGE antigen starting at 300 μg/mL and a 3-fold serial dilution was performed to achieve a 6 point titration (0.1, 0.3, 1, 3, 10 or 30 μg/mL) for 6 hours at 37° C. and co-cultured with TCR+ T cells grown in the supplemented media. As controls, non-transduced (NTD) T cells (generated from the same donor) were used. After incubation with the TCR MAGE antigen, MV411 cells were washed and then co-incubated with TCR+ T cells at a 1:1 E:T with or without 200 ng/ml IL-18 for 4 days. Percent cytotoxicity (N=3) was determined at Day 4 as described above. The results are shown in Table 3.

TABLE 3

Percent Cytotoxicity of TCR+ T cells Co-cultured with IL-18

| | TCR+ T cells | | | | NTD T cells | |
|---|---|---|---|---|---|---|
| TCR antigen (μg/mL) | [IL-2] (%) | [IL-2] + IL-18 (%) | [IL-7/IL-15/AKTi (%) | [IL-7/IL-15/AKTi] + IL-18 (%) | [IL-2] (%) | [IL-2] + IL-18 (%) |
| 0 | 7.2 | 34.8 | 16.3 | 22.2 | 16.8 | 8.2 |
| 0.1 | −0.4 | 35.7 | 14.2 | 24.8 | 6.0 | −9.8 |
| 0.3 | −3.7 | 51.2 | 22.1 | 63.7 | 1.3 | −7.5 |
| 1 | 11 | 83.0 | 58.3 | 85.0 | 1.8 | −10.8 |
| 3 | 59.4 | 91.1 | 84.6 | 93.9 | −4.4 | −13.1 |
| 10 | 79.8 | 95.7 | 94.2 | 97.3 | −4.5 | −3.2 |
| 30 | 95.0 | 98.2 | 98.8 | 99.6 | 4.1 | −1.7 |

NOTE:
Materials in brackets were present during production of TCR+ T cells

Cytotoxicity was observed in all groups of TCR+ T cells. The groups with IL-18 added to the co-culture showed increased cytotoxicity, as compared to the groups without IL-18 added. In addition, the cytotoxic effect of IL-18 was observed in an antigen dose-dependent manner.

The effect of IL-18 on T cell proliferation and IFN-γ production in a co-culture of TCR+ T cells and target cells was also examined. TCR+ T cells were prepared as described above. Cells were co-cultured with either antigen-positive target cells (H1299 cells) or antigen-negative cells (MV411 cells) at a 4:1 effector:target (E:T) ratio in the presence of 200 ng/mL IL-18. Proliferation was measured by labeling T cells with CellTrace™ Violet (CTV) reagent according to the manufacturer's instructions and subsequently washed with RPMI-1640-10% media. With each successive generation of proliferation, the CTV dye was diluted out of the cell. After the cells were grown for 4 days, proliferation was assessed by measuring the CTV dye on a flow cytometer equipped with a violet laser.

Proliferation was also measured by Ki67 intracellular staining via flow cytometry. Ki67 is an intracellular marker that can be used to measure the proliferation within a small time window, whereas CTV determines proliferation over a span of multiple days (CTV staining is usually assessed at day 4 of the co-culture). On Day 4 of a co-culture, TCR+ T cells with a 3:1 effector to target (E:T) ratio were harvested and were re-stimulated with a T cell activation cocktail [eBioscience™ Cell Stimulation Cocktail (500X)] for 2 hours at 37° C. to boost Ki67 signal. After stimulation, the cells were washed with RPMI media, followed with another wash with FACS staining buffer (BD Pharmigen). TCR+ T cells were then stained with a panel of extracellular antibody fluorophore conjugates (CD3, CD4, CD8, mTCRP; BD Pharmingen and BioLegend; diluted in FACS staining buffer 1:100, 1:1000, 1:2000, and 1:100, respectively) for 30 minutes at 4° C. After the 30 minute incubation, cells were washed again with FACS staining buffer. Cells were fixed with 0.6% paraformaldehyde (PFA) in PBS for 10 minutes at room temperature, then washed with FACS staining buffer. TCR+ T cells were then permeabilized with BD Perm/Wash™ buffer (BD Biosciences) for 1 hour at 4° C. After 1 hour, cells were washed with 1× BD Perm/Wash™ buffer, and then stained with a panel of intracellular antibody fluorophores conjugates (Ki67, IFN-γ and TNFα; eBiosciences and BioLegend). Intracellular antibody flurophore conjugates were diluted to a pre-determined working concentration (Ki67 1:200, TNFα and IFN-γ 1:100) in 1× BD Perm/Wash™ buffer and were incubated with TCR$^+$ T cells for 1 hour at 4° C. Each antibody fluorophore conjugate contains a unique known fluorescent dye. Using flow cytometry with the appropriate laser capability, cellular subsets (CD3+ T cells or TCR$^+$ T cells) were quantified for Ki67 as a marker for proliferation.

In the absence of IL-18, 36.8% of the parental TCR$^+$ T cells proliferated, as measured by CTV, while in the presence of IL-18, 68.9% of the parental TCR$^+$ T cells proliferated. In the absence of IL-18, 14.7% of the parental TCR$^+$ T cells proliferated and produced IFN-γ, as measured by Ki67, while in the presence of IL-18, 29% of the parental TCR$^+$ T cells proliferated and produced IFN-γ.

Example 2

To determine the effect of IL-18 on TCR$^+$ T cells during manufacture, TCR$^+$ T cells were prepared as described in Example 1 except that, for certain cultures, IL-18 (at 10 ng/mL, 50 ng/mL and 200 ng/mL) was added at Day 0. For expansion at Days 5, 7, and 9, fresh media containing IL-18 was added. Negative controls did not have any IL-18 added. For another arm of this study, after TCR$^+$ T cells were manufactured, IL-18 was added in during a co-culture of the TCR$^+$ T cells with the target cells. This latter strategy mimics manufacturing in the presence of IL-18 and co-administration of the TCR+ T cell with IL-18.

Target cells (MV411 cells) were pulsed with a peptide encoding the TCR MAGE antigen at 0, 0.1, 0.3, 1, 3, 10 and 30 μg/mL and were co-cultured with TCR$^+$ T cells for 4 days at 1:1 and 3:1 E:T ratios. Percent cytotoxicity of target cells was determined in triplicate as described in Example 1. The results for Day 4 at 1:1 T:E with 50 ng/ml IL-18 are shown in Table 4. The results with 10 and 200 ng/ml of IL-18 during manufacture showed similar phenotypic and growth characteristics (data not shown).

TABLE 4

Percent Cytotoxicity of TCR$^+$ T cells Co-cultured with IL-18

| | TCR$^+$ T cells | | | | | | NTD T cells | | | |
|---|---|---|---|---|---|---|---|---|---|---|
| TCR peptide (μg/mL) | [IL-2] (%) | [IL-2 + IL-18] (%) | [IL-2] + IL-18 (%) | [IL-2 + IL-18] + IL-18 (%) | [IL-7/ IL-15/ AKTi] (%) | [IL-7/ IL-15/ AKTi] + IL-18 (%) | [IL-2] (%) | [IL-2] + IL-18 (%) | [IL-2 + IL-18] (%) | [IL-2 + IL-18] + IL-18 (%) |
| 0 | 7.2 | 23.7 | 8.2 | 30.7 | 16.3 | 22.1 | 16.8 | 8.2 | 18.0 | 22.9 |
| 0.1 | −4.4 | 25.2 | −9.8 | 32.8 | 14.2 | 24.8 | 6.0 | −9.8 | −5.5 | −1.9 |
| 0.3 | −3.7 | 30.1 | −7.5 | 54.8 | 22.1 | 63.7 | 1.3 | −7.5 | −2.7 | −3.9 |
| 1 | 1.0 | 53.4 | −10.8 | 79.9 | 58.3 | 85.0 | 1.8 | −10.8 | 1.1 | −2.1 |
| 3 | 59.4 | 75.6 | −13.1 | 89.7 | 84.6 | 93.9 | −4.4 | −13.1 | −1.3 | −5.0 |
| 10 | 79.8 | 88.9 | −3.2 | 96.5 | 94.2 | 97.3 | −4.5 | −3.2 | −6.4 | 3.8 |
| 30 | 95.0 | 96.0 | −1.7 | 99.0 | 98.8 | 99.6 | 4.1 | −1.6 | −0.9 | −0.3 |

NOTE:
Materials in brackets were present during production of TCR$^+$ T cells + IL-18 denotes IL-18 was added to the co-culture at the time of adding the target cells Adding IL-18 during manufacture of TCR$^+$ T cells in media supplemented with IL-2 increased the cytotoxic activity of TCR$^+$ T cells compared to conditions without IL-18 (i.e., IL-2 only). Addition of TIL-18 at the same time as addition of the target cells to TCR$^+$ T cells did not improve the cytotoxicity of TCR$^+$ T cells grown in media supplemented with IL-2, but did improve the cytotoxicity of TCR$^+$ T cells grown in either IL-2/IL-18 or IL-7/IL-15/AKTi.

Supernatants at Day 1 from the co-cultures of TCR$^+$ T cells grown in media supplemented with IL-18 MV411 targets pulsed with 5 μg/mL of MAGE peptide at a 1:1 E:T ratio were analyzed for levels of interferon gamma (IFN-γ) secretion mediated by TCR binding. IFN-γ production was assessed by Human V-PLEX ProInflammatory Kit according to the manufacturer's instructions using QuickPlex SQ 120 for plate reading and analyzed using Discovery Workbench (all from Meso Scale Diagnostics, Rockville, MID). All samples were diluted to be within the range of detection.

The results suggested that the addition of IL-18 during manufacturing improved the production of IFN-γ to 23158.2 pg/ml compared to 3528.3 pg/ml in the absence of IL-18.

The effect of IL-18 added during manufacturing on proliferation was measured by both CTV and Ki67 staining as described in Example 1.

At a concentration of 5 μg/mL of TCR MAGE peptide, the absolute percentage of parental TCR$^+$ T cells that proliferate as measured by CTV and Ki67 double positive population increased from 14.3% (without IL-18) to 48.0% (with IL-18). At a concentration of 10 μg/mL of TCR MAGE peptide, the absolute percentage of parental TCR$^+$ T cells that proliferate as measured by CTV and Ki67 double positive population increased from 19.20 (without IL-18) to 59.4% (with L-18). Adding in IL-18 during manufacturing of TCR$^+$ T cells improves proliferation in TCR peptide dose-dependent manner.

Example 3

The effect of constitutive L-18 signaling in TCR$^+$ T cells on cytotoxicity and proliferation was tested through recombinant membrane-bound forms of human IL-18 combined with an engineered TCR. TCR T cells were prepared as described in Example 1 except T cells were co-transduced with a MAGE TCR retroviral construct and engineered IL-18 lentiviral constructs described in Table 5. TCR$^+$ T cells were co-cultured with the antigen-negative cell line, MV411. At Day 4, cytotoxicity data was measured from the co-culture assay as described in Example 1 except that a 1:1 E:T of TCR T cells to MV411 cells (that were pulsed with TCR MAGE peptide at a starting concentration of 300

μg/mL) was used. Cytotoxicity was measured by CTV staining as described in Example 1. The results are shown in Table 5.

TABLE 5

| Engineered IL-18 lentiviral constructs | | | | |
|---|---|---|---|---|
| SEQ ID | Signal peptide | IL-18 | Linker | IL-18 receptor |
| 2 | Native (wild-type) IL-18 | Yes | No | No |
| 17 | CD8 signal peptide | Yes | No | No |
| 19 | IL-15 long signal peptide | Yes | No | No |
| 6 | Native (wild-type) IL-18Rα | No | No | human IL-18Rα |
| 21 | CD8 signal peptide | Yes | 3 × GS (SEQ ID NO: 11) | human IL-18Rα |
| 23 | CD8 signal peptide | Yes | 4 × GS (SEQ ID NO: 10) | human IL-18Rα |
| 8 | Native (wild-type) IL-18Rβ | No | No | human IL-18Rβ |
| 25 | CD8 signal peptide | Yes | 3 × GS (SEQ ID NO: 11) | human IL-18Rβ |
| 27 | CD8 signal peptide | Yes | 4 × GS (SEQ ID NO: 10) | human IL-18Rβ |

NOTE:

IL-18 is the wild-type human IL-18 sequence

GS respresents the GGGGS amino acid sequence (SEQ ID NO: 47).

Table 6 shows the percent cytotoxicity of TCR⁺ T cells having the constructs of Table 5 on peptide-pulsed MV411 cells. Results are the average of samples run in triplicate.

TABLE 6

| Percent Cytotoxicity of TCR⁺ T cells | |
|---|---|
| T cells + IL-18 Construct | Percent toxicity (%) |
| TCR⁺ T cells + SEQ ID NO: 2 | 18.2 |
| TCR⁺ T cells + SEQ ID NO: 17 | 80.2 |
| TCR⁺ T cells + SEQ ID NO: 19 | 86.8 |
| TCR⁺ T cells + SEQ ID NO: 6 | 11.1 |
| TCR⁺ T cells + SEQ ID NO: 21 | 67.1 |
| TCR⁺ T cells + SEQ ID NO: 23 | 70.0 |
| TCR⁺ T cells + SEQ ID NO: 8 | 48.6 |
| TCR⁺ T cells + SEQ ID NO: 25 | 90.5 |
| TCR⁺ T cells + SEQ ID NO: 27 | 93.0 |
| TCR⁺ T cells only | 45.9 |
| NTD T cells | −0.4 |

TCR⁺ T cells expressing IL-18 membrane-bound constructs exhibit increased cytotoxic activity against peptide-pulsed targets when compared to T cells manufactured in the presence of IL-2 only. SEQ TD Nos: 25 and 27, membrane-bound IL-18 constructs containing the human IL-18Rβ subunit, showed the highest percentage cytotoxicity.

Proliferation of these TCR⁺ T cells containing constructs of Table 5 was measured by Ki67, TNFα and IFN-γ intracellular staining as described in Example 1 using a series of 3-fold dilutions of the 300 μg/mL starting concentration, i.e., 0.4, 1.2, 3.7, 11.1, 33.3, 100 and 300 μg/mL. After Day 4 of a co-culture of TCR⁺ T cells containing the constructs of Table 5 with peptide-pulsed MV411 cells, the cells were stimulated with a T cell activation cocktail for 2 hours, then washed and stained using the intracellular markers Ki67 (proliferation), TNFα, and IFN-γ. The intracellular cytokines (IFN-γ and TNF-α) were measured by flow cytometry. The results are shown in Tables 7 (IFN-γ) and 8 (TNFα). The percentages shown in the Tables reflects the percent of cells that are positive for both IFN-γ+Ki67 (Table 7) or both TN 0.5+Ki67 (Table 8)

T cells expressing IL-18 membrane-bound constructs exhibit increased IFN-γ and TNF-α production against peptide pulsed target cells when compared to TCR⁺ T cells with no IL-18 constructs or NTD controls.

TABLE 7

| Percent of Proliferating TCR+ T cells producing IFN-γ (IFN-γ + Ki67 double positive) | | | | | | | | | | | | |
|---|---|---|---|---|---|---|---|---|---|---|---|---|
| MAGE peptide (μg/m) | NTD cells | TCR+ cells only | TCR+ cells + SEQ ID 2 | TCR+ cells + SEQ ID 17 | TCR+ cells + SEQ ID 19 | TCR+ cells + SEQ ID 6 | TCR+ cells + SEQ ID 21 | TCR+ cells + SEQ ID 23 | TCR+ cells + SEQ ID 8 | TCR+ cells + SEQ ID 25 | TCR+ cells + SEQ ID 27 |
| 0 | 0.6 | 1.9 | 0.0 | 5.2 | 8.0 | 0.0 | 8.9 | 8.3 | 0.3 | 18.9 | 19.6 |
| 0.4 | 14.2 | 7.4 | 2.5 | 27.3 | 33.0 | 4.0 | 36.7 | 34.6 | 5.4 | 45.7 | 47.4 |
| 1.2 | 38.4 | 19.6 | 16.5 | 39.2 | 40.7 | 13.2 | 48.7 | 49.2 | 24.0 | 52.0 | 51.8 |
| 3.7 | 46.4 | 25.7 | 22.9 | 36.5 | 42.2 | 18.2 | 46.8 | 50.5 | 25.4 | 57.9 | 58.4 |
| 11.1 | 50.2 | 35.7 | 28.8 | 42.6 | 47.9 | 27.9 | 53.6 | 52.5 | 33.3 | 62.2 | 64.5 |
| 33.3 | 47.6 | 41.2 | 35.4 | 42.8 | 51.0 | 33.3 | 57.4 | 58.9 | 40.5 | 65.7 | 66.4 |
| 100 | 48.4 | 50.4 | 39.4 | 45.5 | 49.8 | 38.4 | 58.0 | 57.4 | 45.3 | 68.0 | 67.6 |
| 300 | 39.0 | 47.3 | 33.7 | 42.2 | 46.5 | 40.5 | 55.3 | 55.9 | 49.6 | 63.8 | 65.1 |

TABLE 8

| Percent of proliferating TCR+ T cells producing TNF-α (TNF-α + Ki67 double positive) | | | | | | | | | | | |
|---|---|---|---|---|---|---|---|---|---|---|---|
| TCR peptide (μg/ml) | NTD cells | TCR+ cells only | TCR+ cells + SEQ ID 2 | TCR+ cells + SEQ ID 17 | TCR+ cells + SEQ ID 19 | TCR+ cells + SEQ ID 6 | TCR+ cells + SEQ ID 21 | TCR+ cells + SEQ ID 23 | TCR+ cells + SEQ ID 8 | TCR+ cells + SEQ ID 25 | TCR+ cells + SEQ ID 27 |
| 0 | 0.2 | 0.0 | 0.7 | 3.4 | 2.4 | 1.3 | 3.1 | 2.1 | 2.1 | 6.8 | 7.93 |
| 0.4 | 13.8 | 15.4 | 13.4 | 28.3 | 35.4 | 16.0 | 35.8 | 22.9 | 13.6 | 39.0 | 37.9 |
| 1.2 | 9.5 | 11.0 | 18.0 | 30.7 | 27.8 | 22.2 | 22.6 | 26.9 | 20.9 | 37.2 | 35.9 |
| 3.7 | 12.2 | 7.4 | 17.3 | 36.6 | 34.7 | 21.1 | 31.4 | 41.4 | 28.9 | 46.1 | 44.0 |
| 11.1 | 22.4 | 13.8 | 23.2 | 39.4 | 38.1 | 22.9 | 40.1 | 43.9 | 39.3 | 53.0 | 53.9 |
| 33.3 | 30.8 | 11.7 | 33.4 | 40.2 | 40.1 | 34.7 | 45.3 | 47.0 | 49.2 | 57.3 | 57.2 |
| 100 | 35.1 | 10.6 | 41.5 | 42.9 | 43.3 | 47.1 | 44.7 | 46.6 | 52.4 | 59.3 | 58.5 |
| 300 | 34.7 | 13.9 | 42.4 | 42.4 | 46.0 | 51.3 | 50.9 | 50.9 | 54.7 | 61.2 | 59.0 |

The experiments of Examples 1-3 will be repeated to use media supplemented with IL-2, IL-12 and/or IL-15 and combinations thereof including: 1) IL-2; 2) IL-12; 3) IL-15; 4) IL-18 (100 ng/mL); 5) IL-2+IL-12; 6) IL-2+IL-15; 7) IL-2+IL18; 8) IL-2+IL-15+IL18; 9) IL-2+IL-12+IL 18; 10) IL-2+IL-12+IL-15+IL-18.

Example 4

To determine the effect of IL-18 in combination with and IL-12 and/or IL-15 co-administration on the cytotoxic activity of TCR containing T cells, an in vitro co-culture assay (i.e., an assay where TCR+ T cells are co-incubated in the same well together with target cells expressing the antigen of interest) will be used to measure percent cytotoxicity of target cells. TCR+ T cells will be produced as described in Example 1. The cells may be cultured with 1) IL-2 (1000 IU/mL); 2) IL-12 (100 ng/mL); 3) IL-15 (100 ng/mL); 4) IL-18 (100 ng/mL); 5) IL-2+IL-12; 6) IL-2+IL-15; 7) IL-2+IL18; 8) IL-2+IL-15+IL18; 9) IL-2+IL-12+IL 18; 10) IL-2+IL-12+IL-15+IL-18 and additional cytokine combinations and concentrations thereof.

For initial studies, TCR+ T cells grown in media supplemented with IL-2 will be thawed, rested overnight, and then co-cultured with either MAGE-positive target cells, e.g., H1299 cells, or MAGE-negative target cells, e.g., MV411 cells, at a 4:1 effector:target (E:T) ratio. The target cells will be engineered to express luciferase. Cytokines will be added at Day 0 of the co-culture. On Days 1 and 4 after co-culture initiation, D-luciferin substrate will be added at a final concentration of 0.14 mg/mL and incubated at 37° C. for 10 minutes. T-cell mediated cytotoxicity will be measured in triplicate (N=3) by measuring the luciferase signal of target cells and TCR+ T cells co-cultured together and subtracting the luciferase signal emitted by target cells plated alone (Brown et al., 2005, *J. Immunol. Methods* 297:39-52). Luminescent signal will be determined by a VarioSkan™ LUX or VarioSkan® Flash multimode microplate reader.

The effect of IL-18 in combination with and IL-12 and/or IL-15 on T cell proliferation and IFN-γ production in a co-culture of TCR+ T cells and target cells will also be examined. TCR+ T cells will be prepared as described above. Cells will be co-cultured with either antigen-positive target cells (H1299 cells) or antigen-negative cells (MV411 cells) at a 4:1 effector:target (E:T) ratio in the presence of IL-18 with IL-12 and/or IL-15. Proliferation is measured by labeling T cells with CellTrace™ Violet (CTV) reagent according to the manufacturer's instructions and subsequently washing with RPMI-1640-10% media. With each successive generation of proliferation, the CTV dye is diluted out of the cell. After the cells are grown for 4 days, proliferation will be assessed by measuring the CTV dye on a flow cytometer equipped with a violet laser.

Proliferation will also be measured by Ki67 intracellular staining via flow cytometry. Ki67 will be an intracellular marker that can be used to measure the proliferation within a small time window, whereas CTV determines proliferation over a span of multiple days (CTV staining is usually assessed at day 4 of the co-culture). On Day 4 of a co-culture, TCR+ T cells with a 3:1 effector to target (E:T) ratio will be harvested and will be re-stimulated with a T cell activation cocktail [eBioscience™ Cell Stimulation Cocktail (500X)] for 2 hours at 37° C. to boost Ki67 signal. After stimulation, the cells will be washed with RPMI media, followed with another wash with FACS staining buffer (BD Pharmigen). TCR+ T cells will then be stained with a panel of extracellular antibody fluorophore conjugates (CD3, CD4, CD8, mTCRβ; BD Pharmingen and BioLegend; diluted in FACS staining buffer 1:100, 1:1000, 1:2000, and 1:100, respectively) for 30 minutes at 4° C. After the 30 minute incubation, cells will be washed again with FACS staining buffer. Cells will be fixed with 0.6% paraformaldehyde (PFA) in PBS for 10 minutes at room temperature, then washed with FACS staining buffer. TCR+ T cells will then be permeabilized with BD Perm/Wash™ buffer (BD Biosciences) for 1 hour at 4° C. After 1 hour, cells will be washed with 1× BD Perm/Wash™ buffer, and then stained with a panel of intracellular antibody fluorophores conjugates (Ki67, IFN-γ and TNFα; eBiosciences and BioLegend). Intracellular antibody flurophore conjugates will be diluted to a pre-determined working concentration (Ki67 1:200, TNFα and IFN-γ 1:100) in 1× BD Perm/Wash™ buffer and are incubated with TCR+ T cells for 1 hour at 4° C. Each antibody fluorophore conjugate contains a unique known fluorescent dye. Using flow cytometry with the appropriate laser capability, cellular subsets (CD3+ T cells or TCR+ T cells) will be quantified for Ki67 as a marker for proliferation.

Example 5

To determine the effect of IL-18 in combination with IL-12 and/or IL-15 on TCR+ T cells during manufacture, TCR+ T cells will be prepared as described in Example 4 except that, for certain cultures, IL-18 and IL-12 and/or IL-15 (at 10 ng/mL, 50 ng/mL and 200 ng/mL) will be added at Day 0. For expansion at Days 5, 7, and 9, fresh media containing IL-18 and IL-12 and/or IL-15 will be added. Negative controls will not have any IL-12 or IL-18 added. Other controls will not have any IL-18 added (IL-12 only).

For another arm of this study, after $TCR^+$ T cells will be manufactured, IL-18 and IL-12 and/or IL-15 will be added in during a co-culture of the $TCR^+$ T cells with the target cells. This latter strategy mimics manufacturing in the presence of IL-18 and IL-12 and/or IL-15 co-administration of the $TCR^+$ T cell with IL-18 and IL-12 and/or IL-15.

Target cells (MV411 cells) will be pulsed with a peptide encoding the TCR MAGE antigen at 0, 0.1, 0.3, 1, 3, 10 and 30 μg/mL and will be co-cultured with $TCR^+$ T cells for 4 days at 1:1 and 3:1 E:T ratios. Percent cytotoxicity of target cells will be determined in triplicate as described in Example 4.

Supernatants at Day 1 from the co-cultures of $TCR^+$ T cells grown in media will be supplemented with IL-18 and IL-12 and/or IL-15 MV411 targets will be pulsed with 5 μg/mL of MAGE peptide at a 1:1 E:T ratio are analyzed for levels of interferon gamma (IFN-γ) secretion mediated by TCR binding. IFN-γ production will be assessed by Human V-PLEX ProInflammatory Kit according to the manufacturer's instructions using QuickPlex SQ 120 for plate reading and analyzed using Discovery Workbench (all from Meso Scale Diagnostics, Rockville, MD). All samples will be diluted to be within the range of detection.

The effect of IL-12 and IL-18 and IL-12 and/or IL-15 added during manufacturing on proliferation will be measured by both CTV and Ki67 staining as described in Example 4.

Example 6

The effect of constitutive IL-18 signaling in $TCR^+$ T cells on cytotoxicity and proliferation will be tested through recombinant membrane-bound forms of human IL-18 combined with an engineered TCR and IL-12 and/or IL-15. $TCR^+$ T cells will be prepared as described in Example 1 except T cells will be co-transduced with a MAGE TCR retroviral construct and engineered IL-18 lentiviral constructs described in Table 5. $TCR^+$ T cells will be co-cultured with the antigen-negative cell line, MV411. The cells may be cultured with 1) IL-2 (1000 IU/mL); 2) IL-12 (100 ng/mL); 3) IL-15 (100 ng/mL); 4) IL-2+IL-12; 5) IL-2+IL-15; 6) IL-2+IL-12+IL-15+ additional cytokine combinations and concentrations thereof. At Day 4, cytotoxicity data will be measured from the co-culture assay as described in Example 1 except that a 1:1 E:T of $TCR^+$ T cells to MV411 cells (that are pulsed with TCR MAGE peptide at a starting concentration of 300 μg/mL) will be used. Cytotoxicity will be measured by CTV staining as described in Example 1.

Example 7

To determine the effect of IL-18, IL-15 and/or IL-12 co-administration on the cytotoxic activity of CAR containing T cells, an in vitro co-culture assay (i.e., an assay where CAR T cells are co-incubated in the same well together with target cells expressing the antigen of interest) will be used to measure percent cytotoxicity of target cells.

A CAR construct with FMC63 scFv+CD28 intracellular domain+CD3ζ intracellular domain will also be used. A lentivirus vector will be used for T cell transductions.

CAR T cells will be produced as follows. $CD3^+$ cells obtained from STEMCELL™ Technologies (Vancouver, Canada) will be isolated from peripheral blood mononuclear cells obtained from healthy donors and frozen down in. Before lentivirus transduction, $CD3^+$ pan T cells will be thawed, activated with CD3/CD28 Dynabeads®, (ThermoFisher Scientific) according to manufacturer recommendations and rested overnight. The following day cells will be transduced with lentivirus containing CAR constructs. As controls, Non-transduced (NTD) T cells generated from the same subject will be used. Cells will be normalized for cell counts during expansion. Transduction efficiency will be evaluated by flow cytometry in the presence of a fixable viability dye and analyzed by flow cytometry.

For initial studies, CAR T cells grown in media supplemented with IL-2, will be thawed, rested overnight, and then co-cultured with either CD19-positive target cells, or CD19-negative target cells. IL-18, IL-15 and/or IL-12 will be added in the media at Day 0 of the co-culture. T-cell mediated cytotoxicity will be measured. The cells may be cultured with 1) IL-2 (1000 IU/mL); 2) IL-12 (100 ng/mL); 3) IL-15 (100 ng/mL); 4) IL-18 (100 ng/mL); 5) IL-2+IL-12; 6) IL-2+IL-15; 7) IL-2+IL18; 8) IL-2+IL-15+IL 18; 9) IL-2+IL-12+IL 18; 10) IL-2+IL-12+IL-15+IL-18 and additional cytokine combinations and concentrations thereof.

The effect of IL-18, IL-15 and IL-12 alone and in combination on T cell proliferation and IFN-γ production in a co-culture of CAR T cells and target cells will also be examined. CAR T cells will be prepared as described above. Cells will be co-cultured with either $CD19^+$ target cells or $CD19^-$ cells at a 4:1 effector:target (E:T) ratio in the presence of IL-18, IL-15 and/or IL-12. Proliferation will be measured by labeling T cells with CellTrace™ Violet (CTV) reagent according to the manufacturer's instructions and subsequently washed with RPMI-1640-10% media. With each successive generation of proliferation, the CTV dye will be diluted out of the cell. After the cells are grown for 4 days, proliferation will be assessed by measuring the CTV dye on a flow cytometer.

Proliferation may also by measured by Ki67 intracellular staining via flow cytometry. Ki67 is an intracellular marker that can be used to measure the proliferation within a small time window, whereas CTV determines proliferation over a span of multiple days (CTV staining is usually assessed at day 4 of the co-culture). On Day 4 of a co-culture, CAR T cells with a 3:1 effector to target (E:T) ratio will be harvested and re-stimulated with a T cell activation cocktail [eBioscience™ Cell Stimulation Cocktail (500X)] for 2 hours at 37C to boost Ki67 signal. After stimulation, the cells will be washed with RPMI media, followed with another wash with FACS staining buffer (BD Pharmigen). CAR T cells will be stained with a panel of extracellular antibody fluorophore conjugates for 30 minutes at 4° C. After the 30 minute incubation, cells will be washed again with FACS staining buffer. Cells will be fixed then washed with FACS staining buffer. CAR T cells will be permeabilized with BD Perm/Wash™ buffer (BD Biosciences) for 1 hour at 4° C. After 1 hour, cells will be washed with 1× BD Perm/Wash™ buffer, and then stained with a panel of intracellular antibody fluorophores conjugates (Ki67, IFN-γ and TNFα; eBiosciences and BioLegend). Intracellular antibody fluorophore conjugates will be diluted to a pre-determined working concentration (Ki67 1:200, TNFα and IFN-γ 1:100) in 1× BD Perm/Wash™ buffer and will be incubated with CAR T cells for 1 hour at 4° C. Each antibody fluorophore conjugate will contain a unique known fluorescent dye. Using flow cytometry with the appropriate laser capability, cellular subsets (CD3+ T cells or CAR T cells) will be quantified for Ki67 as a marker for proliferation.

Example 8

To determine the effect of IL-18, IL-15 and/or IL-12 on CAR T cells during manufacture, CAR T cells will be prepared as described in Example 8 except that, for certain cultures, IL-18, IL-15 and/or IL-12 will be added to the media at Day 0. For expansion at Days 5, 7, and 9, fresh media containing IL-18, IL-15 and/or IL-12 will be added. The cells may be cultured with 1) IL-2 (1000 IU/mL); 2) IL-12 (100 ng/mL); 3) IL-15 (100 ng/mL); 4) IL-18 (100 ng/mL); 5) IL-2+IL-12; 6) IL-2+IL-15; 7) IL-2+IL 18; 8) IL-2+IL-15+IL18; 9) IL-2+IL-12+IL 18; 10) IL-2+IL-12+IL-15+IL-18 and additional cytokine combinations and concentrations thereof. For another arm of this study, after CAR T cells are manufactured, IL-18, IL-15 and/or IL-12 will be added in during a co-culture of the CAR T cells with the target cells. This latter strategy mimics manufacturing in the presence of IL-18, IL-15 and/or IL-12 and co-administration of the CAR T cell with IL-18, IL-15 and/or IL12.

Target cells are co-cultured with CAR T cells for 4 days at 1:1 and 3:1 E:T ratios. Percent cytotoxicity of target cells will be determined in triplicate as described in Example 7.

Example 9

The effect of constitutive IL-18 signaling on CAR T cells on cytotoxicity and proliferation will be tested through recombinant membrane-bound forms of human IL-18 (mb IL-18) combined with an engineered CAR. CAR T cells will be prepared as described in Example 7 except T cells will be co-transduced with a CAR construct and mb IL-18 lentiviral constructs, see for example, Table 5. CAR T cells will be co-cultured with an antigen-negative cell line. Culture media may be supplemented with IL-15 and/or IL-12. The cells may be cultured with 1) IL-2 (1000 IU/mL); 2) IL-12 (100 ng/mL); 3) IL-15 (100 ng/mL); 4) IL-2+IL-12; 5) IL-2+IL-15; 6) IL-2+IL-12+IL-15+ and additional cytokine combinations and concentrations thereof. At Day 4, cytotoxicity data will be measured from the co-culture assay as described in Example 7.

Example 10

The effect of IL-18, IL-15 and/or IL-12 for augmenting Natural Killer (NK) cell based immunotherapy will also be investigated. To demonstrate the benefit of IL-18, IL-15 and/or IL-12 on NK cells, initial experiments will include two sources of NK cells: Primary NK cells isolated from peripheral blood and $CD19^+$ CAR NK cells derived from the NK-92 cell line.

NK cells are innate immune cells that exert effector functions through secretion of cytokines such as interferon-γ (IFN-γ) and TNF-α and even more predominantly through direct lysis of their targets.

Primary NK cells will be isolated from fresh peripheral blood PB (EasySep Human NK Cell Isolation Kit, Stem Cell Technologies) and cultured overnight in primary NK cell media (DMEM) containing either: 1) IL-2 (1000 IU/mL); 2) IL-12 (100 ng/mL); 3) IL-15 (100 ng/mL); 4) IL-18 (100 ng/mL); 5) IL-2+IL-12; 6) IL-2+IL-15; 7) IL-2+IL18; 8) IL-2+IL-15+IL18; 9) IL-2+IL-12+IL 18; 10) IL-2+IL-12+IL-15+IL-18 and additional cytokine combinations and concentrations thereof. Following overnight culture, primary NK cells from each culture condition will be further cultured alone or placed in co-culture with K562_luciferase cells (from ATCC engineered to express luciferin in-house) as target cells in the presence of the aforementioned cytokines and cytokine combinations at E:T ratios of 2:1, 1:1, and 1:2. After four, eight, and sixteen hours of co-culture, the following parameters will be measured in all wells: A) Supernatant levels of secreted IFN-γ, TNF-α by Meso Scale Discovery, B) Surface expression of CD107a on NK cells by flow cytometry and C) Specific lysis against K652 cells as measured by K562 luciferase signal on a plate reader.

The CAR-NK constructs will be made as follows: the NK-92 cell line (from ATCC) will be transduced with a lentiviral construct expressing $CD19^+$ CAR+mbIL-18 with polybrene addition and spinoculation methods to enhance transduction efficiency. After transduction, NK-92 CAR cells+mbIL-18 will be expanded in NK-92 medium (RPMI 1640 with 10% FMS, 2 mM L-glutamine) and recombinant IL-2 (1000 IU/mL), recombinant human IL-12 and/or recombinant human IL-15. After eight to ten days of expansion, CAR transduction percentage will be measured by flow cytometry, and cells will be moved to NK-92 media containing either: 1) IL-2 (1000 IU/mL); 2) IL-12 (100 ng/mL); 3) IL-15 (100 ng/mL); 4) IL-18 (100 ng/mL); 5) IL-2+IL-12; 6) IL-2+IL-15; 7) IL-2+IL 18; 8) IL-2+IL-15+IL18; 9) IL-2+IL-12+IL 18; 10) IL-2+IL-12+IL-15+IL-18 and additional cytokine combinations and concentrations thereof for 24 hours as pre-incubation before co-culture with $CD19^+$ Nalm6 cells for 24 hours. Control wells containing NK-92 CAR+mbIL-18 without co-culture will also be included. After four, eight, and 16 hours of Nalm6 co-culture, the following will be measured in all conditions: A) Supernatant levels of secreted IFN-γ, TNF-α by Meso Scale Discovery, B) Surface expression of CD107a on NK cells by flow cytometry and C) Specific lysis against K652 cells as measured by K562 luciferase signal on a plate reader.

Example 11

To determine the effect of IL-18, IL-15 and/or IL-12 on CAR containing NK cells during manufacture, CAR containing NK cells will be prepared as described in Example 11 except that, for certain cultures, IL-18, IL15 and/or IL-12 is added at Day 0 to the media. Combinations may also include: 1) IL-2; 2) IL-12; 3) IL-15; 4) IL-18 (100 ng/mL); 5) IL-2+IL-12; 6) IL-2+IL-15; 7) IL-2+IL18; 8) IL-2+IL-15+IL18; 9) IL-2+IL-12+IL 18; 10) IL-2+IL-12+IL-15+IL-18. For expansion at Days 5, 7, and 9, fresh media containing IL-18, IL-15, and/or IL-12 will be added. Negative controls will not have any IL-18, IL-15 and/or IL-12 added. For another arm of this study, after CAR containing NK cells are manufactured, IL-18, IL-15, and/or IL-12 will be added in during a co-culture of the CAR T cells with the target cells. The cells may be cultured with 1) IL-2 (1000 IU/mL); 2) IL-12 (100 ng/mL); 3) IL-15 (100 ng/mL); 4) IL-18 (100 ng/mL); 5) IL-2+IL-12; 6) IL-2+IL-15; 7) IL-2+IL18; 8) IL-2+IL-15+IL18; 9) IL-2+IL-12+IL 18; 10) IL-2+IL-12+IL-15+IL-18 and additional cytokine combinations and concentrations thereof. This latter strategy mimics manufacturing in the presence of IL-18, IL-15 and/or IL-12 and co-administration of the CAR containing NK cells cell with IL-18, IL-15 and/or IL-12.

Target cells will be co-cultured with CAR T cells for 4 days at 1:1 and 3:1 E:T ratios. Percent cytotoxicity of target cells will determined in triplicate as described in Example 7.

Example 13

The effect of constitutive IL-18 signaling CAR containing NK cells on cytotoxicity and proliferation will be tested through recombinant membrane-bound forms of human IL-18 combined with an engineered CAR. CAR containing NK cells will prepared by co-transducing with a CAR construct and membrane bound engineered IL-18 lentiviral constructs. The cells may be cultured with 1) IL-2 (1000

IU/mL); 2) IL-12 (100 ng/mL); 3) IL-15 (100 ng/mL); 4) IL-2+IL-12; 5) IL-2+IL-15; 6) IL-2+IL-12+IL-15+ and additional cytokine combinations and concentrations thereof. CAR containing NK cells will be co-cultured with an antigen-negative cell line. At Day 4, cytotoxicity data is measured from the co-culture assay as described in Example 7.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of treating a B-cell lymphoma expressing CD19 tumor antigen in a subject comprising administering to the subject an effective amount of T-cells via systemic administration, wherein the T-cells are autologous T-cells and comprise (1) a chimeric antigen receptor (CAR) or exogenous T cell receptor (TCR) recognizing CD19 and (2) a membrane-bound IL-18.

2. The method of claim 1, wherein the membrane-bound IL-18 is obtained by expression of a nucleic acid comprising a nucleotide sequence encoding a polypeptide comprising a signal peptide, interleukin-18 (IL-18) and an interleukin-18 receptor (IL-18R) subunit.

3. The method of claim 2, wherein the nucleic acid comprises a nucleotide sequence selected from the group consisting of SEQ ID NOs: 18, 20, 22, 24, 26, 28, 30, 32, 34, 36, 38 and 40.

4. The method of claim 1, wherein the T-cells are further cultured with one or more of IL-2, a Protein kinase B (AKT) inhibitor, IL-7, IL-12, or IL-15.

5. The method of claim 1, wherein the T cells express a CAR recognizing CD19.

* * * * *